US010691726B2

(12) United States Patent
Rapaport et al.

(10) Patent No.: US 10,691,726 B2
(45) Date of Patent: Jun. 23, 2020

(54) METHODS USING SOCIAL TOPICAL ADAPTIVE NETWORKING SYSTEM

(71) Applicant: Jeffrey A. Rapaport, Angeles (PH)

(72) Inventors: Jeffrey A. Rapaport, Angeles (PH); Seymour Rapaport, Los Altos, CA (US); Kenneth Allen Smith, Fremont, CA (US); James Beattie, San Ramon, CA (US); Gideon Gimlan, Los Gatos, CA (US)

( * ) Notice: Subject to any disclaimer, the term of this patent is extended or adjusted under 35 U.S.C. 154(b) by 350 days.

(21) Appl. No.: 14/013,464

(22) Filed: Aug. 29, 2013

(65) Prior Publication Data
US 2014/0236953 A1 Aug. 21, 2014

Related U.S. Application Data

(62) Division of application No. 12/369,274, filed on Feb. 11, 2009, now Pat. No. 8,539,359.

(51) Int. Cl.
*G06F 16/28* (2019.01)
*G06Q 30/02* (2012.01)
*G06Q 10/10* (2012.01)

(52) U.S. Cl.
CPC ........... *G06F 16/285* (2019.01); *G06Q 10/10* (2013.01); *G06Q 30/02* (2013.01)

(58) Field of Classification Search
CPC ........... G06Q 50/01; G06Q 10/063114; G06Q 30/02; G06F 3/017; G06F 17/30; G06F 16/285

(Continued)

(56) References Cited

U.S. PATENT DOCUMENTS 2,870,026 A 1/1959 Keller
3,180,760 A * 4/1965 Rauter .................. H01M 10/10
429/204

(Continued)

OTHER PUBLICATIONS

Miluzzo et al., title "Sensing Meets Mobile Social Networks: The Design, Implementation and Evaluation of the CenceMe Application", published in ACM dated Nov. 5-7, 2008, pp. 337-350.*

(Continued)

*Primary Examiner* — Pierre M Vital
*Assistant Examiner* — Nargis Sultana
(74) *Attorney, Agent, or Firm* — Vierra Magen Marcus LLP

(57) ABSTRACT

A machine-implemented social networking system builds up and repeatedly refreshes a hierarchy tree containing topic nodes. New nodes are added as new topics emerge in online public forums. Each topic node can link to an on-topic real time chat room whose occupants are currently discussing the topic of the node. A chat room can be pointed to by more than one node if the room is discussing multiple topics. Rooms can migrate from node to node as room topic dynamically changes. A system user who explicitly or inferentially wishes to be invited into a chat room which is on-topic with what the user is currently focused upon can do so by use of a node-seeking automated process. The process operates in the background and seeks out nodes of the hierarchy tree that currently have topics appearing to be the same as or similar to what topics the user appears to have in mind. Content browsing experience of the user is enhanced by addition of an invitations displaying subsystem that automatically invites him or her to co-compatible chat rooms currently discussing the topic(s) the user appears to have in mind. One of the many topics that a user may inferentially have in mind is that of being at a given location as reported by the user's GPS and wondering what best to do at that location and time.

260 Claims, 33 Drawing Sheets

(58) Field of Classification Search
USPC .............. 705/319, 7.15; 700/204; 715/758; 707/740
See application file for complete search history.

(56) References Cited

U.S. PATENT DOCUMENTS

| | | | |
|---|---|---|---|
| 3,676,937 A * | 7/1972 | Janson | D06B 9/06 165/290 |
| 3,749,870 A * | 7/1973 | Oakes | H01H 9/0214 200/298 |
| 5,047,363 A * | 9/1991 | Hickernell | H03H 9/02976 257/416 |
| 5,337,233 A * | 8/1994 | Hofert | G06F 17/2264 715/234 |
| 5,754,939 A | 5/1998 | Herz et al. | |
| 5,793,365 A | 8/1998 | Tang et al. | |
| 5,828,839 A | 10/1998 | Moncreiff | |
| 5,848,396 A * | 12/1998 | Gerace | G06Q 30/02 705/14.49 |
| 5,930,474 A * | 7/1999 | Dunworth | G06F 17/3087 707/999.01 |
| 5,950,200 A * | 9/1999 | Sudai | H04M 3/42008 |
| 5,961,332 A * | 10/1999 | Joao | G16H 10/20 434/236 |
| 6,041,311 A | 3/2000 | Chislenko et al. | |
| 6,047,363 A | 4/2000 | Lewchuk | |
| 6,061,716 A | 5/2000 | Moncreiff | |
| 6,064,971 A * | 5/2000 | Hartnett | G06Q 40/02 706/45 |
| 6,081,830 A * | 6/2000 | Schindler | H04L 29/06 348/552 |
| 6,154,213 A * | 11/2000 | Rennison | G06F 16/34 715/854 |
| 6,229,542 B1 | 5/2001 | Miller | |
| 6,256,633 B1 * | 7/2001 | Dharap | G06F 16/9535 |
| 6,272,467 B1 * | 8/2001 | Durand | G06Q 10/02 705/26.1 |
| 6,425,012 B1 | 7/2002 | Trovato et al. | |
| 6,442,450 B1 | 8/2002 | Inoue | |
| 6,446,113 B1 * | 9/2002 | Ozzie | G06F 16/1767 709/204 |
| 6,480,885 B1 | 11/2002 | Olivier | |
| 6,496,851 B1 * | 12/2002 | Morris | H04L 12/1818 709/204 |
| 6,577,329 B1 * | 6/2003 | Flickner | G06F 3/013 715/774 |
| 6,611,881 B1 | 8/2003 | Gottfurcht et al. | |
| 6,618,593 B1 | 9/2003 | Drutman et al. | |
| 6,651,086 B1 | 11/2003 | Manber et al. | |
| 6,745,178 B1 * | 6/2004 | Emens | G06F 16/951 707/741 |
| 6,757,682 B1 | 6/2004 | Naimark et al. | |
| 6,766,374 B2 | 7/2004 | Trovato et al. | |
| 6,873,314 B1 * | 3/2005 | Campbell | A61B 3/113 345/156 |
| 6,879,994 B1 | 4/2005 | Matsliach et al. | |
| 6,978,292 B1 * | 12/2005 | Murakami | G06Q 10/107 709/200 |
| 6,981,021 B2 * | 12/2005 | Takakura | H04W 4/029 709/204 |
| 6,981,040 B1 * | 12/2005 | Konig | H04L 67/20 |
| 7,219,303 B2 | 5/2007 | Fish | |
| 7,386,796 B1 | 6/2008 | Simpson et al. | |
| 7,394,388 B1 * | 7/2008 | Light | G06Q 30/02 340/539.1 |
| 7,395,507 B2 * | 7/2008 | Robarts | G06Q 10/10 709/206 |
| 7,401,098 B2 | 7/2008 | Baker | |
| 7,424,541 B2 | 9/2008 | Bourne | |
| 7,472,352 B2 | 12/2008 | Liversidge et al. | |
| 7,610,287 B1 * | 10/2009 | Dean | H04L 12/1818 |
| 7,630,986 B1 | 12/2009 | Herz et al. | |
| 7,640,304 B1 * | 12/2009 | Goldscheider | G06Q 10/10 709/204 |
| 7,647,098 B2 | 1/2010 | Prichep | |
| 7,720,784 B1 * | 5/2010 | Froloff | A61B 5/165 706/47 |
| 7,730,030 B1 * | 6/2010 | Xu | G06Q 10/10 707/617 |
| 7,788,260 B2 | 8/2010 | Lunt et al. | |
| 7,853,881 B1 * | 12/2010 | Aly Assal | G06Q 30/02 715/734 |
| 7,860,928 B1 | 12/2010 | Anderson | |
| 7,865,553 B1 * | 1/2011 | Anderson | G06Q 10/10 709/205 |
| 7,878,390 B1 * | 2/2011 | Batten | G06Q 30/0207 235/383 |
| 7,904,500 B1 | 3/2011 | Anderson | |
| 7,945,861 B1 | 5/2011 | Karam | |
| 7,966,656 B2 | 6/2011 | Dawson et al. | |
| 8,024,328 B2 | 9/2011 | Dolin et al. | |
| 8,150,868 B2 | 4/2012 | Richardson et al. | |
| 8,180,760 B1 | 5/2012 | Carver | |
| 8,249,898 B2 | 8/2012 | Schoenberg | |
| 8,274,377 B2 | 9/2012 | Smith et al. | |
| 8,380,902 B2 * | 2/2013 | Howard | G06Q 10/06 705/7.15 |
| 8,676,937 B2 | 3/2014 | Rapaport | |
| 8,743,708 B1 * | 6/2014 | Robertson | H04W 28/18 370/252 |
| 8,843,835 B1 * | 9/2014 | Busey | H04L 12/1813 715/739 |
| 9,015,093 B1 * | 4/2015 | Commons | G01C 21/3602 701/23 |
| 9,135,663 B1 * | 9/2015 | Heiferman | G06Q 50/01 |
| 9,183,285 B1 * | 11/2015 | Brown | G06F 17/30598 |
| 9,749,870 B2 | 8/2017 | Kadel | |
| 2001/0053694 A1 * | 12/2001 | Igarashi | H04L 63/08 455/433 |
| 2002/0072955 A1 * | 6/2002 | Brock | G06Q 30/02 715/758 |
| 2003/0037110 A1 | 2/2003 | Yamamoto | |
| 2003/0052911 A1 | 3/2003 | Cohen-Solal | |
| 2003/0055897 A1 | 3/2003 | Brown et al. | |
| 2003/0069900 A1 * | 4/2003 | Hind | G06Q 10/107 |
| 2003/0076352 A1 * | 4/2003 | Uhlig | G06F 17/241 715/738 |
| 2003/0078972 A1 | 4/2003 | Tapissier et al. | |
| 2003/0092428 A1 * | 5/2003 | Awada | H04M 1/72572 455/414.1 |
| 2003/0160815 A1 * | 8/2003 | Muschetto | G06F 3/0481 715/733 |
| 2003/0195928 A1 | 10/2003 | Kamijo et al. | |
| 2003/0225833 A1 | 12/2003 | Pilat et al. | |
| 2003/0234953 A1 | 12/2003 | Dawson et al. | |
| 2004/0075677 A1 * | 4/2004 | Loyall | G06F 3/011 715/706 |
| 2004/0076936 A1 * | 4/2004 | Horvitz | G06Q 30/02 434/236 |
| 2004/0078432 A1 | 4/2004 | Manber et al. | |
| 2004/0174971 A1 * | 9/2004 | Guan | H04M 3/436 379/201.02 |
| 2004/0205651 A1 | 10/2004 | Dutta et al. | |
| 2004/0228531 A1 | 11/2004 | Fernandez et al. | |
| 2005/0004923 A1 * | 1/2005 | Park | G06Q 30/02 |
| 2005/0054381 A1 * | 3/2005 | Lee | G06F 3/011 455/557 |
| 2005/0086610 A1 | 4/2005 | Mackinlay et al. | |
| 2005/0154693 A1 | 7/2005 | Ebert | |
| 2005/0246165 A1 * | 11/2005 | Pettinelli | G10L 15/1807 704/207 |
| 2005/0259035 A1 | 11/2005 | Iwaki et al. | |
| 2006/0020662 A1 * | 1/2006 | Robinson | G06F 15/16 709/203 |
| 2006/0026111 A1 * | 2/2006 | Athelogou | G06N 5/04 706/45 |
| 2006/0026152 A1 * | 2/2006 | Zeng | G06F 17/3071 |
| 2006/0080613 A1 | 4/2006 | Savant et al. | |
| 2006/0093998 A1 | 5/2006 | Vertegaal | |
| 2006/0156326 A1 | 7/2006 | Goronzy et al. | |
| 2006/0176831 A1 | 8/2006 | Greenberg et al. | |

(56) References Cited

U.S. PATENT DOCUMENTS

| | | | |
|---|---|---|---|
| 2006/0213976 A1 | 9/2006 | Inakoshi et al. | |
| 2006/0224593 A1 | 10/2006 | Benton et al. | |
| 2006/0270419 A1* | 11/2006 | Crowley | H04L 51/00 455/456.2 |
| 2007/0005425 A1* | 1/2007 | Bennett | G06Q 30/02 705/14.73 |
| 2007/0016585 A1 | 1/2007 | Nickell et al. | |
| 2007/0036292 A1 | 2/2007 | Selbie et al. | |
| 2007/0094601 A1* | 4/2007 | Greenberg | G06F 16/2246 715/713 |
| 2007/0100938 A1 | 5/2007 | Bagley et al. | |
| 2007/0112719 A1* | 5/2007 | Reich | G06Q 30/02 706/48 |
| 2007/0113181 A1* | 5/2007 | Blattner | G06F 3/011 715/706 |
| 2007/0149214 A1* | 6/2007 | Walsh | H04L 12/1859 455/456.1 |
| 2007/0150281 A1* | 6/2007 | Hoff | G06Q 30/02 704/270 |
| 2007/0150916 A1* | 6/2007 | Begole | H04H 60/31 725/10 |
| 2007/0168446 A1 | 7/2007 | Keohane et al. | |
| 2007/0168448 A1 | 7/2007 | Garbow et al. | |
| 2007/0168863 A1* | 7/2007 | Blattner | G06F 3/011 715/706 |
| 2007/0214077 A1* | 9/2007 | Barnes | G06Q 40/02 705/38 |
| 2007/0239566 A1* | 10/2007 | Dunnahoo | G06Q 30/0239 705/26.1 |
| 2007/0265507 A1* | 11/2007 | de Lemos | A61B 3/113 600/300 |
| 2007/0282724 A1* | 12/2007 | Barnes | G06Q 40/00 705/35 |
| 2008/0005252 A1* | 1/2008 | Della Pasqua | G06Q 10/10 709/206 |
| 2008/0040474 A1* | 2/2008 | Zuckerberg | G06Q 30/02 709/224 |
| 2008/0052742 A1 | 2/2008 | Kopf et al. | |
| 2008/0065468 A1* | 3/2008 | Berg | G06Q 30/02 705/7.32 |
| 2008/0082548 A1* | 4/2008 | Betts | G06Q 10/10 |
| 2008/0091512 A1* | 4/2008 | Marci | A61B 5/16 705/7.29 |
| 2008/0114737 A1* | 5/2008 | Neely | G06Q 10/107 |
| 2008/0114755 A1* | 5/2008 | Wolters | G06F 16/954 |
| 2008/0133664 A1* | 6/2008 | Lentz | H04N 7/15 709/204 |
| 2008/0154883 A1* | 6/2008 | Chowdhury | G06F 3/0482 |
| 2008/0189367 A1 | 8/2008 | Okumura | |
| 2008/0209343 A1 | 8/2008 | Macadaan et al. | |
| 2008/0209350 A1* | 8/2008 | Sobotka | G06F 3/0482 715/762 |
| 2008/0222295 A1* | 9/2008 | Robinson | G06Q 10/10 709/227 |
| 2008/0266118 A1* | 10/2008 | Pierson | A61B 5/0205 340/573.6 |
| 2008/0281783 A1 | 11/2008 | Papkoff et al. | |
| 2008/0288437 A1* | 11/2008 | Siregar | G06N 5/02 706/50 |
| 2008/0313108 A1 | 12/2008 | Carrabis | |
| 2008/0320082 A1* | 12/2008 | Kuhlke | H04L 12/1822 709/205 |
| 2009/0077064 A1 | 3/2009 | Daigle | |
| 2009/0089678 A1* | 4/2009 | Sacco | G06Q 30/02 715/733 |
| 2009/0094088 A1* | 4/2009 | Chen | G06Q 10/06312 705/7.19 |
| 2009/0100469 A1 | 4/2009 | Conradt et al. | |
| 2009/0112696 A1 | 4/2009 | Jung et al. | |
| 2009/0112713 A1 | 4/2009 | Jung et al. | |
| 2009/0119584 A1* | 5/2009 | Herbst | G06F 16/367 715/273 |
| 2009/0164916 A1* | 6/2009 | Jeong | A63F 13/12 715/753 |
| 2009/0179983 A1 | 7/2009 | Schindler | |
| 2009/0204714 A1* | 8/2009 | Ferrara | G06Q 10/10 709/228 |
| 2009/0215469 A1* | 8/2009 | Fisher | H04L 51/32 455/456.3 |
| 2009/0233623 A1* | 9/2009 | Johnson | H04W 4/023 455/456.3 |
| 2009/0234727 A1* | 9/2009 | Petty | G06Q 30/02 705/14.54 |
| 2009/0234876 A1 | 9/2009 | Schigel et al. | |
| 2009/0249244 A1 | 10/2009 | Robinson et al. | |
| 2009/0254662 A1* | 10/2009 | Lee | H04L 67/30 709/227 |
| 2009/0260060 A1* | 10/2009 | Smith | G06Q 10/10 726/3 |
| 2009/0325615 A1* | 12/2009 | McKay | H04L 63/02 455/466 |
| 2009/0327417 A1 | 12/2009 | Chakra et al. | |
| 2010/0037277 A1 | 2/2010 | Flynn-Ripley et al. | |
| 2010/0057857 A1 | 3/2010 | Szeto | |
| 2010/0058183 A1* | 3/2010 | Hamilton, II | G06Q 30/02 715/706 |
| 2010/0063993 A1* | 3/2010 | Higgins | G06Q 10/10 709/203 |
| 2010/0070448 A1* | 3/2010 | Omoigui | H01L 27/1463 706/47 |
| 2010/0070758 A1 | 3/2010 | Low et al. | |
| 2010/0070875 A1* | 3/2010 | Turski | G06Q 10/107 715/748 |
| 2010/0073133 A1* | 3/2010 | Conreux | G07C 9/00111 340/5.67 |
| 2010/0094797 A1* | 4/2010 | Monteverde | G06Q 10/10 706/54 |
| 2010/0114684 A1 | 5/2010 | Neged et al. | |
| 2010/0153453 A1* | 6/2010 | Knowles | G06Q 10/107 707/784 |
| 2010/0159909 A1 | 6/2010 | Stifelman | |
| 2010/0164956 A1 | 7/2010 | Hyndman et al. | |
| 2010/0169766 A1* | 7/2010 | Duarte | G06F 3/04842 715/244 |
| 2010/0180217 A1 | 7/2010 | Li | |
| 2010/0191727 A1 | 7/2010 | Malik | |
| 2010/0191741 A1* | 7/2010 | Stefik | G06F 16/3328 707/748 |
| 2010/0191742 A1* | 7/2010 | Stefik | G06F 16/355 707/748 |
| 2010/0198633 A1 | 8/2010 | Guy | |
| 2010/0205541 A1* | 8/2010 | Rapaport | G06Q 10/10 715/753 |
| 2010/0223157 A1* | 9/2010 | Kalsi | G06Q 30/06 705/26.1 |
| 2010/0250497 A1* | 9/2010 | Redlich | F41H 13/00 707/661 |
| 2010/0293104 A1 | 11/2010 | Olsson et al. | |
| 2011/0016121 A1* | 1/2011 | Sambrani | G06F 17/30702 707/734 |
| 2011/0029898 A1 | 2/2011 | Malik | |
| 2011/0040155 A1* | 2/2011 | Guzak | A61B 5/16 600/300 |
| 2011/0041153 A1* | 2/2011 | Simon | G06Q 30/02 725/46 |
| 2011/0047119 A1 | 2/2011 | Kaplan | |
| 2011/0047487 A1 | 2/2011 | DeWeese et al. | |
| 2011/0055017 A1 | 3/2011 | Solomon et al. | |
| 2011/0055734 A1 | 3/2011 | Borst et al. | |
| 2011/0055735 A1 | 3/2011 | Wood et al. | |
| 2011/0082907 A1 | 4/2011 | Anderson | |
| 2011/0087540 A1 | 4/2011 | Krishnan et al. | |
| 2011/0087735 A1 | 4/2011 | Anderson | |
| 2011/0125661 A1 | 5/2011 | Hull et al. | |
| 2011/0137690 A1 | 6/2011 | Louch et al. | |
| 2011/0137921 A1* | 6/2011 | Inagaki | G06F 17/3069 707/749 |
| 2011/0137951 A1 | 6/2011 | Baker | |
| 2011/0142016 A1 | 6/2011 | Chatterjee | |

(56) References Cited

U.S. PATENT DOCUMENTS

| | | | |
|---|---|---|---|
| 2011/0145570 A1 | 6/2011 | Gressel et al. | |
| 2011/0153761 A1 | 6/2011 | Anderson | |
| 2011/0154224 A1 | 6/2011 | Bates et al. | |
| 2011/0161164 A1 | 6/2011 | Anderson | |
| 2011/0161177 A1 | 6/2011 | Anderson | |
| 2011/0179125 A1 | 7/2011 | Lee et al. | |
| 2011/0185025 A1* | 7/2011 | Cherukuri | H04L 12/1813 709/206 |
| 2011/0197123 A1 | 8/2011 | Caine et al. | |
| 2011/0197146 A1 | 8/2011 | Goto et al. | |
| 2011/0201423 A1 | 8/2011 | Borst et al. | |
| 2011/0219015 A1* | 9/2011 | Kim | G06F 17/30864 707/768 |
| 2011/0246306 A1* | 10/2011 | Blackhurst | G06Q 30/02 705/14.58 |
| 2011/0246908 A1 | 10/2011 | Akram et al. | |
| 2011/0246920 A1* | 10/2011 | Lebrun | G06Q 30/02 715/769 |
| 2011/0270618 A1* | 11/2011 | Banerjee | G06Q 30/02 705/1.1 |
| 2012/0042263 A1* | 2/2012 | Rapaport | G06Q 50/01 715/753 |
| 2012/0047447 A1* | 2/2012 | Haq | G06F 3/04847 715/752 |
| 2012/0079045 A1* | 3/2012 | Plotkin | H04L 51/12 709/206 |
| 2012/0102130 A1* | 4/2012 | Guyot | H04L 51/12 709/206 |
| 2012/0124486 A1 | 5/2012 | Robinson et al. | |
| 2012/0158633 A1 | 6/2012 | Eder | |
| 2012/0259240 A1* | 10/2012 | Llewellynn | G06Q 30/02 600/558 |
| 2012/0265528 A1 | 10/2012 | Gruber et al. | |
| 2012/0323691 A1* | 12/2012 | McLaughlin | G06Q 30/00 705/14.58 |
| 2013/0018685 A1* | 1/2013 | Parnaby | G06Q 10/10 705/7.13 |
| 2013/0041696 A1* | 2/2013 | Richard | G06Q 30/06 705/5 |
| 2013/0079149 A1* | 3/2013 | Fletcher | G06Q 50/01 463/42 |
| 2013/0325755 A1* | 12/2013 | Arquette | H04L 51/32 706/12 |
| 2014/0233472 A1* | 8/2014 | Kadel | H04W 28/26 370/329 |
| 2014/0282646 A1* | 9/2014 | McCoy | G06K 9/00597 725/12 |
| 2014/0309782 A1* | 10/2014 | Sharpe | G05D 21/02 700/266 |
| 2014/0321839 A1* | 10/2014 | Armstrong | F24D 19/1063 392/463 |
| 2015/0046588 A1* | 2/2015 | Martini | H04L 63/18 709/225 |
| 2015/0121495 A1* | 4/2015 | Gao | H04W 12/04 726/6 |
| 2015/0125147 A1* | 5/2015 | Zhang | H04Q 11/0071 398/58 |
| 2015/0220995 A1* | 8/2015 | Guyot | G06Q 30/0269 705/14.66 |
| 2015/0262430 A1* | 9/2015 | Farrelly | H04L 67/306 705/13 |
| 2015/0296369 A1* | 10/2015 | Berionne | H04W 8/183 455/418 |
| 2016/0150260 A1* | 5/2016 | Ovide | H04N 21/2668 725/12 |
| 2016/0275801 A1* | 9/2016 | Kopardekar | G08G 5/0043 |
| 2016/0353274 A1* | 12/2016 | Chichierchia | H04B 1/3816 |
| 2017/0034178 A1* | 2/2017 | Hansen | G06Q 10/06 |
| 2017/0115992 A1* | 4/2017 | Krishnamurthy | G06F 9/4403 |
| 2017/0134948 A1* | 5/2017 | Gao | H04W 12/06 |
| 2017/0171142 A1 | 6/2017 | Arquette | |

OTHER PUBLICATIONS

Milluzo et al., title "Sensing Meets Mobile Social Networks: The Design, Implementation and Evaluation of the CenceMe Application", Published in ACM date Nov. 5, 2008, pp. 337-350, (Year: 2008).*

PCT Search Report, PCT/US10/23731, dated Jun. 4, 2010, 12 pages.

PCT International Preliminary Report on Patentability, PCT/US2010/023731, dated Aug. 16, 2011, 1 page.

Advance E-Mail, PCT Notification Concerning Transmittal of International Preliminary Report on Patentability, PCT/US2010/023731, dated Aug. 25, 2011, 1 page.

Joshua Schnell, Macgasm, http://www.macgasm.net/2011/06/09/apple-smartphones-smarter-patent/, Oct. 6, 2011, 6 pages.

D. Bottazzi et al., "Context-Aware Middleware for Anytime, Anywhere Social Networks," IEEE Computer Society, pp. 23-32 (2007).

Final Office Action dated Jun. 1, 2017 in U.S. Appl. No. 14/192,119.

Office Action dated Feb. 8, 2018 in U.S. Appl. No. 12/854,082, 44 pages.

Response to Office Action filed Aug. 29, 2017 in U.S. Appl. No. 14/192,119.

Response Following PTAB Decision filed Jan. 2, 2018 in U.S. Appl. No. 12/854,082, 35 pages.

Office Action dated Oct. 31, 2017 in U.S. Appl. No. 14/192,119.

Response to Office Action filed Apr. 30, 2018 in U.S. Appl. No. 14/192,119.

Final Office Action dated Sep. 4, 2018 in U.S. Appl. No. 12/854,082, 49 pages.

Response to Office Action filed Jul. 9, 2018 in U.S. Appl. No. 12/854,082, 103 pages.

Notice of Allowance and Fee(s) Due dated Jul. 11, 2018 in U.S. Appl. No. 14/192,119, 89 pages.

Response to Final Office Action dated Jan. 3, 2019 in U.S. Appl. No. 12/854,082, 27 pages.

Office Action dated Oct. 8, 2019 in U.S. Appl. No. 16/196,542, 53 pages.

* cited by examiner

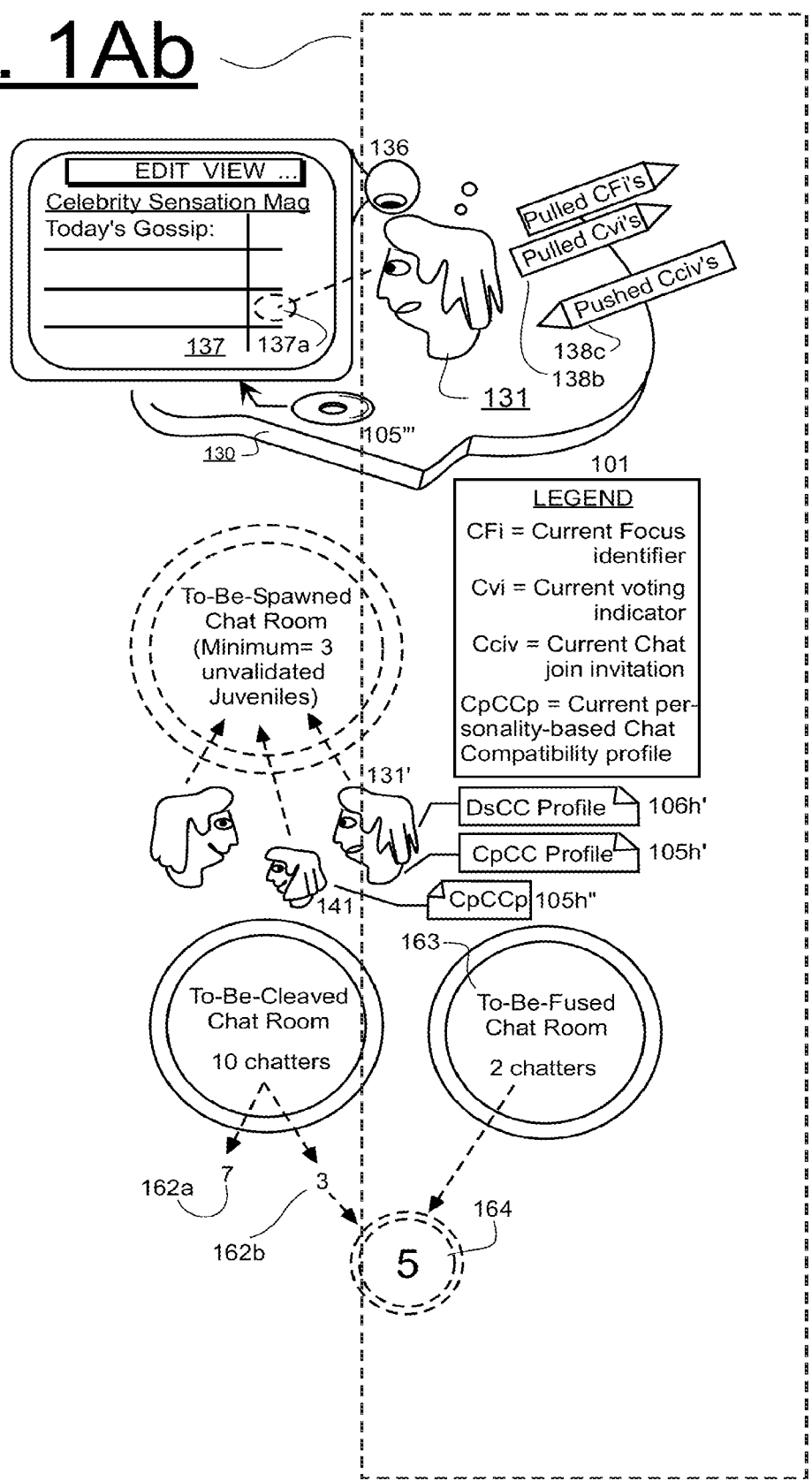

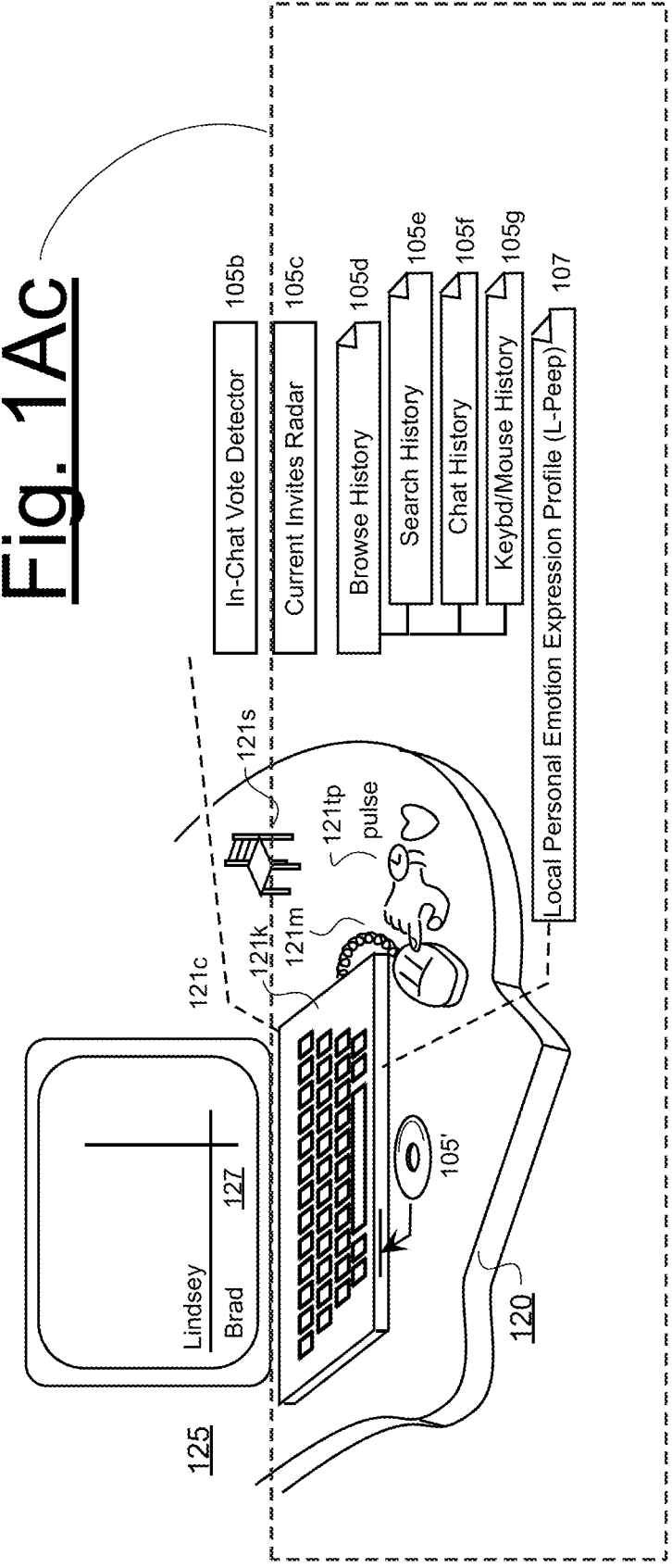

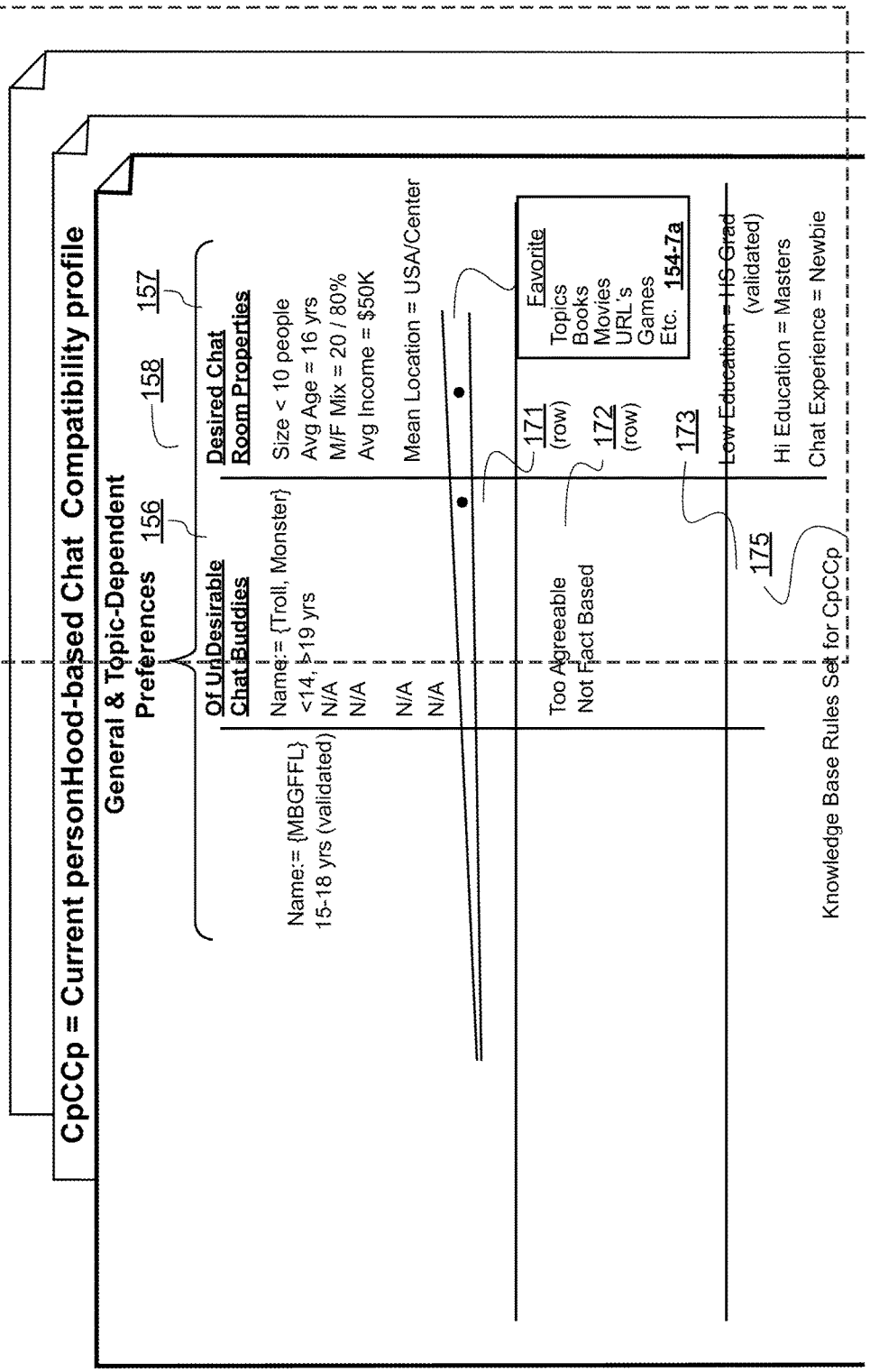

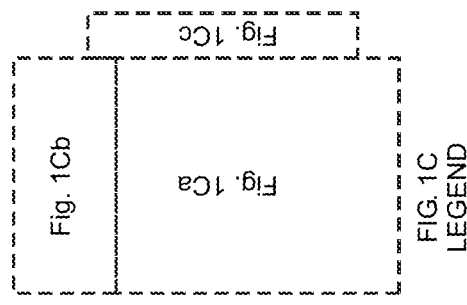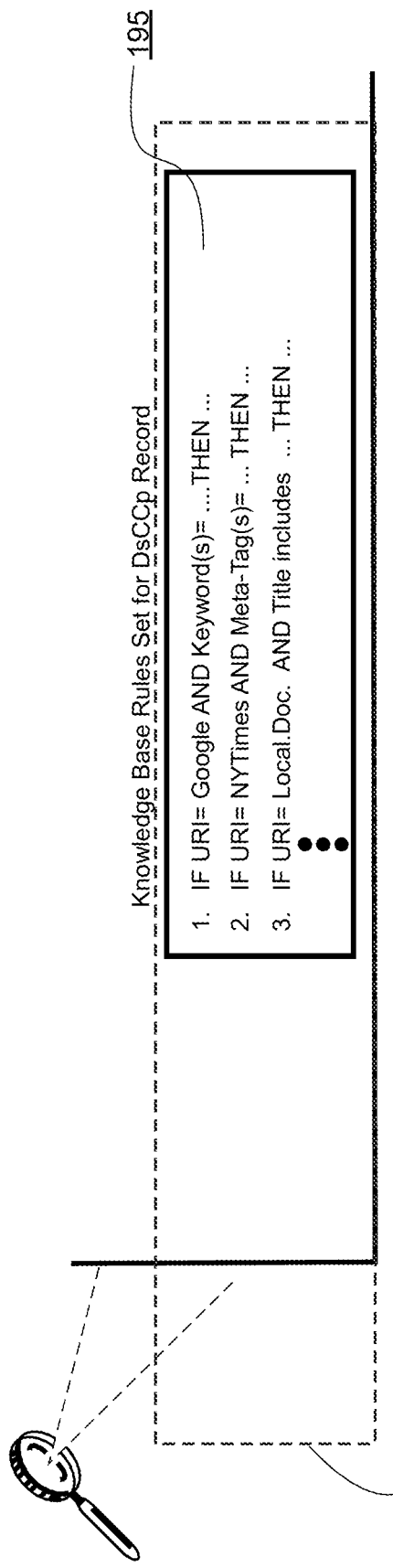

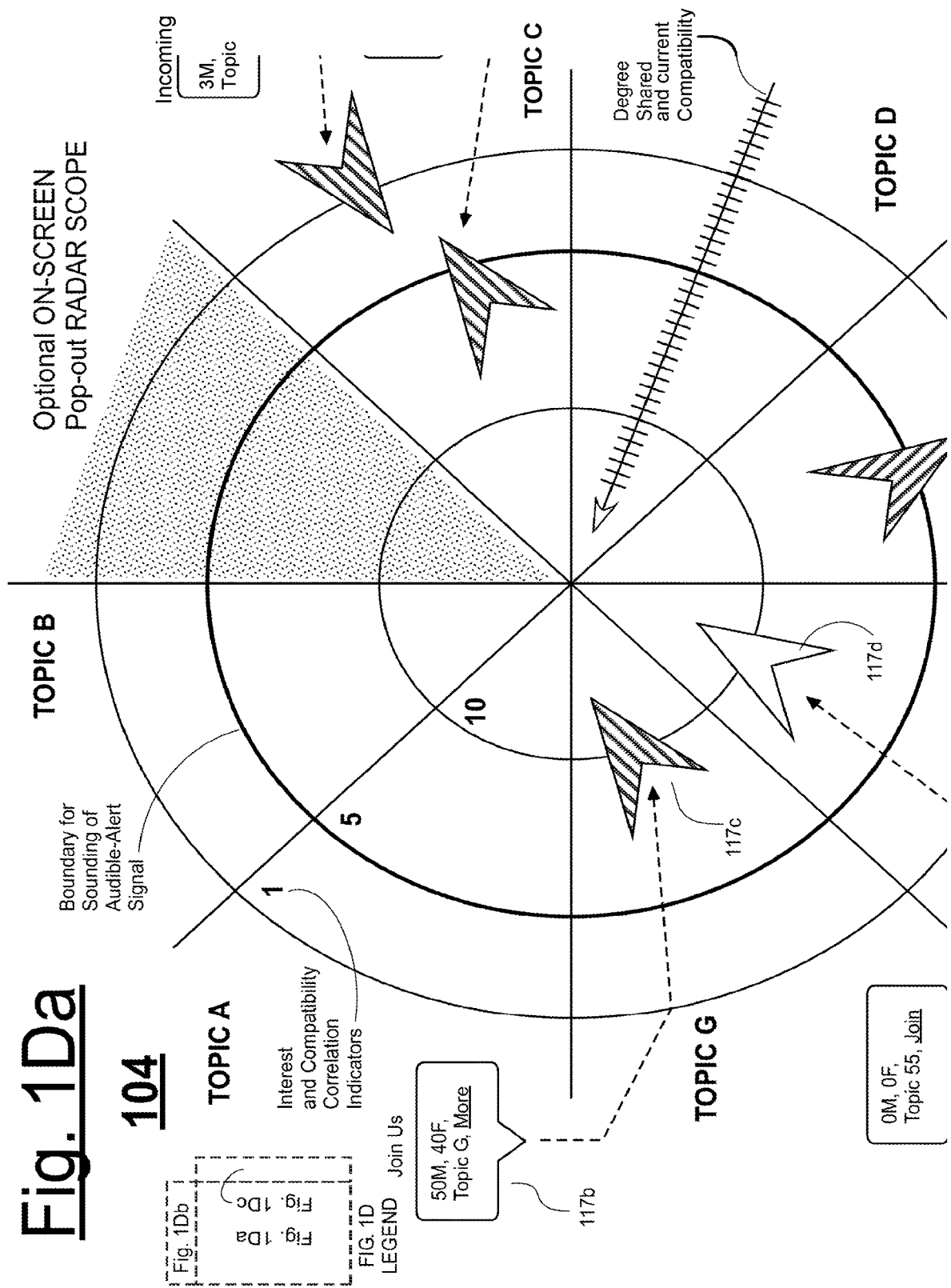

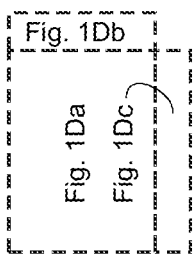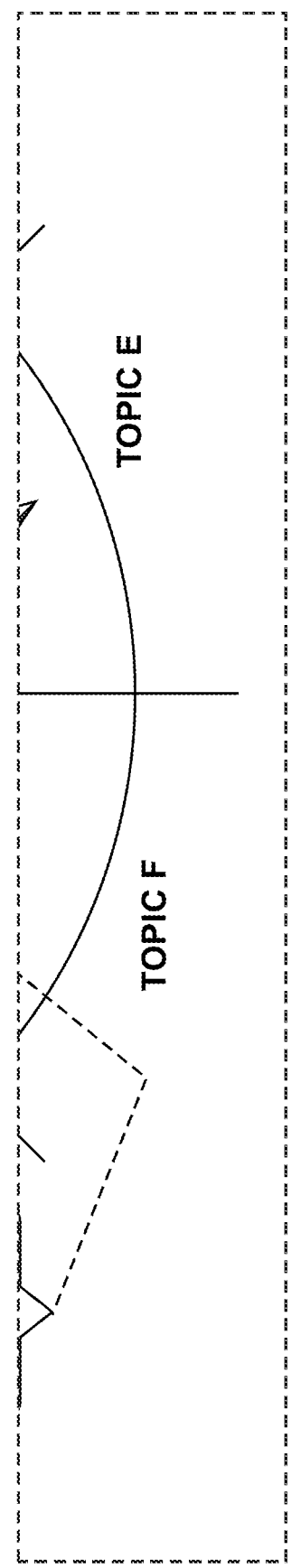

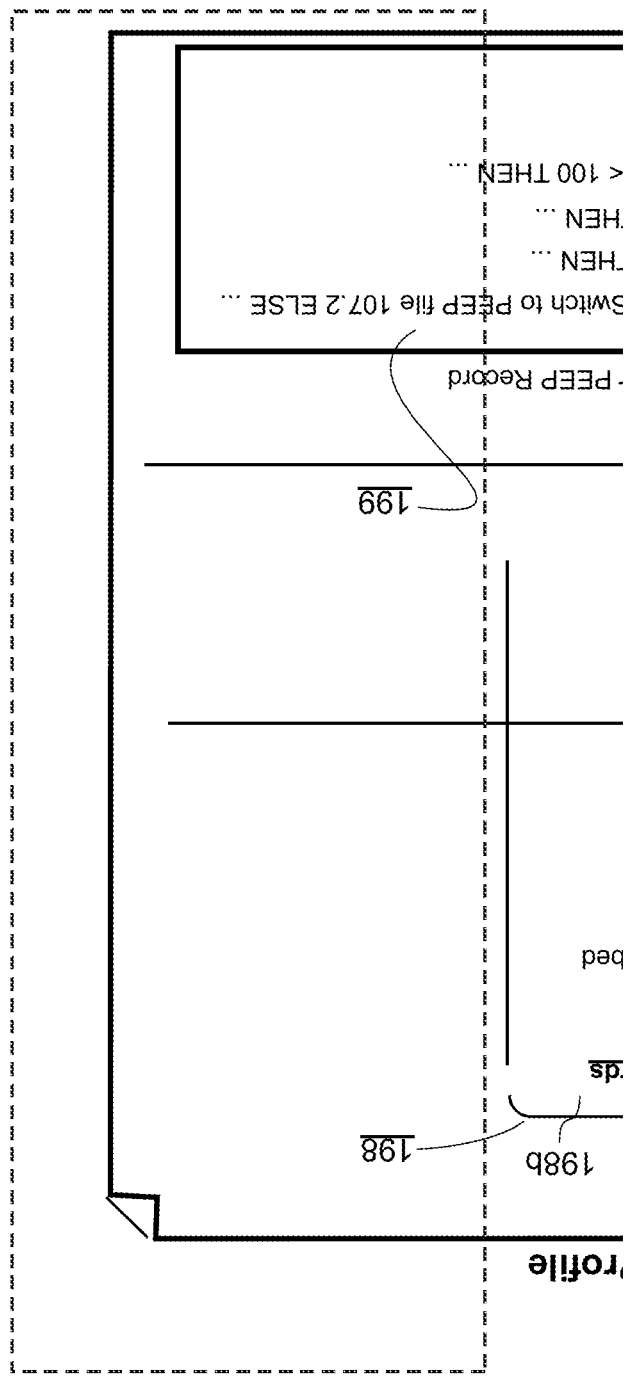
Fig. 1Eb
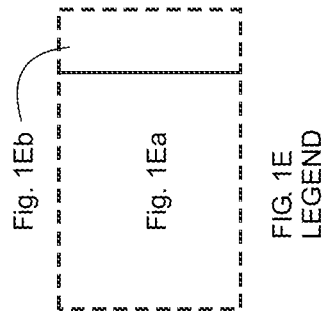
FIG. 1E LEGEND

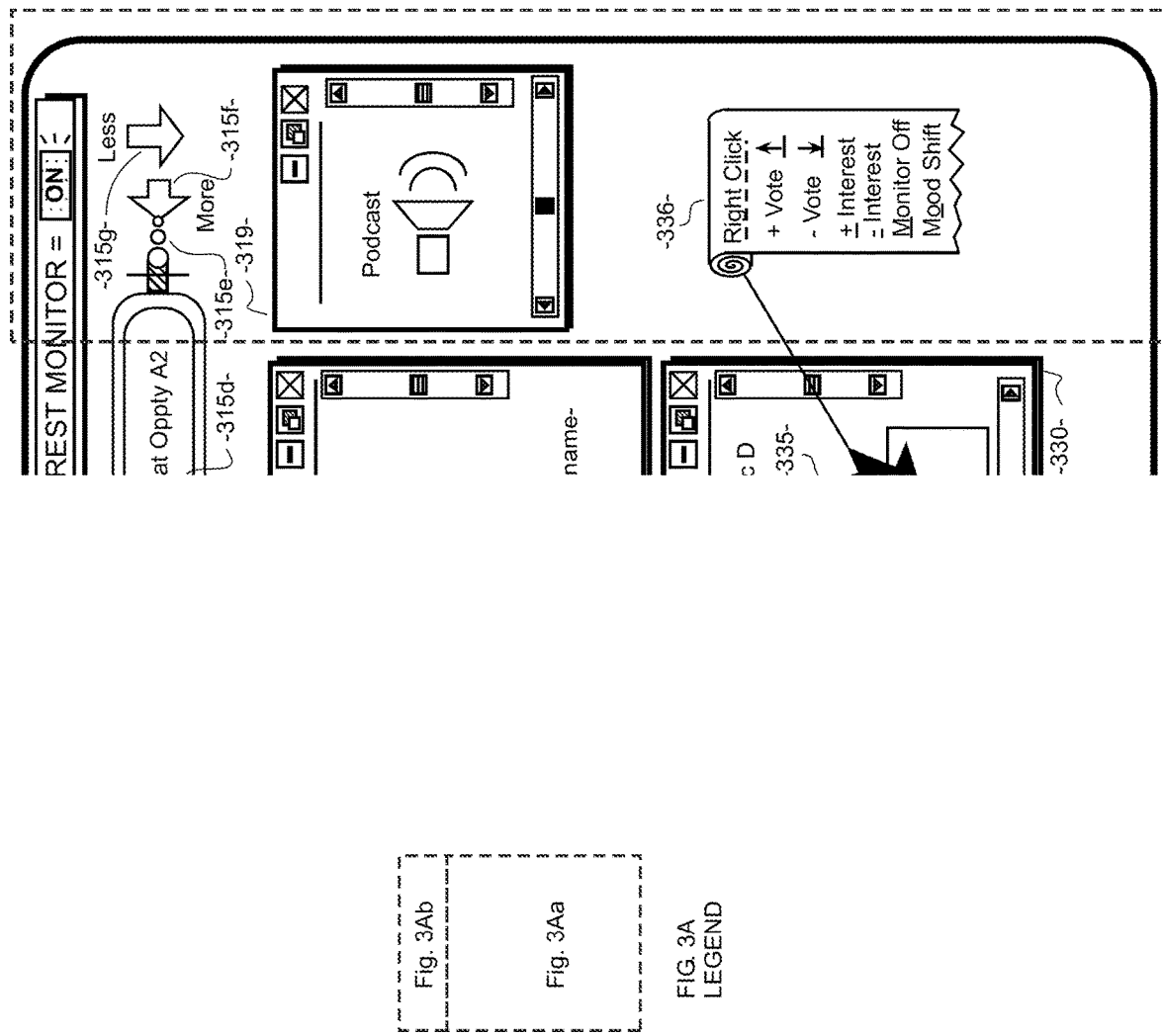

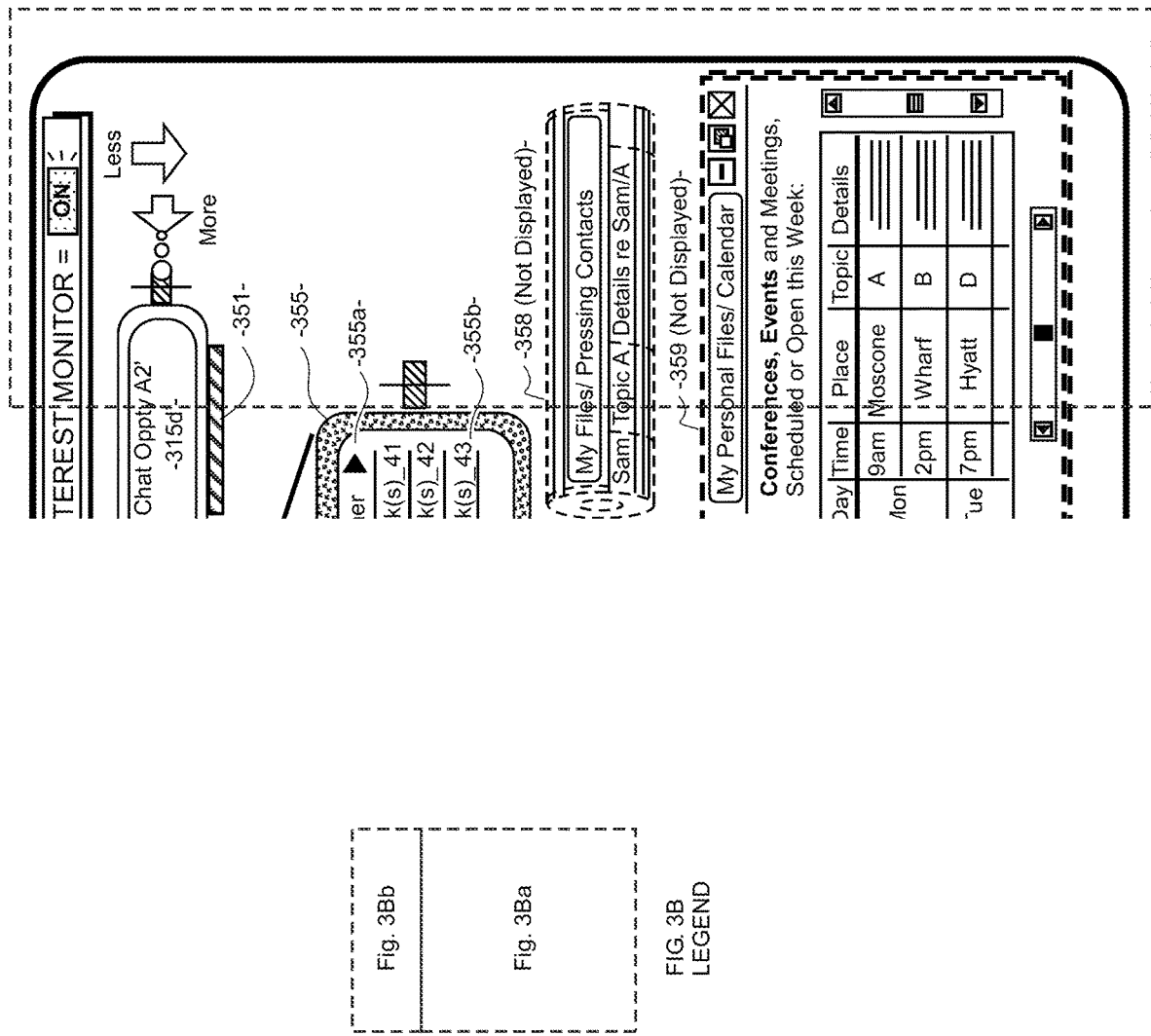

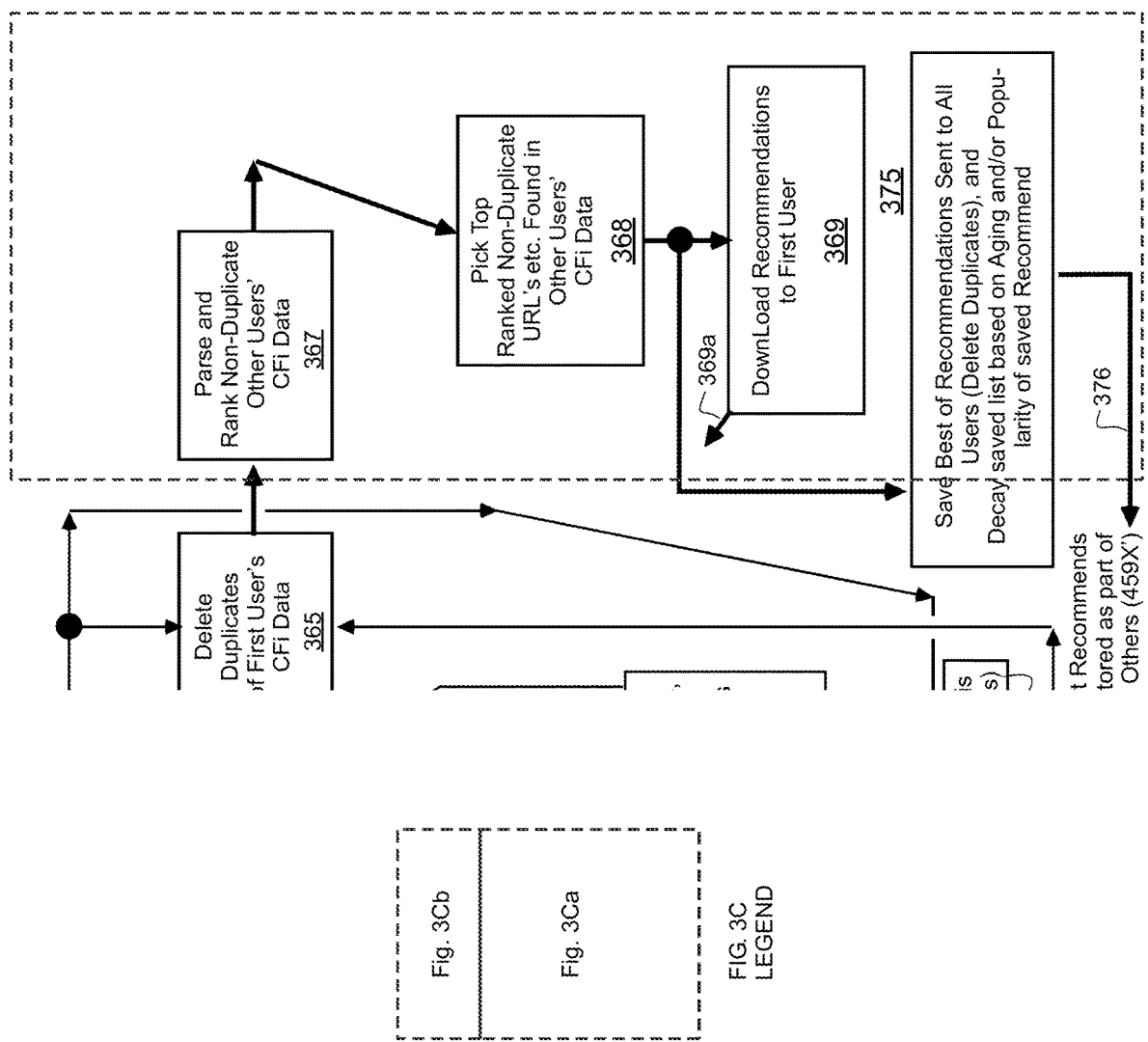

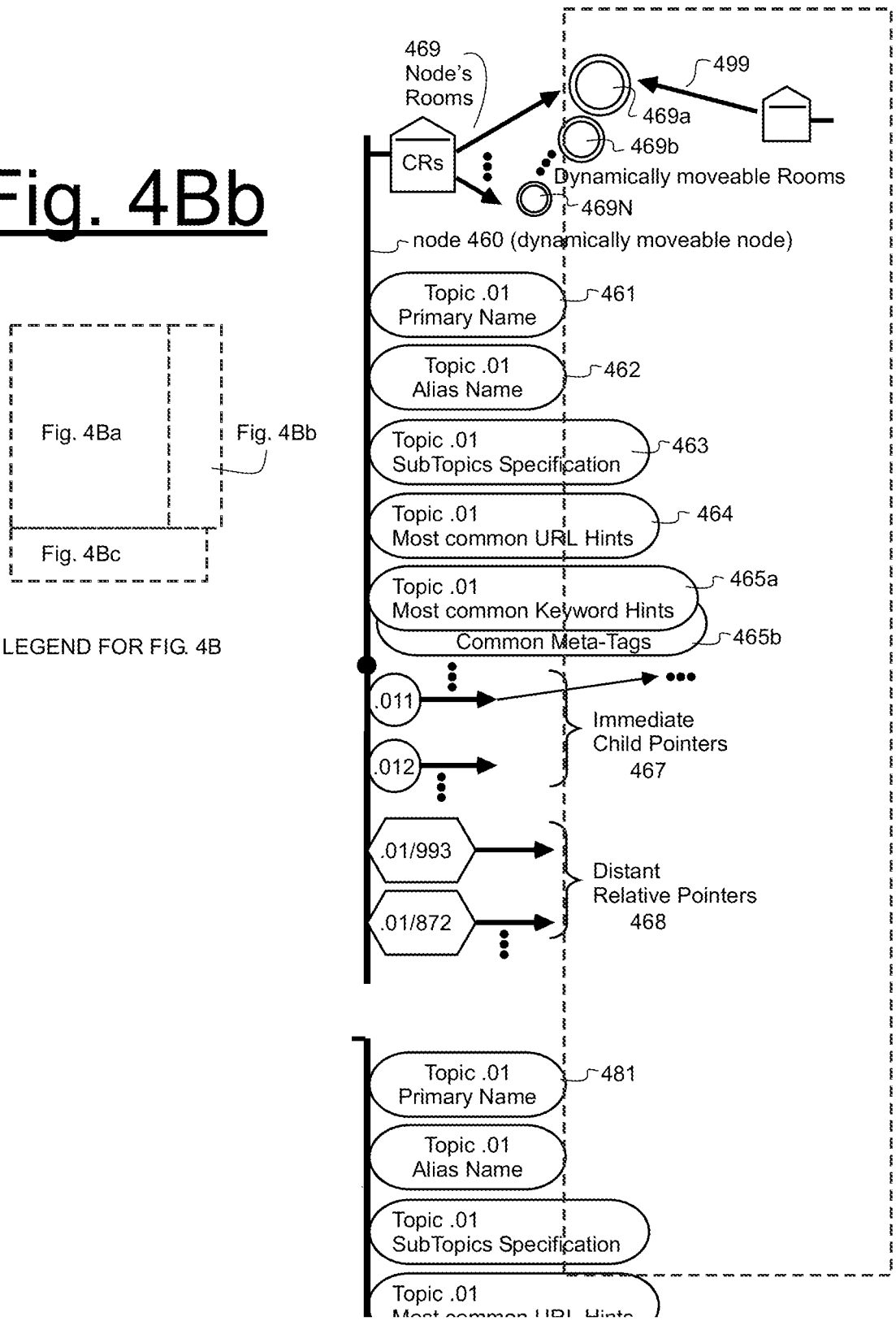

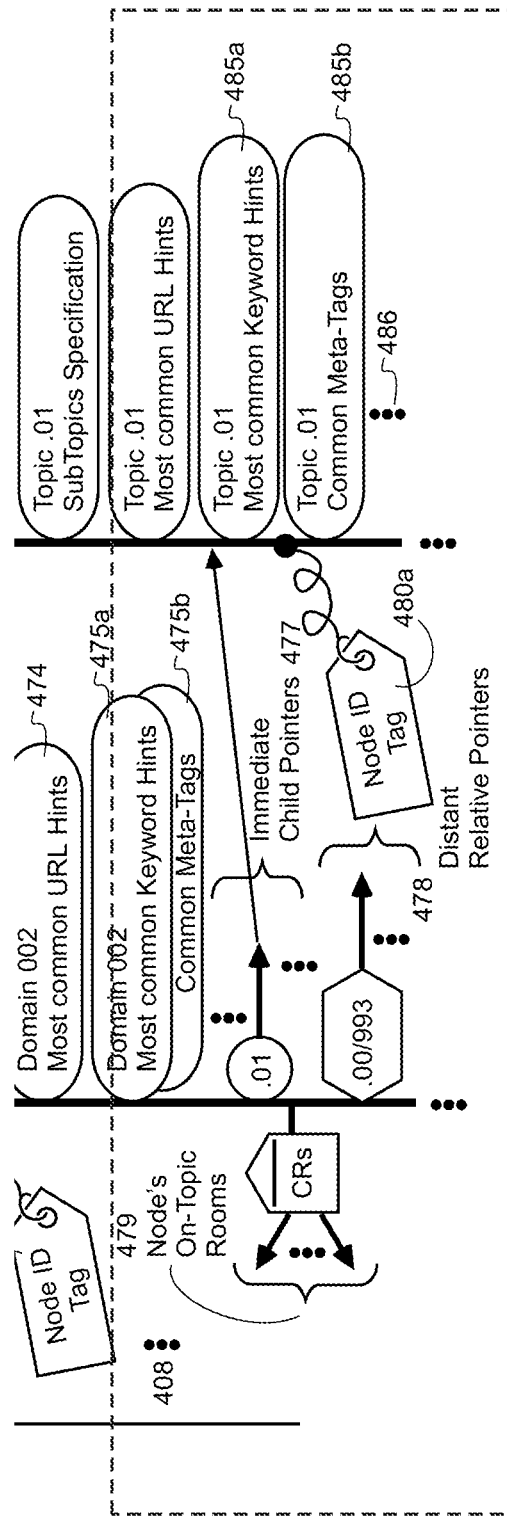
Fig. 4Bc
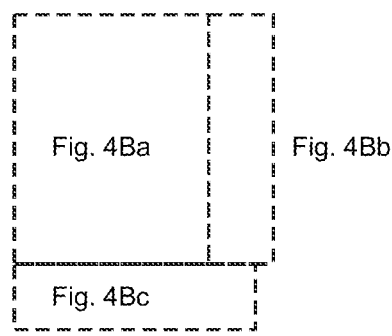
LEGEND FOR FIG. 4B

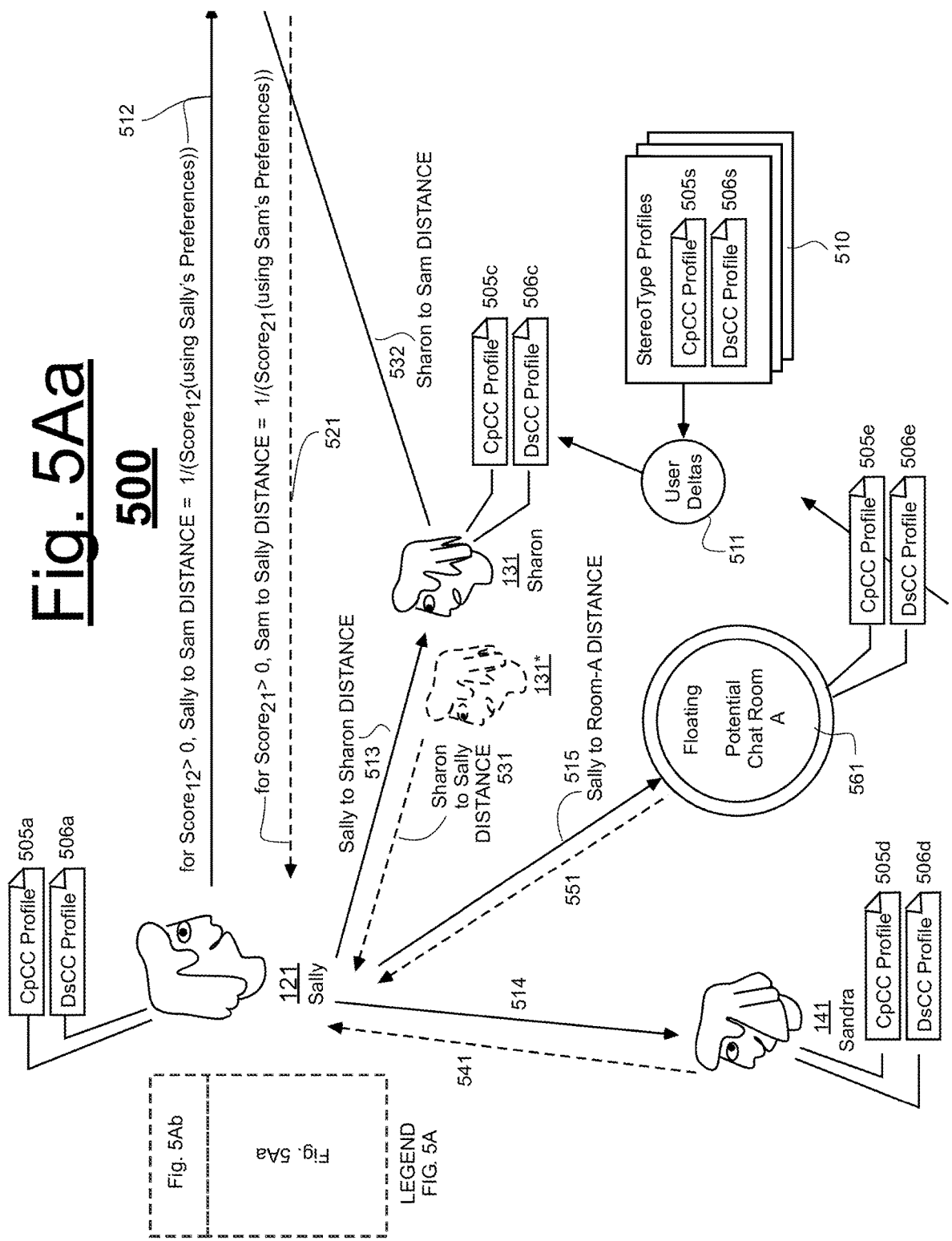

600

METHODS USING SOCIAL TOPICAL ADAPTIVE NETWORKING SYSTEM

CROSS-REFERENCE TO RELATED APPLICATION

This application is a continuation of and claims benefit of U.S. parent application Ser. No. 12/369,274, filed Feb. 11, 2009 and originally entitled "Social Network Driven Indexing System for Instantly Clustering People with Concurrent Focus on Same Topic into On Topic Chat Rooms and/or for Generating On-Topic Search Results Tailored to User Preferences Regarding Topic", where the disclosure of said parent application is incorporated herein by reference in its entirety.

CROSS REFERENCE TO PATENTS

The disclosures of the following U.S. patents are incorporated herein by reference:
(A) U.S. Pat. No. 5,890,152, issued Mar. 30, 1999 to Rapaport, et al. and entitled "Personal feedback browser for obtaining media files"; and
(B) U.S. Pat. No. 7,430,315 issued Sep. 30, 2008 to Yang, et al. and entitled "Face recognition system".

CROSS REFERENCE TO PUBLICATIONS

The disclosures of the following U.S. patent publications are incorporated herein by reference:
(a) U.S. 2008/0262364 entitled, "Monitoring Apparatus for Monitoring a User's Heart Rate and/or Heart Rate Variation; Wristwatch Comprising Such a Monitoring Apparatus" published Oct. 23, 2008 on behalf of Aarts; Ronaldus Maria;
(b) U.S. 2008/0266118 entitled, "Personal emergency condition detection and safety systems and methods" published Oct. 30, 2008 on behalf of Pierson; Nicholas J.; et al.;
(c) U.S. 2008/0097235 entitled, "Subjective Significance Evaluation Tool, Brain Activity Based" published Apr. 24, 2008 on behalf of OFEK; Einat; et al.;
(d) U.S. 2007/0013652 entitled, "Integrated Chip for Detecting Eye Movement" published Jan. 18, 2007 on behalf of Kim; Dongsoo; et al.;
(e) U.S. 2008/0091512 entitled, "Method and System for Determining Audience Response to a Sensory Stimulus" published Apr. 17, 2008 on behalf of Marci; Carl D.; et al.;
(f) U.S. 2008/0234976 entitled, "Statistical Methods for Multivariate Ordinal Data Which are Used for Data Base Driven Decision Support" published Sep. 25, 2008 on behalf of WITTKOWSKI; Knut M;
(g) U.S. 2005/0149459 entitled, "Automatic creation of Neuro-Fuzzy Expert System from online analytical processing (OLAP) tools" published Jul. 7, 2005 on behalf of Kofman, Gene I.; et al; and
(h) U.S. 2008/0288437 entitled, "Perspective-based knowledge structuring & discovery agent guided by a maximal belief inductive logic"; published Nov. 20, 2008 on behalf of Siregar; Edouard.

FIELD OF DISCLOSURE

The present disclosure of invention relates generally to real time social networks and to production of on-topic search results including that of automatically producing matches between currently online people for instant engagement in real time with one another in forums such as chat rooms. One aspect of the disclosure relates more specifically to helping isolated online users of a network (or even strangers at a social gathering, e.g., a large business conference) in automatically finding one another at times when they are in the mood to do so and when they have roughly concurrent focus on same or similar content and/or when they have approximately concurrent interest in a same or similar particular topic or topics and/or when they have current personality co-compatibility for instantly chatting with, or for otherwise exchanging information with one another in short order online (or even in person) and for example with regard to the content and/or topic of shared current focus or with regard simply to a likelihood that they have current personality co-compatibility for instantly chatting online (or even in person) with each other and potentially developing focus on a particular topic of common interest. Another aspect of the disclosure relates to providing a real time changing indexing tree having hierarchically interconnected nodes representing topics, where the configuration of the tree changes dynamically in response to real time reactions of users to online content. In one embodiment, nodes of the tree correspond to topics in a dynamically changing topic space and the nodes link to on-topic chat rooms and/or to on-topic search results. Domain and topic nodes in the tree may include unconventional ones such as, My Current Location Is: . . . (fill in the blank with location determined by GPS or other means) and topics under that domain may include, Fun Things to do for My Demographic Group at this location and this time or soon after.

DESCRIPTION OF RELATED TECHNOLOGY AND USAGE

The internet is one example of a network supported, public communication and data exchange system that enables isolated users to individually browse through an almost unlimited volume of informational content. Users can peruse through daily, hourly, or even minute-by-minute updated news publications, industry journals, blogs, tweets, list serves, video galleries (e.g., You Tube™), photo galleries (e.g., Flicker™), and so forth. For almost any general or unique topic a given first user may be currently interested in, or focused on, corresponding content is usually available somewhere out on the internet (or via another public information distributing means) for looking at by the first user (if the user knows its URL or other content access pathway to that informational content). The same content is typically available for concurrent study by other users. The specific topic areas that are of interest to each user may span from those that are socially popular (i.e., the latest fads), socially acceptable and/or economically valuable to ones that might be taboo or even border on the illegal. It is not the intent of this disclosure to pass judgment on what topics of focus people may approve of or not approve of, but rather to point out that people's interests and immediate areas of focus (current attention) can be wide, varied over time and can often coincide by happenstance with the same interests of many others or with a same esoteric interest of a highly esoteric handful of other people, where the people who share a topic of interest may be situated (clustered) in a same local community or sparsely spread around the world.

Much of online content (and/or content that is locally stored on a user's local data storage device) is accessed by human users in a relatively non-social framework. That is to say, and by way of example, that a first isolated user in suburban Utah may have been scanning through large volumes of online content while for most of the time exhibiting little interest in the browsed through content. However, surprisingly, in the last few minutes (or longer, or shorter), she began to keenly study and with great interest a particular article in an online posting of "Celebrity Sensations Magazine" (here, a fictitious name for a possible online magazine and not to be confused with a magazine of same or similar name if any exists). Unbeknownst to the first user, another isolated user in rural Nevada (whom the first user has not met) is doing the same thing at about the same time, namely, having settled into looking at the same web page, the same article and also becoming substantially engaged emotionally or otherwise involved with the same material (the same content). The content intake and information appreciation experience for each of the first and second isolated users might be much richer and more satisfactory if only these isolated users could connect online essentially instantly with one another and exchange ideas or insights or even develop new ideas about the specific article that they are now reading and are now substantially engaged with. However, heretofore there was no automated and easy-to-use mechanism available for bringing such isolated online users together at the moment of their concurrent focus on same or similar content and at the moment of their concurrent substantial involvement (e.g., emotional or other involvement) with that content, where for example, the mechanism invites both of them to join a mutually acceptable, real time online chat or another such online informational exchange forum that focuses on the content and/or topic of their concurrent mutual focus.

As known to those skilled in the art of internet chat rooms, so-called instant chats can be invoked in numerous ways, including but not limited to: IRCs (Internet Relay Chats), HTML rooms and Java rooms. When such chat rooms are employed, it appears to a first user that one or more other persons are substantially instantly reading (or otherwise perceiving, e.g., within one or a few seconds) what the first user posts into the chat room frame and that the other person(s) are responding in substantially real time to those actions by, for example, almost instantly writing back (instant back and forth messaging).

As is further known to those skilled in the art of internet chat rooms, such person-to-person interconnections can be private ones or ones open to the public. People who do not know each other (in the real world, in a virtual reality world, or otherwise) generally cannot meet one another for a first time in a private chat room because one must know the other ahead of time (and/or have some pre-existing "friendship" or "chat buddy" relationship with the other) in order to post an invitation and thus induce entry into the private chat room. Thus, in the example given above, the two isolated and concurrent readers of same content in the online Celebrity Sensations Magazine (a fictitious name) will heretofore not have had a convenient means by way of which to join in a private room because they do not know of each other's existence or identity. Moreover, they do not know about the concurrency and commonality of their attention on same content or their interest in apparently the same topic (content and topic are not always the same thing as will be seen below). Thus they have essentially nothing to entice them to then meet in a same online chat room (private or public). On the other hand, public chat rooms often allow just about anyone who is aware of the room to join in its transactions (e.g., electronic conversations). Because of this complete openness, public chat rooms are often quickly overtaken by so-called "trolls" (a pejorative term for offensive or impolite personalities) and these discussion-hogging people tend to reduce the discourse to a relatively low level of common denominator (e.g., ad hominem attacks, profanity, digression from original topic of discussion, etc.). Thus, useful interchange is very difficult to obtain in wide open public chat rooms and many users who would otherwise enjoy polite and civil discourse with similar minded peers in an online chat room avoid public ones at least for this reason.

The latter situation is unfortunate because much could be gained from exchanges between people (e.g., peers) who may meet each other electronically for a first time and have a concurrent common focus on same or similar content and/or interest in a same or similar topic that they wish to discuss and/or collaborate with others who are also engaged with the corresponding subject matter at that moment. Also, it would be helpful if meeting strangers can somehow increase the odds that they are co-compatible with one another in terms of chat personalities and/or in proficiency regarding the topic or content of common interest.

Online is not the only place where strangers can meet. Large business conferences is another example. Two people can be at a same large business conference and in short walkable proximity of each other but surrounded by hundreds of other people. The two attendees to the conference may not know each other, and yet they may have much to gain if they were to meet in person and exchange information in real time about specific topics of concurrent common interest. But since they don't know each other and are not aware of their mutual concurrent interest in certain specific topics and of their physical proximity to one another, as well as of their co-compatibility for chatting with one another, it is likely that without more, they will not meet. It will be a missed opportunity for mutual gain. Heretofore, an easy to use automated system was not available for joining together people who have same topics of concurrent interest on their minds and who are co-compatible for chatting with one another either online or even in person.

SUMMARY

Structures and methods are provided in accordance with the present disclosure of invention for creating a social network driven indexing system that can, as one option, instantly cluster people with concurrent focus on a same topic into currently on-topic chat rooms and that can additionally or as an independent option, generate on-topic search results tailored to user preferences regarding the topic of current interest. In one embodiment, the system almost instantly provides first links (e.g., invitations) to online chat rooms (or to other substantially real time informational exchange forums provided via a wired or wireless communications network) for people who happen to be focused on same or similar content at substantially the same time, and/or who happen to be interested in a same or similar topic and/or who are chat-wise co-compatible with one another. The offered first links or invitations allow such people (including those who probably would not have otherwise linked to each other) to meet within the offered chat rooms (or even in person in some instances) and to share information or discussion regarding, for example, same or similar content of current mutual focus and/or same or similar topics of current mutual interest. In the same or another embodiment, the system almost instantly provides second links (e.g., further research and/or activity suggestions) to online data resources whose content currently substantially relates to a topic that appears to currently be on the user's mind. The offered second links or further research/activity suggestions allow people to locate on-topic additional material (e.g., the most current on-topic material) even without joining a chat room. In one embodiment, the provision of invitations and/or recommendations occurs by machine autonomous action—in other words, the user is not consciously participating in generation of the invitations and/or recommendations, except perhaps to consciously approve activation or continuance of a benign form of spyware that will spy on the user's current activities and infer from those activities what content, if any, is currently of interest to the user, what topic, if any, is currently on the user's mind and/or what kinds of other people are currently co-compatible for chatting with the user online or otherwise (e.g., even in person).

It is to be understood, Incidentally, that when this disclosure mentions an online web page (online content) that a given user is focusing his or her attention on, the disclosure is not intended to be limiting its scope to HTML or otherwise coded web pages or to content provided exclusively by a user's one computer or exclusively through the internet. Any form of network-provided or broadcast-provided or multicast-provided presentation of informational content to users (whether digital or analog) is contemplated. All that is needed is that the user can focus his or her attention on the presented content, that the user's focus can be automatically detected by machine means and that the content can be automatically identified by machine means as content that is substantially similarly also available to other users in roughly the same time span. In other words, the present disclosure contemplates situations where two or more separated users are watching a same live broadcast of a television show (analog or digital), or are almost concurrently watching a same YouTube™ or other online video stream, or are concurrently viewing a pre-recorded show from their personal recording devices (e.g., TiVO™) or are listening to a same radio show, and so forth, and where the identity of the content can be automatically determined by machine means and preferably where the degree of user involvement with the content can also be automatically determined by machine means.

The point being made here is that two or more users can be focusing at roughly the same time on same or similar machine-generated content (e.g., digital content) and an automated means is present for identifying the content they are focusing their attention on at the moment and reporting the occurrence of the same automatically to a reports-collecting and match-making centralized system. The disclosure will be easier to understand however, by first starting with the case where the content presenting apparatus is a user's local data processing machine system (e.g., a user-operated and user-servicing digital computer such as one having a CPU, memory & network interface) and the content being provided can be identified by means of a URL code (Universal Resource Locater code) or other such page identifying code and where the content identifying code (e.g., URL) is already in possession of or directly accessible by software executing on the user's local data processing machine. Also, because the inclusion of heading markers, meta-tags and the like in HTML (HyperText Markup Language) or XML (Extensible Markup Language) coded web pages is understood by those skilled in the art, it will be easier to start with such a commonly understood form of content presentation and explain how topical hints are often invisibly embedded in such content in the form of meta-tags, heading start/stop braces, and the like. In a more complex situation where plural users are watching or listening to a live analog broadcast, for example, of a soccer game, hints about the topic(s) associated with what is being watched (and/or listened to) may have to come from an ancillary real time digital source (e.g., automated captioning text for the deaf for that same content providing channel) whose output can be time-wise synchronized with the analog broadcast content that the users are focusing upon and whose digital output can thus be used to infer a probable topic of common interest then probably present on the plural users' minds. It will be seen that the users can be linked to one another through an on-topic node and that, because the on-topic node serves as sort of a portal for identifying and/or joining together groups of people who probably have a same topic in mind, the on-topic node can also serves as sort of a common collection point for collecting most-current data about the topic where the collected data (e.g., recent or common URL hints) can be collected and ranked based on the type of people who implicitly pass through the portal-like node (e.g., where one type of such people are licensed and/or otherwise credentialed experts in the topic being handled by the on-topic node).

Moreover, it is to be understood that the initial embodiments discussed herein will assume single users each privately positioned in front of his or her personal computer. However, it will be seen later that face recognition software may be used in group situations where different people are taking turns in interfacing with a same computer and the computer may then automatically switch user profiles upon automatically recognizing that a different user is now sitting in front of the computer webcam and computer screen and interfacing with that local client machine.

In one embodiment, structures and methods for collecting content-identifying reports and/or reports about a given user's level of focused interest in that content, operate under the auspices of a distributed and automated match-making and invitations-generating system (MM-IGS). The MM-IGS collects (e.g., uploads) information (Current Focus information, also referred to herein as CFi data) about the content that participating individual users are currently focusing on, about their emotional reactions to the focused upon content, and also additional personhood information about their backgrounds and preferences. Using this information, the MM-IGS automatically generates clustering maps which cluster together in an appropriate co-compatibility space, various ones of plural users who appear to be co-focused on same or similar content, and/or who appear to have same or similar topics on their minds and/or who appear to have co-compatible personalities and/or who appear to have same or similar emotional reactions regarding the topic or content being focused upon. The MM-IGS automatically generates invitations and sends the invitations to closely clustered together ones of its users to thereby invite them to join each other in an online chat room (or other network supported information exchange forum, e.g., a restricted access blog, a peer-to-peer forum) whose occupants are or are expected to be focused upon the same or similar content, on the same or similar topic and/or to exhibit same or similar general emotional reactions to the topic and/or to the focused upon content. Users who accept the invitations are automatically linked to the real time informational exchange forums (e.g., chat rooms) that contain other, similarly invited persons. In this way, people who are interested in same or similar things and who may have not otherwise met each other, are automatically given opportunities to meet and chat in real time in online rooms and perhaps benefit from the exchanges. In one embodiment, if an invitation/recommendation confidence score assigned to a given invitation (or corresponding recommendation) exceeds a predefined threshold, the linking to the chat room or other real time informational exchange forum (or linking to recommended further search results) is performed instantly without waiting for acceptance of the invitation/recommendation. (The invitation/recommendation confidence score can be one that increases as a function of scores assigned to indicate how on-topic the corresponding invitation/recommendation is deemed to be, how co-compatible the corresponding invitation/recommendation is deemed to be, and how interested in the topic the user is deemed to be. If the confidence score is high enough, the corresponding invitation/recommendation is deemed to be sufficiently urgent that the user will want to see it instantly. In one embodiment, the user can switch instant showing of high confidence chat rooms and/or instant showing of high confidence recommended other material on and off as desired and/or change the threshold value needed to trigger instant showing.)

One of the expected benefits of users accepting invitations to, and/or being instantly linked to high confidence ones of chat rooms or other real time information exchange forums is that occupants of chat rooms (or other forums) which initially focus upon a first topic will evolve, develop the topic material and eventually migrate their focus to one or more new topics or subtopics. Migration to new topics or subtopics can result in the adding of new topic nodes to a hierarchical tree containing logically linked topic nodes. The tree thus comes alive to grow and evolve dynamically in response to the dynamic and self-evolving current activities taking place in online chat rooms which run under auspices (patronage) of the tree. Aside from automatically generating invitations to currently on-topic chat rooms, the MM-IGS may also automatically generate links to currently on-topic informational resources such as the latest editorials or blog comments or tweets on a recently emerging topic.

Incidentally, it is to be understood here that when the disclosure mentions online chat rooms to which specific users are invited to enter, the disclosure is not intended to be limiting its scope to internet provided textual chat rooms. Any form of network-provided or broadcast-provided or multi-cast-provided cross-exchange of relatively current informational content between clustered groups of users can benefit. This includes live video conferences and the like. While relatively current online information exchanges (e.g., chat rooms) are preferred, topic nodes of the system may also provide logical links to slower moving (less current) on-topic information resources such as private blogs and private forums or list serves to which occupants gain entry to by invitation only. The point being made here is that users who may have not known of each other or may have not known that they share a concurrent focus in same or similar content and/or a concurrent interest in same or similar topics are automatically identified and are automatically clustered together in a topic space so that common on-topic information they posses (if any) can be conglomerated and so optionally they can be invited to join with each other in some form of machine-assisted current cross-exchange of informational content. While invitation into an online forum is one outcome in accordance with the present disclosure, it is also within the contemplation of the disclosure to independently or supplementally provide recommendations pointing to new online content that corresponds with a topic of current interest to the user, where the new online content is likely to be content that the user has not recently considered.

Once again, for sake of simplicity in this introductory summary, it is assumed that single users are each privately positioned in front of their personal computing devices (e.g., laptop, palm-top, PDA, 3G-cellphone, etc.) and interfacing with a network (e.g., the internet) via that one device and reviewing online informational content and/or privately stored informational content. In such a case and according to one embodiment, so-called Local Activities Monitoring Service(s) (LAMS) software is provided in and executes in each user's on-network and local automated data-processing machines (e.g., client computer). The Local Activities Monitoring Service(s) (LAMS) predominantly executes in the background as a benign form of spyware. The LAMS automatically detects one or more on-display specific content areas of current focus by the local user and/or other portions of content that the user appears to be focusing upon, (e.g., audio output) during a given stretch of time. The specific stretch of time can vary from user to user because some users tend to move quickly through large volumes of content (e.g., many web pages visually scanned per minute) and other users tend to step more slowly through web or other informational content; perhaps reading just a few paragraphs on a same web page over the course of 5 minutes. In one embodiment, behavioral trend determining services are provided either in the LAMS or in the MM-IGS or in both for automatically determining the speeds at which specific users intake different kinds of content and also the speeds at which the users react emotionally or otherwise to the intaken content. The determined speeds are recorded in so-called PEEP files. For example, one user may laugh out loud instantly to a funny cartoon he sees on a web page as he scans through many pages in a single minute. Another user may take several minutes to digest and become angry about some upsetting story she read on another web page (showing her reaction by for example silently frowning). Each user tends to have his or her own personal style for intaking content at a personal intake speed and for reacting to it (at a personal reaction speed), as well as tending to have their own personal styles regarding how they exhibit or express their reactions to the content. So Personal Emotion Expression Profiles (or PEEP's) are developed over time (by local and/or remote trending services) for each user and used to determine the appropriate stretches of time over which each user's local activities are to be gauged. In one embodiment, PEEP's include a minimal focus persistence time specification that defines a minimal amount of time that the given user is required to be detected as focusing upon corresponding content before a corresponding CFi record is recorded for the focused upon content. Content that is focused upon for less than the PEEP specified minimal focus persistence time is ignored in that embodiment and a corresponding CFi record is not recorded for it.

Incidentally, the term "benign spyware" as used above and elsewhere herein is a bit of a misnomer because conventional spyware seeks to make its presence unknown to the spied-upon user and/or spied-upon program. By contrast, the benign spyware discussed herein generally makes its presence and persistent activities known to the spied-upon user and/or his programs, by for example, a blinking "monitoring on" warning being presented on the user's screen. In one embodiment, the user can elect to hide the warning during a session. It is to be understood then, that use of the term, "benign spyware" herein conveys something other than conventional spyware where the latter seeks to conceal its presence from the user.

While the benign spyware is busy detecting and identifying the specific content that its local user is focusing attention on and recording the same (as a Current Focus information or CFi data), the encompassing LAMS is also working in the background to automatically detect one or more indicia of current emotional engagement with, or reaction to, the focused-upon content by the local user. This automated detection of emotional involvement/reaction may be based, for example, on current machine operating activities of the user (e.g., mouse use, keyboard use etc.) and/or on current biometrically detected states of the local user (e.g., increased heart rate, increased breathing rate, increased depth of breathing, increased fidgeting, unusual skin blushing or paleness, up-tilted head and diverted eyes while listening to audio, etc.). The LAMS automatically attaches time stamps (and optionally, geographic location stamps) to each detected and to-be-reported activity (each item of Current Focus identifying or indicating data, or CFi data for short). The detected and to-be-reported activities may be single or compound ones. Examples of single activities might be that the user has been focusing his or her eyeballs (pupils) on the upper left quadrant of the web page for the past one minute or that the user vocalized a sigh over the last 2 seconds. A compound report may indicate that the user just launched a search engine search with certain keywords and at the same time the user's heart rate had increased substantially. Cause and effect are not always concurrent though. Chronological spacings between the two may be indicated for certain users based on their PEEP's and/or other developed profiles. The collected and time-stamped report information (CFi data) can be used for automatically determining what collected pieces of reported user activity probably correlate with other ones (strongly cross-correlate). The collected and time-stamped report information can be ultimately used for automatically determining whether two or more users have sufficient concurrency with regard to same or similar focused upon content and/or with regard to same or similar topic of interest probably on their mind, etc., so as to justify inviting them into a same chat room. If the detected degree of attentive focus on a particular portion of available content and/or if the indicated current emotional involvement with or reaction by the user to that focused-on content output is scored to be above a predetermined threshold, the LAMS (Local Activities Monitoring Service) may automatically generate and store in a buffer one or more Current Focus identifying and/or indicating records (CFi's) where the latter data objects contain data representing the collected physically-based information (about current focused upon content, current biometric behavior, etc.). The CFi's are locally stored by the LAMS in the client machine and then made available for collection (uploading) by one or more on-network Remote Activities Monitoring Services (also referred to as an AARMS) of the MM-IGS system. (In one embodiment, rather than deciding on its own which user activities warrant being reported to the MM-IGS, the LAMS records all activities as buffer-stored CFi's and lets the MM-IGS (the remote match-making and invitations-generating system) sort through the information to determine what might be relevant and what not so relevant for match-making or other purposes.) The AARMS typically executes on one or more remote servers, where the servers are located either at a geographically local data center or at a far away data center. Data centers may be interlinked to form a network interconnected, data processing cloud that provides automated match-making and invitations-generating services (or other services such as that of making automated further research recommendations to users of the MM-IGS system).

Uploaded CFi's from different users are automatically parsed in the AARMS to determine which CFi-contained first data of a given user is to be merged with other recent CFi-contained data of the same user, if at all (and optionally on a weighted basis), so as to provide a more complete and meaningful sampling of current user activities for understanding what content the given user is most likely focusing his or her attention on and what biometric reaction data most likely correlates with the content and with cotemporaneous user activities. As indicated above, for some fast-paced users, a single CFi record or snapshot of content taken over say, a 3 second stretch of time may be sufficient for determining degree of substantial focusing of attention on corresponding content and biometric reaction data that correlates to it (because this user tends to read and react quickly). For other users, a plurality of CFi records or multiple sampling snapshots taken over say, a 10 minute stretch of time may be deemed to be more appropriate because this other user tends to intake content more slowly (especially if it is for a difficult subject area) and/or to respond with additional user activity (e.g., a follow-up search engine use) more slowly and/or to exhibit biometrically detected reaction to the same more slowly. The automated determination of which CFi snapshots (or parts of snapshots) to merge with others can vary with time of day, current user mood (e.g., is the given user sleepy, upset, etc.?) and/or topic (e.g., is the user reading a dense science article or light fiction?). Since each user can be different, in one embodiment, a personalized set of adaptively modifiable knowledge base rules are stored in one or more profiles of each user (for example, in local and/or remote PEEP's of the given user and/or in a personhood defining CpCC profiles of the user, which CpCCp data structure will be detailed below.) A simple example of a CFI's data merging rule might be: IF time=late_evening and topic_type=complex and mood=groggy THEN merge CFi data over time_stretch=15_minutes; IF time=early_morning and topic_type=simple and mood=caffeinated THEN merge CFi data over time_stretch=90_seconds; ELSE merge CFi data over default time_stretch=3_minutes. These personalized CFi data merger rules (knowledge-base rules) may be periodically adaptively changed as the system learns of each given user's personal traits and/or as each user's traits change over time.

The uploaded and optionally parsed and merged CFi-provided data items obtained from each of the different users are then automatically compared to that of other users (or against composite data of ongoing chat rooms) in the MM-IGS for purpose of matching with one another (user-to-user match-making or clustering) and/or for purpose of matching with predefined chat rooms (user-to-room match-making). In one embodiment, closeness of matching or closeness of clustering of users to one another and/or to available rooms is expressed as a machine-utilized co-compatibility distance between users, where more closely matched users are deemed to be less distant from one another in a co-compatibility space and thus are deemed to be closely clustered to one another for purposes of being automatically invited into a common chat room. In other words, when data gleaned from the respective collected Current Focus information records (CFi's) of two or more users indicate a substantial match with regard to content of current significant focus and/or with regard to topic of concurrent interest; or when the collected Current Focus information records (CFi's) of a given first user are found to substantially match the content-related focus and/or topic-related attributes of a preexisting chat room by an online match-making service, the same (or another) online service further compares Current personality-based Chat Compatibility profiles (CpCCp's) of the to-be-joined users (or of the to-be-joined first user and of the averaged members in the potential chat room to which the first user may be invited) to thereby determine if the personalities of the to-be-joined plural users are sufficiently compatible with one another such that they may beneficially (as they see it) exchange information in a common chat room regarding the material of common concurrent focus. If yes, the user(s) having the identified and currently common focus on same or similar content and/or having the same or similar topic of interest currently on their minds, are automatically invited to join in a system-spawned chat room or to exchange information using another real-time and system-supported information exchange mechanism (e.g., a live video web conference or a live voice only conference, etc.), where in one embodiment the invitations are sent to users who also have current personality-based co-compatibility for chatting with each other. While personality-based co-compatibility may be one attribute tested for prior to inviting users to join into a live chat room, it is within the contemplation of the disclosure to generate invitations that are filtered on the basis of other co-compatibility factors such as level of proficiency in a given topic or reputation regarding a hierarchically categorized subtopic within a hierarchal tree having predefined domain nodes, topic nodes and subtopic nodes, etc., as will be detailed below.

Incidentally, throughout this disclosure reference is made to averaged or median or other statistically computed attributes of rooms. In this regard it is to be appreciated that different users may be continuously entering or leaving a given room at relatively fast pace, particularly in the more popular chat rooms of the system. As such the instantaneous average or other statistically computed attributes of the room can be theoretically changing very fast. It may consume too much of system resources to constantly keep track of the instantaneous average or instantaneous other statistically computed attribute(s) of each room. In one embodiment, running averages or the like are recomputed for successive and chronologically spaced apart time windows. The widths of the windows and the spacings may vary from room-to-room, or topic node-to-topic node or domain-to-domain in accordance with system maintained knowledge-base rules. In one embodiment, each chat room's attributes are deemed to be frozen in time for regular intervals; such as frozen in each one of successive 5 minute stretches whose statistics were computed over a window covering, say, the last 2 minutes; as frozen in each of successive 10 minute stretches whose statistics were computed over the last 4 minutes, every 15 minutes as computed over the last 5 minutes, etc., even though users may be constantly entering and leaving the room. The time points at which new room attributes are recomputed and frozen into place may be referred to herein as attribute checkpoints.

In one embodiment, invitations to join one or more chat rooms (or to join other forms of real-time or non-real time informational exchanges) appear on a side area of each user's computer screen in the form, for example, of incoming and enlarging radar blips, dots, growing bubbles, etc. or as otherwise displayed icons. The positions, shapes, sizes, colorations, enumerations, etc., of these icons may be fixed or they may change. The icons may be structured to indicate what on-screen content of current focus they belong to, and/or what general topic they belong to. Alternatively or additionally the icons may be structured to dynamically indicate (e.g., by temporarily glowing) that they logically belong to certain on-screen content when the user hovers a mouse cursor over the content. The invitation icons may be structured to indicate how strongly they correlate to the user's current content area of specific focus or current topic of interest and/or indicate how strongly the chat compatibilities of other invitees correlate with chat compatibility preferences of the user. In one embodiment, invitations to join one or more chat rooms (or to join other forms of real-time informational exchange) first appear as tiny, perhaps semi-transparent and slow moving dots moving in from opposed edges of the user's screen (or window) toward a central area of a top or side banner. As they move inwardly, if they indeed continue to do so, they may grow in size, in degree of nontransparent coloration, and also in degree of on-screen agitation or movement thus becoming larger and more noticeable centralized bubbles (a disposition that represents being at the center of a hypothetical radar scope). This happens as the local user's current point of focus and the local user's current topic of interest (inferred) and the local user's current co-compatibility converge with those of the invitation's chat room or vise versa. On the other hand, if the user's focus on content diverges away from that of the invitation's chat room or if the user's apparent topic of interest moves away from that of the invitation's chat room, or vise versa, the corresponding bubbles reverse direction and they stream away from the center and revert back to less colorful ones, less agitated and sidelined ones that ultimately disappear off of the peripheral edge of the screen or window (beyond the recognizable event horizon from which they emerged). In one embodiment, each of incoming radar dots morphs into an enlarging image of one or more animated talking (silently talking) heads or faces or avatars where the speed of talking or other movement by the avatar heads indicates an attribute of the invitation such as urgency or relevance of the invitation to on screen other content. The talking heads may wear hats and/or labels indicating their related topic and/or name of associated chat room. If the user indicates partial interest in the invitation, by for example hovering a mouse cursor over the invitational image (e.g., talking head), a speech balloon with a snippet of current chat room content may appear and/or a vocalized version of that snippet may be output from the client machine's sound system.

If the user accepts one of the invitations (e.g., dancing bubbles, franticly talking but silent heads, etc.), by for example mouse clicking on an invitation-offering icon or otherwise gesturing acceptance of the corresponding invitation, a corresponding chat room (e.g., a chat window frame) is automatically opened on the user's screen, where the chat room is populated by co-compatible other users such as by current invitation-accepting other users. In this way, two or more co-compatible users such as the above exemplified users who were simultaneously reading a same article in Celebrity Sensations Magazine (fictitious name) in isolation can be united online with one another substantially instantaneously with the understanding that they are interested in a same area of focus if not also in a same topic of interest and that they have been deemed to be co-compatible personality-wise and/or otherwise for chatting with one another about the content material and/or topic of common interest based on a machine-automated matching of their current chat compatibility preference profiles (CpCCp's and/or optional DsCCp's—which are topic related profiles described below) by a centralized online matching service.

While the above teaches an in-the-background and thus user transparent system for generating invitations, it is within the contemplation of the present disclosure to allow users to explicitly request invitations. In other words, a given user may highlight certain in-web-page content; right click his or her mouse and pick an option (in a pop-out menu, not shown) that asks the system to find matching chat rooms for the highlighted content and to invite the given user into at least one personality-wise co-compatible room among the matching chat rooms. It is further within contemplation of the disclosure to allow users to explicitly search for chat rooms under specific hierarchy nodes of the system where the searched for chat room meets explicit search requests of the user. For example, the user may explicitly request an invitation to a chat room under the domain "sports" and topic "soccer" where other user "Sam" is already a participating occupant inside that chat room. In other words, if users want to be explicitly involved in the decision making of which rooms they get invited into, they can. More generally though, the invitations generating process is intended to occur in the background by autonomous machine operations and without direct (explicit) user participation most of the time so that the user can unobtrusively go about with his or her routine content browsing activities and so that the user may be occasionally surprised (e.g., once every 15 minutes) to discover that the system has magically (and autonomously) located a chat room where other people are discussing essentially the same topic the user is studying on his or her local computer. The user is also surprised to discover that magically, the people in the chat room (if entered, if the invitation is accepted) are of the civility and/or proficiency that the given user prefers for this topic. Of course, none of this happens by magic but rather by a series of background machine-implemented processes as is detailed herein. In one embodiment, each user can turn off the invitations generating system for a predetermined time length (e.g., one hour, one day, etc.) if he or she finds it annoying and can change their minds and turn it back on at any time they want. Moreover, each user can ask the system to provide invitations at a faster or slower rate as fits the mood of that user. (In one embodiment, users must be subscribed to a premium service if they want the invitations presentation rate to exceed a predefined limit.) In most embodiments however, users cannot explicitly force their way into a given chat room or other online forum running under auspices of the MM-IGS system. They must be invited into the chat room by the system. One reason is that other already participating occupants in that room may not want more new comers (due to room population limits) or may not want that specific newcomer (due to personality conflicts for example). Additionally, in one embodiment, when a user explicitly requests an invitation, the user does not need to be focusing upon any content at all. Instead the user may have already developed a personalized co-compatibility profile (e.g., a CpCCp as will be described below) which by itself allows the match-making and invitations-generating system (MM-IGS) to locate at the time of request, co-compatible other people with whom the first user will more likely than not enjoy conferencing with online about no specific initial topic at all. Closely co-compatible users who request such a topic-less invitations are automatically clustered into a catch-all chat room with other users where profiles of the invitees indicate they are highly likely to be co-compatible for such open ended conferencing. By way of example, they may wish to confer generally about current events. Eventually, the online conference may evolve towards focusing upon a specific topic, in which case the catch-all chat room they joined may be migrated towards a specific topic node as will be described below. However, the point is that the MM-IGS system can be used to automatically bring together people who are chat-wise co-compatible to confer about no specific topic or content at all.

In one embodiment, the centralized online match-making and invitations-generating system (MM-IGS) operates as a distributed cloud computing environment wherein workloads are distributed amongst plural servers and/or data centers based on resource availability and service demands by local user populations. In one embodiment, current chat compatibility preference profiles are automatically updated in a data center with which a user's client machine currently interacts, the modification to the chat compatibility preference profiles are time stamped, and then the time stamped modifications are propagated in the background through the cloud to be included in shadow copies maintained at other data centers of the user's chat compatibility preference profiles. If a user's home default data center is unable to appropriately service him or her for any reason (e.g., power outage, too far away, too overworked, etc.), the user's client machine is redirected to another data center that contains a relatively up-to-date copy of the user's chat compatibility preference profiles. That alternate data center then provides appropriate match-making and invitations-generating services in place of the home default data center.

In one embodiment, current chat compatibility profiles (e.g., personality related CpCCp's) are computer readable digital data files (each accessible by the corresponding logged-in user and partly modifiable by the respective logged-in user) that contain demographics information about that local user and preference information specifying generically the kinds of other users which the local user may or may not wish to connect with at the present time for chatting or other forum like informational exchanges; i.e. blogging, twittering, etc. The personality related compatibility profiles (CpCCp's, PEEP's) may also contain adaptively changeable knowledge base rules indicating how uploaded CFi's are to be parsed and/or merged. In one embodiment, the local user's co-compatibility preferences may be automatically changed based on detected mood of the user, surrounding environment (e.g., work, home, coffee shop), current date (e.g., a special holiday for the user), passage of time, accumulated trending information, etc. and thus in one embodiment the remote match-making service uses monitored user activities and user surroundings to determine the user's mood or other profile selecting attribute to automatically select an appropriate CpCCp matching that current mood and/or other preferences-determining attribute. The system also adaptively changes individual knowledge base rules for personality and/or topic co-compatibility processing based on accumulated trending information. The current chat compatibility profiles (e.g., CpCCp's) of one embodiment further include reputation files or pointers to such files where the corresponding reputations are ones that are built over time for the local user by votes (e.g., biometrically inferred votes or explicit votes) cast by other online users. The current chat compatibility profiles (CpCCp's) of one embodiment further include credential files or pointers to such files where corresponding credentials (including those indicating proficiencies for specific topics or subject areas) are ones that are initially declared by their users but can afterwards be validated or invalidated by system operators and/or by challenges or affirmations by other users of the chat rooms spawning system. CpCCp's may further include identities of a user's favorite topics when in a given mood. These identified favorite topics may be used to better guess at what the user's current topic of interest is (not to be confused with current area of focus) as will be described below.

In one embodiment, one or more of a user's current area of focus (CFi), current mood (Cm) and current voting intent (CVi) are automatically inferred at least from biometric data obtained in real time from the local user, but could additionally be inferred from other information combined with the biometric data such as time of day and surrounding environment (e.g., type of background music, its volume, its beat, etc.). The utilized biometric data may be obtained from visual scanning of the user's face (e.g., detecting grimaces, eyebrow lifts, or other facial expressions) and/or from mechanical detection of the user's sitting posture (i.e., fidgeting) and/or detection of the user's pulse/heart rate, breathing rate ($CO_2$ exhalation detection), depth of inhalations and/or exhalations, galvanic skin response, hand gesturing or the like. Thus if a user is smiling and has eyes wide open, such may indicate a high degree of satisfaction with what the user is currently focused upon on the user's local screen (or with what is otherwise being perceived by the user through a user interface of a local data processing device, i.e., a client computer). On the other hand, if a user is detected to be grimacing and gesturing wildly and breathing rapidly and shallowly, such may indicate a high degree of dissatisfaction or anxiety with what is currently being focused on through viewing of the screen and/or through other user interface means. The specific meaning of biometric data gathered from a local user may vary from user to user, from one surrounding environment to another (e.g., work versus home), from culture to culture (e.g., in some cultures, shaking of head from side to side does not mean disagreement), and so forth. Accordingly, Personal Emotion Expression Profiles (PEEP files) which may include translation data and/or biometric data processing rules are formed, stored and used to determine what the biometric data collected from a given user at the instant or over a stretch of time probably means regarding each local user's cognitive state. PEEP's may be stored locally in the user's client machine and/or remotely in an in-cloud data storage facility. Automatically inferred guesses of what the local user's current interest is (physical focus spot plus mental topic selecting state) and/or what the local user's current conscious or subconscious voting intents are, are automatically generated and respectively recorded in uploaded data objects such as Current Focus identifying records (CFi's) and Current vote indicating records (Cvi's). Incidentally, CFi's do not have to be generated from one same client machine. A local user can have a plurality of automated machines arrayed around him where one machine is watching head and eye (pupil) movements and reporting those to the cloud via a first stream of uploaded CFi's, a second machine is watching posture changes and reporting those to the cloud via a respective second stream of uploaded CFi's, a third machine is watching what content is being made available to the user (through the third machine itself and/or through action of one or more other machines or devices) and reporting those to the cloud via a respective third stream of CFi's. In one embodiment, yet another machine watches or otherwise monitors the biometric sensing devices in its locale to determine which if any user the other sensing devices are monitoring and reports as to the same and the respective machine identification numbers to the cloud. As will be seen, in one embodiment each CFi (FIG. 2A) is time stamped and location stamped and machine ID stamped. The MM-IGS (e.g., in-cloud service) can collect these various streams and merge them according to closeness of time and location stamps. In one embodiment, the CFi data generated by each machine or device is accumulated in the local machine's buffer and held there for automated background gathering (e.g., uploading) by an on-network client watching service (e.g., an AARMS server) as bandwidth permits. Since the CFi's are time stamped, they don't have to be uploaded at the instant they are generated. All this generation and accumulation of CFi's typically executes transparently in the background so the local user is generally unaware that this machine-implemented activity monitoring and optional activity interpretation processing is going on.

The local user merely goes on with his or her routine activities including that of browsing through and occasionally focusing more intently on current content of interest as seen on one or more screens (not necessarily of a same device, could be TV screen and email screen for example) and/or focusing on current content of interest as perceived through other user interface channels (e.g., audio data signals, for example from a separate radio that independently reports to the cloud regarding what the user is currently listening to). In one embodiment, the benign spyware activities are limited to one or more windows or frames or devices which the user has pre-specified as being open for such benign spying upon at that time (e.g., interest_monitoring is set to and shown as being On). In one embodiment, security locked windows or frames or devices are automatically excluded from being spied upon. The open-for-spying windows/frames/devices may have special blinking icons, or special window border colors/patterns, animation or the like operating on them per the user's election so as to thereby repeatedly remind the user that activities within these windows/devices are currently being benignly spied upon. The user may deactivate the spy permissions on one or all windows, frames or devices as desired. In this way, the user may maintain as private certain on-screen and/or off-screen information at all times, especially when the user shifts his or her focus to that private material.

While the above teaches an in-the-background and thus user transparent system for automatically determining the probable emotional and/or physiological state of the user (e.g., angry, tired and hungry), it is within the contemplation of the present disclosure to allow users to explicitly declare their emotional and/or physiological state to the system. In other words, a given user may right click his or her mouse and pick an option (in a pop-out menu, not shown) that allows him or her to tell the system about his or her self-perceived emotional and/or physiological state. He or she may explicitly ask the system to locate chat rooms occupied with other people who are equally emotionally involved with a same or similar topic (e.g., angry over a recent news development or joyous about a local sports team winning the championship). Of course, when caught in the throws of a highly emotional state, users in general may not be able to step back, truthfully assesses their emotional state and explicitly declare it to the system, which is why it is preferable to rely on background collected biometric data. In one embodiment (as detailed below), the system automatically determines when to include current emotional and/or physiological state as one of the parameters for finding a matching chat room.

If a user accepts a chat invitation (Cciv) from an online match-making service (e.g., from the in-cloud MM-IGS) and the user shifts his focus (mouse, eyeball focus, keyboard focus, etc.) into the corresponding chat window or frame then in one embodiment, the inferred meanings of his inn-chat focal activities become different from those inferred for non-chat focal activities. The user's bursts of focused and emotional engagement with inn-chat transactions are interpreted as implied votes for the content being focused upon within the chat room window. (User reactions to system-made recommendations for further research—See FIG. 3B—may also be deemed as feedback providing votes.) During an ongoing chat, if one subset of inn-chat users persistently express negative votes (even subconscious negative votes) against the contributions of one or more other in-room users, the online match-making service may automatically and responsively decide to cleave the one chat room into two separate rooms that respectively contain the now-separated warring parties (assuming the users did not provide chat preferences indicating they wanted a good fight). Each group is informed that the others have left the room. In this way, incompatible chat room participants (e.g., so-called "trolls") can be efficiently dealt with (removed from contact with upset others). Chat room trolls are given the impression they have won because everyone else appears to have left the room. Negative reputations are automatically built up over time about the trolls based on repeated negative votes cast by numerous other users, especially of other users who have established good reputations. In this way the system can automatically build up reputation profiles for different users over time based on the reactions of other participants. Reputations may vary as a function of topic of discussion or subject matter or detected current mood of the user.

In one embodiment, if users search on same or similar search terms through a same search portal (e.g., the Google™ web search page) and the searches are initiated within a prespecified chronological distance form each other (e.g., 5 minutes or less apart) and/or the users are within a prespecified geographic distance from each other (e.g., 50 miles or less apart), then invitations are automatically sent to those users to chat about their search results irrespective of what topic the users are actually thinking about. In another embodiment, personality wise co-compatible users who perform such searches are clustered together and the invitations are sent to the clusters to join respective chat rooms. Personality co-compatibility may be determined through use of CpCCp personhood files as shall be detailed below.

Invitations into real time online chat rooms are not a necessary part of all embodiments of the system disclosed here. At least in one embodiment it is sufficient that further research recommendations are autonomously made by the system to the user based on content the user is detected to have been apparently focusing upon.

Other aspects of the disclosure will become apparent from the below detailed description.

BRIEF DESCRIPTION OF THE DRAWINGS

The below detailed description section makes reference to the accompanying drawings, in which.

DETAILED DESCRIPTION

Figure 1A:
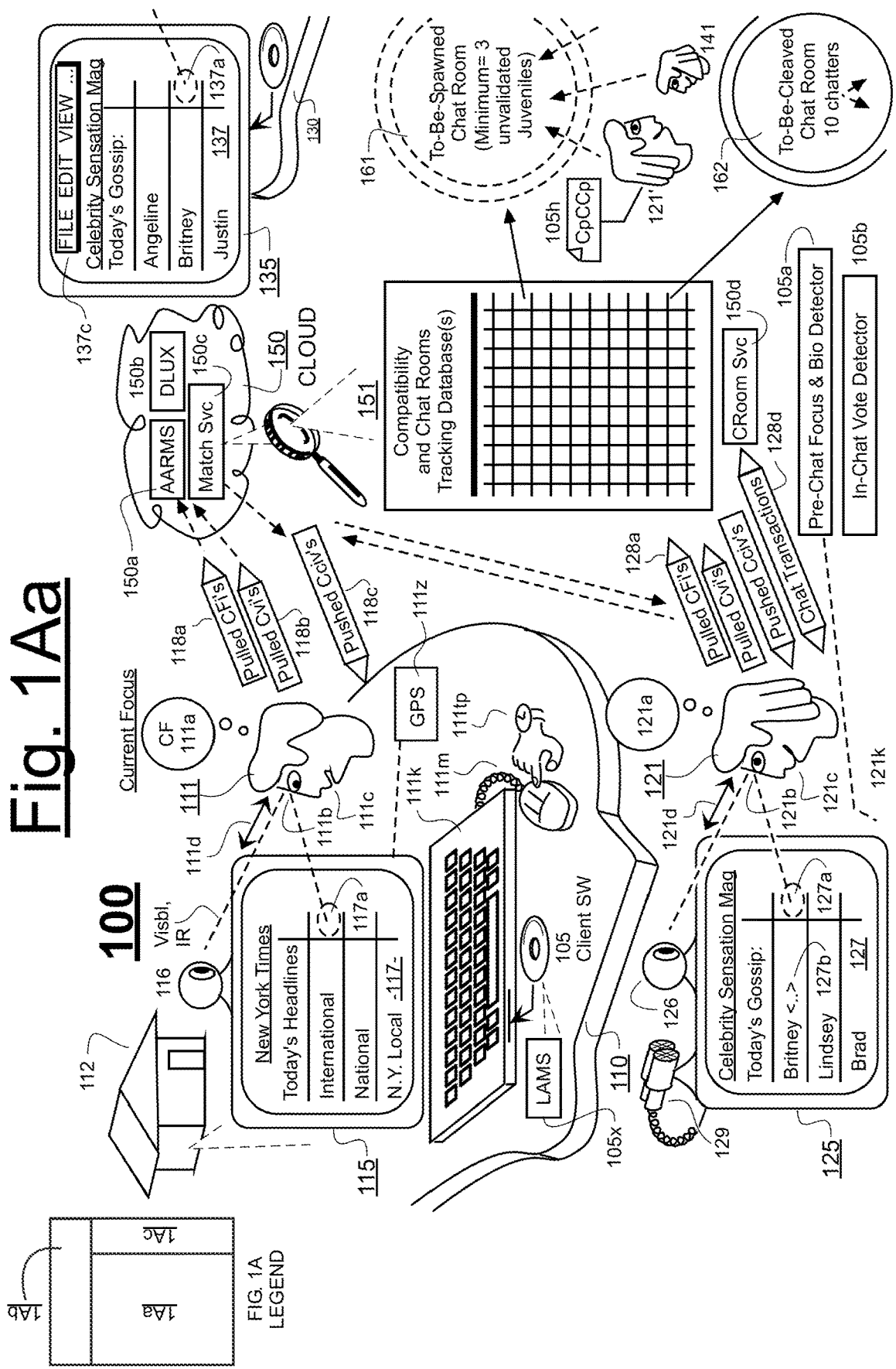
FIG. 1A is a composite of partitions 1Aa, 1Ab and 1Ac per the legend provided in partition 1Aa and all references herein to said FIG. 1A are understood to refer to said respective composite which shows a block diagram of an automated chat room spawning system in accordance with the disclosure.

FIG. 1A is a block diagram of an automated user-watching, user-activities reporting, activities analyzing, user-to-user match-making and chat room spawning, chat room migrating system 100 in accordance with the present disclosure. Major components include client computers 115, 125, 135, etc. respectively located at a plurality of separate user locations 110, 120, 130, etc., and a networked server cloud 150 to which the local computers 115, 125, 135, etc., operatively couple by way of electrical/fiber cables, wireless interconnect or other appropriate communication means. Within the cloud 150, one or more servers (not shown) provide a number of services including an Access and Accessible-Resources Monitoring Service (AARMS) 150a, a topic and Domain Look-Up Service (DLUX) 150b and a user-to-rooms Matching Service (MS) 150c. There are yet other in-cloud provided services including a Chat Rooms Management Service (150d, shown below database(s) 151) and others that will be detailed below. (See also briefly FIG. 4A.) The cloud 150 may include geographically distributed and separately powered data centers having fully or partially overlapping service capabilities. (See FIG. 4A again.) Accordingly if one data center becomes inoperable due to power outage, etc. or one data center becomes overwhelmed with too many service demands from a surge in current user population, other data centers may step in to absorb the work load.

The local client computers 115, 125, 135, etc. of FIG. 1A may be desktop units, laptop units, hand-held devices (PDAs), third generation cellular telephones, or the like. Specific hardware available within each client machine (e.g., GPS location indicators, RFID tags, wireless network interconnect circuits, etc.) may vary from one local computer to the next. However, each local client machine (e.g., client computer) generally has some means for remotely connecting to the server cloud 150, some means for visually and/or otherwise outputting informational content to its local user (e.g. 111, 121, 131, etc.) and optionally some means for receiving input from the local user such as through a local keyboard (e.g., 111k, 121k, etc.), a local mouse (e.g., 111m, 121m, etc.), a local microphone (only one shown at 129 but there can be plural microphones at a user site) and so forth.

The local client computers: 115, 125, 135, etc., each also includes appropriate client software 105, 105', 105", etc., that is installed in that computer by one or more means including but not limited to: insertion into the local computer of a compact disc (CD) that contains at least part of the client executable software 105 and/or by downloading of at least part of the executable client software 105 into the local computer through use of manufactured instructing signals transmitted from the server cloud 150. As will be explained in more detail below, the loading-in of part or all of the client software 105 transforms the local computer into one or more altered states wherein the altered computer operates at least part of the time as an automated generator of Current Focus identifying records (CFi's), as an automated generator of Current Vote indicating records (Cvi's), as a receiver of chat room invitation records (Cciv's) and/or as an automated displayer of radar-like invitation blips that represent received ones of the Cciv's. The client software 105 may comprise a plurality of components including, but not limited to: a Local Activities Monitoring Service (LAMS) 105x. In one embodiment, the LAMS 105x includes an automated current focal point detector module 105a (a CFid, shown elsewhere in FIG. 1A) and a current vote detector module 105b (Cvod, also shown elsewhere). The client software 105 may further comprise a radar-like invitations display means (Iv-Disply) 105c for displaying invitations (e.g., in the form of silently talking heads, spinning tops, in-flying airplane silhouettes, etc. that appear on the user's screen—see FIG. 1D) and for displaying their respectively associated interest domain and topic coefficients as well as their user co-compatibility coefficients (see briefly 117b of FIG. 1D). The locally installed copy of the client software 105 may cause the transformed client machine to maintain its own copy of a user browsing history 105d or it may link to, and supplement, an already present browser history in the local computer 115-135. In one embodiment, the supplementing information indicates a level of emotional engagement or biometrically indicated interest by the user for the correspondingly focused upon informational content output by the same or another local client machine. In the same or another embodiment, storage of one or more of the user's internet browsing history (105d), the user's search tool input history (105e) and the user's chat room participation history (105f) occurs in the cloud 150, where in-cloud service modules (described below) can make use of this user's historical information (105d-105f) as well as making use of a cloud retained, Personal Emotions Expression Profile (rPEEP). In one embodiment, a history 105g of the user's keyboard, mouse and/or user input device usages is also kept. For example, history 105g may record the user temporarily highlighting a specific line of text, or zooming in to better view a specific piece of content and/or copying a specific piece of content to the client machine's clipboard. These various histories and other records may be used to make automated determinations regarding the user's probable frame of mind, including what topic the user is probably thinking about, how emotionally engaged the user is in that topic and whether the emotional engagement is of a kind (be it positive or negative) that indicates an automated search for a corresponding chat room should be initiated on behalf of the user.

User focus and/or interest in a particular item may be indicated by a variety of mechanisms including those disclosed in the here incorporated U.S. Pat. No. 5,890,152 ("Personal feedback browser" by J. Rapaport et al). In other words the interest indicators may comprise or may be functions of an amount of time spent by a given user in viewing a particular on-screen article, time spent scrolling through the article, time spent moving a cursor or other location indicator through the article, number of mouse clicks on items within the article, amount of highlighting of various parts of the article, and so forth. Scroll rate and mouse agitation rate may also be used as indicators of current level of interest. Time spent apparently listening to related audio content may also be used as an indicator of current level of interest.

Each user is different and thus may indicate heightened interest in one form or another of informational content that is being displayed and/or otherwise output to the user by his local machine by means of a different set of local user activities. Accordingly, in one embodiment, the local client software 105 includes a local Personal Emotion Expression Profile (L-PEEP) 107 which correlates different ones of locally expressible and detectable physical activities of the user with different kinds of interest and/or emotional indications, be they negative, positive or neutral. The meanings of detected user state may also change as a function of user mood or user surroundings. Alternatively or additionally, the Remote Client Access and Accessible-Resources Monitoring Service (AARMS) 150a in the cloud 150 may link to a client account database that stores an online or remote Personal Emotion Expression Profile (rPEEP) where the latter is made responsible for carrying out, or for supplementing the correlations made for different ones of locally expressed and detected physical activities of the user with different kinds of interest or emotion indications. In one embodiment, standardized interest indications are established by the online match-making service such as a spectrum of interest indications spanning from substantially not engaged to fully engaged and such as from substantially negatively disposed to substantially positively disposed when used for representing level of emotional disposition. In one embodiment, a neural network adaptive model or the like includes trend and erratic departure detectors and is used for determining best guess correlations between locally detected indicia of user focus and/or emotion with otherwise indicated levels of focus and/or emotional disposition. In the same or an alternate embodiment, a statistical model is used for scoring on an ordered probabilities basis, correlations between locally detected user activities and/or biological states and corresponding states of the user's mind (e.g., engaged versus bored, happy versus disappointed or upset, etc.). In one embodiment, the neural network adaptive models and/or statistical models are used to adaptively alter knowledge base rule sets for individual users where the knowledge base rule sets dictate how various pieces of information will be combined and processed.

Figure 1B:
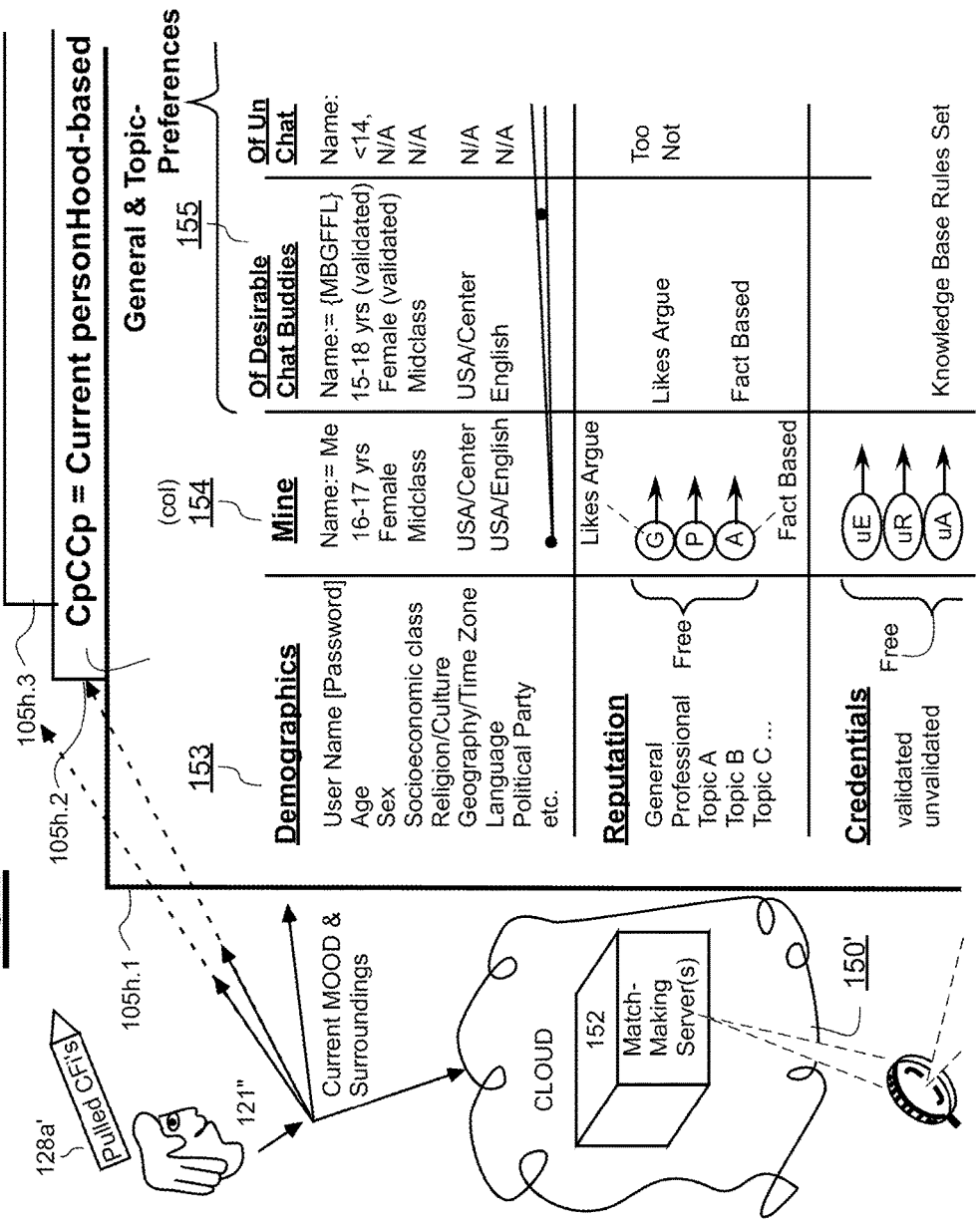
FIG. 1B is a composite of partitions 1Ba, 1Bb and 1Bc per the legend provided in partition 1Ba and all references herein to said FIG. 1B are understood to refer to said respective composite which shows a schematic diagram showing use and storage of current personality-based chat compatibility profiles (CpCCp's)
Figure 1B:
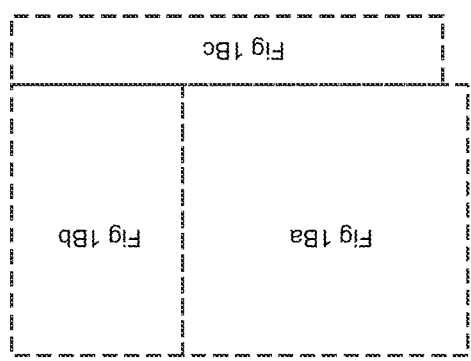
Figure 1B:
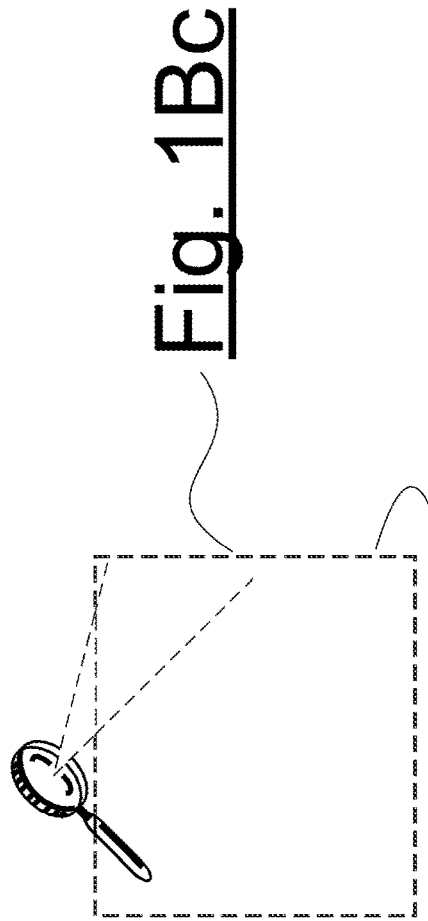
Figure 1B:
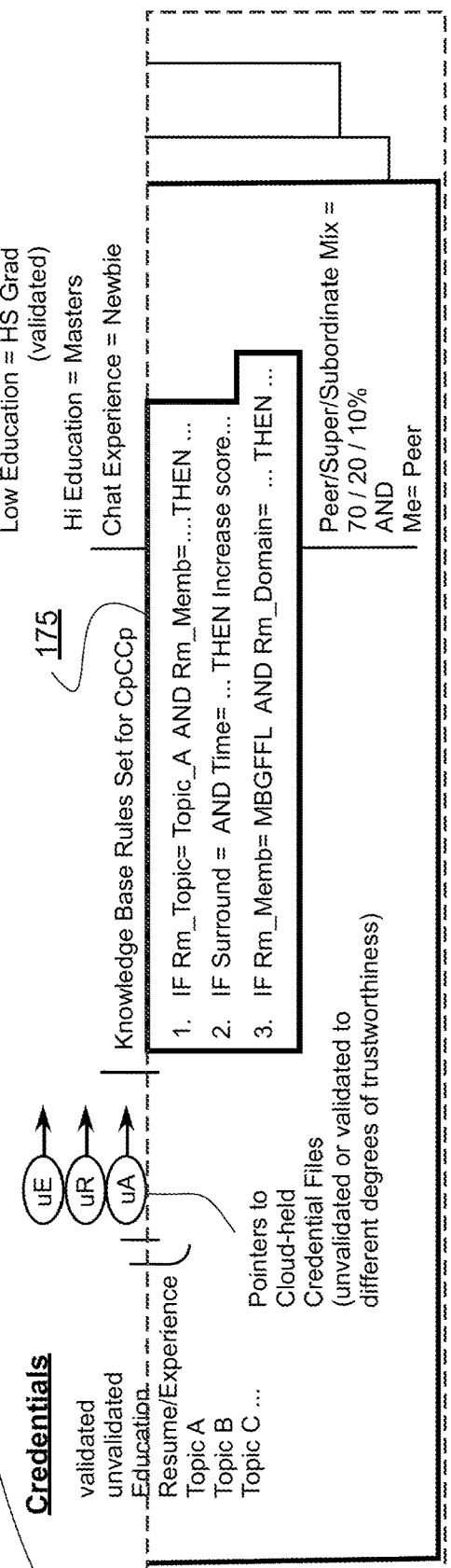
Figure 1C:
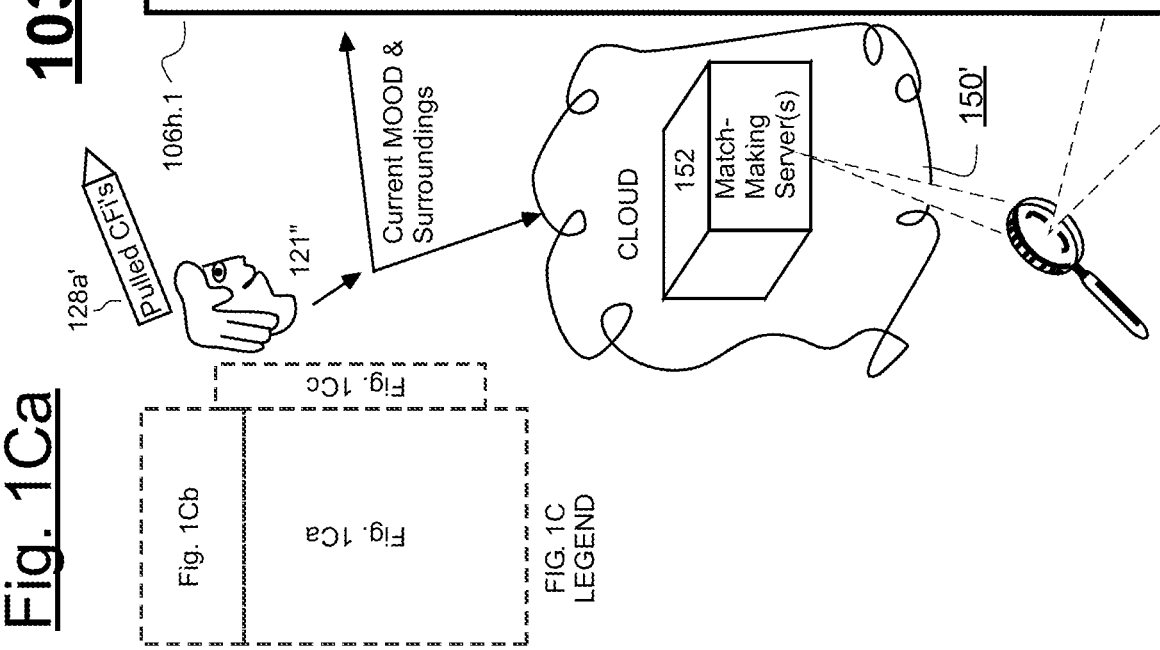
FIG. 1C is a composite of partitions 1Ca, 1Cb and 1Cc per the legend provided in partition 1Ca and all references herein to said FIG. 1C are understood to refer to said respective composite which shows a schematic diagram showing use and storage of domain specific current chat compatibility profiles (DsCCp's)
Figure 1C:
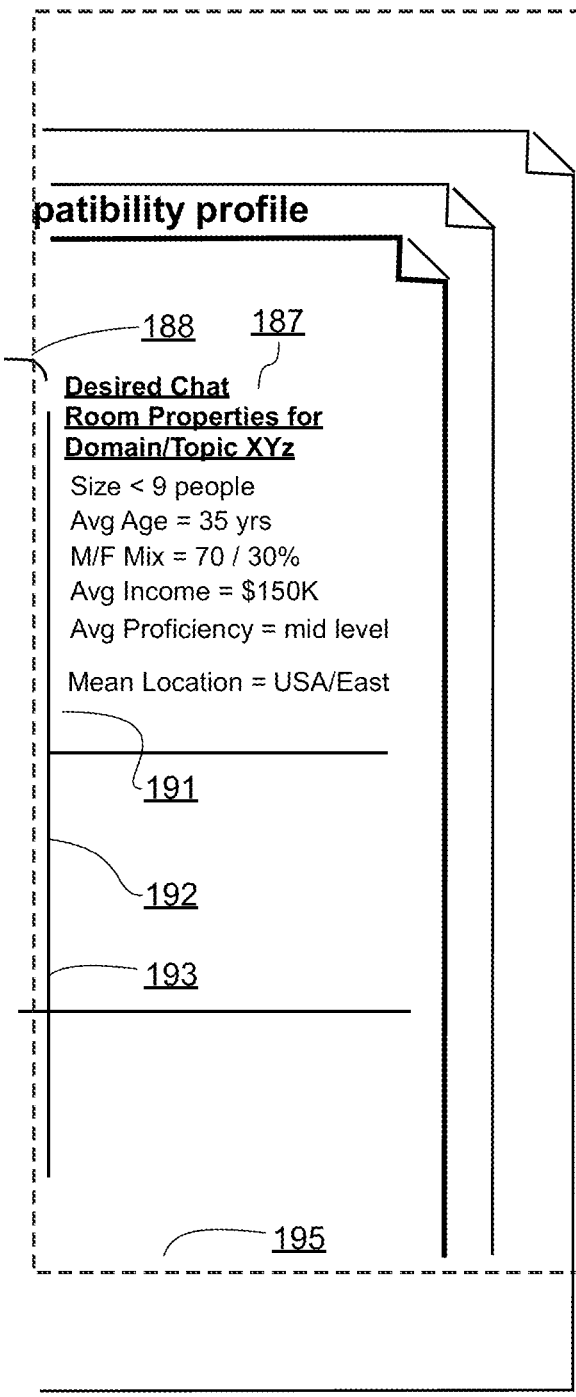
Figure 1D:
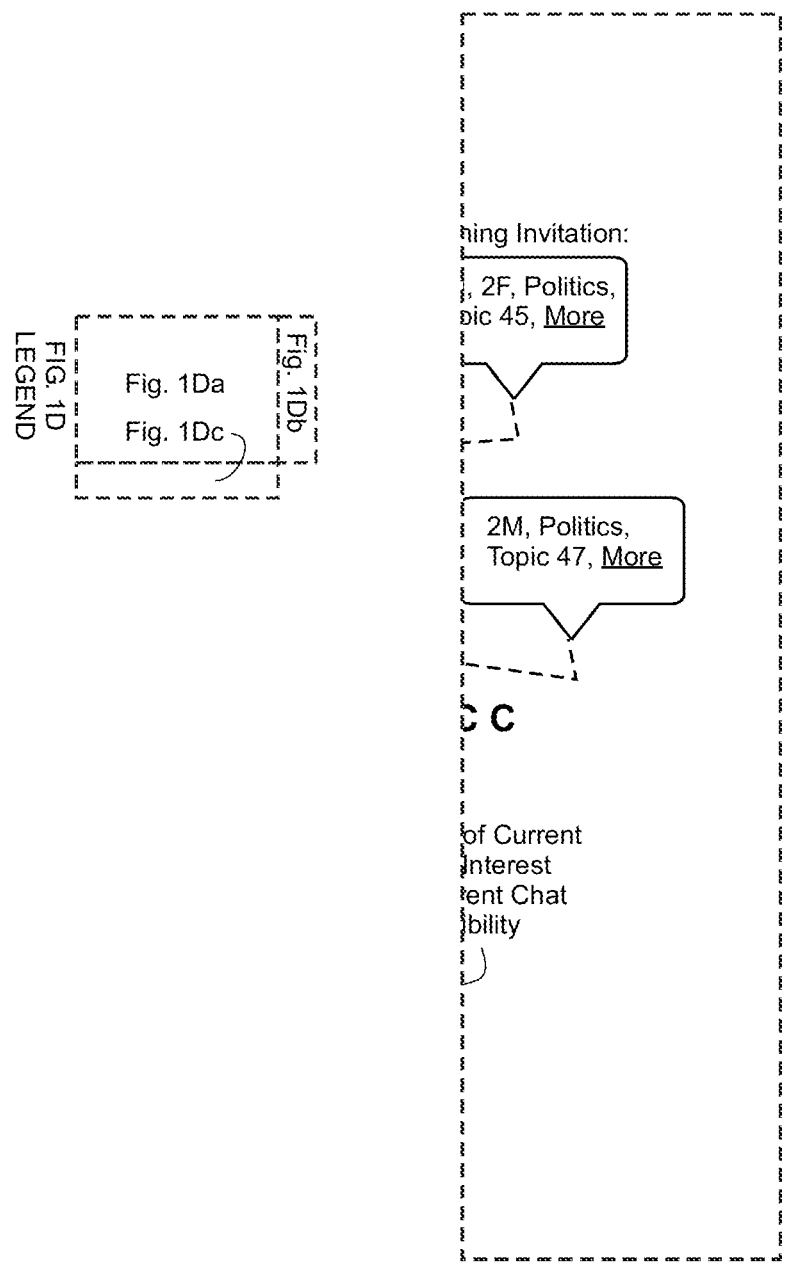
FIG. 1D is a composite of partitions 1Da, 1Db and 1Dc per the legend provided in partition 1Da and all references herein to said FIG. 1D are understood to refer to said respective composite which provides a diagram of a first radar scope design which allows users to determine degree of current shared interests and degree of current chat compatibility profile matching for corresponding chat invitations.
Figure 1E:
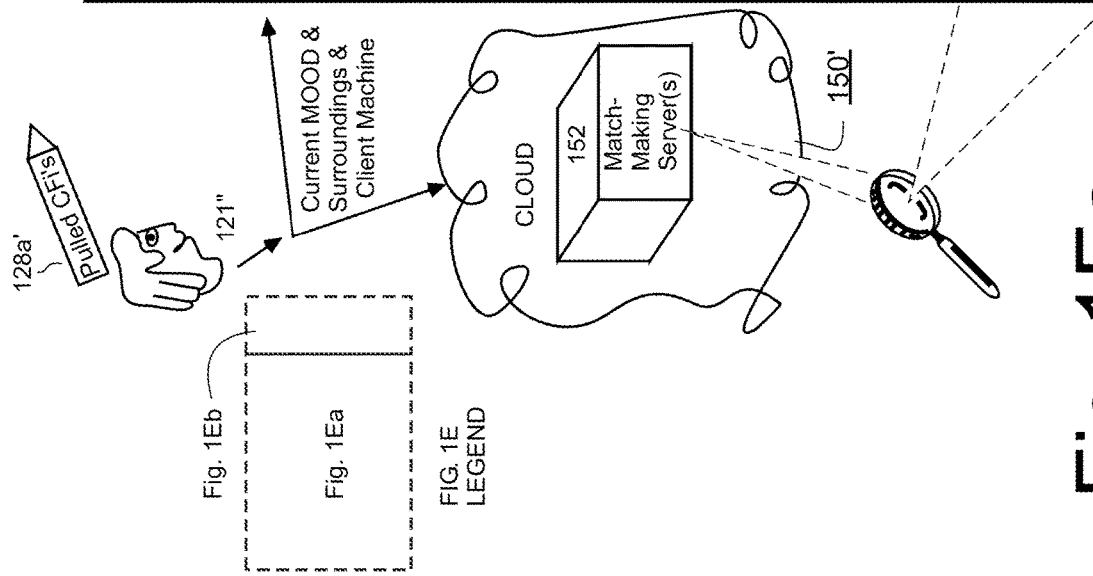
FIG. 1E is a composite of partitions 1Ea and 1Eb per the legend provided in partition 1Ea and all references herein to said FIG. 1E are understood to refer to said respective composite which provides a schematic diagram showing use and storage of an individual user's Personal Emotion Expression Profile (PEEP)

In terms of a more concrete example, reference is now made to PEEP record 107 of FIG. 1E. This Personal Emotion Expression Profile (PEEP) record can be fully stored in one or both of the user's local client machine (e.g., 115) and in the cloud 150 or its functionalities can be distributively stored, partially in each. Most people have favored body language expressions (or "tells" in a poker player's parlance) by way of which they tend to signal their state of mind even though they may not verbally express the same. Of course, a stone faced professional poker player who intentionally hides his "tells" with sun glasses, etc., may not be able to beneficially use the here described system. However, most users will keep their faces substantially exposed and will subconsciously signal their internal state of mind by various body language clues such as how rapidly they blink their eyes, how long they stare at a particular location, by changes in eye pupil dilation, by how tightly they purse their lips, how rapidly and/or deeply they inhale and exhale (or how long they hold an inhalation), how often they sigh and/or shrug or slump their shoulders (if at all), how long they pause between using mouse or keyboard, how they twitch various facial muscles, and so on. A great deal of literature on body language cues is available including in the realm of so-called poker "tells". As will be detailed below, various means for observing the user's body language may be provided in, or coupled to, the client machine (or operatively coupled to the cloud while being located at the user site) where these means may include but are not limited to having one or more web cameras (e.g., 116) that constantly watch the user's body, including his face, his eyes, his hands, etc. for the purpose (among others) of reporting body language tells to the cloud. Operative coupling between the web camera(s) and data processing hardware within the user's primary computer 115 may be provided in any of a variety of ways including wired or wireless couplings. Aside from providing image data to the user's primary computer, one or more of the web cameras (e.g., 116) may provide sensor settings data such as an indication of one or more angles at which the camera is pointed, an indication of a variable focus length at which the camera's lens system (if variable) is currently set at, an indication of a variable aperture (if variable) being currently used by the camera, an indication of a variable spectral filter (if variable) being currently used by the camera, and so on. In addition to or as an alternative to the one or more web cameras (e.g., 116) that constantly or periodically watch the user's body, the user's local machine system may include other optical devices (e.g., tracking lasers) that track the user's eyes for various purposes including for example determining where the pupils are pointed to and what the current pupil dilation is and/or determining when and how often the user blinks. In addition to or as an alternative to the one or more web cameras (e.g., 116), the user's local machine system may include other head position determining means (e.g., tracking lasers) that track the user's head positions for determining for example as among various user state parameters, how far the user's face is form one or more content display devices, for determining how often and/or to what extent the user shakes or bobs his head (e.g., in rhythm to background music), and so forth. Every user tends to be slightly different in how he or she expresses their tells and what those body language displays mean. For one person, shaking of the head up and down may mean agreement while for another, something entirely else. Accordingly, a Personal Emotion Expression Profile (PEEP) is individually developed over time for every system user. New users may have a stereotyping PEEP initially assigned to them. This stereotyping or template PEEP is modified over time as the system adaptively learns which body language cues are most telling in given circumstances for each user. The assigned stereotyping PEEP may be selected based on place of birth, ethnicity, culture, age, gender, reported education level, and/or other demographic information provided by the user.

In one embodiment, a first table column 196 of the PEEP database record 107' (FIG. 1E) lists the monitored or monitorable biometric parameters as an ordered list with the more preferred (the more telling) of the individual user's biometric parameters listed first. Not every local client machine (e.g., palmtop versus desktop computer) can monitor every parameter. It depends on available monitoring resources. The ordered list of more and less preferable monitorable biometric parameters (196) is consulted by the local client machine the user is using and a subset of available resources is selected. Ordering of the list 196 is achieved in adaptive iterations as the system adaptively learns which parameters are better tells than others under varying circumstances (e.g., at work, at home, in morning, in evening, etc.). Success may be determined based on occasional surveys sent to the user and also on positive feedback obtained from the user accepting more invitations rather than less when the invitations are based on the more telling of the monitorable biometric parameters.

In addition to ordering the monitorable biometric parameters according to which are more telling in given circumstances, the average latency between cause and effect are recorded for each in time stretch column 197 of the table. some biometric parameter changes may occur long after an instigating event (e.g., viewing emotion creating content) while others may take root soon after. The time stretch needed between time-stamped ones of start and stop CFi's may be determined based on the average latency times recorded in column 197. The actual time stretch employed may be varied according to adaptively adjusted expert system rules provided in a knowledge rule base 199 that may be embedded in each PEEP record (or stored elsewhere and logically linked to the PEEP). As known to those skilled in knowledge rule databases and automated expert systems, IF-THEN-ELSE statements can be nested one in the other and each containing conditional expressions plus conditionally actionable consequences. The nesting can be changed, the conditional expressions can be changed and the data ranges or other data values inside the conditional expressions can be changed. Accordingly a very flexible system is made available for adaptively learning what monitorable biometric parameters work best (or good enough) for each individual user under various surrounding conditions, what ranges or trigger limits of data values inside the conditional expressions work best (or good enough) for each individual user, and what nesting of rules works best (or good enough). In one embodiment, before less important other parts of a given PEEP record (e.g., 107') are processed, a PEEP record switching rule (e.g., IF Surroundings=Work THEN . . . ) is automatically executed so as to conditionally swap in a different PEEP record (e.g., 107.2, not shown) in place of the default PEEP record when certain predefined conditions are met, such as when it is determined that the user is at his or her work place rather than at home, that the user is using a handheld data processing machine (e.g., cell phone) rather than the usual desktop computer at home or at work, that the user is not alone, that the time of week is a weekend rather than a weekday, and so on. In this way wholesale changes of PEEP defined behavior can be made before finer determinations of user state are made based on in-PEEP knowledge-base rules and/or based on in-PEEP primary physical state definitions.

Here are some nonlimiting examples of knowledge base rules that may be provided in a PEEP record and used for determining via automated means what the user's current emotional state is: (1) IF Heart_Rate increased by 2% in last 5 minutes THEN increment Anxiety_score by +1, ELSE IF Heart_Rate decreased by 3% in last 4 minutes THEN adjust Anxiety_score by −1. (2) IF posture_change shifted weight bearing 20% or more asymmetrically to one body side more than what average of last hour was THEN increment Jumpy_score by +1, ELSE decrement Jumpy_score by 0.5. (3) IF Words_per_minute_read increased by more than 10% over base_reading_rate_of_current_content_displayer in last 2 minutes THEN increment Interest_score by +1 ELSE IF Words_per_minute_read decreased by more than 30% below base_reading_rate_of_current_content_displayer in last 2 minutes THEN increment Interest_score by +2 AND increment CFi's time stretch by +3 minutes ELSE decrease adjust Interest_score by −0.3. (4) IF eye dilation increased by 10% or more while reading last paragraph AND same paragraph was reread THEN increment Interest_score by +5 AND increment CFi's time stretch by +2 minutes. (5) IF user interrupted reading to type notes and then quickly returned to reading same content and then proceeded to make further notes THEN increment Interest_score by +10. (6) IF user's eyes tracked paragraph without interruption for more than 1 minute AND Respiration_rate decreased by more than 20% THEN increment Interest_score by +8 AND increment Concern_score by +3. (7) IF user read last paragraph uninterrupted AND eyes dilated AND microphone(s) detected utterance of swear word by user AND user put hands to face and shook face, THEN increment Upset_score by +50. (8) IF user stopped reading (eye sweep stops) and stared into monitor for more than 45 seconds (thus appearing to concentrate on thinking) AND then user resumed reading with increased Heart_rate THEN increment Interest_score by +10. (9) IF user stopped reading (eye sweep stops) and user quickly changed web site (new URL) and became engaged in activities unrelated to currently displayed content THEN adjust Interest_score by −25. (10) IF user returned to original web site (old URL) and user resumed reading same (eye sweep resumes) and user ceased unrelated activities THEN adjust Interest_score by +25 (to wipe out earlier negative due to newer showing of continued interest in content of old URL, perhaps due to user re-evaluation of value of that older content). (11) IF user Heart_rate in range of 117 to 123 beats per minute, THEN set Extreme_excitement to True. (12) IF user inhalation depth is greater than normal by 25% and respiration rate is Regular THEN set Deep_interest to True.

In one embodiment, initial knowledge-base rules sets may be hand coded and stored into respective stereotyping or template profiles together with pointers pointing to rule parameters that are to be automatically fine tuned by the system over time on the basis of experience with a given user's behavior. In one embodiment, pattern discovery and/or rules generation are automatically carried out in accordance with Rough Sets theory and/or other expert system knowledge base development techniques. In one embodiment, a combination of automated knowledge base development techniques and hand coded refinement may be used to produce the initial knowledge-base rules sets.

In one embodiment, table column 198a identifies the mental state (typically expressed as a numerical score by the data processing machines described herein) that most closely correlates with the monitorable biometric parameter of column 196 for the given individual user. The correlations can change from person to person, from one environmental setting to another and even for a same user over the course of time. Thus these listed correlations are adaptively changed by the system over time using feedback obtained from user filled surveys, obtained from emotion evoking test content and/or from rate of invitation acceptances. In one embodiment, table column 198b identifies room matching keywords that are best employed for that person to find chat rooms having emotional states empathetic to the correlates ones of the given user whose PEEP record 107' is shown. The correlations of column 198b can change from person to person, from one environmental setting to another and even for a same user over the course of time. Thus these listed correlations 198b and utilized keywords are adaptively changed by the system over time using feedback obtained from user filled surveys, obtained from emotion evoking test content and/or from rate of invitation acceptances. In one embodiment, each PEEP file may include an early executed knowledge base rule that swaps out the current PEEP file 107' and replaces it with another PEEP file (e.g., 107.2, not directly shown) in response to, for example, time of day, primary client machine being currently used by the user, detected surroundings of the user and so on. More specifically, a given user's normal reaction times may vary as a function of such parameters and by substituting in the appropriate PEEP file the system can automatically make whole sale adjustments to finer PEEP parameters by first picking the context-appropriate PEEP file.

A PEEP database record or file may have a variety of different fields filled with various correlations and/or adaptively changeable rules. As seen in the example of FIG. 1E, for each class of major body areas that are to be monitored, there can be plural subsets to be monitored with individual correlating factors attributed to those subsets. The knowledge base rules 199 may include rules specifically tailored to the monitored subclasses of biometric parameters (e.g., pulse rate, blood pressure, oxygen saturation level, etc.).

Referring again to FIG. 1A, the browsing history 105*d* (URL's recently visited) maintained by the local client software (and/or in the cloud) may be supplemented by a search engine history 105*e* which indicates various keywords that the user has recently used (e.g., over rule-based stretches of time) in conjunction with use of one or more search engines at roughly the same time that focus centered on a particular screen area such as 117*a* within web page 117 and interest was expressed by one or more machine-implemented means. The keyboarding and/or mouse use activities history 105*g* may be used to determine that the user for example highlighted certain words or phrases and/or copied them to a clip board, all this indicating that perhaps greater weights should be assigned to the highlighted words or phrases. These highlighted words or phrases and/or utilized search keywords may be used alone or in combinations with other hinting data (e.g., URL's, hidden meta-tags, the user's personal profiles) to automatically determine the more probable ones of possible topics of interest that might currently be on the local user's mind as he focuses on corresponding content (e.g., 117*a*). The topic Domain Look-Up Service (DLUX) 150*b* in the Cloud 150 may use user histories uploaded form the user's local machine and/or user histories already stored in the cloud 150 to automatically determine probable topics of current interest of the local user. It is to be understood that focal area (e.g., 117*a*) and topic of interest are not necessarily one and the same. For example, one user (e.g., 111) might be focusing on a map of Las Vegas, Nev. because he is an avid poker player and wants to map out directions for traveling to an upcoming tournament. At the same time, another user (e.g., 121) might be focusing on the very same on-line map (same URL) of Las Vegas, but because she is doing a school report about the Hoover Dam and its surrounds. Thus, common content found in the area of focal attention does not necessarily mean same topic of interest. In one embodiment, the system strives to automatically determine both what content is being focused upon and what topic of interest is probably on the user's mind in conjunction with that content as well as the degree of interest in the content and topic, where the determination is to a sufficient level of accuracy, resolution and/or confidence so that only truly co-compatible users who are thinking about the same or a relatively similar topic will be invited into a same chat room. In other words, poker players will meet up with other poker players (e.g., for example to discuss the latest developments in reading other players poker "tells") and Hoover Dam researchers will meet up with alike researchers in the respective chat rooms to which they are invited even though all may have been focusing on the same common content. In an alternate embodiment, commonality of content being focused upon may be alone sufficient for inviting concurrently focusing users into a same chat room.

Aside from using the locally stored browser use history 105*d* and/or in-cloud stored history of the user's browsing activities (and/or mouse use activities 105*g*) to determine probable topic of interest, automated determination of the user's probable topic of interest may be based on a locally stored history of the user's chat room activities (e.g., stored in local chat history file 105*f*) and/or in-cloud stored history of the user's chat room activities, where the latter histories may contain information about the identities of the chat rooms that the given user had recently entered into (whether invited or not) and that information may include duration of stay in the room, level of contribution to room content and indications of positive or negative reactions by the user to the contributions of others within that chat room. The latter gathered information can be used to automatically infer certain preferences of the client user (e.g., 121). In one embodiment, one or more adaptive neural networks and/or statistical analysis models are established in the cloud 150 for each user for determining from a host of input parameters, that user's current, most probable topics of interest; that user's current, most probable emotional state; and that user's current, most probable voting intentions (inferred ones rather than explicitly stated ones). The host of input parameters may include data provided in current CFi's, data obtained from the user's most recent or earlier browsing, searching and chatting histories and data regarding apparent success of earlier guesses made by the neural network or other models (for example, based on the user accepting an invitation into a chat room and the user demonstrating satisfaction with the choice, such as by the user participating for a relatively long time in that chat room). As already mentioned, one of the database records that the user models periodically try to tweak based on feedback are each user's PEEP record (107' of FIG. 1E). The PEEP in turn may determine the stretches of time over which successive CFi's are correlated to each other (or parsed data fields within first CFi's are correlated to other data fields within other CFi's, for example content in first CFi's correlated to delayed emotional reaction in later stamped CFi's) so that CFi's are processed according to user-specific behavioral trends. Accordingly, when it is mentioned herein that "recent" data is processed for one purpose or another, it is to be understood that the stretch of time deemed to be "recent" can be variably adjusted for example in accordance with normal times and rule-established variances of those normal times as stored in the given user's currently effective PEEP record.

Another aspect to be recalled here is that the informational content to which a user is exposed; and to which content he or she may pay more or less attention to (degree of focus); and in which content he or she may take greater or lesser interest in; and with which content he or she may become emotionally involved to a greater or lesser degree; does not necessarily come all or partially from the local computer (e.g., 115) on which the user is performing searches or on which the user is participating in chat rooms. The user could be watching a soccer match on a nearby television set and at the same interacting on his local computer (e.g., 115) with a chat room populated by soccer enthusiasts. Or the user could be listening to a nearby radio over which the soccer match is being telecast. It is the job of the local computer (e.g., 115) to determine what one or more content-providing devices (e.g., TV, radio, computer monitor 117) the user is focusing attention on over PEEP-defined stretches of time and to determine the degree of that attention (e.g., high, medium or low) and to determine the degree of interest that the user is taking in the focused upon content. To this end, various local range networking schemes such as wireless BlueTooth™ or the like may be used so that the local computer (e.g., 115) can interrogate nearby other content-providing devices (e.g., TV, radio, other computers including XBox™ or other game playing machines) to determine if they are turned on or not, and if yes to determine what content they are currently providing and/or what their audio volume setting is and/or how often and how the user is interactively interfacing with them (particularly the game playing devices). Additionally, microphones (soon described) of the local computer (e.g., 115) may pick up noises emitted by these various devices and relay samples of the same to the cloud 150 for analysis and determination of what specific content the local user (111) is being exposed to. More specifically, as mentioned above, the user may be surrounded by background music. The background music may be fast paced heavy metal rock and roll or slow paced classical symphony music. These different types of music or even their primary beat may be indicative of the kind of mood the user is in. Also the volume of the music or the rate at which the music changes from one type to another (e.g., because the user is fidgeting with the station selection controls) may be indicative of current user mood. Alternatively, there could be loud machinery noise in the background or screaming young children which could place the user in a bad mood. Provided on the microphones, on the computer display monitor, or separately, there may be room lighting detectors which detect the brightness and pervasiveness of surrounding room lighting, where the later is automatically reported to the cloud as being potentially indicative of current user mood.

As an alternative or addition to use of BlueTooth™ or the like for interrogating other local machines and obtaining reports from them, the user's primary local computer (e.g., 115) may include an RFID detector (radio frequency identification interrogator) that tests for presence of RFID tags in the surrounding equipment and thus determines the nature of the surrounding equipment (and perhaps their distances from the RFID detector). This coupled with sound picked up by the microphones, room lighting detected by room lighting detectors or controls and imagery picked by the primary local computer's web camera (116) may be sufficient for identifying the external content to which the local user is being exposed to and for determining when the local user is directing his or her attention to that other content-providing device. So to summarize, although discussion herein centers on content provided by web pages displayed under control of the user's primary local computer (e.g., 115), the present disclosure is not limited to web-page encoded (e.g., HTML, XML) presentations. Content to which the user is exposed and to which he or she may pay greater attention to, take greater interest in, and so on, can come from any automatically identifiable source and the user's primary local computer (e.g., 115) may have means for identifying the content produced by that source (e.g., via listening in with the microphones, via BlueTooth™ interrogation, etc.) and may have means for determining when and to what degree the local user (111) is paying attention to that externally provided content and reacting to it. In one alternate embodiment, each external content providing digital device may automatically feed CFi's (wirelessly or otherwise) to the user's primary local computer (e.g., 115) for uploading to the cloud or one or more of those external content providing digital device may automatically feed CFi's directly to the cloud 150 for integration in the cloud of those CFi's with CFi's uploaded from the user's primary local computer. (It will be seen in FIG. 2A that in one embodiment, every CFi has a time stamp 215d, a sourcing machine identification stamp 215b and a location stamp 215c, thus allowing the cloud to integrate CFi's produced by different machines but at roughly the same time and in a relevant neighborhood of the user so as to thereby determine what content the user is potentially paying attention to.)

As seen in FIG. 1A, a variety of optional biometric data detecting devices may be attached to, or installed within, each user's local computer(s). Each user may have more than one local computer at his disposal and each should have a unique machine ID defined under that user's name. These ID's are stored in an online user account data store (see UADS 432 of FIG. 4A for example) and can thus be correlated to specific machine definitions and associated machine behavioral patterns. By way of nonlimiting examples regarding the different biometric detecting devices, each of client computers 115, 125, 135, etc. may include one or more respective digital video cameras, 116, 126, 136, etc. that are positioned to scan at least the local user's head and facial expressions (and better yet, at least the upper torso body language displays). The camera(s) (e.g., 116, and associated software) may be configured to keep track of the user's eyeballs 111b, how they move and where they focus, and also to keep track of how wide open the eyes or pupils are dilated and/or how often the eyelids blink. In one embodiment, the camera(s) (e.g., 116) may emit a short pulsed light in the IR or other wavelength band that reflects off the user's eyeballs (sclera) and which reflection (including the dark spot of the pupil) is picked up by photodetectors embedded on the user's screen 117 or elsewhere for determining eyeball position and/or orientation and/or pupil dilation and/or eyelid blink rate. The camera 116 may additionally keep track of the shape of the user's mouth 111c including whether it is in a smiling configuration, a grimacing configuration, a lip biting configuration or other; and also the rate at which the lips move if at all. The camera 116 may additionally keep track of the apparent distance of 111d between the user's head and the computer screen 117. The user's head may become enlarged within the camera's scanning frame when the user leans in towards the screen 117 or shrunken when the user pulls back away. An ultrasonic motion and/or distance detector may be included to detect and measure movements by the user. In one embodiment, the local camera 116 may not only have a first sensor array (e.g., CCD—charge coupled device) for sensing an image in the visible light range, but also a second sensor array for sensing an image in the infra-red (IR) range. The IR image may indicate facial blushing by the user and/or rate of exhaling warm air with each breathing cycle (or temporarily withheld breath), volume of exhalation, and so forth. In one embodiment, additional cameras may be connected to the local machine to determine the user's surrounding environment, such as determining whether the user is alone or not, whether the user is at home or at work, the user's sitting posture, etc. This information may be used to automatically infer the user's moods.

The local client software 105 may use one or more of these or various other biometric indicators to infer what the local user (e.g., 111) is consciously or subconsciously thinking (111a) with regard to material 117a that is being displayed on the screen 117 or otherwise presented by the local computer and on which the user's eyeballs (his pupils) are currently focusing upon (and/or on which the user's mouse cursor is dwelling or keyboard cursor is dwelling upon or highlighting). The local client software 105 may use the various biometric indicators to also determine how focused and emotionally engaged or not the user is on that particular area 117a and/or what positive, negative or neutral emotional attributes the user 111 is assigning to that focused-upon content 117a by virtue of the user's currently expressed and detected biometric and/or other activities (or later detected biometric and/or other activities that are logically associated as effect and cause pairs with earlier content in accordance with the user's PEEP record, e.g., 107 and/or in accordance with other effect and cause pairing data. Additionally, the local client software 105 may use various context cues, such as by detecting the location of the user via a GPS sensor 111z or other means (e.g., nearby RFID tags, nearby other equipment detected by wireless coupling via BlueTooth™ or the like) and determining from the identified surrounding location (e.g., at home, in the office, on the road, alone, in a crowd, etc.) what the probable topic of the focused upon material is. (Topic and/or topic domain may be automatically determined by the DLUX service module 150b which will be discussed later below.)

Some users' computers may include one or more microphones 129 for not only picking up voice communications by the user (e.g., 121) but also for detecting voice stress patterns in the user's speech and/or detecting non-verbal grunts or other sounds which the user may make to express enjoyment, dismay and so forth. Additionally, the microphone(s) may be used to determine the surrounding environment in which the user is situated. Are there noisy children in the background and/or a barking dog? Is a TV or radio blaring in the background? What type of music is being played? What current broadcast TV show is being watched or listened to? Alternatively, is the user relaxing at a quite poolside of a luxury hotel or in a darkened room while sipping a fine wine (whose odor may be detected by an optional odor sniffing device that reports to the cloud)? Much can be determined by picking up and analyzing background noises and/or odors and/or lighting cues. Knowledge-base rules can be provided in the cloud for analyzing uploaded background noises, etc., and for determining probable user mood based at least in part on such background noises, etc. In the case where plural microphones 129 are present, these may be directional ones and used for detecting the direction and/or location from where a noise came as well recording the sound for analysis. It is possible for a verbal utterance to come from someone other than the primary user, where the primary user is the person closest to the display 127. Plural microphones can be used to discriminate and ignore unrelated background noises. Also if a startling noise comes from behind or to the side of the user, the plural microphones can detect this and determine that an immediately responsive change in biometric data (e.g., the user turning away from the screen to look at the source of the sound) is unrelated to on-screen content. Client software 105' may include interface components for receiving the audio signals from microphone(s) 129 and for using these to determine current emotional states 121a of the user and/or to determine when a current emotional state is unrelated to on-screen content. Once again, because emotional expression by each user may vary due for example to gender, culture, surroundings, etc. and may vary from day to day, the client software will often include a local personal emotion expression profile (L-Peep, see also FIG. 1E) 107 for that user which indicates to the software how to interpret various auditory expressions by the user as well as visual gestures and so forth during a current usage period. Alternatively or additionally the match-making service (150c) may maintain remotely stored personal emotion expression profiles (rPeep's) for the given user where the active rPeep file indicates to the software how to interpret various auditory expressions by the user and/or visual gestures, biometric input data and so forth so as to thereby automatically determine current user mood and/or other inferred mental states and also to determine the stretch of time over which CFi's should be grouped together to represent interrelated biometric data and the content that is being biometrically responded to by the user. The personal emotion expression profile(s) Peep 107 and/or rPeep's (not shown in 1A but can be same as in FIG. 1E) may be adjusted with use of neural networks, statistical modeling, knowledge-base rules sets, trend detecting software or the like to adaptively learn how the user expresses his or her emotions via the various detectable mechanisms such as auditory, visual, biometric, etc. Correlations and/or rules provided in the PEEPs may be adjusted accordingly. For example, on intermittent occasions in one embodiment, user surveys or other standardized test content that is designed to evoke certain emotions may be presented to the user and the user's auditory, visual, biometric or other reactions may be observed and recorded so as to calibrate and refine the local and/or remote personal emotion expression profiles Peep 107 and rPeep for that user. (Each Peep 107 is associated with a specific user name which should be provided in a log-in session (or the user identification may be determined by face recognition software) so that a correct PEEP file is fetched and updated in cases where more than one user uses the local computer. Additionally, PEEPs may be sensitive to surrounding environment and the location data obtained from GPS module 111z or other location detecting/indicating means, for example embedded RFID tags in surrounding equipment, to adjust inferred mental states of the user based on surrounding location and artifacts present in that location.) Additionally, PEEPs may be made sensitive to time of day, date during the year (e.g., especially those relating to general public holidays, cultural holidays, personal birthdays, etc.) such that determination of emotion may vary according to these variables. Additionally, PEEPs may be made sensitive to the apparent topic of interest of the user (or type of topic) and/or the general domain to which the currently focused upon content belongs. This can be done in the adaptively variable knowledge base rules (e.g., 199). First guess at domain or type of topic (e.g., serious topic versus light hearted one) may be made based on current URL and the user's declared favorite topics in his or her CpCC profile (see box 154-7a of FIG. 1B). The PEEP rules (199) may use the first guess at topic, type of topic and/or domain as an input variable. Later, the system may make a better, more refined determination of probable topic based on collected, parsed and processed CFi's. Stated by other words, a given user may demonstrate one set of behavioral/emotional expression attributes when dealing with a first type of topic, say a serious subject matter (e.g., a personal health concern) and the same user may demonstrate a second, very different set of behavioral/emotional expression attributes when dealing with a different type of topic, say less serious subject matter (e.g., reading online jokes involving a fictitious person's to-be-laughed at health problems). The URL of the content plus embedded meta-tags may provide sufficient information for the system to automatically make a good first guess determination that the topic is a serious type, not a comical one and the PEEP rules may then dictate a corresponding interpretation of the user's behavior according to the first guess as to the nature of the topic. Uploaded CFi's (to to-be-uploaded CFi's) are treated (parsed, grouped, etc.) according to CFi treatment actions suggested or dictated by the PEEP rules (199).

Some users of system 100 may elect to wear a biometric timepiece 111tp such as one shown to appear as a wristwatch on the wrist of user 111. However this biometric time piece 111tp may be configured not only to reveal the current local time and date (and optionally time in standardized Greenwich Mean Time (GMT) format) but also to perform one or more of the following: wirelessly relay to the computer the current pulse rate of the user, relay the current galvanometric skin resistance of the user, relay strain or tightening of the wrist band which may indicate flexure of forearm muscles, relay acceleration of the time piece 111tp which may be detected by integrated miniaturized electromechanical devices (MEM's) and may represent hand gestures and speed thereof by the user and/or relay a Doppler signal from an integrated Doppler ultrasound blood flow detector which detects rates of blood flow in the user's hand, pulse, etc. Additionally or alternatively other medically related devices and/or methods may be used to pick up for example the user's current rate of respiration, blood pressure, state of agitation, distribution of weight on weight bearing surfaces within a properly configured chair 121s or sensor-riddled floor mat (not shown) and so forth for the purpose of determining the user's current emotional state. In one embodiment, specially configured chair 121s is further configured to communicate to the local computer 125 the seating posture of the user 121, for example using sensed weight distributions to indicate whether the user is leaning forward on the edge of the chair or relaxed and leaning backwards on the back of the chair, leaning to one side or the content and/or for how long. Additionally, or alternatively some users may elect to wear special biometric measuring clothing, shoes, gloves, etc., which wirelessly report to the computer 125 (or directly to the cloud) various aspects of the user's external body language and or internal medical state (e.g., EKG, EEG, etc.). As already mentioned, in one embodiment the display mounted digital camera 116 may include means for capturing local imagery in more than one optical band, for example in the IR band in addition to normal visuals captured in the visual (e.g., RGB) band. IR captured imagery may indicate flows of warm blood to different parts of the user's face, rate of exhalation of warm air, depth of exhalation, and/or other biometrically related information. In one embodiment, the software 105 includes a privacy consent agreement which must be digitally signed by the user before such privacy challenging information is collected and relayed to the match-making service in cloud 150. Since the numbers and kinds of biometric data gatherers (e.g., 111tp, 129, 121s, 126, etc.) can vary from one user computer (e.g., laptop) to another (e.g., third or later generation cell phone or personal digital assistant PDA), the match-making service (150c) may include software for dealing with various permutations of available biometric data gatherers and different knowledge-base rules (e.g., 199) may apply depending on which biometric data gatherers are available and being used for reporting on the biometric state of the user. For example, a same user on one day may be using his full featured desktop computer with a large array of available biometric data gatherers and another day the same user may be using his potable PDA (or intelligent cell phone or other intelligent mobile phone/device based on appropriate other technologies such as WiFi, satellite, etc.), which intelligent mobile device has a substantially smaller number of available biometric data gatherers with perhaps more limited capabilities. More specifically, the hand held intelligent mobile device may be limited to capturing a low resolution image of the user's face and to detecting how the hand held device is being gripped by the user, how hard it is being gripped and in what orientation. The system has to make due with this limited amount of gathered biometric data. The match-making service automatically detects the available (operable) biometric data gatherers for each user session and adaptively adjusts its data processing accordingly (e.g., by using knowledge-base rules provided in the user's PEEP record(s), e.g., 199). Biometric data gathering devices may be integrated into the user's mouse or keypad so that biometric information is automatically detected and gathered each time the user's hand comes into proximity with such a user interface (e.g., GUI) device. For example, a mouse may have an IR subsystem embedded on a side surface thereof where the user's thumb normally comes to rest when manipulating the mouse. The IR subsystem detects proximity of the thumb and lights up at that time to pick up the user's pulse rate, skin temperature (indicative perhaps of vessel constriction or sweating) and other parameters. Skin resistance at the thumb may be detected capacitively. On the other hand, if the primary local user client machine is a cell phone, it may not have a mouse or its equivalent for purpose of determining gripping stress in the hand. However, the cell phone is not without ability to determine user state by other means such as detecting stress tones in the user's voice, detecting what angle the user is holding the portable device relative to gravity, detecting what mechanical stresses the user differentially applies to different parts of the portable device, detecting whether the user is employing public speaker mode as opposed to private earpiece mode and if in earpiece mode determining how the user is shaking his or her head and/or hand based on change of orientation of the handheld portable device. Knowledge-base rules for processing these various situations may be embedded in the user's PEEP record(s) and/or logically linked to the PEEP(s).

Beyond the relatively less intrusive biometric detecting devices (e.g., pulse-detecting wrist watch, wrist band or mouse), some users may be willing to have their biometric state monitored by more intrusive means. For example, a user may elect to wear special eye glass frames (not shown) that are structured to detect relative head angles and/or relative eyeball angles and/or relative degree of pupil dilation. More specifically, a set of detectors on eye-facing side(s) of the frames may watch eye movement and pupil dilation and report these wirelessly to the client machine 115. Integrated motion detectors (e.g., MEMs—miniaturized electro mechanical sensors) inside the frame may detect absolute head direction and/or relative changes of head angles and report these wirelessly to the client machine 115. Magnetic resonance detectors (e.g., of a functional fMRI kind) or other kinds of electromagnetic brain probing devices may be embedded in the special eye glass frames or in a helmet (not shown) worn by the user so as to detect when certain parts of the brain (e.g., amygdala, orbitofrontal cortex, dorsal striatum, etc.) become more active or light-up so to speak and thereby discriminately indicate different emotional or cognitive states (e.g., fear, doubt, joy, etc.). These brain activity indicating signals may also be reported wirelessly to the client machine 115 and processed thereby or relayed to the cloud and processed in the cloud 150.

Referring now more specifically to the first user 111 shown in FIG. 1A; this user may be alone at home 112 in a quiet background environment (as detected from lack of background noise picked up by a built-in microphone (not shown, see 129) of his primary local computer 115) and using his primary local computer 115 to read the current news on a favorite online newspaper of his (e.g., The New York Times™ Online, where the favoritism for this particular web site is indicated in the user's CpCC profile of FIG. 1B as will be described below). For purpose of illustration, it is assumed that first user 111 is an adult male having a college education or equivalent. One particular item 117a regarding international news catches the first user's attention. He reads through it slowly, deliberately; pauses for a while to stare into space (and to apparently think about what he just read) and then he returns to focus on the same article and read it a second time. His eyeballs (pupils) scan quickly back and forth through the article and pictures during the second read through while he grimaces with his mouth 111c. Video camera 116 (and/or other detectors) pick(s) up all of these facial expressions and indicators of locus of focal attention, included repeated attention directed to the same content. A video interpretation component in the local client software 105 reports out these video based indicators as well as the user's point of focal attention 117*a* to other modules of the local client software 105 (or directly to the cloud 150 for processing therein). During the reading and re-reading of the focused-on news article 117*a*, the first user 111 may additionally launch a search engine (e.g., Google™ News search) and type in certain keywords that the user 111 apparently associates with the story 117*a*. Additionally or alternatively the user 111 may click on various hyperlinks embedded in the news story 117*a*. All of this information about user activities associated with the reading of the news article 117*a* (primary focused-upon content) is relayed into the user's browser history 105*c* and search history 105*e* (or into cloud-maintained versions of such histories) and is interpreted by the machine means (e.g., by use of knowledge-base rules) as providing additional clues regarding the user's implied topic or topic domain for the focused on content appearing in screen area 117*a*. As already mentioned, focal area (e.g., 117*a*) and what topic the user is thinking about as he or she focuses on that content 117*a* are not necessarily one and the same. More specifically, the news article 117*a* may mention a particular person's name (e.g., a celebrity) and a particular location (e.g., Las Vegas) and a particular time period (e.g., last week). It is generally not possible to determine from mere identity (e.g., URL and frame ID) of the news article 117*a* what topic the user 111 is thinking about. The user may be researching recent activities of the named celebrity, or recent famous visitors to the named location (e.g., Las Vegas) or just current events of a recent time period (e.g., last week) or a topic that interrelates all three. The client software 105 accumulates all of these pieces of evidence or clues and hints as they develop in real time and the software 105 forwards these clues and hints to the match-making service. In response, the match-making service uses one or more topic lookup functions thereof (e.g., DLUX services as shall be detailed below) to try and determine from the collected evidence what topics or domains are most likely the topics/domains that the first user 111 is currently interested in while focusing on this particular news article 117*a*. One of the clues may be the related keywords which the user entered into his most recent search engine activity (105*e*). In response to the locally collected evidence, the client software 105 generates one or more corresponding current focus and current topical interest clues record (118*a*—also referred to herein as a CFi or Current Focus identifying record) that identifies the user, identifies the time at which the focal attention was expressed (in Greenwich Mean Time format (GMT)), identifies the focused upon content and optionally provides further clues or hints for identifying the probable topic of interest by one of a variety of means such as by specifying keywords and URL's gathered from recent activity. (See briefly FIG. 2A.) In one embodiment, the topic of interest or domain of interest may be identified by the universal resource locator (URL) of the web page that the user was looking at during the time of focused attention as well as other URL's recently looked at. In the same or another embodiment, a first collection or snapshot of words found within the area of interest 117*a* of the URL identified page is further included in the locally-generated CFi record 118*a* and uploaded to the cloud 150. In one embodiment, the viewed article of interest may included hidden and embedded meta-tags (127*b*) which are picked up by the software when the camera 126 detects the area of focused attention 127*a* of a given user (e.g. 121). This meta-tagged information may be further included in the correspondingly generated Current Focus identifying record (CFi). Meta-tags (127*b*) can come in a variety of forms including search-engine compatible tags and special hierarchy tags (e.g., navMeta-Tags) as shall be described in more detail below. Each locally generated and time stamped CFi is stored in one embodiment, into a circular buffer (not shown, see briefly FIG. 2A instead).

The local client software 105 may sort the collected Current Focus identifying records (CFi's) according to locally determined intensity of interest or emotional involvement scores. Prior to the start of content scanning by the user (e.g., 111), the user had logged into an online interest matching and compatibility matching service (e.g., 152 of FIG. 1B) that is provided by cloud 150 and/or the user's identity was automatically determined by face recognition software executing within his primary local client machine 115. Depending on available bandwidth, the match making service 152 repeatedly polls the CFi's buffer of the user's local computer (e.g., 115, 125, etc.) and requests (pulls) copies of the more recent and optionally more heavily scored ones of the focus and interest identifying records (CFi's) 118*a* where the scores and time stamps indicate recent intensity of focal attention and of emotional involvement. (In one embodiment, the action of polling and pulling is done by selectively dropping or accepting packets from each user machine, as will be explained shortly.) The pulled CFi records 118*a* are routed to a corresponding Access and Available Resources Monitoring Service (AARMS) such as 150*a* for parsing of data within each CFi, for logical linking of data items parsed from successive CFi's (e.g., cause and effect items such content perceived at time point one and emotional reaction exhibited at later time point number two) and for further processing of such parsed and logically linked CFi data. Parsed and logically linked CFi data collections are sent to one or more Topic Domain Look-Up Services (DLUX's) such as 150*b* for automatic determination of most likely topic areas based on accumulated topic clues and scores given to the clues by the topic lookup service(s). In one embodiment, topics are split among primary Domain areas (e.g., most popular vogue topics relating to sports, entertainment, news, financials, etc.) and more detailed topical nodes that are hierarchically organized under their respective domain headings. One or more databases may be maintained for tracking users whose current CFi's indicate a probable interest in one of the topics listed under the Domain or domains monitored by the respective databases. For example, within cloud 150*a* first database 151 may be actively keeping track of not only the first user's 111 current level of interest in a current topic but also keeping track of current interest levels of many other logged-in users (e.g., 121, 131, etc.) who are currently focusing on same or similar content provided by their computers and are presenting hints indicating a same or similar topic of interest on their minds at roughly the same time. The first user 111 may not know this, but somewhere out on the internet there may be another user (not shown) who is studying the same New York Times webpage (117) and focusing on the same article area (117*a*) at approximately the same time and is also indicting; by reading and re-reading the article 117*a*, extreme interest in a same topic relating to the focused on material 117*a*.

It was noted above that the actions of direct polling of client machines and of pulling from their buffers is not always possible. For example, when the client machine connects to the internet through one or more conventional routers (i.e., when multiple computers are on a local LAN accessing the network through a single access point that has a single IP address as seen on the internet) there is often no way for a server in the cloud to uniquely address each of the individual machines behind the router (and optional firewalls) or to uniquely address each of the buffers within those machines and determine their states. Instead, in one embodiment, the server can emulate the client CFi's buffer at the server's end of the communications network and can selectively poll those emulated buffers and selectively pull from them. Alternatively or additionally, the server can selectively drop CFi packets sent from the client as a substitute for the action of not pulling CFi data. Yet alternatively or additionally, the client machine sends buffer status packets with upload requests to the server. For example, the client machine sends a buffer status and upload packet indicating something like: I have 10 Kb of CFi data for you to upload with the data having an aged data range of 3 seconds to 4 minutes. In response, the server may send different handshake responses including for example: (1) OK send all of it to me now; (2) OK send all of it to me during the following time slot . . . ; (3) My bandwidth is somewhat limited now, send to me only your most important 5 Kb or less of CFi data and drop the rest; (4) My bandwidth is somewhat limited now, send to me only your most recent 2 minutes worth or less of CFi data and drop the rest; (5) My bandwidth is very tight now, discard all the CFi data you currently have and do not send me another request until the following time slot . . . . These are some examples of how the in-cloud server can control upload data flow. Other communication control mechanisms such as the server sending buffer slack indicators to client machines or sending backpressure messages to the client machines can also be employed. It is to be understood that different router and firewall configurations may be used in home and/or business LANs installations and that different specific actions may need to be adaptively taken to emulate various ones of the actions described herein involving communications between the client machines and the match-making servers. It is to be understood that even when clients have unique IP addresses and are uniquely identifiable by the server in the cloud, there may often be hardware or software firewalls preventing direct access in which case the server may emulate direct access at its end and use some form of end-to-end automated synchronization of data sets or handshaking in order to effectuate the desired outcome.

The first user's involvement with the given article (117a) and/or the first user's involvement with other associated content that the user 111 for example hyperlinked to, or found by way of a search engine search, may be greatly enhanced if the first user 111 was merely informed that there are other users out there (e.g., on the internet) like him who are studying the same article with approximately the same focal intensity and/or approximately the same emotional involvement at the same time. In other words, the first user is informed that he is not alone in having interest of a particular intensity in this particular material and/or topic at this particular time. In one embodiment, the first user is informed of how many other users the matching service 152 has identified as having a matching focal point of interest (e.g., 117a) and/or having a matching interest in a corresponding topic correlated with the focal point in a recent time period (e.g., in the last 5 minutes, in the last hour, last 3 hours, last day, last week, etc.). This information alone can enhance the user's experience. However, there is more.

The first user's involvement may be even more greatly enhanced if the first user 111 could communicate with some of those other, still unknown to him, users about the same or similar topic of interest or even about just the same focused on material 117a. To this end, the in-cloud matching service 152 (or more correctly one or more online servers (virtual and/or real) that provide the corresponding services) may push one or more current chat room invitations (Cciv's) 118c over a network and to the local computer 115 of the first user 111. These chat room invitations may appear as moving icons (e.g., small blinking semitransparent dots, larger more solid bubbles, or yet larger animated talking heads etc.) flowing on a side banner of the user's screen 117 from edge to center or from one end of the banner to the other. In one embodiment, these chat room invitations appear as blips (e.g., 117c, 117d of FIG. 1D) on a more prominent radar screen (104) that can for example pop out from a side border of the user's screen when requested by the user and then collapsed back to a thin line on the edge when no longer wanted. When the radar screen (104) is popped out, the user may see the radar blips displayed thereon as growing in brightness or size as they move in from the outer diameter rings towards the center of the simulated radar scope. The user may also see departing blips as shrinking ones that move outwardly toward the outermost circle, shrink in size and/or brightness and eventually disappear as they move beyond the simulated detection horizon of the simulated radar scope. In one embodiment, the user's local machine outputs unique sound pulses that sound like sonar blips or metallic clicks through the sound system of the local machine when each incoming blip (e.g., 117c) crosses a predefined radius while approaching the scope's center. This may occur even if the pop-out radar screen is minimized at the time. A blinking red alert light may also become active on the user's screen for a short duration even if the pop-out radar screen is minimized. With use, the user becomes trained to the idea that this unique sound and/or pulsating light of a special color indicates an incoming invitation has become worthy of attention on his radar scope and that the user may then want to pop out the scope from his screen side and take a closer look. (In most embodiments, the background benign spyware is trained to exclude from its CFi reports, user responses to the popped out radar screen or to noises emitted on behalf of that radar screen.)

Referring to FIG. 1D; and this example is more so for purpose of illustration rather than as an indication that the illustrated radar scope 104 is a preferred way of displaying an invitations-indicating radar scope, the illustrated pop-out radar scope pane 104 may pop out from a side banner of user 111's screen when the user clicks on a flashing (blinking) light point at that spot. The pop-out radar scope pane 104 may indicate to user 111 that there is an ongoing first chat room (represented by an on-screen and dwell-invoked popup balloon 117b) present on the internet which contains some 90 users already heavily involved in a same particular topic G which user 111 now appears to be thinking about also (this being inferred by the system from the topic clues provided in recent CFI's uploaded from the user's client machine 115. The flying airplane icon 117c shown on scope 104 and associated with pop-out balloon 117b indicates that user 111 is moving his focal point on content and his apparent topic of interest into closer alignment with the same attributes of an ongoing online chat represented by invitation 117b or vise versa. The vise versa is that the participants of chat room 117b are on average moving closer towards coincidence with the current user's (111) current content of focus and current topic of interest where that topic is categorized under general topic area G (e.g., domain G) of the match-making system. In one embodiment, flying airplane icon 117c would have caused the user's client machine to output an audible alert noise such as a short metallic click or a sonar echo like blip when icon 117c was crossing the alert ring with value "5". When the user finally pops out his full radar scope 104 in response, he would see that the incoming airplane icon 117*c* has already advanced more inwardly and is now crossing the co-compatibility and topic correlation ring with the score value of "10", this indicating even greater convergence between the user's inferred topic of interest and that of the chat room to which icon 117*c* invites him. In either case, whether user 111 is moving his focus closer to something being covered by the chat room of icon 117*c* or participants in that room are moving their discussion closer to something user 111 is focusing on; the first user 111 is informed by way of such an on-screen radar scope 104 (or the clicking alert sound) that other people (e.g., 50 males, 40 females per balloon 117*b* and icon 117*c*) are currently involved in discussing roughly the same topic and that user 111 may join that chat room simply by clicking on the invitation-representing icon 117*c* or on its attached explanatory balloon 117*b*. In response to user 111 clicking on (e.g., double clicking on, right clicking on, etc. or otherwise indicating in a machine understandable way that he is entering) icon 117*c* or balloon 117*b*, his computer 115 substantially instantaneously opens a pop out window frame (not shown, but see briefly 316*a* of FIG. 3A) containing content from the corresponding online chat. The popped out window frame (not shown in FIG. 1D) displays the most recent content of the already ongoing chat (or other real time informational exchange), displays the user names of the most recent contributors and indicates to other members of the chat room that user 111 has just entered the chat room. A live or automated chat room moderator may greet user 111 or not—depending on how the room is managed—and brief him on what has been going on lately in the chat.

With the popped-out chat window frame (not shown in FIG. 1D, see 316*a* of FIG. 3A) now available on screen, the first user 111 instantly sees how other people are currently discussing the topic of probable mutual interest. Matching service 152 may not always guess correctly as to the specific topic of interest that drew focus by user 111 to content area 117*a*. If the automatically produced guess is not on target, no harm is done because user 111 can quickly close the chat frame and go on with his business. Such a quick close can be used as feedback by the match-making system indicating that the system had made a poor match. Alternatively, user 111 may provide explicit feedback to the system by informing the matching service 152 of his actual topic of interest (e.g., it is not the current poker tournament in Las Vegas but rather the Hoover Dam engineer's special interest group called HD.spig) and in response the matching service 152 may then alter its behavior (learned behavior) accordingly with regard to the meanings of the recent actions by the given user 111. If the matching service 152 correctly inferred what the user's topic of interest is, the first user 111 will usually keep the chat room (e.g., 316*a*) open for a while. Such a prolonged open state can be used as feedback by the match-making system indicating that the system had made a good match. The user may elect to just observe from the sidelines the current interactions by other chatterers within the opened up room. Alternatively, the first user 111 may elect to participate on a more active basis by voting on room content, by contributing to the room content or conversing (virtually) with other people who are currently in the room and appear to be as heavily interested in the same topic 117*a* as he is. In one embodiment, even if the matching service 152 did not bring the first user 111 to exactly the kind of room he would have preferred to join, the first user 111 is given the opportunity to manually browse along adjacent nodes of a topic categorizing, hierarchy tree full of roughly similar chat rooms (see briefly FIG. 4B) and find for himself a room more to his liking. Such tree browsing activity can be used as feedback by the match-making system indicating that the system had made a roughly good match but it could have done better. The system analyses the results to determine how it could have done better and make small iterative adjustments to its match-making algorithms. Over the course of many users and many such incremental adjustments, system behavior converges on making better choices and bringing users to rooms closer to their liking. Methods for scoring potential chat rooms will be described later below. After having found a nearby chat room that seems more to his liking, the user may ask the system to invite him into that room instead. Depending on whether that specific room is willing to accept him or not (because rooms can have their own criteria for acceptability of users) the user is allowed in to that room or a similar but more accepting other room. These various options for learning of other similarly situated users and opportunities for being invited into like minded chat rooms can significantly increase the enjoyment and/or benefit that first user 111 derives from his computer and from the internet because now he is almost instantly (e.g., within a few seconds or less of the match having been made and the invitation sent) being joined together with many other people who are engaged in conversation about the very same content of focal attention (117*a*, or other content fairly similar to his) and/or about the same specific topic (or another topic fairly similar to his) or to a general topic domain that he is interested in. He (user 111) is no longer merely studying the material and thinking about the topic all by himself and outside of a social framework. Instead, he is drawn into a socially interactive circle of like-minded or co-interested people. This can greatly enhance the experience.

Referring to second user 121 of FIG. 1A, unlike the first user 111, she is of a different gender, a different age, different educational background and a different proclivity for material that interests her. In this example the second user 121 is a female of approximately 16 years age and engrossed in an esoteric Celebrity Sensations Magazine 127 (fictitious name here) and more specifically in a gossip piece 127*a* concerning a particular celebrity (e.g., Britney). In this particular example, the topic of interest and the content area of attention focus 127*a* will be taken as merging into a single entity rather than being separate attributes. One reason that such can happen is due to the presence of embedded meta-tags 127*b* in the content where the meta-tags explicitly identify the topic of interest as will be explained shortly. Unbeknownst to second user 121, there are two or more like situated users 131, 141, etc. active at spaced away locations 130, 140, etc. (location 140 not explicitly shown) who are currently engrossed with the same gossip piece 127*a*, 137*a*. No one is yet chatting in a chat room about gossip piece 127*a*/137*a*. However, a matching service 150*c* within cloud 150 detects in its database 151 that users 121, 131 and 141 are logged-in, are simultaneously interested in same content associated with a same topic (e.g., 127*a*, 137*a*) and that they are indicated to be co-compatible with one another (e.g., by virtue of age, gender, educational background, etc.) for chatting about this point of common interest. In this case the cloud 150 automatically spawns an empty chat room 161 (or temporarily dedicates a preexisting empty one) for use with the matched content and/or topic (e.g., 127*a*, 137*a*). The cloud 150 automatically sends out invitations (pushed Cciv's 138*c*) to the co-compatible users 121, 131, 141 to enter into the empty chat room 161. In one embodiment, chat room 161 includes a use policy dictating that there must be at least three (3) active users inside the room (or simultaneously accepting invitations) if any of the inside or entering users has an unvalidated chat profile with respect to the user's demographic attributes (e.g., age, gender, location, etc.). The purpose of this policy is to prevent one-on-one chat room situations from developing where one of the chatters might be a predator and the other a vulnerable minor. As long as there are 3 or more participants, no participant is left alone with just one other participant and each may be more wary that improper activity will be reported to the authorities.

Servers within cloud 150 may automatically determine co-compatibility between users 121', 131', 141 by comparing their associated profiles including Current personality-based Chat Compatibility profiles (CpCCp's) 105h.1 etc., 105h' and so forth (see also FIG. 1B). With regard to such CpCCp's, the present disclosure generally refers to the same as "personality" based profiles because that is the more frequent and more easily understood use of the such CpCC profiles. They can be used to cluster together in chat rooms, or elsewhere, users who are personality-wise co-compatible with one another. However, there are instances in the present disclosure where the same CpCC profiles are more broadly referred to as "personhood" based profiles, because for example, only the demographic or credentials sections of the profiles are used and the latter do not necessarily reflect the personality-based likes and dislikes of the user. Accordingly, the term "personhood" based profile is to be understood as being broader and to encompass demographic and/or credential attributes of the user as well as generally encompassing personality attributes. In one embodiment, machine-stored co-compatibility distance scores are developed as between users (see also FIG. 5A). The compared profiles that are used for generating such co-compatibility distance scores may include not only the CpCCp's but also Domain-specific Chat Compatibility profiles (DsCCp's)—just one shown at 106h' in FIG. 1A but see also FIG. 1C. These CpCCp's and/or DsCCp's may be first partially formulated in the respective local computers of the users and then uploaded into the cloud 150 for use in making matches and developing community-approved reputations. Alternatively or additionally, the CpCCp's and/or DsCCp's may be pre-formulated as stereotyping templates and stored in the cloud. In one embodiment, template profiles that fit stereotypical persons within the system's user population are made available, applied to new users who are joining the system and then minor modifications are made to the applied stereotyping template profiles so that they become more representative of the associated individual user to whom they are applied. Such an approach can lighten the workload for each new user who wishes to have an individualized profile created for him or her and it can also allow users who do not have individualized profiles to enter and use the system under the guise of the template profiles (e.g., as anonymous guests who are giving the system a test drive).

Before discussing in detail data structures of profile records such as CpCCp's 105h-etc. (see FIG. 1B) and such as DsCCp's (e.g., 106h.1, see FIG. 1C), a few additional features of system 100 are to be noted here. Some users do not enjoy fighting for attention in crowded, heavily populated chat rooms (e.g., more than 10 active participants at one time). They may express a preference for smaller chat rooms or rooms where the population is maintained in range that is comfortable for its users. Alternatively or additionally, some participants in a system-formed chat room (e.g., 162) may find other participants to be disagreeable to them even though their CpCCp's 105h-etc. were initially determined to be co-compatible and thus matched by the system cloud 150. In the latter case, users may express their displeasure through conscious (explicit) or subconscious (implicit) negative votes expressed in corresponding Current voting indicators (e.g., Cvi's 138b). In one embodiment, right clicking of a mouse while the mouse-controlled cursor is over an item of focus opens up a pop out menu (see 336 of FIG. 3A) that includes vote indicating buttons and interest indicating buttons. The user left clicks on one of these items to register an explicit vote or an explicit indication of interest. Current voting indicators (Cvi's) may be implicitly generated by biometric indicators in the same way that Current focus identifying records (CFi's) are generated except that implicit Cvi's are generated while the user is engaged inside a chat room frame (e.g., 316a of FIG. 3A) while implicit CFi's are generated when the user is engaged inside a non-chat, content-containing frame (e.g., 317 of FIG. 3A).

If a first set of one or more users express persistent displeasure with a second set of users within a given chat room (e.g., 162 of FIG. 1A) through their respective negatively-directed Current voting indicators (e.g., Cvi's 138b), the cloud 150 may automatically detect this and responsively cleave the room (e.g., 162) automatically into two child rooms (e.g., room 162a containing 7 participants and room 162b containing 3 participants). Participants in each child room may be told that the cleaved off other participants have "left the room", if they are told that at all. In one embodiment, a juveniles containing room is never cleaved to have less than 3 or 4 participants in it depending on system policy for chat rooms containing non-adult participants.

Just as some users may prefer small rooms (e.g., 5 or less participants), others may prefer larger rooms. The cloud 150 automatically detects this from the CpCCp's or other profiles of the users. If two rooms each have too few of a number of participants in view of the user desires expressed in their profiles, the system automatically detects this and automatically fuses (combines) two small parent rooms (e.g., say room 162b containing 3 participants and room 163 containing 2 participants) into one larger room 164 of co-compatible and larger-crowd seeking participants. Preferences are determined based on user Current Chat Compatibility profiles directed to personality and topic (CpCCp's and DsCCp's) which are stored in database 151 and whose data structures are now detailed with reference to examples, first in FIG. 1B and then in 1C.

Referring to FIG. 1B, in one embodiment 102, the cloud 150' includes a plurality of compatibility profile storing servers 152. A given user 121" may have a plurality of compatibility profiles such as 105 h.1, 105 h.2, and 105 h.3 assigned to him or her. This is so because profile data may change with change of user mood and/or change of other factors. Only one of the personality-based compatibility profiles or CpCCp's will be deemed as the 'current' personality-based chat compatibility profile for the moment based on an explicitly stated or implicitly determined mood and/or surroundings of the user 121". (The dashed, arrow-headed lines extending from near user 121" to alternate profiles 105h.2 and 105h.3 indicate that designation of one of them as the current profile can change in response to machine-implemented detection of changed circumstances, such as a mood change by the user and/or a change of surroundings and/or a change of topic and/or a change of time for example from a business day to a weekend or holiday.) The mood of the user may be explicitly indicated by the user or implicitly obtained from recently pulled Current focus indicators (CFi's) 128a' and/or from current voting indicators and/or from local surroundings (such as indicated by GPS 111z or nearby RFID tags). Mood, surroundings and/or other user attributes may affect the preferences defined in the preference columns 158 (likes and dislikes) of the personality-based compatibility profile. The second column 154 labeled as "mine" remains relatively constant irrespective of the user's changing moods. More specifically, when user 121" is in a first mood, she may prefer to chat with chat buddies who generally agree with her current position (e.g. singing to the choir so to speak) regarding a Domain-nonspecific topic. Contrastingly, on a different day or in a different environment, user 121" may be in a different mood (e.g. corresponding to profile 105 $h$.2) where she desires to debate with people who hold views diametrically opposite to her own. As mentioned, the user 121" may indicate her current mood to the system either explicitly by pressing appropriate chat control buttons (e.g. right mouse click) or implicitly through current votes and/or current focus and topic-of-interest indicators. Surrounding environment may be detected through a GPS module 111z and/or through peripheral cues picked up by camera 126 and/or other cameras and/or through background sounds picked up by the one or more microphones (129) and streamed to the cloud for analysis.

The currently-in-effect personality-based chat compatibility profile (CpCCp) (i.e., having mood or surrounding related to identification number 105$h$.1) may be viewed as having a plurality of horizontal regions, e.g., those designated as demographics rows 171, reputation rows 172 and credentials rows 173. Additionally, as seen in FIG. 1B, the exemplary CpCCp 105$h$.1 may be viewed as having at least 4 vertical data holding columns, a first of which is designated here as "mine" (154), a second of which is designated here as representing positive scoring criteria that define desirable chat buddies (155), a third of which is designated here as representing negative scoring criteria that define undesirable chat buddies (156), and a fourth of which is designated here as representing averaged or mean criteria for desired chat room properties (157). Additionally, as seen in FIG. 1B, the exemplary CpCCp 105$h$.1 may be viewed as having a mood-and-personality directed set of knowledge-base rules 175 that provide for finer determination of user preferences based IF/THEN declarations and variables inside the IF/THEN expressions. Criteria items in each of the 4 vertical columns 154-157 and/or in the knowledge-base rules set 175 may be stored as parameter name and value pairs in a relational database or another appropriate storage structure. For example a username may be designated as "Name:=" and then this parameter name setting may be followed by the value data representing the username. Similar parameter name and value pair structures may be used for the other indicated values in FIG. 1B. In one embodiment, an industry recognized and so-called JSON notation protocol (JavaScript Object Notation) is used. However, to avoid illustrative clutter these various details are not shown in FIG. 1B. It is to be appreciated that the CpCCp's of FIG. 1B are to some extent, independent of the hierarchy tree of domains and topics shown in FIG. 4B. The general demographics 158 of desired or undesired chat buddies can be specified independently of a specific topic or a specific topic domain. Combinations of personality based preferences and topic related changes in preferences may be specified in the knowledge-base rules set 175. (For example, one rule might read as: IF Room_Topic=A AND Room_member=MBGFFL THEN increase co-compatibility score by +10.) It will be seen in FIG. 1C that topic dependent preferences 187 (DsCCp's) may also be specified with respect to specific topics of interest. One exception to the above general rule for FIG. 1B is that users may specify favorite topics (see the box labeled as 154-7$a$) as well as favorite books, favorite movies, etc, as constituting part of the description of their personalities and/or parts of description of personalities of chat buddies they may like or dislike. In one embodiment, users may also specify most disliked topics, movies, books, URL's, etc. as well as favorites.

The demographic data of the local user 121" is stored in a database region represented in FIG. 1B by the first horizontal region 171 (which may have plural rows) and the first vertical column 154 labeled "mine" (which in some cases may have plural subcolumns). In this particular example, user 121" has indicated her age to be between 16 and 17 years old and her gender to be female and her socioeconomic class to be middle class. She has also indicated her geography of permanent residence and time zone to be the central time zone of the USA. She has designated her preferred language as American English (as opposed to British English for example). When user 121" first provides this information it is tagged as being 'unvalidated'. This is so because no trusted other user (or trusted system program) has validated the alleged age, name, gender etc. of this user. However over time and through usage, votes by trusted other users in the system may be used to switch one or more of these local user-provided demographic data items (mine) to be tagged as validated data, meaning that others have validated her alleged age, her alleged gender, and so forth. Some users may demand to deal only with other users whose demographic data (or a prespecified portion thereof) has been validated. Others may not care. These preferences may be specified in each user's likes and dislikes columns (e.g., in column 155, user 121" specifies that she prefers the alleged gender of her chat buddies to be validated as female and she also prefers that their alleged ages be validated as being in the range 15 to 18 years old. In one embodiment, users may also specify levels of importance or weights to be used by the match-making system when scoring these various preferences to find co-compatible other users or co-compatible chat rooms. For example, some preferences may be designated by the user as being more like "must haves" while others may be designated by the user supplied weights as being closer on the spectrum to "don't really care" if this preference (or dislike) is adhered to, it is just a fine resolution adjustment as opposed to a coarse adjustment regarding preferences.

Referring to vertical column 155 (desirable chat buddies), user 121" has indicated that the chat rooms she would like to be invited into preferably should include another user whose username happens to be MBGFFL (which may stand for My Best Girl Friend For Life). The preferred inclusion list could have plural usernames in it. User 121" has also indicated that the stated demographic age groups for desired people in the ideal chat room should be in the range of 15 to 18 years old and that these should be validated age indicators. Additionally, she has requested that most of the chatters be of the female gender (this being reinforced in column 157) and that this gender designation be a validated one. When a co-compatibility finding server (one containing database 151 of FIG. 1A) searches for users who are to be grouped (e.g. invited) into a same chat room, it uses the data in column 155 (desired buddies), not as mandatory requirements, but rather as a co-compatibility positive score creating sets of points-generating information. Positive points are added for every matched criterion. These may be differently weighted.

As mentioned above in some embodiments the users can provide suggested weights to be applied to the various stated preferences or stated dislikes. However, a user's actual behavior may show subconscious preferences (or dislikes) that are quite different from the stated ones and/or weighted differently than the user-state weights. In one embodiment, the cloud 150 includes trend detecting services that run in the background and analyze each user's actual behavior (e.g., which chat rooms she or he actually joins and engages in forcefully). The trend detecting services (see for example 437 of FIG. 4A) determine the more accurate weights to be applied to the stated and actual preference attributes of the user. In one embodiment, each user may view the changes made by the trend detecting and adapting services to that user's profiles and that user may reverse or halt such automated changes to at least some of the entries and/or their weights in the profiles.

When the match-making services score the weighted (or unweighted) preferences positively and the weighted (or unweighted) dislikes negatively and add these scores together (or apply them to a more complex function for determining co-compatibility, the resulting co-compatibility score signals (could be along different dimensions such as one for topic co-compatibility and another for personality co-compatibility) tends to increase as more of the desired chat buddy properties are met and decrease as more of chat buddy dislikes (column 156) are met. A relatively high co-compatibility score indicates a greater likelihood that user 121" will find the other chat buddies in the proposed chat group to be co-compatible with her desires at the current moment. Near the end of the process (detailed more below), different co-compatibility scores based on personality will have been developed for a given user i.e., 121" and the proposed groups of other users (e.g., 131', 141' of FIG. 1A) with which she is to be joined in an empty room (e.g., 161) and/or for a given user i.e., 121" and the proposed already populated chat rooms into which she may be invited. Some proposed but-not-yet formed groups (e.g., 121', 131', 141' of FIG. 1A near room 161) may score high while other proposed but-not-yet formed groups (not shown) may score lower. Some proposed and already populated chat rooms (e.g., 162) into which user 121" has not-yet-been invited into may score high while other proposed and already populated chat rooms (e.g., 163) may score lower. The match-making system sorts the scored rooms or other users and then picks the higher ones or those exceeding a predefined threshold. Then the system sends invitations to the given user i.e., 121" only for the picked higher scoring chat opportunities. All this happens automatically in the background and thus user 121" is not bothered with considering the merits of chat rooms or chat groups that scored poorly and to which chat opportunities she was not invited. Instead, user 121" is presented with invitations to the more highly scoring opportunities (these invitations may come in the form of in-flying radar blips like 117c, 117d of FIG. 1D) and she gets to choose, if she wants to bother to at the moment, from among the highest scoring ones and thus the ones most likely to have chat buddies who are co-compatible with her preferences (e.g., the personality and demographic based ones expressed in her CpCCp 105h.1).

Figure 5A:
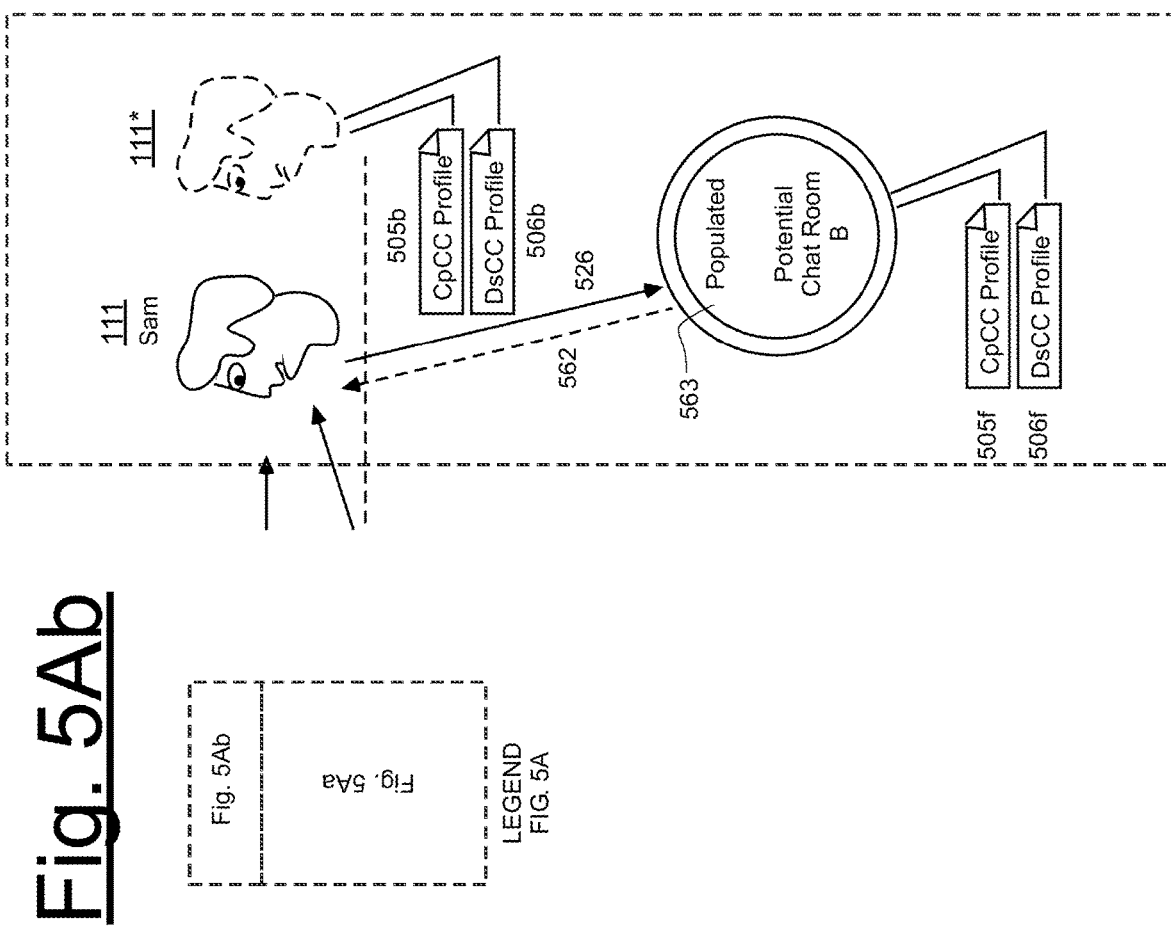
FIG. 5A is a composite of partitions 5Aa and 5Ab per the legend provided in partition 5Aa and all references herein to said FIG. 5A are understood to refer to said respective composite which provides a schematic diagram of a distancing algorithm that may be used by the system of FIG. 4A to cluster users to each other and/or to potential chat rooms into which they may be invited based on scored co-compatibility where the distancing can be in a combined scoring space.
Figure 5B:
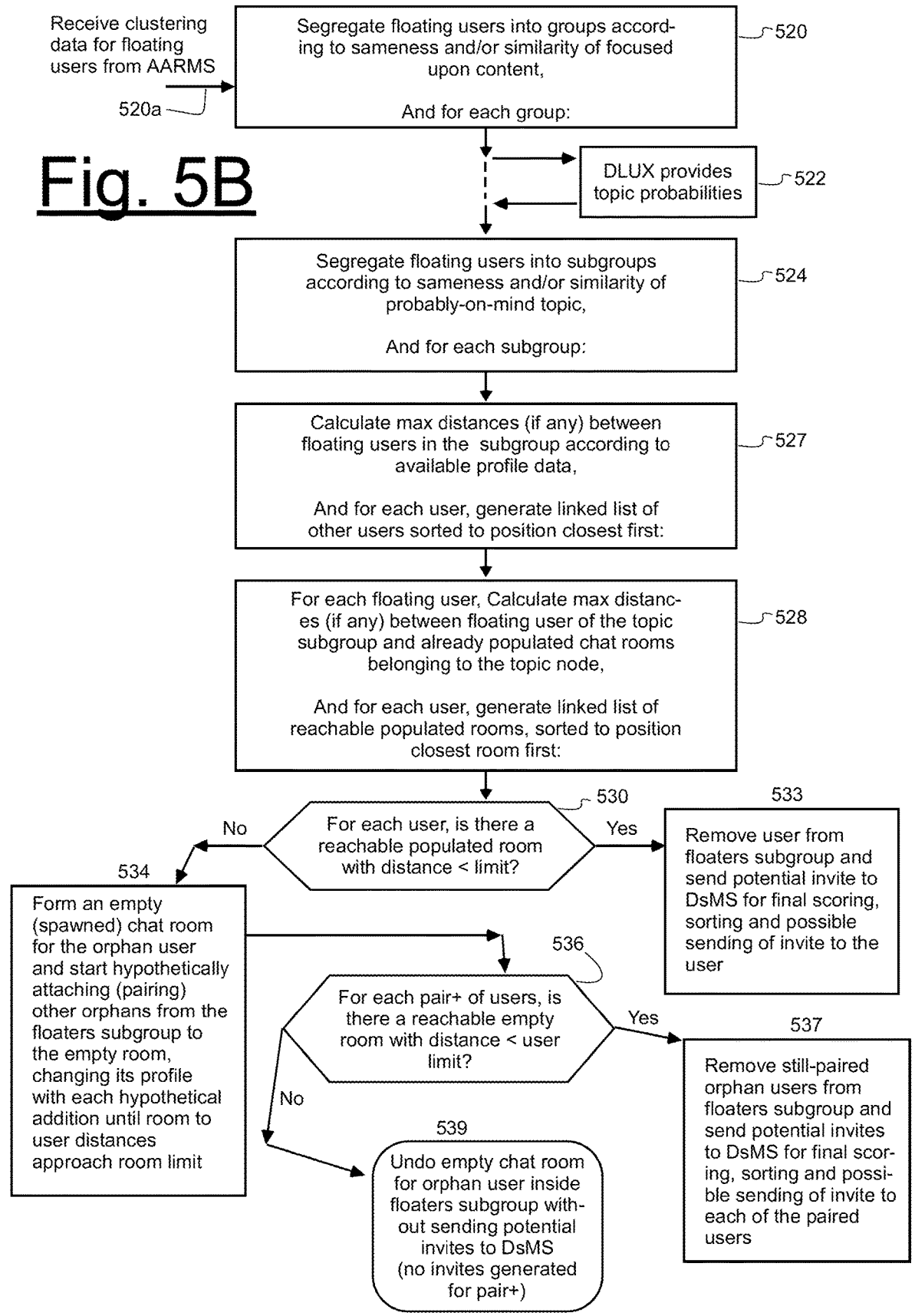
FIG. 5B is a flow chart of an automated invitations-generating system that uses a distancing algorithm like that of FIG. 5A for determining what rooms respective users should be invited into.

Since various permutations of not-yet-joined users and rooms may be possible, in one embodiment co-compatibility distance graphs are formed and represented by stored digital data. FIG. 5A shows an example while FIG. 5B illustrates one possible process for using the represented graphs. Referring to FIG. 5A, first user 121 (call her Sally) has a corresponding set of one or more profiles (e.g., 505a, 506a) which represent her preferences for meeting up with other potential users, for example with second user 111 (call him Sam here). Sam has a corresponding set of one or more profiles (e.g., 505b, 506b) which among other things represent his demographic attributes (see 154 "mine" of FIG. 1B). The system automatically generates a weighted score ($Score_{12}$) that represents how well Sam's demographic attributes correlate with Sally's preferences. The reciprocal ($1/Score_{12}$) of this, if positive and finite, may be taken to represent a distance vector 512 that originates with Sally's preferences (e.g., 505a, 506a), extends to Sam's demographic attributes, and is referred to here as the Sally-to-Sam distance. (Of course user-to-user distance values may be generated with functions other than the score reciprocal and still provide roughly similar results. Accordingly any function where distance shrinks in response to the co-compatibility score going up (e.g., Distance=Large_Number minus Score) may be used as deemed appropriate by system administrators to provide a desired kind of clustering. For example, distance might be computed as D=1/(Score squared) or as D=Q(score)/P(score) where P and Q are polynomials. Additionally, the score used in these functions might be logarithmically or otherwise transformed.) If the Sally-to-Sam score ($Score_{12}$) is zero (or a sub-threshold number close to zero), then distance goes to infinity and no linking vector 512 is created at all. Similarly, if the Sally-to-Sam score ($Score_{12}$) is negative, then it is taken to mean that Sally strongly objects to meeting up with Sam, and as a result, no linking vector 512 is created at all. On the other hand, if the Sally-to-Sam score ($Score_{12}$) is a relatively large positive number, then the Sally-to-Sam distance vector 512 exists and it is relatively short. This may be taken to mean (depending on how long or short the computed vector 512 is) that Sally 121 is willing to entertain the possibility of meeting up with Sam 111 in a chat room (say 561 for example).

While first vector 512 is drawn from Sally-to-Sam with a respective first distance (in a one or two dimensional co-compatibility space or in a space of 3 or more dimensions, where each dimension is a different kind of co-compatibility factor), a different second vector 521 is drawn from Sam-to-Sally based on a system generated, weighted score ($Score_{21}$) that represents how well Sally's demographic attributes correlate with Sam's preferences. In this case, Sam is shown in phantom at location 111* and a dashed distance vector 521 is shown to represent the corresponding counter distance. The reciprocal ($1/Score_{21}$) of the Sam-to-Sally score, if positive and finite, may be taken to represent distance vector 521 that originates with Sam's preferences (e.g., 505b, 506b), extends to Sally's demographic attributes, and is referred to here as the Sam-to-Sally distance. (Of course user-to-user distance values may be generated with functions other than the score reciprocal and still provide roughly similar results.) If the Sam-to-Sally score ($Score_{21}$) is zero or almost zero, then distance goes to infinity (beyond a predefined maximum) and no linking vector 521 is created at all. Similarly, if the Sam-to-Sally score ($Score_{21}$) is negative, then it is taken that Sam strongly objects to meeting up with Sally, and as a result, no counter-linking vector 521 is created at all. On the other hand, if the Sam-to-Sally score ($Score_{21}$) is a relatively small positive number, then the Sally-to-Sam distance vector 521 exists but it is relatively longer (longer than first vector 512 in the illustrated case). This may be taken to mean (given the relatively large distance defined by vector 521) that Sam 111 is less willing to talk with Sally 121 than the vise versa condition concerning Sally's willingness to meet up with Sam 111 in a chat room (based on their respective profiles).

In this example (FIG. 5A) it will turn out that Sally and Sam will not be invited to join together in a system spawned empty room (e.g., 561) due to the comparatively long distances, 512 and 521, found between them and contrasted to shorter distances like 513 and 514 found between Sally and other users Sharon (131) and Sandra (141). In one embodiment, the following additional steps are taken. If, as between Sally and Sam, there are two distance vectors, 512 and 521 of different lengths, the larger of the distances (521 in this case) is taken as a linking path distance between Sally and Sam. On the other hand, if as between Sally and Sam, there is only one distance vector because the score of the counter vector was not greater than or sufficiently greater than zero (>>0), then no linking path and linking path distance (each of which is represented by system stored data) is created. The not-created linking path and linking path distance is not considered in later algorithms, which for example, sort users according to the linking path distances between them (see 527 of FIG. 5B).

Next, as seen In the example of FIG. 5A, counter vector pairs 513/531 and 514/541 are respectively defined (by machine stored data) between Sally 121 and Sharon (131) and Sandra (141) respectively. Linking paths and linking path distances (not explicitly shown) are defined (by system stored data) for each of the counter vector pairs 513/531 and 514/541. An empty and floating chat room 561 is spawned by the system and first hypothetically linked, as part of a trial and error process, to Sally 121 by way of counter vector pair 515/551. The empty room 561 has its own set of profiles (e.g., CpCCp 505e and DsCCp 506e). While only Sally is linked to room 561, the room's profiles (e.g., 505e and 506e) are mirror copies of Sally's profiles (e.g., 505a and 506a). The temporary linking distance between floating room 561 and Sally will be zero (not shown). However, in a next part of the trial and error process, Sharon 131 will be hypothetically linked to room 561 and that room's profiles (e.g., CpCCp 505e and DsCCp 506e) will be automatically readjusted to pretend that both Sally and Sharon have entered the room. (They have not yet even been invited into the room though. This is still part of the trial and error clustering process.) Since Sally 121 and Sharon 131 have different profiles, the linking distance (the longer of vectors 515 and 551) between Sally 121 and the floating empty room 561 will be nonzero. Another nonzero linking distance will also form between Sharon 131 and the floating empty room 561. For sake of avoiding illustrative clutter this other link is not shown.

Next, as part of the trial and error clustering process, Sandra 141 is hypothetically linked to room 561 and that room's profiles (e.g., CpCCp 505e and DsCCp 506e) will be automatically readjusted again to pretend that all three of Sally, Sharon and Sandra have entered the room. Accordingly it is seen that user-to-room linking distances change as more users are hypothetically added to the room and also that the room's averaged (or otherwise formed) variable profiles (e.g., CpCCp 505e and DsCCp 506e) will change in response to trial and error addition of each further user. At some point, user-to-room linking distances may exceed one or more predefined limits and the trial and error process will be stepped back to return to acceptable distances and possibly halted at that time.

So one possibility is that free agent users (floating users) like 121, 131 and 141 have no pre-established room to join into and the system spawns an empty room (e.g., 561) for them and starts determining through trial and error how to populate the room with closely clustered users (closely clustered in the graph space) such as 121, 131 and 141. On the other hand, in the case of Sam 111, the system may find an already populated chat room B (563) where the linking distance (526/562) from Sam to the room (B) is within predefined limits. In that case, Sam will be invited to enter populated room 563, and if he accepts the invitation, the profiles of room 563 will be adjusted accordingly to reflect Sam as a new member.

Referring to FIG. 5B, a corresponding machine-implemented process is illustrated by way of flow chart. Entering into step 520, a data center service such as an AARMS (411) provides the CFi's or other clustering support data (via input 520a) for a plurality of "floating" users. By floating users, it is meant here that these users of client machines appear to be in need of being matched to corresponding chat rooms. The need for matching may be due to the fact that these users are not currently engaged in a chat room and their client machines are uploading fresh new Current focus identifying records (CFi's) or for other reasons as the system may deem appropriate. In step 520 the floating users (e.g., 111, 121, 131, 141) are segregated into groups according to sameness and/or similarity of the focused upon content that has been identified by their respective CFi's. In one embodiment, such segregation is based only exact sameness of the focused upon content (e.g., same exact URL). In other embodiments the degree of similarity between different URL's or other content is determined by the AARMS service module (e.g., 411) before it hands over a match-making job to one of its DLUX modules (e.g., 415) and the scope of similarity or nonsimilarity tolerated may vary from data center to data center or AARMS to AARMS. For example, in one data center, a specific AARMS may be configured to automatically determine that first users whose URL includes the string, "soccer" and second users whose URL includes both of the strings, "football" and "UK" are in fact focusing on same or similar content (although the respective topic of interest for these users has not yet been determined and optionally will be in optional step 522). In one embodiment, database records and/or knowledge base rules are empirically developed and kept for identifying differing content sets that are nonetheless to be deemed as being substantially similar, focused upon content.

After users are segregated into respective groups based on sameness and/or substantial similarity of focused upon content in step 520, each group is respectively further processed in step 524. It is to be understood with regard to the illustration in FIG. 5B of sequential steps that each group or subgroup or user may be processed by parallel data processing means as well as by serial von Neuman machines where the latter is used in one embodiment. In one embodiment, between the handing off of each same/similar-content group from step 520 to 524, the group may be first handed off to a corresponding DLUX (e.g., 415) where in step 522 the DLUX generates topic sameness probabilities (or scores) for each group member based on their recent CFi's (e.g., 75% chance user is thinking about a USA soccer team, 30% chance it's a British soccer team, etc.).

In step 524, the same/similar-content group is further segregated into subgroups of floating users according to sameness and/or similarity of the domain and/or topic that is probably on their minds. For example, one subgroup is formed of users who have similar probabilities that they are thinking about a USA soccer team in conjunction with the same/similar-content that has been identified by their CFi's, while a second subgroup is formed of users who have similar probabilities that they are thinking about watching an upcoming USA versus UK soccer (or "football") game on TV this weekend. The number of subgroups that are formed depends on system resource availabilities. If the current workload is heavy and resources are strained, each subgroup may correspond to a low resolution domain. On the other hand, if more bandwidth is available, each formed subgroup may correspond to a higher resolution subtopic residing under a topic node which resides under a corresponding domain node (see FIG. 4B).

In an alternate embodiment (not shown), module 522 appears before module 520 and module 522 of this alternate embodiment provides scores for say, the three most likely domains (pre-established domains in the system hierarchy tree) each user is probably thinking about. These scores are used to define clustering distance vectors similar to those of FIG. 5A but only in a topic closeness space that does not take into account personality-based, chat co-compatibility or sameness and/or substantial similarity of the focused upon content of the different users. So it is a crude first step way of first clustering users around nodes of the system hierarchy tree without testing a priori for personality-based, chat co-compatibility or sameness and/or substantial similarity of the focused upon content. It is to be appreciated from this that the present disclosure contemplates various permutations besides those illustrated in the drawings. So in contrast to FIG. 5A where the distance scores may take into account all the user's preferences (as defined in their personal profiles) and/or the room preferences (e.g., as defined by averaged room preferences), users may be step-wise incrementally move closer to their ultimate clusters by first clustering according distances of each user from pre-established domain or topic nodes in the system hierarchy tree and then secondly revising the distancing maps according to sameness and/or substantial similarity of the focused upon content of the different users or according to personality-based, chat co-compatibility. In one embodiment, sameness and/or substantial similarity of the focused upon content is not determined and only closeness based on topic scores is used to cluster floating users closer to or further away from each other. In yet another embodiment, users are first clustered closer or further away from another based only personality-based, chat co-compatibility; and then only after that are the distances refined based for example on sameness and/or substantial similarity of the focused upon content of the different users (or alternatively, based on the scored distance of the users relative to pre-established domain or topic nodes in the system hierarchy tree).

While it was mentioned above that topic-based distance scoring may be varied as a function of cloud workloads, it is also within contemplation of the present disclosure that topic-based distance scoring be varied as a function of CFi hint specificity and richness. More specifically, some uploaded CFi data sets may contain a rich set of topic hints that clearly point to a specific topic node within the system hierarchy tree. Accordingly, the user associated with this rich CFi set may be finely positioned among set of highly specific topic nodes and his finely-tuned score used to determine which of the highly specific topic nodes are the ones that most likely reflect what is on the user's mind. By contrast, the uploaded CFi data set of another user may contain only hints that are very vague as to what specific topic that user has on his or her mind. In the latter case, the user will be crudely positioned in topic node space next to a major domain or to a low resolution topic node but not next to a highly specific topic node. Accordingly, users whose uploaded CFi data sets contain only vague hints as to probable topic on that user's mind are float-wise positioned in topic node space next to a major domain (including the generic catch-all domain) or to a low resolution topic node (including a generic catch-all topic under a specific system domain) and such users therefore cluster close to one another. In one embodiment, the topic node space is defined as a polar coordinate space (see FIG. 6) with the generic catch-all domain (D0 of FIG. 6) being positioned at the origin, the system domains (D1, D2, . . . Dn) being positioned at close radial distances (but different polar angles, e.g., at R=1) around the origin and highly specific topic nodes (e.g., T1.1, T1.2, etc.) and subtopic nodes (e.g., ST1.1) being positioned progressively further away from the origin (e.g., R=10, R=100 plotted logarithmically). The far-away from origin positioning of the highly specific topic nodes (e.g., ST1.11) prevents vague CFi providing users from being accidentally clustered near to these highly specific topic nodes and keeps those users relatively close to the origin (e.g., closer to D0 than to ST1.1). In one embodiment, if a single, rich CFi hints providing user (e.g., outer orbit Larry 651 of FIG. 6) ends up being clustered all by him or herself in the outer reaches of this polar space (e.g., at R=1000, radius circle not shown) because no other user is currently providing such rich, highly specific CFi upload hints data, the radial positioning of the lone user (e.g., 651) is automatically scaled back to thereby reposition him or her closer to the origin and thus closer to where other users (e.g., 611, 621) are more likely to be. The polar angle(s) (in N-dimension polar space, where N=2, 3, etc.) of the scaled back user remains the same so that he thereby remains within the shadow angle of his encompassing domain(s) or topic(s) (see for example the illustrated shadow angle 602 of topic T1.1 and shadow angle 601 of encompassing domain D1).

Figure 6:
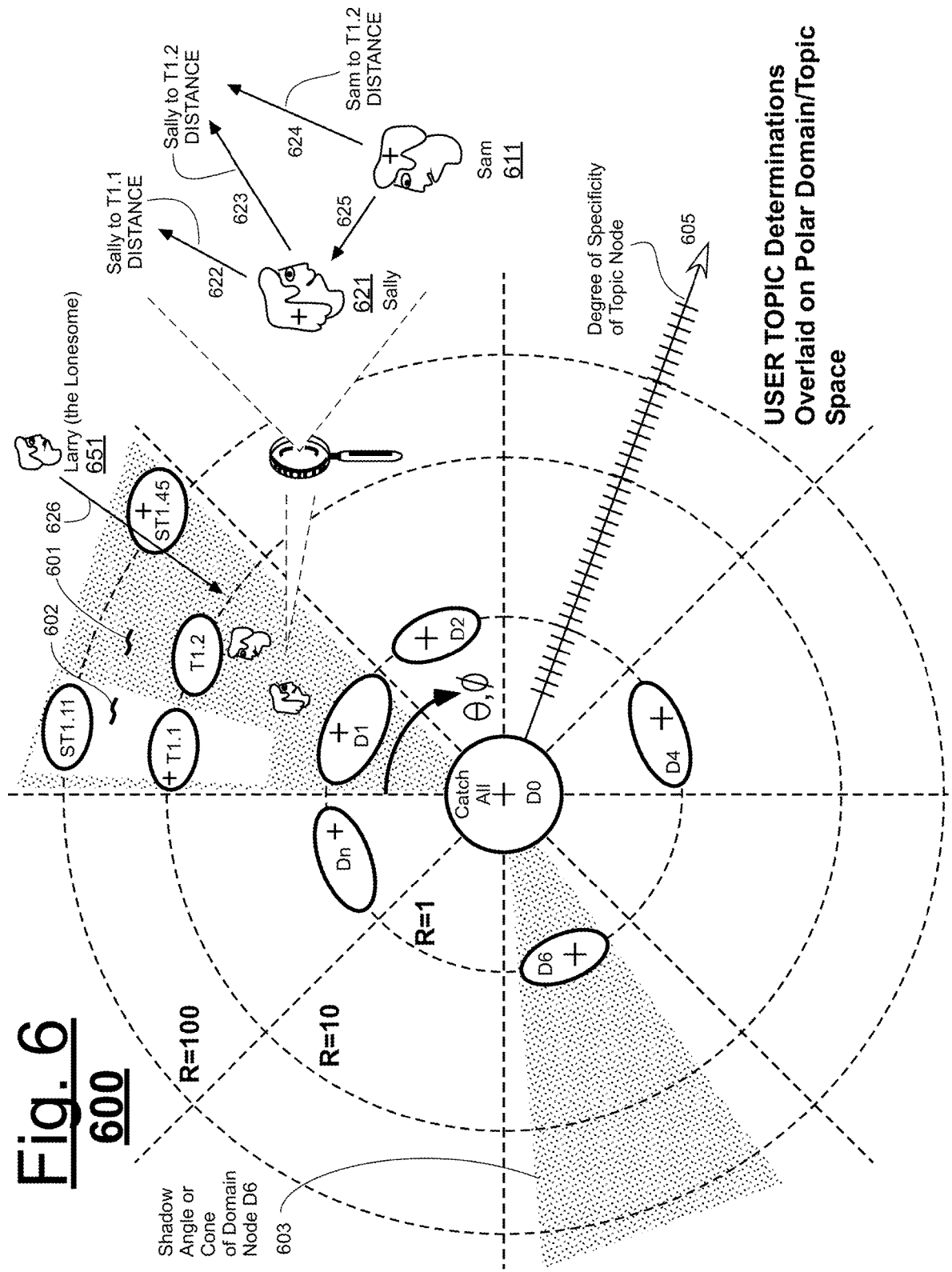
FIG. 6 is a schematic diagram of a topic space having polar coordinates in which a catch-all domain node occupies the origin, in which other nodes are positioned away from the origin at respective polar coordinate angles and radii, and in which distancing and clustering algorithms may be used to identify users who appear to have same or similar topics on mind and to locate tightly clustered groups of such users in the topic space.

A few more words are in order here regarding FIG. 6. The actual domain or topic node does not necessarily consume area or an arc segment in the topic space 600 of FIG. 6. Instead each node can be a point node of no width or height, and whose position is illustrated as a crosshair in FIG. 6. Thus there can be an almost infinite number of domains on radius circle (R=1), but not quite infinite because polar space 600 is defined in a finite machine memory. Each domain node (e.g., D6) can cast a corresponding one or more shadow angles (e.g., 603) that are associated with it where each such shadow angle may have a vertex at the origin and its start of shadow casting begins at the radius of the node and extends out toward infinite radius. Shadow angles of same radius domain or topic nodes can overlap with one another in one embodiment. Their cast areas do not have to be mutually exclusive. The catch-all domain D0, of course does not need a shadow because it covers essentially all angles of the topic space 600 (there can be forbidden zones). While domains D1, D2, . . . , Dn are shown to be ordered in a particular sequence around the R=1 radius, it is to be understood that this is a nonlimiting example in a two dimensional illustrated polar space 600. It is within the contemplation of the disclosure to organize domains in 3-D or higher dimensioned polar space (e.g., with complex number planes) with different shadow angles for different angular dimensions. It is within the contemplation of the disclosure to define multiple organizations of domain and topic nodes relative to one another in different ones of selectable spaces.

By way of a more specific example of the use of the illustrated 2-D polar space 600, it is assumed that recent uploaded CFi hints belonging to Sam (611) position him close to topic node T1.2. Recent uploaded CFi hints belonging to Sally (621) position her midway between domain node D1 and topic node T1.2. Recent uploaded CFi hints belonging to Larry (651) position him at an angle of subtopic ST1.45 but much further out in this solar system of domain and topic nodes, say at R=1000. Since Larry 651 is alone in the current overlaying of his determined topic of interest on polar space 600, a first automated step scales Larry's position radially back, but at his original angle, to say R=100 and a test is conducted to see if other users are nearby. If no, a next automated step scales Larry's position radially back, but at his original angle, to say R=10. Once again it is tested to see if Larry is all alone. This time the answer is no because Sam 611 is nearby. Ultimately Larry and Sam may be invited to join a chat room (not shown) running under the auspices of topic node T1.2. Sally 621 may be invited to join the same chat room. However automated determinations as to which room if any each user will be invited to join may be made on the basis of computed distances (e.g., 622-624) in topic space 600 between each user and nearby topic nodes and/or computed distances (e.g., 625) in topic space 600 between nearby users. In one embodiment, users who are much closer to each other (in other words, they are closely clustered) in topic space 600 than to nearby topic nodes are automatically invited into a newly spawned room that is automatically spawned for them because they are so closely clustered (e.g., within a pre-defined distance), topic wise to each other. Of course invitations may be predicated in some embodiments on personality co-compatibility and/or other attributes besides that of closeness within the topic space 600.

It was mentioned above that recent uploaded CFi hints belonging to Sally (621) position her midway between domain node D1 and topic node T1.2. Here is how the same is machine implemented in one embodiment. Actually and initially, a DLUX analysis of the recent uploaded CFi hints belonging to Sally (621) provide a first relatively high score associating her recently uploaded CFi hints with domain node D1 and a second relatively high and roughly the same score associating her recently uploaded CFi hints with topic node T1.2. The DLUX analysis may provide yet other scores that place her near, say domain node D6 (where such placement is not shown in FIG. 6). In a next machine-implemented step, DLUX placement that are relatively close to each other (e.g., within a system predefined distance and/or within a system predefined angle sweep) are consolidated into a single placement point by weighted summing (e.g., averaging) of the original positions in topic space 600, where the weights are functions of the original DLUX scores. Since Sally's scores for node D1 and node T1.2 are roughly the same, she ends up through averaging to be placed approximately midway between the two nodes. In the same example, initial DLUX analysis of the recent uploaded CFi hints belonging to Sam (611) generated roughly equal scores placing him simultaneously along the R=10 circle at topic node T1.1, T1.2, . . . , T1.4 (last one not shown even though its associated ST1.45 is). A somewhat lower DLUX generated score simultaneously placed Sam at domain node D1. Machine-implemented weighted averaging of all these closely spaced positions caused Sam to become placed just inside of the R=10 circle near topic node T1.2 (as shown within the shadow angle 601 of domain node D1). It is to be understood that these weighted average placements of Sam, Sally and Larry in the topic space 600 are based on recently uploaded CFi hints belonging to respective users. It is within the contemplation of the disclosure to additionally and automatically generate trending data that shows progression of respective users over time in different topic sectors (e.g., one sector being in the shadow 601 of D1 for example and another being in say, the shadow 603 of D6) and shows regions of the topic space 600 where the respective users tend to focus on. The history window of such trending data may vary from user-to-user given that some users may exhibit wildly volatile migrations from one topic to another whereas some users may exhibit highly consistent and stable concentration in certain areas of topic space 600. A back-ground service of the match-making and invitations-generating system (MM-IGS) scans through the topic space trending data of the different users and determines what size of history window is appropriate for each. The adaptively variable history window size is stored in the user's account settings (432 of FIG. 4A) or in the trending data store (437).

Returning back to the example of FIG. 5B wherein users are first clustered according to sameness or substantial similarity of their focused upon content; in step 527, for each subgroup formed by step 524, the system computes the linking distances (if any exist, and in a combined scores space for content and topic sameness) between each of the users of that subgroup. At this stage each user in the subgroup is already known to be focusing on same or similar content (because of the initial segregation that took place in step 520) and is believed to be thinking about a same or similar topic (because of the refining segregation that took place in step 524). The computed linking distances indicate the likely co-compatibility between the users based on the combination of content and likely topic. Closer ones are more likely to be co-compatible in combined topic and content space. As mentioned above, co-compatibility can be further determined (refined) on the basis of Current personality-based Chat Compatibility profiles (CpCCp's). Topic co-compatibility can be further refined on the basis of detailed information provided in the current Domain specific Chat Compatibility profiles (DsCCp's) of the users. In one embodiment, if a user does not have a CpCCp, the system automatically fetches a default stereotyping profile for the user from a default profiles storage region (e.g., 510 of FIG. 5A). The specific default profile(s) to be fetched may depend on the navigation paths the user took to get into the invitations-generating system (e.g., she entered via a link provided on the home page of Celebrity Sensations Magazine (a fictitious company here)). In one embodiment, after the system automatically assigns one or more default profiles to a user, the user may optionally view the profile and make changes (deltas) as is indicated by bubble 511 of FIG. 5A. In cases where the deltas are small and few, the system may store an identification of the default profile and store only the small deltas for the user in the user's account (e.g., 432) rather than storing a separate full profile. Although FIG. 5A shows at 510, a CpCCp default template bundled with a DsCCp default template, such an arrangement is not necessary or always the case. The CpCCp default template is automatically assigned based on assumed personality and demographic attributes of a new user (for example due to a detected Web browsing navigation path she took just prior to engaging with the invitations-generating system). On the other hand, one or more DsCCp default templates may be independently and automatically assigned to the same user based on a detected search engine usage she performed shortly before engaging with the invitations-generating system. In one embodiment, all users are initially assigned a default CpCCp template and a default root DsCCp template even if they had not responded to an initial user questionnaire supplied by the system. If they have not responded, the assigned default templates are very generic. If they have responded, the assigned default templates are more specific, with specificity being function of how deep down into the questionnaire the user went before quitting. In one embodiment, the first page of the questionnaire simply asks for age, gender and geographic location. The user may quit and not fill in any more information if they so choose. The second page of the questionnaire asks for more detailed demographic data (see column 153 of FIG. 1B) like level of education, level of income, culture, politics, etc. The user may quit and not fill in any more information if they so choose. The third page of the questionnaire asks for yet more detailed background information and so on.

Once the system computes the linking distances existing (if at all) between the various users in step 528, in one embodiment, the system also automatically generates a linked list for each user where the list items are sorted according to linking distance from the lead user, with the closets one or more other users appearing first in the list and the furthest appearing last. Thus the list provides an ordering of other users according to distance from the lead user of that linked list.

In step 528, for each subgroup formed by step 524, the system computes the linking distances (if any exist) between each of the users of that subgroup and available, populated chat rooms belonging to the node of the corresponding topic. In some instances there may be no already-populated chat rooms belonging to the node, particularly if it is a newly formed topic. However, if already-populated chat rooms exist for the node and a given user within the subgroup is determined (in test step 530) to be within acceptable linking distance of that room (where acceptable linking distance may be defined by user preferences or by the system), then control is passed to step 533.

In step 533, the subgroup member who is deemed to be within acceptable linking distance of a on-topic room is removed from the subgroup. In other words, if Sam 111 of FIG. 5A is deemed to be acceptably close enough to populated room 563, then Sam is taken out of consideration for whether he should be invited into floating room 561. This reduces the trail and error burdens on the floating rooms process which occurs later (e.g., step 534). In one embodiment, the mere fact that an on-topic and already populated room (e.g., 563) has been found within acceptable distance of a subgroup member (e.g., Sam 111) does not mean that an invitation will be sent to the user for that room. The system could be simultaneously generating many other potential invitations (chat opportunities) for the same user and some of these chat opportunities may have been scored as having much shorter linking distances (in other words, much higher co-compatibility scores) than the current chat opportunity. Accordingly, scored chat opportunities are returned from the match-making subroutines that found them (e.g., via the process depicted in FIG. 5A) to a supervising DsMS module for final sorting. (Functionings of DsMS's or Domain specific Matching Services will be explained in more detail below. See 416 of FIG. 4A for example.) The DsMs then decides how many and which of the highest scoring chat opportunities (if any) should be converted into actual invitations to be sent to the corresponding user. Score alone need not be a determinant. The DsMS module may decide it wants to provide diversity by avoiding invitations to almost same chat rooms. More over, the domain-specific DsMS module may be in communication with other DsMS modules (see 416' in center 420 of FIG. 4A as a possible example) so as to provide a balanced spread of invitations, not only for the topic nodes covered by this DsMS module but also for the topic nodes covered by the other DsMS modules.

Still floating users (those not yet paired to a room) who have not been culled out from the subgroup by step 533 get passed on for processing by step 534. Here, the process mentioned above for Sally 121 is carried out if sally is one of the still floating users. Floating room 561 is spawned for her and she is deemed the foreperson of the room. Then the linked list that was earlier generated (in step 527) to identify the closest other users is stepped through, and the still floating other users remaining on her linked list are hypothetically added into the floating room 561 one by one with linking distance adjustments between the room 561 and users being made on the fly. At some point, one or more limits associated with the floating room will be approached, such as too many invitees or too many relatively long linking distances, etc. At that point control is passed to step 536. The limits of each hypothetically joined user to that room is also tested. It could be that although the room's distance limit was not surpassed, the user's personal limit was surpassed. so that user is returned to the floating users pool in hope that some other room will pick her or him up. In step 537, the still attached users are removed from the floating pool and their corresponding chat opportunities are handed back to the DsMS for final scoring and sorting. As in step 533, users whose identifications are passed into step 537 with an associated chat room (e.g., 561) may still nonetheless not get invited to that room. In some cases, a floating chat room (e.g., 561) may end up devoid of any potential users other than its original foreperson (e.g., Sally). There is no point in inviting Sally alone into her own private chat room. So the trial and error room matching gets undone in step 539 and that is the end of the trail for that room. It is dissolved. Sally may still get picked up by another floating room which has someone else as its foreperson (e.g., Sandra). If not, no harm arises. Sally merely does not get an invitation as a result of this one of many match-making runs. As mentioned above, in one embodiment, room median, average or other attributes are determined at predetermined attribute checkpoints in time and held constant as such until the next checkpoint.

It is to be noted that the floating room which emerges from step 537 with two or more invitees paired to it, may still never come into fruition. All of the invitees can turn down their invitations or not accept in a predefined time, in which case the reserved but still unfilled room is automatically dissolved. Moreover if only one user (e.g., Sally) accepts the invitation, an apology message may be returned to her explaining that the room has been terminated in the interim (because there is no point in inviting Sally alone into her own private chat room) and the reserved but still unfilled room is automatically dissolved. In one embodiment, users who turn down invitations or are the lone ones accepting for an otherwise empty room are automatically added back with their corresponding clustering data (old CFi's) into the floating users group of a later run of step 520 so they have a chance of being joined with new users also being processed by that later execution of step 520. In one variation, this add back feature is employed only if the age of the old CFi data sets of the uninvited or lone invited user does not exceed a system predefined aging limit. If the CFi data set is over aged, it is dropped. The user may get further invitations after submitting fresher CFi data.

Referring back to FIG. 1B, discussion of some other weight-wise scoreable columns of the CpCCp 105*h*.1 continues here. Similar to column 155, the next vertical column, 156 (undesirable buddies) indicates negative attributes, meaning that these are data parameters identifying users that the local user 121" does not want to generally find in chat rooms she is invited into. Negative score points are attributed to users matching these parameters. For example, user 121" (e.g., Sally) has indicated that she does not want to be invited into any chat room that has the user with username "Troll" in it or "Monster". She has also indicated that she does not want to be invited into a chat room which will include people under the age of 14 or people over the age of 19 years old. The co-compatibility calculating server assigns negative score values (optionally differently weighted) to each of these parameters if met and therefore if a corresponding already-filled chat room (e.g., 563 of FIG. 5A) or a corresponding floating room (561) has too many negative or undesirable attributes to it, the score will be very low, the indicated co-compatibility for inviting local user 121" may be very low or even negative and corresponding very long linking paths (e.g., 515/551 of FIG. 5A) or no linking paths at all will result. In one embodiment, the cloud server does not invite user 121" (by sending her a corresponding invite or Cciv) if the total score generated by her current CpCCp 105*h*.1 for the pre-existing chat room or proposed chat room group is a negative one. In an alternate embodiment, the requirement for sending out an invite (Cciv) may be higher, for example requiring a positive score of 10 or better.

Referring to vertical column 157 (chat room properties), these criteria are directed to statistically averaged or other global properties for the chat room (or proposed chat room), this being distinguished from the positive or negative criteria attributed to individuals already participating in such rooms. A user may leave columns 155-156 blank while only filling in criteria in column 157. In the illustrated example user 121" has indicated that she prefers a chat room which has ten or fewer people (or alternatively she prefers a room with a "cozy" population range of 5 to 9 participants, but no fewer or no more). She has indicated a preference for a chat room where the average age is 16 years old. She has indicated a preference for a chat room where the male to female mix ratio is 20% to 80%. She has indicated a preference for a chat room where the average participant income is $50,000 per annum. Moreover she has indicated a preference for the mean location of the users within the chat room to be the central portion of the USA. Once again the server assigns positive or negative, weighted or unweighted values to these qualifiers that work to respectively increment or decrement cumulative scores for given chat room (whether already existing or proposed to be formed) relative to user 121". The potential invite score goes up or down depending on how many of the desired or undesired properties are met by the proposed or preexisting chat room.

Referring back to vertical columns 154 ("mine"), 155 (desired them) and 156 (undesirable them) as well 157 (users in chat), there is one class of additional demographic information that is valuable to include at least in the "mine" column 154 if not in the other columns. This is the general favorites information which is shown in box 154-7*a*. Each user (e.g., 121") may have certain system-defined "topics" of interest or topic domains of interest which that user is generally interested in. When the match-making service in cloud 150 is trying to associate a most likely topic of current interest with a received CFi (or recently received plural CFi's), the match-making service can look to the favorite Topics entries (represented by the dot in 154-7*a* that intersects with column 154) of the user's "mine" column and use that as one of the clues in determining automatically what topic the user currently is most interested in conjunction with the current content areas of engaged focus. Thus, even if a given user does not have DsCCp's filled out for use in providing automated inferencing of the user's topic, the favorite topics entry 154-7*a* in the user's CpCCp can be used as a clue.

Aside from listing favorite topics and/or favorite domains in box 154-7*a* (where same or different instances of the box apply respectively to columns 154, 155, 156 and 157, where for 157 it defines favorite topics of a potential preferred or non-preferred chat room), the user may additionally list favorite books, favorite movies, favorite (most often visited) URL's/web pages, favorite games, favorite TV shows, favorite music, favorite foods, etc., not only for him or herself (mine) but also as attributes for desired and undesired chat partners or predominant population attributes of desired or undesired chat rooms. By way of example, a given user may list "Gone With the Wind" as her favorite book and at the same time list the same book as being an undesirable favorite of other users in chat rooms she is to be invited into. This in essence says, I like "Gone With the Wind" but nonetheless I prefer not to enter chat rooms filled predominantly with others who like "Gone With the Wind".

There is often a limit as to how much detailed information can be practically given in row 171 and its crossings with columns 155, 156 and 157. For example, in one embodiment, the number of names for desired chat buddies may be limited in column 155 to just three for a nonpremium user and seven for a premium user. More specifically, column 155 may list the following desirable chat partners: (1) Name:= MBGFFL, (2) Name:=Sharon and (3) Name:=Sandra for CpCCp owner Sally (121"). The match-making system may be pre-programmed to score these as linearly summed positive scores. More specifically, for each desirable chat partner already inside a potential chat room to which the current user is to be potentially invited, increase the Invitation_score by +1. So if only MBGFFL is in a potential room, that room's score is increased by +1. If all three of the listed desirable chat partners are present, then by +3. If the topic being discussed in that room doesn't closely coincide with the topic on the current user's mind (let's call her, Sally), that room's Invitation_score by reduced by a −5. However, suppose Sally wants to secretly impose the following special condition: If a potential room include MBGFFL AND Sharon BUT NOT Sandra, I want to be invited in irrespective of what the topic is. To this end, the knowledge-base rules set 175 may be embedded into or logically linked to Sally's CpCCp of the moment, 105*h*.1. The utilized knowledge-base rules set 175 may contain the following special rule: IF Room_member=MBGFFL AND Room_member=Sharon AND Room_member=! Sandra THEN Increase that room's Co-compatibility score by +25. (Here, the symbol=! is understood to mean, not equal to.) As seen the special rule is primarily personality based rather than topic based. Topics are topics of the room (if any topic at all, else it is deemed a "catch-all") and not the topic which the current user is probably thinking about. (This is a subtle difference which will be better understood when DsCCp's are discussed below. It is to be noted that there are at least two different kinds of catch-all rooms, namely, those where even though the topics on its users' minds are not the same, at least the content of current focus is substantially the same; and those where neither the content of current focus nor the topic on its users' minds are the same but the in-room users are nonetheless chatting with each other and thus perhaps converging on a topic of common focus. In one embodiment, each chat room's attributes are deemed to be frozen in time for regular intervals; e.g., every 5 minute stretch, 10 minute stretch, 15 minutes, etc., even though users may be constantly entering and leaving the room.)

When combined with the base rule of column 155, row 171, the above IF/THEN rule concerning who the current room members are, and are not, basically says, Sally likes each of MBGFFL, Sharon, and Sandra alone and even more so when they appear in any combination in a room; but Sally especially likes it when both of MBGFFL and Sharon are present but Sandra is not. Perhaps this is so because Sally feels that a special social synergy exits for Sally when this particular combination of personalities is present in a chat room together with Sally. The personalities-directed rules set 175 may be formulated with aid of an electronic questionnaire that Sally fills out. The data storage capacity of the personalities-directed rules set 175 may be progressively increased to higher limits in accordance with higher level premium subscriptions that Sally pays for. Standard subscription users may be limited to having only relatively simple and small personalities-directed rules sets 175 while premium subscribers are allowed greater complexity and a greater number of rules and/or more storage space. Personalities-directed rules sets like 175 are not limited to specifying special rules about other users. They may be directed to personality quirks of the current user (e.g., Sally). Suppose for example that Sally does not want to be invited into Domain 5 chat rooms (a hypothetical domain name) if the time is between 2 PM and 5 PM and she is still at work. A corresponding rule might then read as follows: IF Room's_Domain_Name=5 AND (Time >2 PM AND Time <5 PM) AND My_Location=Work THEN reduce room's Co-compatibility_score by −30.

It is to be understood that just as system limitations may be imposed on the number of desired chat buddies who are individually listed in column 155, row 171 (essentially as equally weighted members of a linearly summed scoring value), there can be similar limits placed on the number of undesired chat buddies who are individually listed in column 156, row 171 (essentially as equally weighted members of a linearly summed and negative scoring value). Similarly, there can be system defined limitations imposed on the number of age ranges entered for the "Age" row of column 153 as it crosses with each of preference specifying columns 155, 156 and 157. There can be system defined limitations imposed on the number of socioeconomic class identifiers entered for the "socioeconomic class" row of column 153 as it crosses with each of preference specifying columns 155, 156 and 157 and so on. The knowledge-base rules set 175 may be used to expand on these limits and provide specialized scoring rules for specialized permutations of various ones of such preference parameters, including for cross subclass combinations. More specifically, one rule might read: IF Room's_Current Population <10 AND (Avg_Age Range is 14-17 OR 35-39) AND M/F Mix is in range 20/80 to 5/95 THEN increase Room's Co-compatibility score by +100.

It can be bothersome for users, especially newcomers to the match-making and invitations-generating system (MM-IGS) to fill out long electronic questionnaires from which their respective CpCCp's can be automatically formulated. In one embodiment, so-called template CpCCp's and template knowledge-base rules sets (e.g., 175) are prestored in the system for initial assignment to new users. Each new user may be initially asked to fill out a very short demographics questionnaire (e.g., just name, age, gender and place of birth or residence) from which a stereotyping model of the user is developed. The developed stereotyping model is used to select for that user, one of the prestored template CpCCp's in the system and optionally also one of the prestored template knowledge-base rules sets. (The same stereotyping model may also be used to select for that user, one of prestored template DsCCp's and PEEP's and optionally also one of prestored and respective template knowledge-base rules sets for domain specific rules and emotional expression rules.) Then later, as each new user continues to use the system, corresponding models of the user's personality likes and dislikes are refined and improved over time as are also models for the user's topic likes and dislikes and for the user's personal ways of expressing different emotions or mind sets. The refined and more accurate models may be used to automatically pick for and assign to that user correspondingly better matching ones of the template profiles and/or template knowledge-base rules sets. Even later, as a user becomes more skilled in utilizing the match-making and invitations-generating system (MM-IGS), the user may be empowered to fine tune his or her personal CpCCp and DsCCp's and knowledge-base rules sets or the user may employ an authorized service provider authorized by system administrators to perform the fine tuning for that user. Additionally, background fine tuning service running automated in the background of the system may analyze trending data about the user and fine tune his or her rules even more. By way of example, suppose the user named Sally has created for herself a CpCCp rule (175, item 3) that says: IF Room's_Domain=Celebrity_Gossip and MBGFFL is a member inside the room THEN increase that room's co-compatibility score by +100. However, on analyzing Sally's actual behavior as stored in the system's trending storage (437 of FIG. 4A), a background fine tuning service determines that Sally fails to accept invitations to a room whose domain is Celebrity_Gossip and where her best friend for life is already inside the room much more often than is warranted by a score increase of +100. In other words, the system is wasting its time and resources sending Sally invitations to a matching room like that. A more realistic increase of score for the potential room's co-compatibility score would be +50. In one embodiment, the fine tuning service alters the above IF/THEN rule so it says THEN increase . . . by +50 rather than +100. In an alternate embodiment, the fine tuning service compromises between the realistic score change and the user's exaggerated score increase by automatically modifying the above IF/THEN rule so it says THEN increase . . . by +75 rather than +100. Later, it may compromise again by picking an increase of +65 as the median between +75 and +50. In this way if Sally starts accepting substantially more invitations for that specified kind of room, the modified rule will not be far off from her long term norm.

Unlike the demographics data 171 in vertical column 154 ("mine") of FIG. 1B, the reputation data 172 and credentials data 173 of vertical column 154 are not directly controllable or specifiable by user 121" (e.g., Sally) to whom those reputation and credential indicators are attributed. They are not self-generated. Instead they are developed over time through community determinations such as by votes cast by trusted other users in the system (when those other users are of sound mind) and/or by validation by the system operator. In one embodiment, each user (e.g. 121") is given 3 free reputation files which define various reputation attributes of the user when seen as a general person (G) or as a professional person (P) acting in their primary professional occupation or as an alleged expert or novice in a particular first domain and topic area (Topic A). In one embodiment, if the user 121" wishes to have additional reputation files for other topics inserted in her CpCCp, she must pay for having these additional reputation files opened in various additional topic areas such as B and topic C. Since the reputation files for column 154 of the current CpCCp remain relatively unchanged despite possible change of current mood by user 121", the mine reputation area 154/172 and also the mine credentials area col. 154/row 173 of one embodiment contain pointers to external files or database records rather than containing the file data themselves inside the CpCCp. In this way the same data for reputation may be used from one CpCCp 105*h*.1 to the next 105*h*.2 irrespective of change of user's mood, surrounding, etc. By way of example one reputation value assigned to user 121", in her general person role (G), by other users who have voted on this attribute indicate that user 121" likes to argue a lot. This is recorded in her general personality reputation file (G). Alternatively, the other users may have voted to indicate that user 121" in her general person role tends to be too agreeable or tends to rely on things that are not fact-based. In vertical column 155, user 121" has indicated that her desirable chat buddies should be others whose reputations indicate they like to argue and they tend to present their arguments with fact-based backup. In vertical column 156, she has indicated that she does not want to join with chat buddies whose reputations flag them as being too agreeable or as debating on a basis other than a fact-based ones (e.g. on emotional basis instead). Although vertical column 157 for row 172 has been left empty, it is within the contemplation of this disclosure that user 121" may also indicate general chat room properties for reputation, credentials and so forth in the general person category, the professional category, and specific topic-based categories. In one embodiment, other users are blocked from voting on a first user's reputation and/or credentials when the system determines from biometric data collected from those other users that their current emotional states are such that their vote on reputation and/or credentials may not be trustworthy. For example, the other users may be overly-tired at the time, cranky, not fully alert and thus not in possession of fully sound minds at the moment. Hence the system can decide to not trust their voting judgments at such times (when voting on a first reputation and/or credentials or voting on something else of importance to system operations). In one embodiment, rather than fully blocking votes of other user who are captivated by strong emotions at the moment, the system proportionally de-weights their votes according to the extremity of their user emotions (the emotions determined from biometric data). In one embodiment, if trustworthy biometric data for judging user emotion or irrationality is not available, then trending data alone may be used for determining that a given user is behaving out of normal during a given time period and for responsively discounting or down-weighting that user's votes during times of apparently abnormal behavior. More specifically, if the given user is submitting a significantly larger than average number of negative votes during a given time period (e.g., last 4 hours) then it could be automatically assumed by the system that the person is unusually not in a good mood and the votes should be discounted. (Of course if the user routinely casts a large number of negative votes and that is the user's normal pattern of behavior, then this discounting feature may not kick in. On the other hand, the system may include an automatic vote down-weighting factor for negative votes cast by users who are routinely negative and perhaps an automatic vote up-weighting factor when such routinely negative persons cast a positive vote.

While reputation is generally earned as a matter of popularity, (voted on by either credentialed voters or non-credentialed voters and/or or by either voters with high reputations or with low reputations when in trustworthy states of mind), credentials and subject matter proficiency are another matter. Credentials (horizontal region 173) are mostly fact-based attributes of the given user. Credentials may define for example, what the educational qualifications of user 121" are, what schools she attended, what grades she got, etc. These attributes can be validated by obtaining official transcripts from credential giving and validating authorities. In one embodiment, users have to pay service fees to the credential giving authorities in order to have their listed credentials displayed as having been validated to one validation level or another. Accordingly credentials may be of an officially validated type as well as of an unvalidated type. In one embodiment, each user gets 3 free nonvalidated credential files, for example, one relating to their educational background, one to their work resume or experience, and a third related to a first-chosen topic (A). Additional fees must be paid to the system operator to support additional credentials for further topic areas and also to support validated credentials as opposed to unvalidated ones. Proficiencies are determined based on community standards and community cast votes in different domain and topic arenas.

For some users, credentials (row 173) may be the most important type of preferences to indicate for being invited into a given chat room or not. Some users may prefer to deal only with chat rooms that contain other persons who are equally credentialed in a specific topic (e.g. topic B) and to have validated educations at the masters' degree level or higher. In the illustrated example, user 121" has indicated in vertical column 157 that the desired chat room credential properties should be that of the lowest educational level being a validated high school graduate and the highest being a master's degree. Additionally she has requested that the chat experience of those being invited to join with her into an by-invitations-only chat room be ones who indicate little or no experience with chat rooms. Additionally, user 121" has indicated a particular superior to subordinate participant mix. Most specifically she has requested that the 70% of the people in the chat room that she is invited to join (or host) should have peer credentials similar to her own and 20% may have superior credentials while only 10% or less have inferior or subordinate credentials. She has requested to be considered as one of the peers. (Complex invitation criteria, by the way, may be specified in rules set 175 rather than in the main body of the CpCCp.) Alternatively she could have requested that she be considered a subordinate user and that one or more persons with superior credentials should also be in the chat room to advise her on an area in which she is not an expert. Alternatively she could have requested that she be designated as a superior credentials or proficiency member of the group and everyone else be of a subordinate credentials class. These preference options can be very important because it allows the user 121" to control the type of interchange that will occur in the chat room she is invited to join (or that she indirectly invites others to join). For example, if she wishes to obtain advice from other chatterers who have superior credentials in a particular topic area (e.g. Topic C) relative to her credentials in that topic area, then she may ask for a mix where she is part of the subordinate participant class. On the other hand if she wishes to converse with people of equal credentials to her own, then she may insist that most people in the chat room (e.g. 70%) including herself be of a specified peers class. Similarly, an expert in a particular field, say financial advice, may wish to chat only with people with lower credentials for the purpose of providing them with financial advice (perhaps for a fee). In this case that person would designate himself as the sole member of a superior credentials class within the group and allow for 99% subordinates (e.g., novice class) and also control the size of the group so as to keep the conversation small and controlled.

In general, it may be seen from FIG. 1B that each user may control the type of chat room invitations they receive from the cloud 150 based on how they fill out their current personality-based chat compatibility profiles 105*h*.1, based on what reputations they have earned through general use or in topic-specific arenas, and based on what credentials and/or proficiencies they have established on an unvalidated basis or on a community-validated basis.

Thus far, for users 121', 131', 141 it was assumed in FIG. 1A that commonality of eyeball focus (and/or other indication of attentive focus) on a same magazine article (e.g., 127a, 137a) was enough to indicate commonality of interest and enough to warrant automatically inviting users 121', 131', 141 into a same chat room 161. However, there are at least two alternate possibilities. First, two users (say 121' and 131' again) are mechanically focusing on a same piece of computer-output content (e.g., 127a, 137a) but in their minds they are considering two entirely different topics. One for example may be reading about a celebrity Britney visiting a beach in Rio de Janeiro, Brazil and thinking about travel plans to the same destination. The other user may be thinking about what other celebrity is known to be in the same area at the same time and if it is more than mere coincidence. Thus same content but two entirely different topics or domains of interest. There is no apparent benefit to inviting these two users to chat with one another. The match-making service should be generally able to avoid inviting into a same room, users whose current topic of interests are very divergent from one another. The other situation is where two users are indeed respectively thinking about a same topic, subtopic, etc. but are mechanically focusing on respectively different content offerings (e.g., one looking at Celebrity Sensations Magazine and the other at Hollywood Star Gossip Magazine (which here is taken as a fictitious name for a possible online magazine and is not to be confused with any real magazine of same or similar name if any exists). Thus in the second case there may be benefit to automatically joining these two users for chatting with one another even though they are focusing on different content (for example on web pages having different URL's).

Figure 4A:
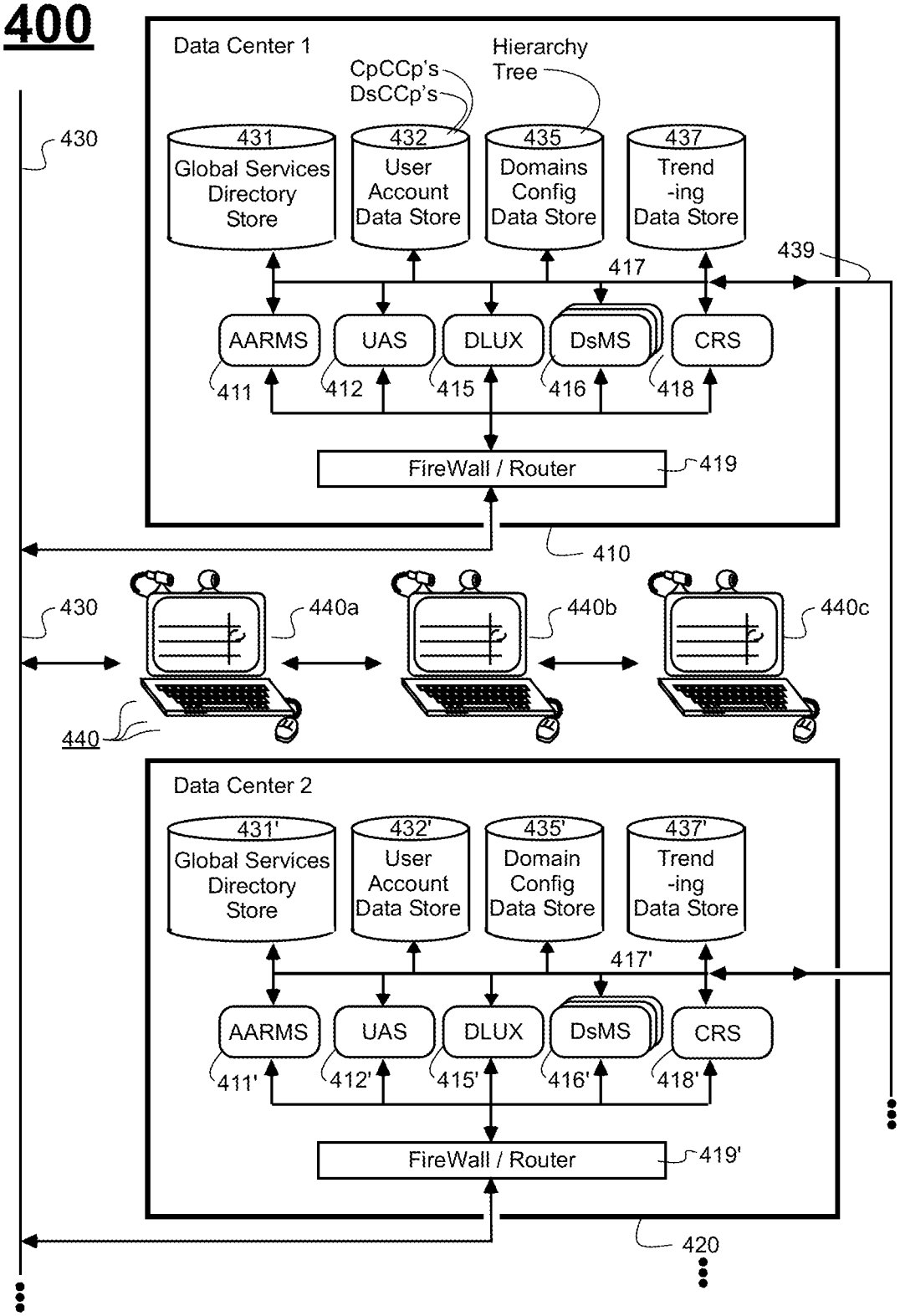
FIG. 4A is a block diagram of a distributed match-making system having geographically spaced apart data centers each of which can provide match-making services in accordance with the present disclosure.

FIG. 1C shows a possible data structure for part of a Domain-specific Current Chat Compatibility Profile or DsCCp 106h.1 for short. The DsCCp 106h.1 of a given user 121" may be used in cooperative combination with the CpCCp of that same user 121" to automatically home in on co-compatible chat buddies or chat rooms and to responsively generate invitations into corresponding chat rooms (e.g., 161 of FIG. 1A) based on domain or topic. In one embodiment, DsCCp's 106h.1, etc., are organized into a hierarchical tree structure that somewhat mimics a hierarchical tree structure used in the cloud 150 for keeping track of domains and topics. By this, it is meant that each user will have a root DsCCp and may have under that root various child or branch DsCC profiles linked to one another in parent child relations. Not all chat rooms have to be logically tied to a specific topic or domain or Domain/topic/subtopic/ . . . /etc. hierarchical designation. Some rooms may be defined as not yet having an ascribed domain and topic. These will be catch-all rooms. However, for cases where users prefer subdivision of chat rooms according to domain, topic, etc., the system may rely on the user's DsCCp's for performing one or both of at least two functions: (a) automatically determining the user's more probable current topic or topics of interest and (b) automatically homing in on co-compatible chat buddies or chat rooms for the determined topic or topics that are probably currently of common interest. As in the case with PEEP's and CpCCp's each DsCCp may have embedded therein or logically linked to it a topics-directed set of knowledge-base rules (195). Unlike rules 175 of FIG. 1B however, the knowledge-base rules here (in 195) may be used to define what topic the current user most likely has on his or her mind. This is done by looking at CFi hints and then scoring those hints. More detail will be provided when FIG. 4C is described.

A Domain-specific Chat Compatibility profile (DsCCp) such as the one 106h.1 shown in FIG. 1C can be viewed as a personality-free extension of, or substitute for, the user's general, personality-based current chat compatibility profile (CpCCp). While the general current chat compatibility profile (CpCCp) operates primarily to specify the user's general personal and personality directed characteristics, such as age, educational level, etc., as well as the their preferences for same or different general personality characteristics in chat partners and also their general preferences for favorite topics, favorite books, authors, movies, etc. (or most disliked topics, books, authors, etc.), the Domain-specific chat compatibility profiles (DsCCp's) take such selection preferences one step further (or along a different preferences plane) by specifying a user's chat compatibility profile on a per Domain basis or per Domain/topic/subtopic basis. The utilized domain, topic, subtopic, etc. names or aliases are the same as, or are mapped to match those used in the system's stored hierarchal tree of domains and topics (see briefly FIG. 4B). Selection of a given user's CpCCp and/or DsCCp('s) as being "current" can change depending on personal variables such as the client user's current mood, his or her surrounding environment (e.g., work versus home), etc. Unlike the CpCCp which tends to be general in nature and primarily personality based, each DsCCp is more so proficiency or interest directed to a specific domain or topic node within a hierarchal tree filled with parent domain nodes and child topic nodes. For example a person might indicate that they are a 50 year old with a Master's degree in Business Administration (MBA) and, in so far as personality is considered, they are generally happy to chat with anyone within 10 years of their own age and with at least a high school diploma as educational background. That general specification would normally be part of their general CpCCp and would be used even if the user is being invited into a catch-all room that has no specific domain or topic associated with it. This same user might also indicate (e.g., in section 154-7a of FIG. 1B) that their usual or favorite Domain of interest is the Domain of finance. The same person may wish to specify that when they are chatting under that finance Domain (as opposed to a general interest other type of Domain or a catch-all Domain) they only want to chat with other people holding at least a master's degree if not higher (hoping to perhaps get better advice or exchange ideas at their level of advanced proficiency). Alternatively, if the interest Domain is that of music, the same user may want to chat only with people who are 10 years younger than they are (because nobody in their own age group appears to appreciate the newest music trends). The same user (e.g., 121") might also indicate that a less usual but still predominant Domain of interest is the Domain of movies and that they only want to chat with people older than they are (because they like older classic movies). Rather than placing these personality-independent, domain by domain specific preferences in the general CpCC profile, in one embodiment such domain specific preferences are stored either in one all encompassing DsCCp record or in separate DsCCp's which are logically linked to a root DsCCp and to each other according to a logical tree structure where a root DsCCp record lists the hierarchically higher domains and their order of current probability (as ordered for example at the top of column 183 of FIG. 1C with highest likelihood being number 1, lowest number 7). Child DsCCp records may provide additional rules (e.g., listing of primary keywords such as in column 188) for each specific domain and topic under that domain and subtopic under the topic and so forth. It is possible for the plural DsCCp's of a given user to overlap and perhaps conflict with regard to likes and dislikes (preferences) of that user. In such a case, the match-making and invitations-generating system (MM-IGS) determines which of the DsCCp's currently takes priority based on currently detected mood or surrounding environment of the user and/or based on trending data stored in the system's Trending Data Store (e.g., 437 of FIG. 4A). In one embodiment, the most probable topics currently on the user's mind are determined first and only thereafter is a deeper search performed for chat rooms that not only match or come closest to the user's probable topic of interest but also match or come closest to the user's personality based preferences. Of course, it is within the contemplation of the disclosure to do the vise versa in certain circumstances, namely, search for the most co-compatible rooms on the basis of personality first and then refine the search on the basis of topic matching. Hybrids of the two approaches are possible also.

More to the point, a root DsCCp such as 106h.1 in FIG. 1C may have a first table (or other database structure) indicating that currently user 121", if they are at all thinking about a specific topic and there are no narrowing hints provided by the CFi's, it will most probably be national politics (rated number 1 because for example a Presidential election is taking place during the current year) and it will next most probably be a finance domain identified as Finance.002. (There could different kinds of Finance domains identified for example as Finance.001, Finance.002, . . . Finance.999; each with unique subtopics as children of its hierarchy tree.) There are certain topic-narrowing hints or clues 188 that may be picked up from recently pulled CFi's 128a' as to what the user's current domain and/or topic, subtopic, etc. of interest is. Say for example that the user's recent web browsing history includes the web site named Wall.St.J.com (here a fictitious name) as one of the top three most recently visited sites. That can be taken as a hint that the user 121" is currently focused on the Finance.002 domain because table 183 indicates that this domain is highly likely and further because the Wall.St.J.com entry in table 185 is logically tied to a probability weighting pointer (not shown) that shows, say, 75% probability of linking to the Finance.002 domain if Wall.St.J.com is in the top three of recently visited sites by that user 121".

Yet another of the topic-narrowing hints 188 provided by the user's root DsCCp 106h.1 may be a collection of recently used search terms entered into a search engine. Say for example that the user's recent search history includes the search term "economy" as one of the top three most recently used search terms. That in combination with DsCCp entry of "economy" in a corresponding row of column 186 can be taken as a hint that the user 121" is most probably currently focused on either the Finance.002 domain or the Politics domain. This may be so if table 183 indicates those two domains as the most highly likely two tied to the "economy" search term entry placed in table column 186. The illustrated "economy" entry may be logically tied for example to a first probability weighting pointer 186b that shows 48% probability of linking to the Finance.002 domain, a second pointer (not shown) indicating 47% probability of linking to the Politics domain and further pointers (not shown) with 5% weight distributed to other domains.

Weighted pointers are way of linking keywords to most probable domains. A more flexible approach to determining what the more probable domain and topic of interest is uses a set of knowledge-base rules such as shown at 195. In one embodiment, topic likelihood scores are made functions both of the one-to-one horizontal correlation hints provided in columns 185 and 186 as well score adjustment rules specified in the DsCCp knowledge-base rules set 195. More specifically, reading across subrow 4 ("Poker") of row 191 of FIG. 1C, for the current user, the most frequently associated URL with this "Poker" domain is shown in a correlated row to be "PokerGuru.com" (a fictitious name here) and the most frequently associated search keywords are shown in a correlated row to be "cards" and "table". A further column (not shown) might specify that for the current user, the most frequently associated meta-tags with this "Poker" domain are <<eye-tells>> and <<card-shark>>. Accordingly, if current content being focused upon by the user appears under the URL, "PokerGuru.com" and the same user entered one or more of the search keywords "cards" and "table" in a recent stretch of time into his search engine and the current content being focused upon also includes one or more of the meta-tags <<eye-tells>> and <<card-shark>>, then each of these coincidences is linearly added as a positive factor into a topic likelihood score stored by the system. Scores for competing topics (and/or competing domains) are sorted and the ones with the highest likelihood scores are assumed to be the most likely topics on the user's mind. However, there may be special scoring synergies to be invoked when unique combinations of hints appear. For example, in a JSON-like expression which allows for different types of URI's (Universal Resource Identifiers) including the URL identifier type, the rule might read as follows: IF URI:=URL:=NYTimes.com AND MetaTag:=election AND MetaTag:=economy THEN increase likelihood score of Topic:=National.Politics/Presidential_election/economics_debate by +100 AND increase likelihood score of Topic:=City.Politics/Mayoral_race/economics_debate by +50. This kind of special treatment rule would go inside the knowledge-base rules set 195 of the operant DsCCp (which could be a root DsCCp or a child DsCCp stored under the root).

Data in the DsCCp's may be adaptively changed over time as the user's preferences change. For example, the ordering of domains (column 183, major row 191) may be changed to reflect different preferences in case where no additional hints (no keywords, no URL's etc.) are available. The more frequently associated URL's, keywords, meta-tags for each listed domain or topic of column 183 may be changed in response to detected changes of the user's preferences over time. One of the feedback mechanisms used for automatically detecting such changes is when the user turns down initially offered best-guess invitations and instead accepts an invitation with a substantially lower likelihood score. That tells the system that the user's mapping of hints to likely target topics have shifted.

Table column 184 indicates a length of user history associated with each domain and optionally includes pointers to history records for the respective domains and what priority positions they held in the past. If there is long history of one domain being in the top three for example, then this historical trend may generate a sort of inertia for domain reordering algorithms which works to keep the top three domain with long history of being there from suddenly being dropped say out of the top ten list. The illustrated domain and topic picking structures of FIG. 1C are merely examples and it is understood that the DsCCp may have more, others or various further permutations of columns, sub-columns, rows and sub-rows, etc. Moreover, it is understood that like the case for the user's CpCCp, the identification by the system of the user's current root DsCCp (and thus its associated children DsCCp's) may change shift as an automated function of the user's detected mood and/or surroundings.

In addition to domain-narrowing hints such as shown at the top of major column 188 for main topic domains, the root or a child DsCCp may include hints such as shown at major rows 192, 193 for specific topics or subtopics under respective domains or topics. Thus the DsCCp may be used for automatically homing on the most probable topics of current interest by the given user.

As mentioned above, users may have weighted preferences (likes and/or dislikes) on a domain by domain or topic by topic basis, on a chat partner by partner basis (different weights for different partners, e.g., positive scores that involve MBGFFL get a +1.3 multiplying boost factor just because MBGFFL is Sally's best friend for life; and negative scores involving MBGFFL get a 0.9 watering down weight for the same reason). Users may also have weighted preferences on a room type by room type basis (e.g., if a potential room is limited to a range of 3 to 5 participating members, its positive co-compatibility scores are automatically boosted by a +1.5 multiplying factor because Sally considers this population range to be a sweet spot).

In one embodiment, in-profile weights are automatically updated based on determinations made by the system's trending data monitoring services. In other words, a given user (e.g., Sam) may expressly record that he prefers to chat with people his own age. However the system's trending data monitoring services may determine based on actual historical data regarding his chatting activities that he actually doesn't care so much about age and instead most prefers to chat with people who are history enthusiasts. In this case, a weight given to age may be automatically decremented while a weight given to history being a favorite topic may be automatically incremented in Sam's system-stored profile(s).

In FIG. 1C, an example of specification of preferences for chat room properties for a given Domain/topic identified hierarchically as XYz (domain=X, topic=Y, subtopic=z) is shown at column 187. Alternatively, this type of room qualifying rule could have been embedded inside of knowledge-base rules set 195. One of the Domain specific preference settings is the notion of proficiency in the given topic. At the CpCCp level a person's education level might provide an indication of general chat compatibility, but a person's general educational level may not indicate a level of proficiency in specific topic areas. A person may hold a doctorate, in marine biology for example, but he may be a novice at quilting. DsCCp's can allow proficiency levels to be expressed on a per Domain or topic node basis as indicated at 187. A given domain node may have first proficiency preferences attached to it by the user and a subtopic node under that domain may have other (e.g., more stringent) proficiency preferences attached to it by the user. Additionally, in terms of narrowing down on the more likely topics on the user's mind, a given domain node may have first user-preferred keywords or key-phrases associated therewith and stored in the user's root DsCCp while a subtopic node under that domain may have other (e.g., more specific) keywords or key-phrases that are frequently used by the given user (e.g., Sam) and usually intended by the user to refer to that subtopic node. Alternatively, such topic narrowing specifications may be defined by IF/THEN rules in the knowledge-base rules set 195 of the DsCCp. More will be discussed regarding identification of the more likely domains and topics on a user's mind further below. The above discussion was just an introduction as seen from the single user's perspective. In one embodiment, users can query the network to view their personal CpCCp's on a mood by mood basis and their DsCCp's on a topic by topic basis in order to determine if these profiles appear to accurately define the user's preferences and/or other profiled attributes. In one embodiment, domain specific compatibility profiles (DsCCp's) are computer readable data files (each accessible by the corresponding logged-in user and partly modifiable by the respective logged-in user) that provide preference information and likelihood of match information for specific domains and/or topics. Reputations and credentials may be stored in DsCCp's rather than in the CpCCp's.

Figure 2A:
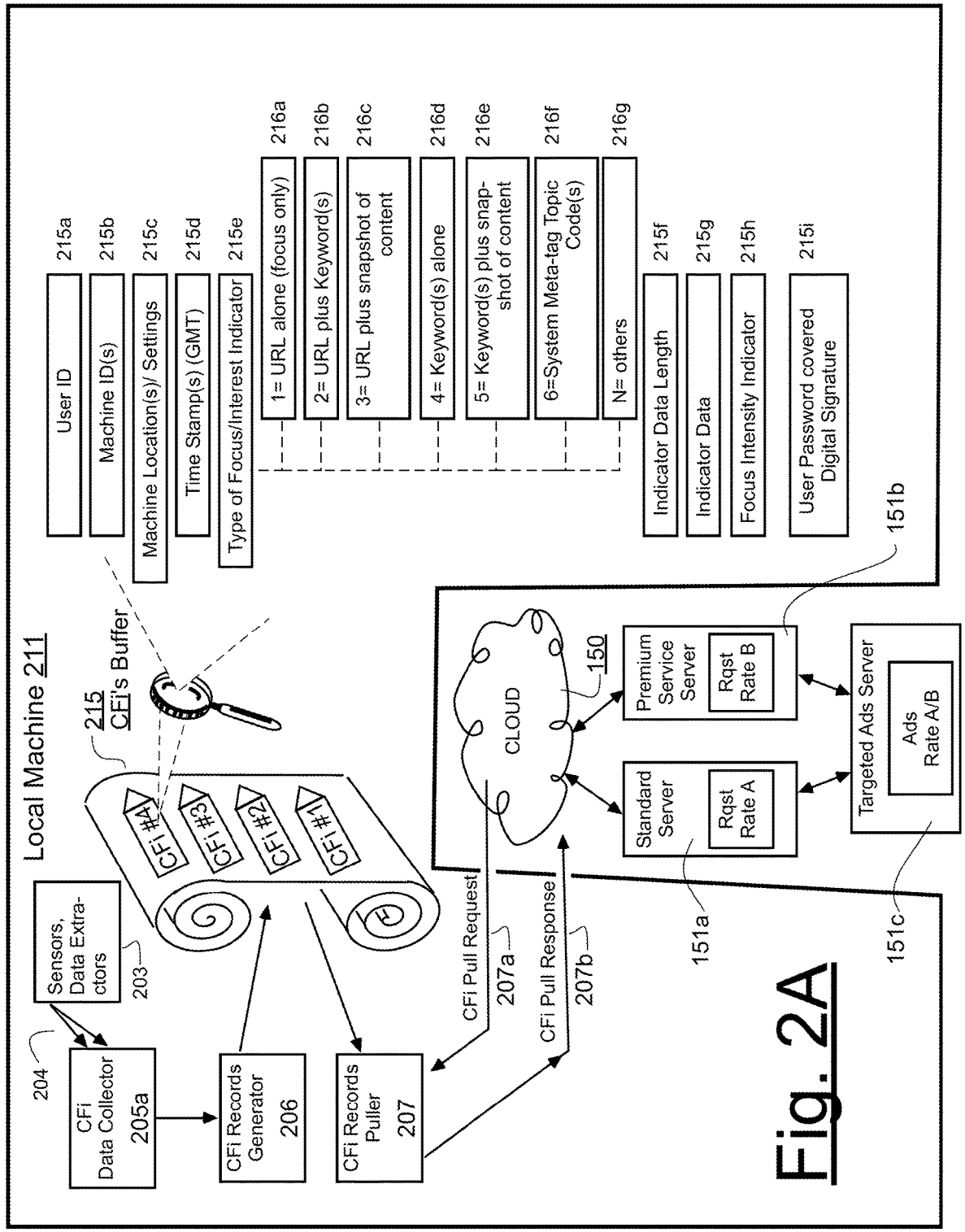
FIG. 2A is a diagram showing a possible data structure for Current focus identifying records (CFi's) generated in a local user's machine.

Referring to FIG. 2A, shown now in more detail is a first mechanism within a local computing machine (client) 211 for managing the transmission of current focus information packets (and current interest hints) to servers within cloud 150. More specifically, machine 211 includes a current focus and interest clues data collector 205a, a current focus identifying records generator 206, a CFi records storing buffer 215, and a CFi records puller 207. The focus clues data collector 205a is operatively coupled by way of one or more couplings 204 (e.g., wired or wireless) to a corresponding set of one or more focus detectors 203. The focus detectors 203 can include sensors such as web cameras, biometric sensors, etc. that sense focus and/or biometric states of the user, and data extractors that extract data indicating for example the identity and/or source content of presentation content being apparently consumed by the user. The focus detectors 203 may also include setting detectors that sense settings of the other sensors such as an aperture setting of a web camera for example. Examples of data that may be extracted by the data extractors include: a URL held in a web browser's target address field, a file name and file access pathway held in a window's source address field, markup source code (e.g., HTML, XML code) used to generate a presented web image, etc. The couplings 204 may be wired or wireless. Data collected by the current focus and interest clues data collector 205a may include current focus detector settings as well as the focus clue data collected by the focus detectors. Examples of settings may include camera angles and web page stylesheets that control how a web page is displayed. The structure of a Current focus identifying packet (CFi) is shown in exploded view for one embodiment in the magnified example. This is just an example and CFi packets in general may be smaller and simpler or larger and more complicated. In the illustrated example, each CFi packet contains a first field 215a identifying the user by a unique username and/or number for example. A second field 215b identifies one of possibly many local sensors or other devices from which focus clues are being obtained in addition to the local machine 211 to which a corresponding invitation is to be sent if the invitation is generated in response to CFi data being sent. In one embodiment, the focus clues providing sensors (e.g., 116) are integrated within the user's primary local machine 211 (e.g., in its housing), in which case the machine ID's field 215b may contain just one machine identification rather than separate ones for the to-be-invited machine and for the focus data supplying device (e.g., 116) It is possible for a single user to be operating multiple machines at a time and therefore it is important to know which devices or machines generated which CFi's and which machine is to receive corresponding invitations. One reason is so that corresponding invitations can be routed back to the correct machine (e.g., 211) among the user's plural active machines. A third field 215c indicates the geographic location(s) of the one or more machines identified in field 215b. Location may be provided by a GPS unit integrated in the user's client machine. Provision of the user's current location may be important for cases where chat opportunity co-compatibility relies on the user's primary local machine being within a given geographic region or specific location or being surrounded by a specific environment. For example, the user may be in a moving car (say driving cross country to that Las Vegas convention of poker players) and the user may want to then chat with geographically nearby other people who are also heading to the same Las Vegas convention. Alternatively, the user may already be at the convention and open to meeting in person with another user who is also there and has one or more topic of current and common interest on mind. Also various sensors may be moving relative to the user or changing their settings over time. Various other clue data extractors may be changing their settings over time. Field 215c may therefore provide not only changed locations data but also changed settings data. In one embodiment, the user's client machine periodically uploads to the cloud, simple CFi's that merely indicate the user's ID (215a) and his or her current GPS determined location (in field 215c). A further field 215d provides one or more current time stamps in terms of Greenwich Mean Time (GMT). By supplying the time stamps for each current focus indicator (CFi) in GMT form, it is possible to quickly match users who are generating common focus indicators in the same global time frame even though they may be located in different geographic areas. Moreover, as mentioned above, it is sometimes desirable to integrate data from a plurality of CFi's that were generated within a specifiable stretch of time; for example so as to link a content related event with a later-in-time emotional reaction to that content. There are at least two different kinds of time stamps that may be stored in field 215d, namely, the time the data was obtained by a corresponding sensor or data extractor and the time the data was recorded by a below described record generator 206. In some instances the delay between the two different kinds of time stamps may be important for determining what weight is to be attributed to the CFi provided data. some data may be stale and thus given a low or null weighting. The CFi data collector 205a alone or in combination with focus detectors 203 may be configured to identify at least one of: (a) a web site from which the focused upon content was obtained; (b) a communications channel from which the focused upon content was obtained; (c) a data file storage location from which the focused upon content was obtained; (d) another resource pathway defined between the user's content presentation device (e.g., 117) and a unique content providing resource and from which the focused upon content was obtained where knowledge of the resource pathway helps to uniquely identify the content itself; and (e) a unique pointer pointing to a unique source from which the first content was obtained where knowledge of the unique pointer helps to uniquely identify the content itself.

The current focus identifier or indicator (CFi) may come in a variety of types. Type of indicator is specified in data field 215e. A number of examples are given although these are non-limiting. It is possible for one CFi packet to contain plural sets of fields like 215e, 216a-216g, 215f-215h all covered by a same time stamp 215d and one digital signature 215i. A current area of focus may be identified by providing only a URL (Universal Resource Locator) for a web page that the current user happens to be looking at. (Or as will be seen in FIG. 3A, it might be another kind of file identifier 320a or a snapshot of content 320b, 320c found in that file or frame.) Alternatively, as partially shown by example 216b, the focus identifier may be the combination of identifying a specific frame in a given URL plus one or more keywords which the user has recently entered into an active search engine (e.g., an open Google.com results window— see 330 of FIG. 3A). Thus this example 216b collects more detailed focus information as well as collecting possible clues for determining or hinting at current topic of interest that is likely to be on the user's mind. Alternatively as shown in example 216c, the focus identifier may be constituted by a URL (or file name) in combination with a snapshot of certain content found inside the page or frame identified by the URL (or file name). The snapshot content may have been automatically selected based on a dwell over or other activity by the user's mouse and/or the user's eyeballs (detected for example by web cam 126 in FIG. 1A) over an area containing the snapshot of certain content or it may have been manually selected by the user is response to a pop-out dialog box (e.g., "Please highlight key passage"). This type of detailed information 216c allows the matchmaking system to better discover exactly what part of the web page or frame or file the user is focusing on and also perhaps the level intensity of focus on that specific part. Yet another identifier of the likely topic of interest may be based on one or more keywords alone that have been entered recently into a recently active search engine window as show at 216d. This information may be parsed and combined with identification of content focused upon as provided by a later supplied CFi. In another alternative 216e, the focus indicator may be defined by a combination of one or more keywords plus a snapshot of results content obtained from a search based on the associated one or more keywords. In yet another example, 216f certain meta-tag codes may have been embedded in an open web page (see also 127b of FIG. 1A) to provide hints (clues) regarding corresponding various topics/subtopics/etc. and/or domains of interest or to directly indicate a specific location in a global hierarchy tree of domains/topics/etc. The utilized meta-tag code or codes and their types (e.g., search engine, hierarchy navigation, etc.) are included in data field 216e of the to be uploaded CFi packet. Box 216g indicates that there can be many other codes beyond 216a-216f for identifying the type of focus indicator plus the associated clues for determining probable topic of interest and/or intensity of interest. Examples 216a-e are merely for purposes of illustration. Aside from identifying focused upon content, a CFi may provide time stamped biometric data that can be associated with content identified by the same or a chronologically nearby CFi.

Because the actual focus and/or topic-of-interest indicating data field (as opposed to its type) may be of varying length or of multiple packets, a data length indicator 215f is provided within each CFi packet for indicating length of a current data field and/or a number of multiple packets or records through which the data field continues and perhaps where the last character is found. In other words, the referenced data field, 215g (which contains the indicator data whose type has been specified in field 215e) may be fully contained in the same single record as length indicator 215f or it (215g) may extend through plural subsequent records or packets. Following this variable length field 215g, is the specified data field 215g. Additionally, one or more biometric data points and/or intensity indictors (along different dimensions, e.g., emotional versus topical) may be provided in following fields such as 215h. In one embodiment, the biometric data points and/or intensity of interest indicator(s) 215h may be each expressed as a whole number selected from a prespecified range, say 1-10, to indicate for example how strongly the user is interested, emotionally or otherwise in the identified topic area (for example the one whose identification and intensity is based on associated mouse activities and/or eyeball activities). Alternatively other forms of measurement for biometric data points and/or level of focus and/or interest indication may be used including positive and negative number ranges expressed in scientific notation form or otherwise. To prevent current focus indicator packets (CFi's) from being spoofed by users or machines other than the ones identified fields 215a, 215b a digital signature 215i covered by a user password (e.g., hashed) may be used to cover one or more of the fields in the CFi packet and to thereby assure its authenticity. The cloud system 150 securely stores the user's password so that generally speaking, only it (and authorized system administrators) and the user know the passwords. When the user logs into her local machine 211, she may be asked to supply the password and this is used to form the digital signature, for example by hashing packet data with the password. In one embodiment, although not shown, the cloud sends a random piece of additional data to the local machine during log-in and this random data is combined during a logged-in session with the password so as to assure that the password cannot be reverse engineered from the digital signature. In one embodiment, the client machine includes face recognition software and/or fingerprint recognition software and/or iris pattern recognition software for identifying the user currently operating the primary likelihood client machine. In one embodiment, the client machine automatically presorts the recent CFi's posted onto buffer 215 according to biometrically or explicitly detected level of interest so that recent CFi's with the highest degree of user expressed or inferred interest are presented closest to the output pointer of the buffer and thus pulled (207b) by the cloud first and given preferential treatment in this way over CFi's that are associated with substantially lower levels of user interest or user engagement with their content.

As the cloud system 150 scales to have larger and larger number of users (e.g., clients), it becomes possible to have millions of client machines (e.g., 211) arbitrarily uploading (e.g., requesting pull up of) their current focus/interest indicators (CFi's) in unsolicited manner into the cloud with the expectation of instant servicing. To avoid this possibility, it is preferable for the cloud 150 to control the rate at which it acquires current focus indicators (CFi's) from different user machines and/or for different domain and/or topic areas. In one embodiment, all current focus indicators (CFi's) generated by the generator 206 of client 211 are stored on a scrolling or circular buffer 215. The cloud 150 does not necessarily pull all new CFi's out of the buffer 215 at one time. Instead, the cloud 150 sends periodic CFi-Pull Requests 207a to records puller 207. (In one embodiment, the CFi-Pull Requests 207a are preceded by the client machine 211 sending a buffer status reporting packet to the cloud 150. Such a buffer status reporting packet (not shown) indicates how much uploadable buffer content is available and its nature. The cloud then responds in a form of a handshake by downloading the CFi-Pull Request 207a.) The CFi-Pull Requests 207a may contain filtering criteria for selectively pulling only those recent CFi's whose time stamps correspond to a certain time span and/or for CFi's whose topic hints correspond to a certain topic area or domain of interest and/or constitute a limited number N of most recent ones of such criteria matching CFi's that are to be pulled. In response, the puller 207 scans the local buffer 215 for CFi records that match the CFi pull request 207a and it uploads via path 207b only the CFi's that match the pull request 207a. In this way, the cloud can control the rate at which current focus/interest indicators (CFi's) are pulled from individual client machines and also it can limit the topic area(s) or other attributes of the selectively pulled CFi packets. In one embodiment, the puller 207 periodically uploads a pinging packet (not shown, sent for example once every 2 minutes) to the cloud 150 indicating "I am here and I want a pull request from you" where the pinging packet identifies local machine 211. If the cloud 150 (and in one embodiment, an AARMS portion of the cloud—described later) does not receive such periodic pings for more than a predefined length of time (say 5 minutes), it assumes that the client machine 211 has been turned off or has gone into an interest_monitor=off mode (see 312 of FIG. 3A) and the cloud 150 then stops sending CFi pull requests 207a to the client machine thus conserving system resources. If and when the client machine 211 later resumes sending "I am here" pings (not shown, but would be over communication channel 207b) to the cloud, it may be necessary for the client machine to reestablish a log-in and/or servicing relation with the cloud because earlier used cloud resources have already been re-allocated to servicing other client machines. This will be detailed when the AARMS portion 411 of FIG. 4A is detailed below.

Within cloud 150 there may be a plurality of different types of CFi pulling servers (or virtual services, not all shown) such as 151a and 151b of FIG. 2A. In the below detailed discussion of the cloud, such CFi pulling services may alternatively be referred to as AARMS, or Remote Activity Monitoring Services 150a. In one embodiment, CFi's of users who do not pay for a premium service are pulled only by a standard pull rate server/service such as 151a where the standard server 151a is allotted a first CFi pull request rate A per user. Pull rate A is lower than one or more premium pull rates B, C, etc. associated with premium services or service servers such as 151b. Both of servers/ services 151a and 151b may forward copies of sampled and/or filtered ones of their pulled CFi records to a targeted advertisement server/service 151c. The targets advertisement server 151c may force users of the system to view corresponding advertisements, or may provide them with an option of viewing a certain number of advertisements at a given advertisement display rate which could be a standard one (A) or a premium one (B) where the premium service has a fewer number of ads per session or fewer other intrusions. Once again, users may be asked to pay for a premium service that offers a lower rate or zero rate of advertisements forced onto the user. The sampled ones of the pulled current focus records (CFi's) inform the targeted advertisement server 151c of the current focus and probable interests of the users from which they are pulled and thus the targeted advertisement server may automatically adapt itself in real time to match the current interests and moods of users to which it is sending its targeted advertisements. Moreover, the targeted advertisement server 151c may control the filters used in pull requests 207a that are sent by the cloud 150 to different ones of the users. Accordingly, the targeted advertisement server 151c may control the rate at which different kinds of users that are of interest to the advertisement sponsors are invited to different chat rooms, perhaps inviting users who are considered to be premium potential customers to premium chat rooms while sending other users to chat rooms that are not as well supported by the advertisement sponsors.

Figure 2B:
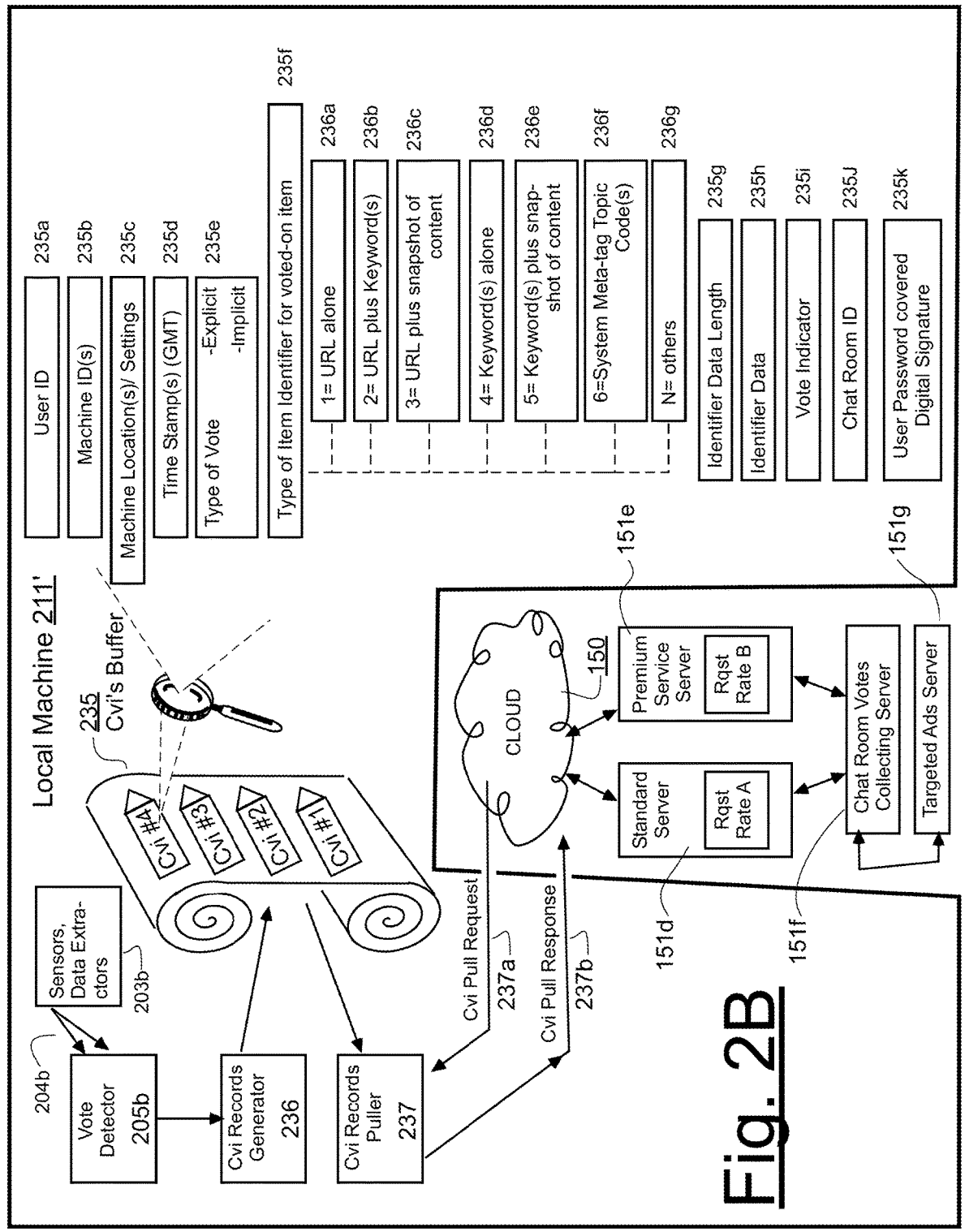
FIG. 2B is a diagram showing a possible data structure for Current vote indicating records (Cvi's) generated in a local user's machine.

FIG. 2B is fairly similar to that of FIG. 2A except that here the local machine buffer 235 is collecting current vote indicators (Cvi's) rather than current focus indicators (CFi's). Vote indicators are generated while the user is interacting with a specific chat room (or other online real time forum) and is voting either explicitly or implicitly on the content found within that chat room. For example, the user may indicate pleasure or displeasure regarding other persons who have joined the chat room and/or regarding the contributions that these other persons make to the chat room. The explicitly or implicitly expressed vote may be accompanied by exhibition of strong or weak emotional reaction (as indicated for example by biometric data). The vote detector 205$b$ picks up both explicit votes and implicit or inferred votes as well as possible emotional feelings and strength of feelings underlying those votes. Sensors 203$b$ (which may be the same as sensors 203 of FIG. 2A) provide vote indicating signals to detector 205$b$ by way of signal supplying paths 204$b$ (which may be the same as paths 204 of FIG. 2A). As mentioned above, inferred votes are those that can be acquired by gestures, vocal noises, or other body language of the user rather than from explicit user indications. A Cvi records generator 236 converts the outputs of the vote detector 205$b$ into corresponding current vote indicating and forum identifying packets. An example of the data structure of a Cvi packet is shown in the magnification to the right. Each Cvi includes a user identification field 235$a$. Additionally there may be a machine identification field 235$b$, a machine location field 235$c$, a time stamp field (in GMT format) 235$d$. Moreover the type of vote is indicated in field 235$e$ as being explicit or implicit. When a vote is provided, it is associated with a specific item (e.g., chat room and/or chat room participant and/or chat room proposal) that is being voted on. Different types of item identifiers may be used for the voted-on items as is indicated by field 235$f$. The voted on item may be identified by URL alone of the associated chat room or other online forum (field 236$a$) or by the combination of URL (or other unique page or frame identifier plus keywords (field 236$b$) or by URL in combination with a snapshot of some content (field 236$c$) or by one or more keywords (e.g., including chat room name) given alone (field 236$d$) or by combination of one or more keywords plus a snapshot of certain content (field 236$e$) or by system issued meta tag codes (236$f$). Moreover the given list of focus and/or interest indicating types is non-limiting and as indicated by the "others" code field 236$g$ which allows for numerous other type of identifier codes including sending of emotional strength indicators and/or original biometric data at the same time or a later time after the vote indicator is stored into buffer 235. As in FIG. 2B, a data length field 235$g$ is provided for the identifier and the actual identifier data is provided in field 235$h$. Field 235$i$ holds the vote indicator. The vote indicator may vary for example in one embodiment it may be a whole number in the range of 1 to 10. Alternatively, it may be a whole number in the range of −10 to +10. Alternatively, it may be a real number in a very large range spanning from negative to positive. An additional one or more fields (not shown) may be included for specifying the voter's likes or dislikes. Examples of such vote specifying data may include: (a) I object to other user's behavior by this voting degree . . . ; (b) I am indicating that I consider the other user to be overly argumentative to this voted degree . . . ; (c) I am indicating that I consider the other user to be of an agreeable personality or reputation or credibility to this voted degree . . . ; (d) I am indicating that I consider the other user's arguments to not be fact based to this voted on degree . . . ; (e) I am indicating that I consider the other user's credentials to be valid (positive) or invalid (negative) to this voted on degree . . . ; (f) I am indicating that I wish to add to or detract from this other user's reputation by the following approving (positive) or disapproving (negative) amount . . . ; (g) I am indicating that I wish to vote on the following pending room proposals (e.g., migrate the room to a new node) as follows . . . ; and so on. Thus votes with various degrees of resolution and objectives may be registered with the system as desired. In one embodiment, the local client machine sorts vote indicating records (Cvi's) according to intensity of emotion associated with the vote so that the Cvi's having relatively strongest emotional feelings (or corresponding biometric data) associated with them will tend to be pulled (uploaded) by the cloud and processed by the cloud first.

Field 235J may contain a system recognized unique identification code for specifying the chat room (or other online forum) whose contents or participants are being voted on. Not all chat rooms necessarily have such a system recognized unique identification code fitting into field 235J (e.g., the topic node ID plus chat room number under that node) which is why URL or other identifications may be provided in fields 236$a$-236$f$. Once again, as in the case of CFi's, a user password plus random session number may be used to form a digital signature that covers the Cvi content and this prevents vote spoofing. The entire voting record (Cvi) may be covered by appropriate encryption when transmitted over an untrusted or public channel.

In order to control resource bandwidth usage and allow for scaling, the cloud system 150 controls the rate at which Cvi records are pulled from each of the local machines 211'. Accordingly, Cvi pull requests 237$a$ are sent from cloud 150 to the Cvi records puller 237 of local machine 211'. The Cvi records puller 237 responsively returns the requested type of current vote indicator record(s) 237$b$ to the cloud. In one embodiment, the Cvi records puller 237 routinely pings the cloud to let the cloud know that the local user is still engaged with one or more system associated chat rooms and is thus probably casting implicit or explicit votes regarding those chat rooms. In one embodiment, these pings come in the form of Cvi buffer status packets that report on the status of buffer 235, its size and nature of data stored therein. If the pings stop for more than a predefined stretch of time, the cloud can interpret that as the user having shut off his client machine or disengaged the monitoring function and the cloud stops trying to pull Cvi's from the Cvi buffer 235. Once again, the cloud may include standard and premium service servers 151$d$ and 151$e$ which provides Cvi pull requests at different rates depending on whether the user is using a standard service or pays for a premium service. The pulled Cvi responses 237$b$ are forwarded to a chat room vote collecting server 151$f$. This server 151$f$ sorts through the various votes and allocates them to various users or chat room content as indicated by the content of the pulled Cvi. Contributors who receive consistent thumbs up (positive votes) from other users in a given chat room generally have their corresponding reputations incremented. Conversely chat room contributors who have their contributions consistently voted down by other users receive negative scores and thus receive decreased reputations in the CpCCp "mine" records. Additionally, the content contributed by the various users may receive positive or negative votes and these votes are further accumulated. In one embodiment, the vote results are sent to a targeted advertisement server 151$g$ which uses the collected information to better gauge how users are behaving relative to their viewing of various topics at the current time. In response, the advertisers may automatically or manually adjust their advertisements strategy and/or their offered product mix accordingly.

A complex set of operations may occur in the cloud 150 between the time that CFi's and/or CVi's are pulled and invitations come back or other responsive activities take place (e.g., automated bifurcation of a chat room to thus separate warring participants). Just briefly and with reference to FIG. 1A, the AARMS services 150*a* collect and initially process the pulled CFi's and Cvi's. The AARMS services 150*a* may parse data embedded in the CFi's and Cvi's and group the parsed data according to rules provided by the user's PEEP records (e.g., 199 of FIG. 1E). The AARMS services 150*a* may prioritize parsed and re-grouped CFi and Cvi data according to intensity of emotions associated with that data and/or according to other prioritizing criteria (e.g., whether the user is premium service subscriber or not) and then hand off the prioritized data groups to one or more domain lookup (DLUX services 150*b*) or other services (e.g., vote processing services) which then try to determine what specific topic or issue the respective content browsing or voting user has on his or her mind when respectively focusing on non-chat content or voting on inn-chat content. Based on various lookup rules (e.g., 195 of FIG. 1C), the DLUX services 150*b* make statistically-based automated determinations (automated best guesses) as to what is more likely to be on the user's mind when showing focus on non-chat content or voting on inn-chat content. The DLUX processed data is then forwarded to another service after best guesses are formulated as to what is more likely to be on the user's mind. In the case where the system is expected to download invitations to the user for chat rooms whose current topic substantially matches the most likely current topics on the user's mind, the DLUX processed data is then forwarded to the Match-making services 150*c*. The Match-making services 150*c* use one or both of recently pulled CFi's, Cvi's and domain/topic assignments provided by the DLUX services 150*b* and the user's CpCCp to find co-compatible chat rooms. Corresponding invitations are then generated and sent to respective invitees. If a user votes negatively as to a whole of a chat room, that may be taken as feedback that the match-making system did not match the user to the correct room.

Figure 2C:
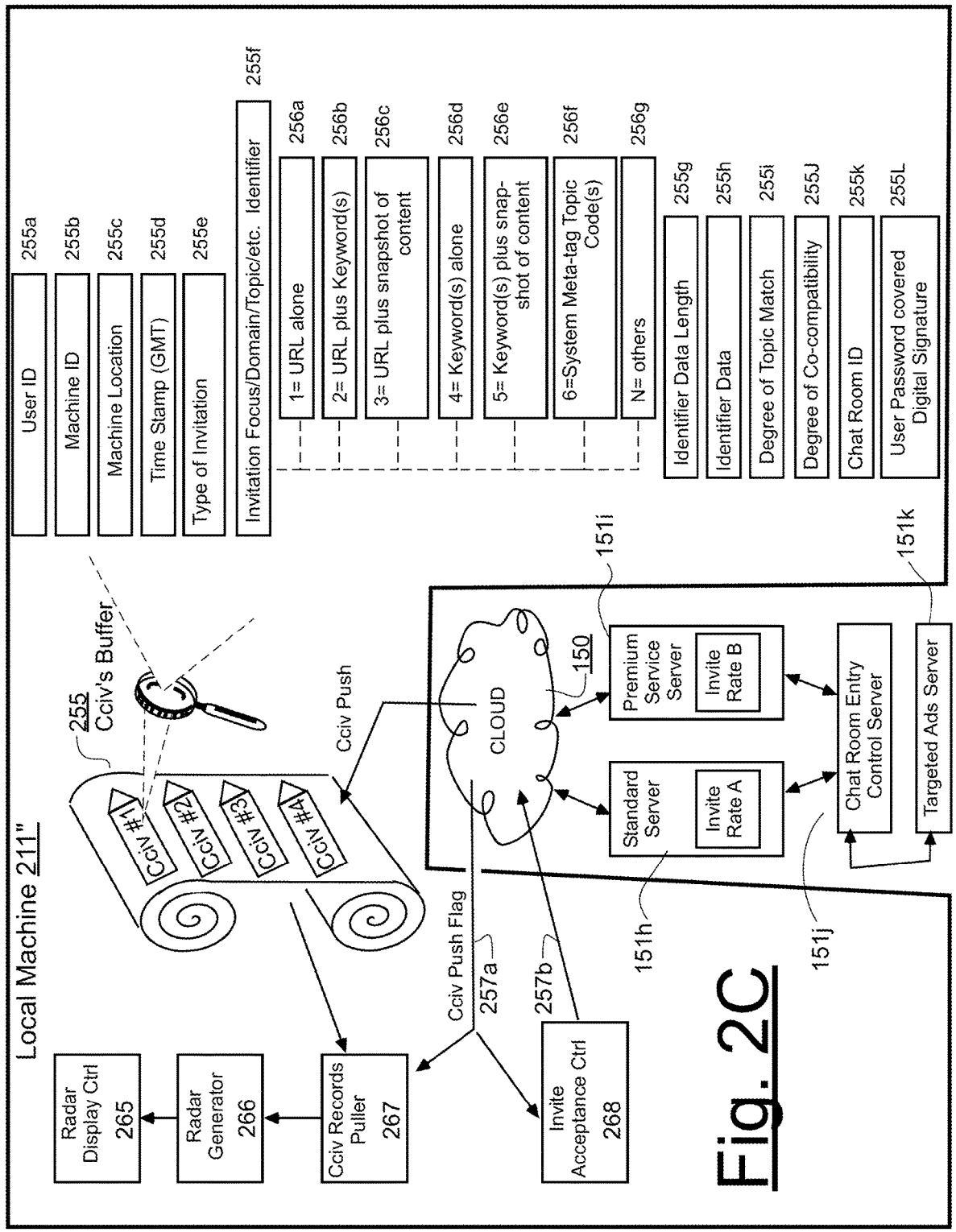
FIG. 2C is a diagram showing a possible data structure for Current chat invitation records (Cciv's) received by a local user's machine.

Referring to FIG. 2C, invitations (Cciv's) to join a chat room are pushed from the cloud to targeted client machines like 211". Pushed Cciv's are stored into circular or scrolling buffer 255. At the same time a push flag is sent to an invitation records puller 267 in the local machine. Depending on how busy the local machine 211" is with higher priority tasks or not, the invitations puller 267 may elect to forward one or more of the recently received and buffered Cciv's (255) to a radar-like display generator 266 or not. In one embodiment, if the user has set an activities monitoring switch to an OFF state, then no new Cciv's are displayed through the radar generating and displaying system 266-265. In one embodiment, the invitation records puller 267 includes an invitations and suggestions rater and sorter that sorts invitations and suggestions according to one or more criteria including how on-topic the received invitations/suggestions appear to be relative to a topic that the user appears to currently have on his or her mind, according to how aged the invitations and suggestions are relative to when corresponding CFi data was sent out and/or according to how quickly acceptance by the user is needed for the received invitations/suggestions before they become stale (e.g., before a chat room closes because its maximum population quota has been reached). The invitations and suggestions rater and sorter (267) then assigns respective stronger and weaker recommendation ratings to the sorted invitations (e.g., to chat rooms) and suggestions (to other on-topic content). The radar display system may include display format control modules 265 by way of which the local user and/or a supervising system controls the format and/or other attributes of her on-screen invitations displaying radar. In one embodiment (see briefly FIG. 3B), the display format control module 265 may include display format controls for presenting the user with recommendations for additional on-topic content as a supplement to, or independent of invitations presented to the user that link to on-topic chat rooms. In one embodiment, the displayed radar may take the form shown in FIG. 1D. In an alternate embodiment, the displayed radar may take the linear banner form 315 shown in FIG. 3A. In yet another alternate embodiment, the displayed radar may be of hybrid form between the two where plural U-shaped flows of invitation-representing bubbles converge at a location where the closed ends of the U-shapes meet or almost meet and where one symmetrical half of each U-shaped flow represents incoming invitations that moving closer into agreement with the user's current focus while the other half of each U-shaped flow represents diverging invitations whose corresponding chat rooms appear to be currently moving apart from correlation with the user's current focus. If new Cciv's are displayed through the radar generating and displaying system 266-265, then the user may elect to ignore them or accept one or more or more of the invitations. Invitation acceptance and/or rejection/ignore activities by the local user are monitored by a local invitation acceptance control unit 268. Unit 268 may keep track of how long it takes for the user to spot an invitation, explore its details and then optionally accept it or instead expressly reject it or choose to ignore it. Unit 268 may also keep track of how long the local user stays in each chat room and how aggressively the user participates in the ongoing chat transactions. The corresponding invitation handling information 257*b* may be sent back to the cloud 150 for further processing for example by standard or premium services servers (virtual servers or real servers) 151*h* and 151*i*. If the returned response 257*b* included an acceptance, a corresponding chat room entry service 151*j* is activated for opening a chat room window or frame on the user's machine 211". In one embodiment, service 151*j* causes a download of executable instructions (e.g., a java script) to be sent to the client machine (e.g., by way of a supervising AARMS) which executable instruction signals, when received and accepted, cause the chat room window or frame to open on the user's screen. Additionally, invitation handling information 257*b* may be forwarded to a targeted advertisement service 151*k* that process the user's invitation acceptance and/or rejection/ignore activities and thereby automatically determines what advertisements may be optimally targeted to the given user and at what frequency and/or what product mix may be optimally advertised to the user. Similar to the cases of FIGS. 2A and 2B, the standard and premium services/servers 151*h*-151*i* of FIG. 2C provide different rates of pushed out invitations and/or forced advertisements depending on what compensation if any is provided by the user.

An example of a possible invitation record data structure is shown at 255*a*-255*k*. Similar to the cases of FIGS. 2A and 2B, the top entries 255*a*-255*d* respectively provide user ID data, machine ID data, machine location data, and invitation time stamping data (time the invitation is issued). Entry 255*e* denotes the type of invitation. There can be different kinds including for example high priority and low priority ones, invitations to relatively public chat rooms and invitations to relatively closed rooms (or to other online and/or real time forums); rooms logged under specific hierarchy nodes of the system (see FIG. 4B) and those that are not. The local radar generating and displaying system 266-265 may optionally and responsively display the different kinds of invitations differently (e.g., with flashing red border for high priority ones, etc.) if the user indicates a desire for such intrusive alerts by user settings made in the radar display control module 265.

The focus/domain/topic identifier field 255f may denote which one or more focal areas of the user's screen content and/or which domain and/or topic/subtopic the incoming invitation (Cciv 257a) is directed to. As was the case with FIGS. 2A and 2B, there can be many different ways to provide this information. Included among the possibilities are those of entries 256a-256f whose counterparts have been discussed above. In the case of keywords and/or meta-tags, the corresponding content areas (if still on screen) may become highlighted in yellow or by some other means when the user floats an on-screen cursor (via mouse and/or eyeball movement) over the invitation. The content pinpointing information of entry types such as 256b, 256c, 256e, 256f, etc. may be used for determining what on-screen content should be highlighted or otherwise flagged to show relationship to the user. In one embodiment, the focus/domain/topic identifier field 255f or another field added into Cciv #1, stores and provides information about the chat room subject matter that would help the user decide whether or not to accept the invitation. This type of subject matter data may include the predefined domain/topic node names and node descriptions, and/or the chat room name and description assigned by the chat room members, or associated interest domain and topic coefficients as well as their user co-compatibility coefficients. In one embodiment, the focus/domain/topic identifier field 255f or another field added into Cciv #1, stores and provides reminder information that reminds the user (by briefly projecting it or highlighting it) what content caused the invitation to be sent. In one embodiment, this additional information is displayed in the "informational balloon" such as 117b of FIG. 1D.

As was the case with FIGS. 2A and 2B, entry 255g indicates the length of the invitation focus/topic identifier, entry 255h provides the focus/topic identifier data. Entry 255i indicates a degree of topic/subtopic match between the local user and the chat room to which the Cciv is providing an invitation. Not all users will be found to be probably focusing on exactly the same topic/subtopic/etc. of the given chat room. However, the invitation generating services/servers 151h-151i may nonetheless have elected to send an invitation to the user with an indication 255i of how far apart the user is from the chat room topic/subtopic/etc. hierarchy. The closeness of match indication 255i may be used to determined how the invitation is displayed on the user's invitation radar (e.g., that of FIG. 1D or FIG. 3A).

Similarly, entry 255J indicates the degree of chat co-compatibility between the user and the cumulative attributes of the invited-to chat room. Not all users will be found to be exactly co-compatible with existing or to-be-formed chat rooms. However, the invitation generating services/servers 151h-151i may nonetheless have elected to send an invitation to the user with an indication 255J of how far apart the user's preferences are for an ideal chat room as opposed to the cumulative attributes (e.g., average chat partner education, age, etc.) of the actual chat room for which the invitation is directed. The degree of co-compatibility indication 255J may be used to determine how the invitation is displayed on the user's invitation radar (e.g., that of FIG. 1D or FIG. 3A). In one embodiment, different aspects of co-compatibility may be separately graded and indicated to the user, namely, degree of personality co-compatibility, degree of topic co-compatibility and degree of topic proficiency co-compatibility. Entry 255k provides a system recognized unique room ID so that if and when the user accepts the invitation, unit 268 can return a response indicating which room the invitation is being accepted for. Entry 255L provides a password covered digital signature from the invitation generating services/servers 151h-151i so that rogue servers cannot easily spoof at being invitation servers.

Figure 3A:
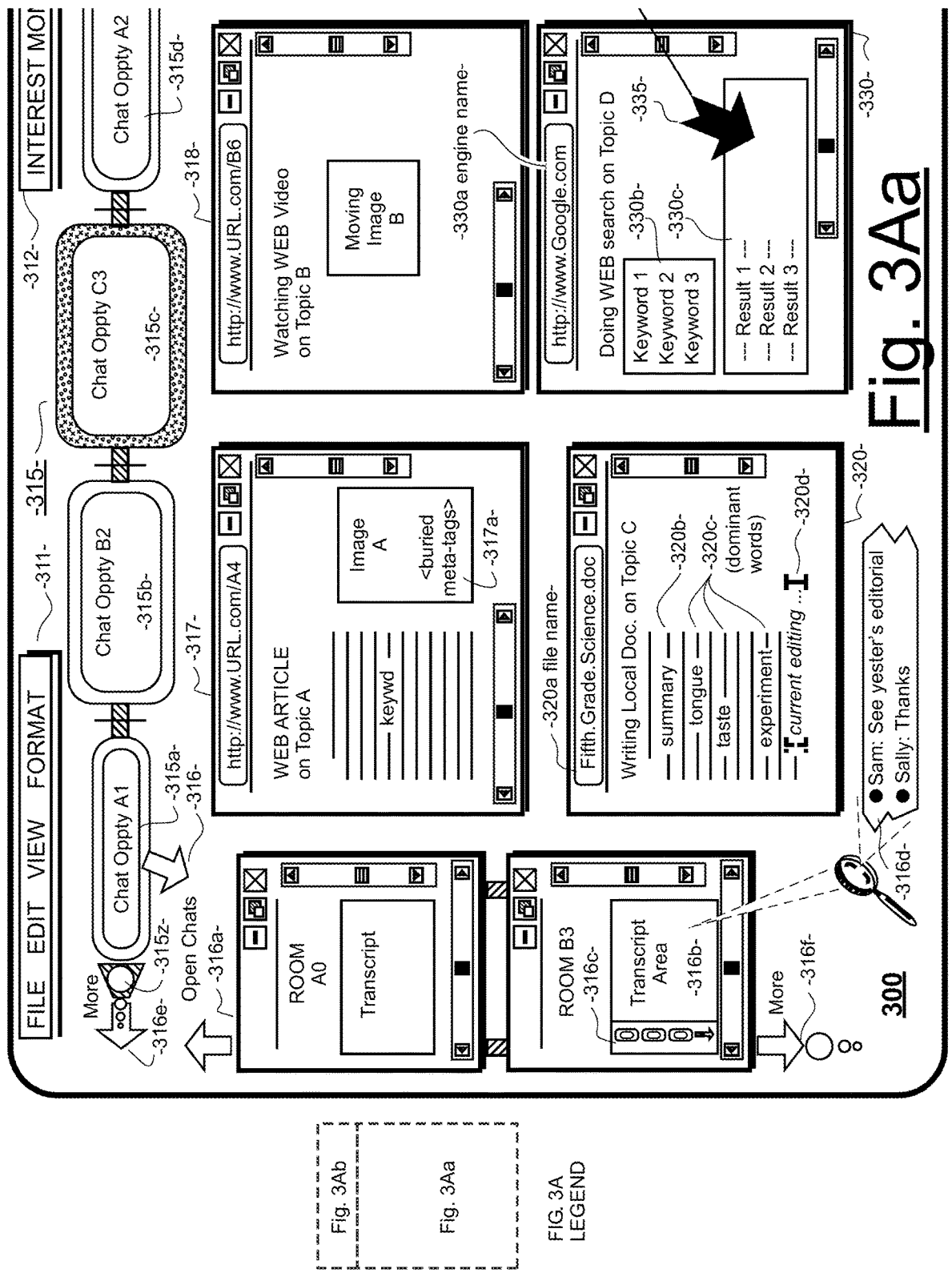
FIG. 3A is a composite of partitions 3Aa and 3Ab per the legend provided in partition 3Aa and all references herein to said FIG. 3A are understood to refer to said respective composite which provides a diagram showing a possible structure of a client machine screen where the screen displays invitations and allows the user to enter by-invitation-only chat rooms as desired.

FIG. 3A is a plan view of an exemplary user screen or user window 300 provided in accordance with the disclosure on a user's client computer machine (e.g., 115 of FIG. 1A). The displayed content of screen 300 may provide one or more conventional control menus such as 311 for controlling file retrieval, controlling file saving, for editing file content and so forth. (Reference numbers like 311 do not appear on the screen and are embraced in hyphens, e.g., -311- to indicate this.) Additionally, the display 300 may include at least one interest-monitoring control menu such as that illustrated at 312. The interest-monitoring control menu 312 may include a current monitoring status (e.g., "=ON") which indicates whether benign spying is ongoing within a corresponding window or whether such spying activity is currently turned off. The user may toggle the state of the flag between on and off as desired for example by clicking with the mouse when cursor 335 is over the flag area 312. In one embodiment, the "=ON" flag slowly flashes as a dim orange graphic to remind the user that monitoring is currently turned on.

By way of more specificity, user editing and/or saving functions enabled by the file control menus 311 may include menu options for performing invitation system related actions such as changing passwords, updating account subscription levels, entering or changing demographic information (e.g., user indicates he moved to a new address, his income level has changed, etc.), or entering preference data change requests (e.g., user indicates he no longer wants to chat with people under 25 years old). These invitation system related menu options under 311 (specific options not individually shown) would be saved locally in one embodiment and then uploaded to a cloud server when bandwidth opportunistically becomes available for such uploads of account changing data. The altered account settings would then be reflected back from the in-cloud server to multiple client computers of the user. Thus universal changes to account settings can be made from any user client machine. In one embodiment, an email is sent to a user selected email account informing of the account setting changes. In one embodiment, menu options for modifying account settings and/or profile preferences are provided as task orientated and context triggered options rather than as universal file orientated options. For example, a menu option for updating a list of other users whom the client likes or dislikes may be automatically provided in an instant messenger window under a simple "buddy list" menu entry. When the user adds, deletes or changes the local list, the changes are saved and uploaded to the cloud so as to become universal changes under that client's account settings.

In a menu bar area directly below menu bars 311 and 312, a chat opportunities banner or marquee 315 may be scrolling through. In an alternate embodiments, the opportunities banner 315 may appear along any one or more of a bottom, left or right side edge of the screen or as a pop-out menu bar that pops out only when the user moves cursor 335 to such an edge. The items in the illustrated banner area 315 may scroll for example from right to left to indicate chronological ordering, where items on the left side of the screen (e.g., shrinking bubbles 315z) disappear after crossing beyond the edge and new items (e.g., enlarging bubbles 315e) appear to emerge from the right edge of the screen. In an alternate embodiment, items (e.g., 315c) that are drifting towards and/or are positioned near the middle of the banner area represent the most important (most highly scored in terms of topic and chat co-compatibility) among the most recent invitations while less important and/or older items (e.g., 315a, 315z) are displayed as reduced in size, shrinking and moving off the end of the banner, this indicating they no longer correspond to the user's current area of focus in terms of content and/or topic of interest. In yet another embodiment (mentioned above) plural U-shaped-like flows (with possible short circuiting tributary flows between symmetrical halves of the U-shapes) may converge from edges of the screen or a window towards a central area such as 315c. The scrolling-in-and-through-and-out opportunity icons or items 315z, 315a-315d, 315e represent respective invitations into different chat rooms, otherwise referred to here as chat opportunities. Each invitational icon (e.g. 315a) may have respective internal text, a background color and/or foreground graphics at its center for indicating the topic or domain to which it applies and/or the urgency or importance of the invitation. In one embodiment (although not all shown), the opportunity icons transform from incoming opportunity bubbles (315e) into animated cartoon or other faces which grow in size, agitation and/or opaqueness as they drift towards the banner area representing greatest importance, current relevancy or urgency of the invitation and then the animating faces (e.g., talking heads not shown) drift outwardly again and shrink back into aged bubbles (315z) that finally drift off screen.

If the user hovers a mouse cursor (e.g. 316) over one of the slowly scrolling-by chat opportunities (e.g., 315a) for a predefined length of time (dwell time, challenge time) or clicks on it, then a corresponding and more detailed informational window opens up (e.g., and informational balloon, not shown) which provides the user with more detailed information about the domain and topic of the given chat opportunity (e.g., 315a). In one embodiment, the more detailed informational window appears as a semi-transparent window hovering over one of the already open content windows such as 317. This indicates that the challenged chat opportunity (e.g., 315a) corresponds to content found in window 317. In one embodiment, one or more keywords related to the challenged chat opportunity (e.g., 315a) glow or otherwise become prominent to indicate they are especially related to the currently challenged chat opportunity. In the illustrated examples open window 317 provides a frame of content obtained from a remote or local URL (universal resource locater) denoted as www.URL.com/A4. If the cursor-challenged chat opportunity 315a corresponds to specific content within open window 317, then in an alternate embodiment, the border of the corresponding window 317 glows or changes color or flashes and/or specific content within that window 317 becomes enlarged and/or bolded to thereby indicate the correlation between that specific content and the challenged opportunity. Additionally or alternatively certain keywords or images within open window 317 may become temporarily underlined and/or highlighted in a different color as the user moves his cursor mouse 316 challengingly over the scrolling-by and interrelated chat opportunity (e.g., 315a). In each of these cases, the temporarily highlighted window and/or temporarily highlighted content within one or more of the open windows (e.g., 317, 318, etc.) indicates to the user how the chat opportunity (e.g. 315a) corresponds to those already opened content frames or windows on his display 300 and/or to content within those one or more windows. In one embodiment, the vise versa is also true; namely, if a user right clicks on or otherwise highlights content (and optionally picks a show invitations option), the corresponding invitations in the invitations display area 315 glow or otherwise make their identity known to the user.

If instead of hovering or once clicking, the user double left clicks his mouse 316 over the available chat opportunity (e.g. 315a) then a new chat room window such as 316a opens up along an alternate side edge (e.g., left) of the screen. Of course, in the same or other embodiments, the user can use other pointing devices and/or hand gestures and/or voice commands to effect the opening of a chat room window based on an offered chat opportunity. The newly opened frame 316a may include room identification indicia (e.g., "Room A0") as well as an interior frame showing a transcript of the latest conversations occurring in substantially real time within that room (A0). For example, it is seen at 316d that Sam and Sally are conversing in essentially real time in room B3 about something in yesterday's newspaper editorial. The local user can then quickly review the content of what is currently occurring in the newly displayed rooms (A0 and/or B3) and decide for himself whether to keep that chat room window open on his screen or to close it down. If the user quickly shuts down the just-opened chat room window (e.g., A0), then this event is reported by the local activities monitor (LAMS 105x) to the remote match-making and invitations-generating system (MM-IGS) and appropriate services within the remote cloud take that event as a negative vote against the offered chat room invitation 315a, this perhaps indicating to the remote matching service that the match-making part of the service guessed wrong as to what topic the user was thinking about and was interested in chatting about. On the other hand, if the user leaves open the just-opened chat room(s) (e.g., A0, B3) for relatively long times and/or begins to actively scroll through the transcript and/or begins to contribute to transcript content (316d) in one or more of them, then these respective local activities are interpreted as affirming to the remote cloud, at respective progressive levels of increased confidence that the remote matching service had guessed correctly as to the user's interest in the topic of this particular chat room and as to the user's co-compatibility with this particular chat room. Room scrolling arrows such as down pointing 316f and the up pointing one below 316e may be used to review newer or older opened rooms. Both negative and affirmative responses to challenged or newly opened chat rooms (or challenged older and re-reviewed rooms) are used by the remote matching service as feedback information for actively learning about the user's preferences and to adaptively adjusting the user's preference records (e.g. DsCCp's) accordingly. Additionally, biometric data collected from the user at the time he challenges or first opens and exams a chat room can be used by the remote matching service as feedback information for actively learning about the user's preferences.

In one embodiment, after a given chat room transcript window (e.g. 316b) has been open for a relatively long predetermined time, a new scrolling side band such as 316c appears adjacent to that transcript window 316b. The icons of scrolling band 316c represent chat opportunity offers made from inside of the already opened chat room 316b. In this case the chat opportunities 316c are those that are more closely related to the content inside of transcript 316b and, as in the case of the main screen scrolling banner 315, the user may mouse over and click challenge (or otherwise challenge) one of the icons in scrolling banner 316c to learn more details about its content. Alternatively, if the user is annoyed by the presence of in-room opportunity banner 316c, the user may click on a menu-provided control which removes scrolling banner 316c from window from 316b. In one embodiment, the in-room opportunity banner 316c is not displayed until the system detects (from biometric data) that the user is showing fading interest in the currently open chat room 316b, at which point the inn-chat invites banner 316c automatically opens to show potentially better opportunities. Additionally in one embodiment, the user may explicitly request opening of the inn-chat invites banner 316c by activating an appropriate menu option. Each of these various user actions (e.g., close inn-chat invites banner 316c, explicitly open same, etc.) may be flagged by the LAMS 105x to the remote matching service 150c to indicate that the scrolling banner was respectively annoying in one case to the user and that user prefers not to have it offered at least in the same context or that the scrolling banner was respectively desired by the user and that user prefers to have it offered at least in the same context. The remote matchmaking and invitations-generating system (MM-IGS) takes note of this behavior, optionally changes in-system knowledge-base rules stored for the user, and adapts accordingly. One of the adaptations may be to increase the length of time before a chat-room internal banner such as 316c is offered to the user. Another possible adaptive behavior is to ask the user whether he no longer wants to be offered such in chat room invitations to interrelated other chat rooms either for the specific topic area or domain or for all domains. Alternatively, the user may elect to shrink and hide the side banner 316c just along a side edge of chat window 316b and to have it responsively pop out when he mouses over to that extreme side. Just as inn-chat room window banners like 316c can be hidden from the user at the user's request, the main on-screen invitation banner 315 can also be temporarily hidden from the user's view when the user no longer wants to see it and it can be brought back when the user is ready to see it again. In one embodiment, when the user hides his banner 315, a message is automatically uploaded to the MM-IGS to temporarily halt the match-making and invitations-generating services for this user. In one embodiment, when main banner 315 is minimized for hiding, it shrinks into a small blinking dot at the top or side edge of the screen 300. The user can double click on this blinking dot to reinstate the full and moving scroll banner 315. At that point, the local client machine automatically signals the MM-IGS to resume the temporarily halt match-making and invitations-generating services for this user. Aside from mouse actions for invoking shrinkage-and-hide or expansion-and-resumption of invitations-representing banners such as 315 and 316c, in one embodiment, the user can use keyboard shortcuts, voice commands and/or hand or other gestures that his local machine has been trained to recognize as commands for the desired banner shrink and expand operations. Accordingly, the user may reclaim his screen space for primary functions at times of the user's choosing and de-collapse the minimized banner at other times. Workload for the remote match-making services may be automatically reduced at times when the user cannot see his invitations-providing banner. However, CFi's may continue to be uploaded to the cloud for purpose of learning about the user's current areas of interest (provided interest_monitoring 312 is left turned on). The software and/or hardware for causing the user's local machine (e.g., 115) and the in-cloud remote services 150 to automatically carry out respective ones of these various actions are of course provided in respective hardware and/or software resources provided in each as appropriate, where this will be understood by skilled artisans in the relevant useful arts after reading this disclosure.

In addition to providing a scrolling-through display of a handful of current chat opportunities 315a-315d, each opportunities offering banner such as 315, 316c may include chronological "more" arrows such as 316e and 315f at one or both of their extreme ends. An old side "more" arrow such as 316e allows the user to recall and enlarge older items (e.g., 315z) that had shrunk and/or passed out of sight beyond the left edge. (In one embodiment, arrow 316e points to the right rather than left.) A newer side "more" arrow such as 315f allows the user to indicate to the opportunity displaying services (local and/or remote) that the user currently wants the banner 315 to advance more rapidly so that the user is provided with a greater number of new invitations (315e) per unit of time. There can also be a "less" arrow such as 315g whereby the user flags that he currently wants the banner 315 to advance less rapidly or for new invitations (315e) to stream in more slowly. In one embodiment, if the user is not subscribed as a premium user, pressing the newer side "more" arrow such as 315f will automatically bring up an advertisement message such as one telling the user that he or she must subscribe to a premium service in order to be able to use the "more newer" invitations feature 315f.

Icons within the scrolling banner 315 may be differently sized (e.g., proportionally sized) to indicate the degree of topic matching and/or chat personality co-compatibility for chat rooms which the remote service has found. Or the degree may be explicitly indicated as an attached number or meter scale. For example, illustrated chat opportunity 315c may be relatively larger sized and/or differently colored on its border to indicate that this is probably a chat opportunity of more intense interest to the given user at this time than others of the chat opportunities 315a-315b, 315d scrolling along the marquee 315. The displayed chat opportunities 315a-315d may apply to a same chat topic or to different chat topics and/or different domains. The respective chat topics may be indicated by bubble-internal text or bubble-internal graphics and/or by color coding of the surrounding border of each one of radar-like blips 315z, 315a-315d, 315e. In one embodiment, each user may specify through a local display control (e.g. 265 of FIG. 2C) the various ways in which the chat opportunity banners e.g. 315, 316c are to indicate their respective chat topics as well as closeness of co-compatibility and topic sameness. As mentioned above, in one embodiment, user reactions to items inside the invitations displaying banner or radar scope are not reported by uploaded CFi's. Additionally, if the user is detected to be busy focusing upon a currently open chat room, then portions of the benign spyware directed to reporting on out-of-chat activities (e.g., CFi generation) may be temporarily put into hibernate mode. Also, the local client machine may temporarily stop pinging the cloud for new invitations (invitations based on out-of-chat content) while the user is detected as being currently occupied with one or more chat rooms.

FIG. 3A also shows that various mechanisms may be present on the user's display 300 for indicating focus of attention on different kinds of content providers and on different topics. For example the open browser window 317 contains an HTML-coded (or XML-coded) web article related to a topic named, A. The local activities monitor (LAMS 105x of FIG. 1A) may detect that the user's eyeballs (more specifically, his pupils) are pointed at and thus presumed to be concentrating on certain words or subareas within window 317. The focused upon words or snapshots of the focused upon areas may be included in the CFi packets sent to the remote server in relation to window 317. Alternatively or additionally, unseen meta-tags 317a that are buried in the source code (e.g., HTML, XML) of those focused upon content areas may be included in the CFi packets sent to the remote server.

Meta-tags 317a that are generally hidden form the user's view (but may be seen in most instances by viewing the underlying mark-up code, i.e. HTML, XML) can come in a variety of types. Examples of possible codes or tags include search-engine assisting/attention-getting codes, popularity engine tag or subject-matter categorizing codes, and hierarchy navigation codes. Search-engine assisting/attention-getting meta-codes or meta-tags can be of the type that web content authors embed in their web source code to direct search engine searches or social networking services to the given content (or to draw attention of the same to the given page) based on search words (e.g., keywords) that a lay user is expected to enter into a search engine service (e.g., Google™, Yahoo™, etc.).

Popularity engine tag codes or "tags" appear in separate popularity engine web pages adjacent to an identification of the URL that is being popularity-wise rated by users of the popularity-based rating engine. Authors of source content may sometimes embed in their displayed web page, redirectors (e.g., Digg-It!) that when clicked, link the user to a corresponding user popularity rating engine (e.g., social network reputation rankers such as Delicious™ (a.k.a. Del.i-cio.us™) Reddit™, Digg™, Stumbleupon™) where at the engine site, popularity engine tag codes ("tags") or subject-matter categorizing codes (e.g., photos, humor, movies, books, etc.) appear for purpose of categorizing the to-be-rated web page according to categorizing tags. The subject-matter categorizing codes or tags may be used alone or in combination to hint at a corresponding topic. More specifically, if a user of the MM-IGS system (FIG. 4A) is focused upon content at a first URL (URL-#1), in one embodiment, the MM-IGS system automatically looks up the tags for that URL-#1 at the web sites of one or more social network reputation rankers (e.g., Delicious™, Reddit™, Digg™, Stumbleupon™, etc.) and collects the tags under appropriate tag-supplier headings (e.g., Reddit™-tags, Digg™-tags, etc.). Then it automatically identifies the most often used of these subject-matter categorizing tags and stores them in storage area 455b as respective, most-often associated Reddit™-tags, Digg™-tags, etc. Most-often-associated popularity tags can come in two flavors: (a) most often found to be associated with the URL's provided in the user CFi's of all users touching on the node (e.g., 450) taken in whole; and (b) most often found to be associated with the URL's provided in the user CFi's of users participating in a given chat room running under the node (e.g., 450). These subject-matter categorizing tags (as stored and organized in region 455b) may be used alone or by also automatically referencing what the associated popularity rating engine (e.g., Delicious™) says (in an indexed database of the popularity rating engine) about the topic of the given URL to automatically determine what the probable topic is of one or more URL's found in a given user's CFi uploads, and to identify the best matching topic nodes within the system hierarchy tree based on the one or more URL's found in a given user's CFi uploads.

Figure 4B:
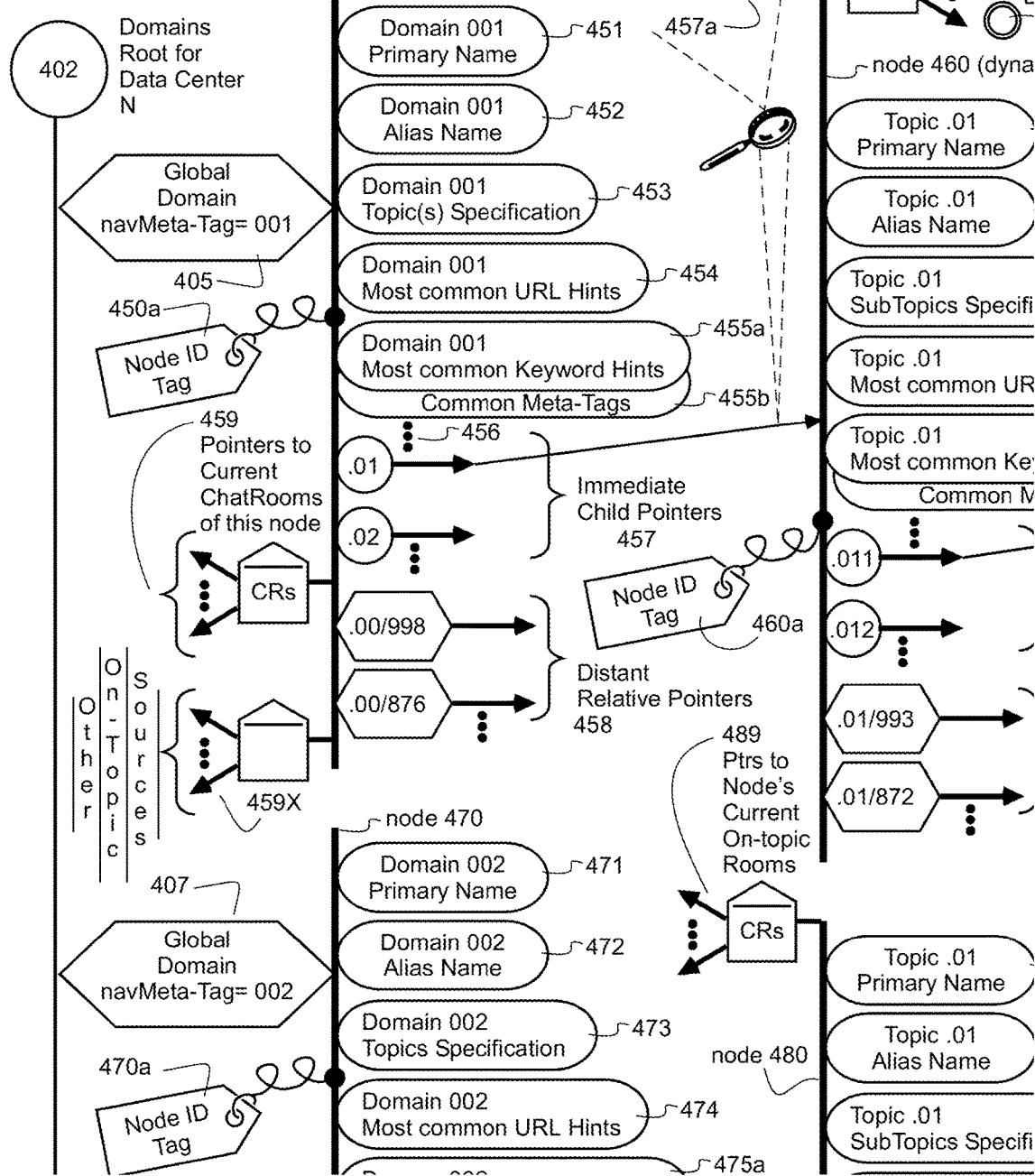
FIG. 4B is a composite of partitions 4Ba, 4Bb and 4Bc per the legend provided in partition 4Ba and all references herein to said FIG. 4B are understood to refer to said respective composite which provides a hierarchical diagram of a set of dynamically reconfigurable domain and topic specifying objects created within a domains configuration store used in the system of FIG. 4A.
Figure 4C:
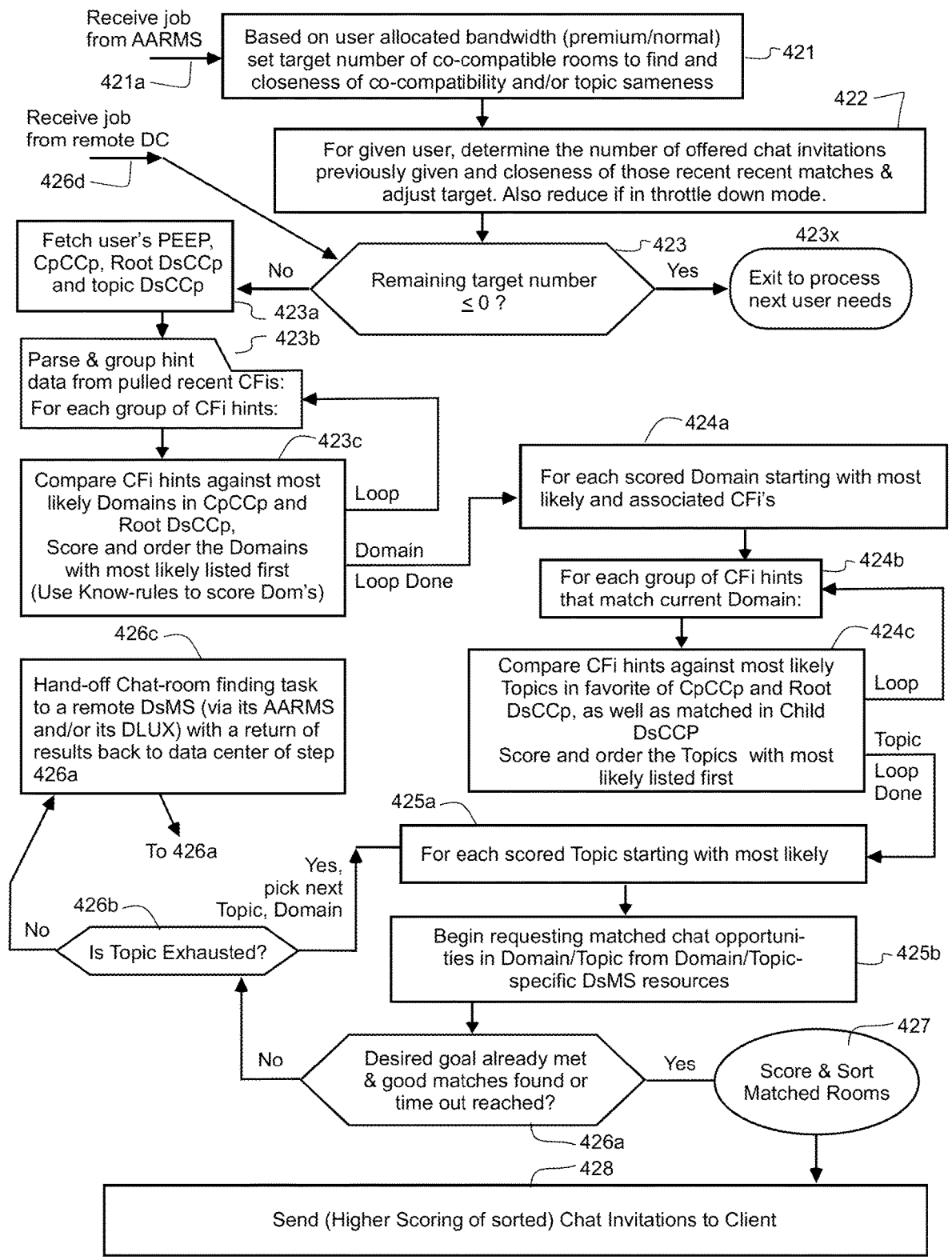
FIG. 4C is a flow chart of chat room match making process that can be used in the system of FIG. 4A.

Hierarchy navigation meta-codes are special ones developed herein for use with domain/topic/etc. hierarchy trees such as shown in FIG. 4B. Basically, the system operator of one or more match-making data centers (e.g., 410, 420 of FIG. 4A) create a Dewey-Decimal like system that assigns whole integer values for navigating to main topic domains and subdecimated values to topics and subtopics so that a hierarchy navigation meta-code of the form, for example, 078.456,123 points to a domain node that has been pre-assigned the 078 number as its root address in the hierarchy tree (e.g., of FIG. 4B); and then it further points to a child of that domain node that has been pre-assigned the 456 number as its address under the 078 domain; and then it further points to a grandchild of that domain node that has been pre-assigned the 123 number as its address behind the 456 topic node. In FIG. 4B such hierarchy navigation meta-codes are denoted as navMeta-Tag codes (e.g., item 405 in FIG. 4B). Although a Dewey-Decimal like system is one possible way of organizing the hierarchy navigation meta-codes, the present disclosure is not to be construed as being limited to that one option. Alphabetic letters and/or other characters beyond just numbers can be used and different characters such as dot (.), forward slash (/), back slash (\), colon (:) for example may be reserved to function as navigation delimiters. Alternatively, a respective unique list of special meta-tags may be pre-assigned to each node in the hierarchy tree and used to navigate to that node. Moreover, special aliases may be devised to jump directly to a popular node or user favored within the hierarchy tree rather than always navigating by starting at the tree's root node (402). In one embodiment, the meta-tags include scope-indicating pointers or indicators that indicate the boundaries of the content to which they are directed, for example a meta-tag whose scope-indicating attribute indicates the meta-tag applies only to the current sentence, or paragraph, or web page or web frame and so on. (To do this may require use of specialized meta-tags that can violate general HTML industry validation rules that dictate where in an HTML document, meta-tags can be placed—generally only in header sections. Accordingly, custom content that is meant to be hidden and yet assign attributes to specific sentences or paragraphs, etc., may have to be inserted as a masquerading part of a valid tag that points to the affected sentence, etc. or to be included as hidden comment code in the HTML source code where the application code of the present system nonetheless reads the comment code and acts on special comment strings embedded in the comment code.) In one embodiment, every node in the hierarchy tree (FIG. 4B) is assigned a respective unique node ID tag (e.g., 450a for node 450) that uniquely identifies the node irrespective of the node's current placement in the tree (or the node's current placement in a topic space such as that of FIG. 6). The unique node ID tag may be generated for example as a concatenation of the date and time (e.g., down to the millisecond) and place (e.g., which data center, which storage unit in the center, etc.) of when and where the node was first created and optionally one or more random numbers further embedded in the concatenation. An alternate approach is to use a GUID (Globally Unique Identifier) provided by a single source within the system, where the GUID is a computer generated series of letters and numbers used to uniquely identify records that need to be shared across multiple database servers. In one embodiment, the unique node ID tag 450 has appended to it, a unique data center code and polar coordinates indicating where in a corresponding one or more polar topic spaces (see FIG. 6) the node is currently positioned. The polar coordinates are not part of the unique node ID because those coordinates can and usually do change when the node migrates to a new location in the hierarchy tree and/or to a new location in topic space. When a node is mirrored into a different data center, its unique node ID tag (e.g., 450*a* for node 450) does not change. In this way, the node's unique node ID tag (e.g., 450*a* for node 450) may be used to identify the node irrespective of it's placement in the hierarchy tree and/or it's placement in an identified topic space and/or its replication into different data centers and/or its change of name over time. (The usefulness of this feature will become apparent later.)

Window 318 shows the local user as watching a web video (having animated images and corresponding audio) relating to topic B. This viewing state of the user may be assumed for example in response to automated detection that the current audio output of the client machine is that generated from window 318. The amount of time spent watching the moving image B and/or fiddling with the volume control may indicate the amount of interest that the user has in that specific topic. Window 319 shows the local user as listening to a podcast. Once again, that state of affairs may be assumed for example in response to automated detection that the current audio output of the client machine is that generated from window 319. The current volume setting and/or fiddling with the volume control may indicate the amount of interest. Additionally, the user's local camera (116) may spot him as tilting his head back and looking away from the screen while concentrating on the audio content. Meta-tag data may be buried in the digitized audio and/or video (e.g., in horizontal or vertical blanking intervals) to indicate the likely topic of interest and this meta-tag data may be uploaded to the cloud as part of a CFi. Biometrically sensed activities may indicate intensity of user interest in the topic being covered at the time by the streaming audio data.

On-screen content may alternatively or additionally include non-web (non-network originated) material such as a locally stored word processing document 320 that the user is working on, where region 320*d* may be a section of the document that the user has been currently editing (and for which a recent edits history is maintained and optionally uploaded to the match-making and invitations-generating system (MM-IGS)). In the illustrated example, window 320 has a file-name area 320*a* indicating a file named, Fifth_Grade_Science.doc. In one embodiment, this information is confidentially uploaded to the MM-IGS in combination with other data (e.g., the recent edits history) for analysis and topic determination. Word processing documents such as 320 often have their data structured differently from that of an HTML-coded web page. Nonetheless, they may have sections that are likely to be topic headings or introductory summaries (320*b*) of the material below them and thus indicative of the topic the writer is thinking about when working on the document as a whole or on a particularly headnoted section. In this case the writer is thinking about doing a fifth grade science project that involves experimenting with different tasting areas of the human tongue. The file name, Fifth_Grade_Science.doc, gives the match-making service (in the MM-IGS) a first clue. Dominant words or phrases 320*c* repeated throughout the current version of the document may also be uploaded to the MM-IGS to give the match-making service yet more clues. A recent set of repeated edits made in section 320*d* (as indicated by the edits history) may give the MM-IGS an indication that the user is having difficulty with this particular section 320*d*. Given the age of the logged-in user and the clues provided by window 320, and her personal preferences (CpCCp and DsCCp('s)), the in-cloud MM-IGS may determine that the user likely wants to chat with other fifth graders (in somewhat remote geographic locations rather than in her local school district where she is competing with schoolmates) who are doing science projects on tongue tasting. Students can exchange useful insights with similarly situated other students and thus they can come to find the school work much more interesting if they have people to share their experiences with. For example, noncompeting students can share in a common chat room, some of the resource materials they used to prepare their science projects. In one embodiment, the science project chat room may be monitored and moderated by a nongrading teacher who has volunteered to help keep the students on track without interfering with their spontaneity or enjoyment of the chat room.

Alternatively, the reason that the local user has been making repeated edits for a relatively long recent time in document area 320*d* is because she is having trouble with a grammar issue, or with a sentence structure issue, etc. In other words, she is having trouble with the writing process itself rather than with the overlying subject matter (e.g., the science experiment project). There will be cases where the match-making service (e.g., MM-IGS) will not be able to determine to any reasonable level of disambiguaty whether the user is thinking about the writing process or another issue. In such a case the flow of incoming invitations may be in the form of multiple incoming streams (e.g., like the U-shaped flows mentioned above) and the user picks (if at all) the stream that appears closets to what she is currently thinking about. This pick among different probable topics is fed back to the match-making system and the system then begins to send more invitations in line with the picked topic, while in some cases, continuing to offer occasional invitations for the other possible topics. (Because once a problem with writing style is resolved, the user may continue to edit the same area 320*d* while this time switching the topic of interest—in the user's mind—to the overlying subject matter; e.g., the science project.)

The types of possible local files (e.g., 320) that the local user may be working on are almost endless, and need not be limited to word processing documents. For example, two or more computer programmers in different locations may be working on a similar coding problem (e.g., for example how does a particular public library function behave when given certain esoteric input parameters?) and they may want to share their frustrations or insights with one another. The match-making system can automatically find such otherwise isolated persons and pair them up for chatting with each other in real time. For example, the local client machine of each computer program writer may detect the local coder's frustration or uncertainty over a certain library function based on biometric indicators collected from the writer. In response, the local client machine software may automatically suggest an uploading of some of the content to the match-making service for purpose of linking the local user into a currently ongoing chat room that is discussing this same coding problem or to another user of predefined proficiency who is currently focusing on this same coding issue. (Since part of the code the local writer is working on may be confidential, the local software 105 is configured to automatically detect that the file content is confidential and to responsively request user permission to upload a highlighted portion with a warning that the user should verify the highlighted portion does not contain confidential material. Thus, in the case where some of the focused-on material may be confidential, the local software asks for permission and provides a warning before uploading the presumably non-confidential subsections of the focused-on material to the MM-IGS. (Even if the material is not confidential, in some embodiments the MM-IGS does not show the uploaded, focused-on material to the other users and thus the material is not in danger of being compromised. As mentioned earlier, in some embodiments the content of the uploaded CFi's is covered by an appropriate encryption process so that other people on the public network (e.g., 430) cannot easily snoop and see what system users are working on.)

Students working on similar school projects and computer programmers working on similar coding problems are just a few examples of the kinds of people that may find each other via the match-making service and collaborate. Lawyers working on similar legal problems may use the system to find each other when their focus is on a same legal issue (for example, what is the definition of a "trade secret" in the State of California?) Research scientists who are reviewing the same non-confidential journal articles may use the system to find each other. Ditto for at home cooks who are reviewing the same recipe, book readers who are currently reading the book(s) of a specific author, and so on. The list can be endless while the benefits of match-making between otherwise isolated local users can also be endless. Each kind of focused-on local file may have its own unique style (e.g., defining where the headings are positioned, where the abstract or summary is positioned, where relevant footnotes or endnotes are positioned etc.) and the match-making service may be configured to recognize and work with different kinds of common styles.

Window 330 shows the local user as using a popular search service (e.g., in a prespecified recent stretch of time) for performing an online search for certain keywords and receiving responsive results. The URL address bar 330a may be used to identify the specific engine and thus infer the data structure of the displayed web page including where the search keywords are located (330b) and where the search results are located (330c). The local client machine keeps track of when the user has last used an available search engine and what content was focused upon shortly before and/or after the search. For example, if the user was editing in section 320d of window 320 less than a few minutes ago and now the user has entered the search keywords, "theory of taste" into keywords input area 330b of the search engine 330a, the match-making service can infer from this that the topic of interest is not one involving a writing style issue but rather one narrowed down to a topic concerning theories for how the sensation of taste occurs. Soon after the search engine returns results in area 330c, the user may move his mouse cursor (335) to dwell over and/or highlight and/or hyperlink to specific ones of the results in area 330c, this indicating differing degrees of increased interest in those specific results. This information may be forwarded via the CFI's to the remote matching service 150c for automated analysis and determination of what subtopic under the theory-of-taste node is currently on the user's mind. The amount of time the user spends in dwelling over or inside specific ones of the search engine results 330c may indicate to the match-making service what the user's current level of interest is in that subtopic or whether the user is having trouble with the search results and wants to discuss the difficulty with like situated other users. Biometric data obtained from the user at this time can help the match-making service to automatically decide whether the user is probably feeling frustration over the results or a heightened interest of a positive kind. The match-making service may then make recommendations (by providing corresponding invitations) one way or another based on the inferred emotional states of the user.

With regard to sensing frustrations or other emotionally charged reactions of local user to something happening or that recently happened on his or her local machine (e.g., search results that do not meet the user's expectation, or chat room developments that upset the user), part of the biometric processing software can be specially directed to detecting expressions of exceptional frustration or other exceptional emotionally charged reactions exceeding the user's norm. The user may verbally express profanities or the like while staring at the computer screen generally or at a particular area on the computer screen for a prolonged period (e.g., more than a second) and/or the user may start to engage in "flaming" activities where the user is projecting impolite content to other users in a chat room or other forum, even if not actually transmitting that flaming content to the others. The special software may use voice recognition modules to automatically detect the unusual use of objectionable language by the user and/or change in voice tonality, change in stress levels or in other vocal system parameters (e.g., including changed breathing patterns) to classify this behavior, if it is markedly unusual for this user, as being an indication of exceptional frustration at or other exceptional emotionally charged reaction to something going on in the computer. Without directly reflecting the detected emotionally charged behavior to the user (because generally no one wants to be directly accused of or confronted with having become inflamed), the match-making service begins to responsively provide invitations directed to diagnosing the source of frustration (and/or other emotionally charged reaction), calming the user and alleviating the underlying source of his or her emotionally charged reaction. For example, one of the chat room invitations flashed to the user after a short cooling off period might be entitled, "Maybe it's only me, but I hate it when my search engine doesn't understand me." Upon seeing this, the local user may think, 'Yes, I do too; let me commiserate with this other chat room member who appears situated similar to me'. In one embodiment, the other chat room member is actually an automated psychology module that tries to coax the invited user into venting his or her frustrations and explaining in more detail what those frustrations are directed at. This may be done through a series of pre-scripted question and answer dialogs that are routinely varied so users will not readily catch on to the automated nature of the questioning. The answers that the user provides to the automated frustrations vent absorbing module are converted by that module into CFi's on behalf of the user and sent to the match-making service for matching with other users who have had similar frustrations (and/or similar other emotionally charged reactions) and maybe have begun to arrive at solutions. For example, the user may relate to the automated frustrations absorbing module, "I am trying to find a research paper on the theory of taste for my science project and the (expletive deleted) search engine is not getting me to the right resources." In response, the automated frustrations absorbing module automatically creates CFi's (as if they had instead been created by the user's local machine) that include key terms such as, "frustrated with search engine X results about theory of taste". In other words, the automated frustrations vent absorbing module has inserted the emotion-defining keywords that the user him or herself would not be willing to openly admit to. In response, the match-making service finds chat rooms filled with other users facing the same or similar frustrations and/or similar other emotionally charged reactions and perhaps some that can offer solutions. A second user on one chat room may instantly reply, "Yes, I had same problems with search engine X but got much better results with search engine Y and these alternate search terms". Other examples of keywords that the automated emotions detecting/absorbing module might insert on behalf of the emotionally charged first user when auto-creating his CFi's might be: "mad about . . . ", "sad about . . . ", "angry with . . . ", "disappointed with . . . ", "hurt by . . . " and so on. These auto inserted, emotion expressing keywords can work to better connect the emotionally charged first user to other users who have or are feeling the same thing about the associated topic. A machine-implemented automated method in accordance with the above may comprise the steps of: (a) detecting biometrically or otherwise, emotionally charged activities by a user that exceed the user's normal level of emotional engagement with his or her local client machine and thus indicate exceptional frustration or other exceptional reaction to machine provided content; (b) in response to the detection of the exceptional emotionally charged activities, inviting the user to a moderated online exchange service that is configured to empathize with the user's exceptional reaction and draw out from the user details about the source of the user's exceptional emotionally charged activities, (c) using the details drawn out from the user by the moderated online exchange service (e.g., the frustrations vent absorbing module) automatically generating content focus identifying records (CFi's) that identify the drawn out details even though the same do not appear as out-of-chat content on the user's machine; and (d) in response to the generated content focus identifying records (CFi's) inviting the user to chat rooms or other online exchanges involving other users who are or were similarly exceptionally emotionally charged about a same or similar topic.

Aside from the system relying on collected biometric data to infer the user's routine and/or exceptional emotional states or other aspects of the user's state of mind, in one embodiment the system allows the user to explicitly indicate his positive or negative interest in, or disposition about a specific item (e.g., out-of-chat room content being focused on or inn-chat room content that is being voted upon). In one embodiment, the user invokes a voting menu (e.g., 336) by right clicking while his mouse cursor 335 while it hovers over a specific piece of content, for example one of the search result items in area 330c. The local machine then responsively unfurls a menu such as 336 which indicates some of the possibilities for explicitly indicating interest or voting upon pointed to content or otherwise venting frustrations. The displayed options in exemplary pop out menu 336 allow the user to explicitly vote positively (+Vote) or negatively (−Vote) relating to the pointed to content. The displayed options in exemplary pop out menu 336 allow the user to explicitly indicate positive (+Interest) or negative interest (−Interest) in corresponding content. In one embodiment, the voting options (±Vote) are grayed out if the cursor is not inside a chat room window. Additionally, the displayed options in exemplary pop out menu 336 allow the user to toggle the interest monitoring alert flag 312 on or off for a desired length of time. Although not shown, in one embodiment the right click options menu (e.g., 336) allows the user to explicitly indicate a mood shift with regard to what is being displayed. While the illustrated pop out menu 336 provides some examples, in other embodiments the user may be provided with yet a longer or different range of options of things that may be explicitly communicated to the remote on-line matching service, including pop out sub-menus for explicitly indicating change of interest, change of vote, change of mood, intensity of interest or of vote, a desire to browse the hierarchy tree (e.g., FIG. 4B) and perhaps thereafter change the topic of interest currently assigned to the user, etc.

Figure 3B:
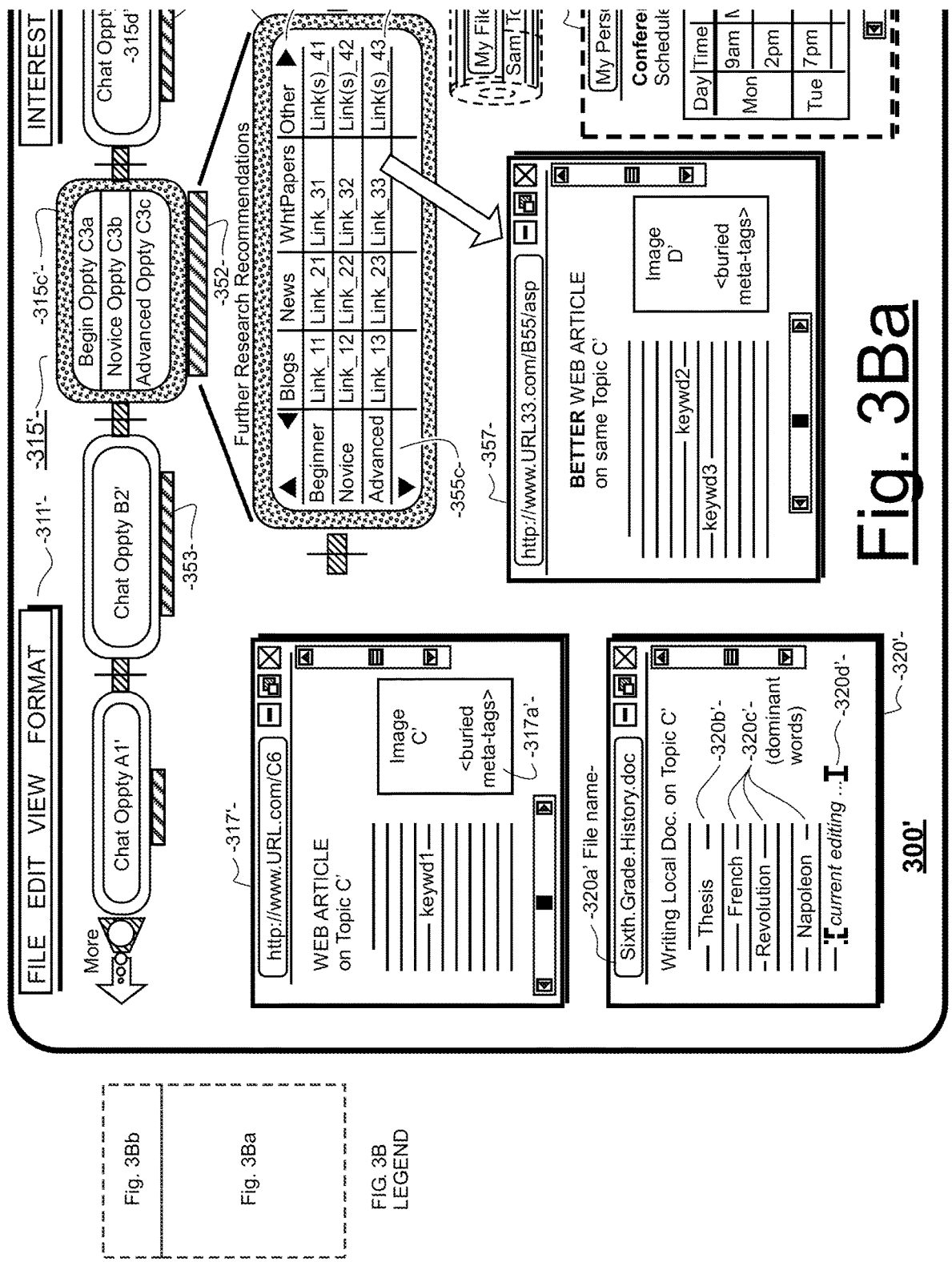
FIG. 3B is a composite of partitions 3Ba and 3Bb per the legend provided in partition 3Ba and all references herein to said FIG. 3B are understood to refer to said respective composite which provides a diagram showing another possible structure of part of a client machine screen where the screen displays recommendation for linking to additional on-topic material.

Referring to FIG. 3B, shown is a second exemplary user screen or user window 300' that can be provided in accordance with the disclosure. Where convenient, apostrophied reference numerals (e.g., 311', 315') are used to identify substantially similar on screen elements corresponding to those of FIG. 3A and thus most of these will not be discussed with extensive detail. What is different in FIG. 3B is the presence of research recommendation bars such as a first one, 351 shown under the Chat Opportunity A2' bubble 315d'.

A second research recommendation bar 352 is shown under the plural chat opportunities bubble 315c' where here, the user has mouse clicked on or otherwise activated that second research recommendation bar 352 and the local machine has responsively popped open a corresponding matrix menu 355. The opened matrix menu 355 of this embodiment provides further research recommendations in the form of direct or indirect hyperlinks denoted as Link_11 through Link(s)_43 where these research recommendations are for the topic covered by the chat opportunities of invitation bubble 315c'. In this particular embodiment, three chat opportunities or separate invitations are provided in bubble 315c', namely, a first invitation C3a deemed appropriate for a user having "Beginner" status or level of sophistication in the relevant topic C; a second invitation C3b deemed appropriate for a user having "Novice" status (more sophisticated than a mere beginner); and a third invitation C3c deemed appropriate for a user having "Advanced" status (more sophisticated than a novice). The denominations as "beginner", "novice" and "advanced" are merely illustrative. A variety of different denominations and different numbers of them could have been used instead based on the topic being covered. For example, if the topic had been a political one, the listed denominations might have said: "for-the-proposition", "against-the-proposition", and "undecided", where again these are merely examples.

The popped opened matrix menu 355 of this embodiment similarly provides rows with different levels such as the "beginner", "novice" and "advanced" levels shown in column 355c. A user may click on the up/down arrowheads of column 355c to thereby respectively scroll the displayed matrix section up or down and see more options if available. Heading row 355a segregates the displayed research recommendations into types of resources, for example where the first offered column links to "blogs" on the topic C covered by bubble 315c', where the second offered column links to "news" websites that report on the topic C, where the third offered column links to "white papers" written about the topic C, and where the fourth offered column may provide further links to same or different other categories of content sources whose content is directed to the topic C covered by bubble 315c'. In one embodiment, each interior box of the matrix (e.g., that containing Link_11) provides a single hypertext link directly to the on-topic material. In another embodiment, each interior box of the matrix provides a single hypertext link to a web page that has further links corresponding to the row 355c and column 355a descriptors of the matrix 355. In the same or yet another embodiment, each interior box (e.g., box 355b that containing Link(s)_43) of the matrix may provides plural hypertext links of the direct or indirect kind. A user may click on the left/right arrowheads of header row 355a to thereby respectively scroll the displayed matrix section left or right and see more columns as options if available.

In the illustrated embodiment, the user has clicked on Link_33 and as a consequence, a new web page frame or window 357 automatically popped open in her screen area 300'. Before clicking bar 352 and then utilizing the offered further research recommendation of Link_33 (a link to corresponding URL33), the user had only a first web article 317' concerning associated topic C' (which topic for example might relate to some thesis the user is developing about say, the historical implication of the French Revolution—as seen in the user's opened file window 320'). The first web article 317' provided a first keyword (keywd1) that was helpful for researching the topic and developing the thesis. However, after activating Link_33, the user is automatically introduced to a better web article 357 on the topic located at URL33 where the introduced web article 357 is better for any of a number of reasons, including for example that it provides additional useful keywords, keywd2 and keywd3 which the user had not run across before or the new article is more in line with the user's thesis 320b', the new article has a better, more on-topic graphic D embedded in it, etc. The user may now use the additional keywords, keywd2 and keywd3 to conduct yet further searches in line with his thesis 320b'. Without the help of the automatically suggested further research recommendations 355, the user may have been stuck and not making rapid progress developing his thesis 320b'. By accepting the automatically generated offer for the suggestions (by clicking bar 352) and by selecting a suggestion in-line with her needs (e.g., advance white paper) the user has now moved to a new level of collected knowledge for his chosen thesis.

It is to be noted in the hypothetical example of FIG. 3B that the user was not explicitly asking for further research recommendations (e.g., 355). Instead, she may have been actively typing away in current editing region 320d' of word processing document 320'. The benign spyware executing in the background on her client machine detected that the user was intensely focused upon the content of current editing region 320d'. The benign spyware had also earlier detected and reported to the match-making system (the MM-IGS) that the user's topic of interest was related to the thesis listed in region 320b'. The match-making system transparently determined that one or both of chat invitations 315c' and further research recommendations 355 should be automatically offered to the user at this time. The invitations and recommendations (bar 352) drifted into the central radar scope area of the user's scrolling invitations banner. The user noticed it (perhaps because an audible urgency tone was sounded) and accepted the offer of recommendations (by clicking on bar 352 and then clicking Link_33). Magically, the user discovers that the linked-to new web page 357 is different from what the user has found thus far, and more on-topic and/or in-line with his thesis 320b'.

Figure 3C:
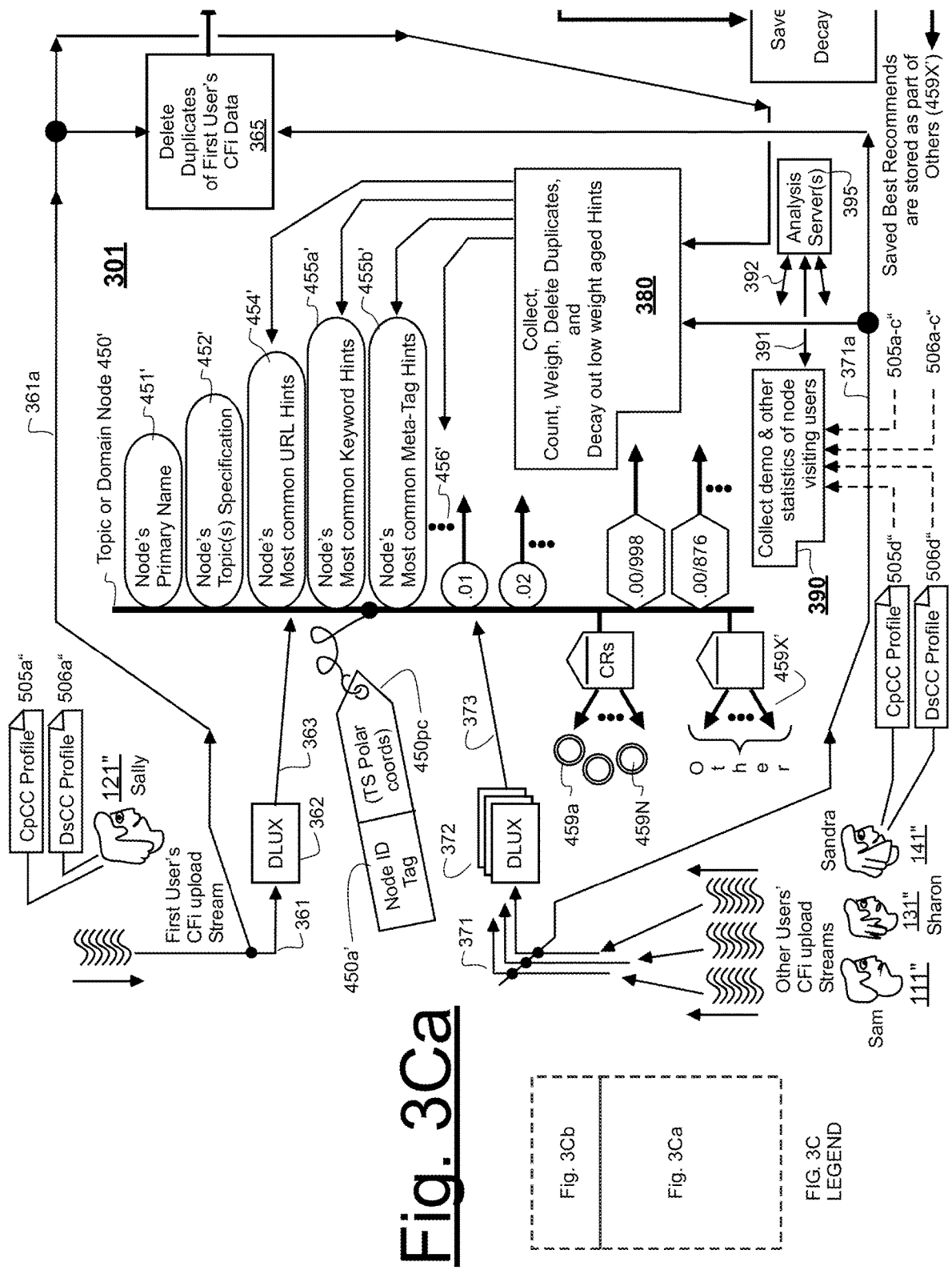
FIG. 3C is a composite of partitions 3Ca and 3Cb per the legend provided in partition 3Ca and all references herein to said FIG. 3C are understood to refer to said respective composite which provides a schematic diagram showing how the displayed recommendation of FIG. 3B may be automatically generated.

Of course it is not by magic but rather by deliberate execution of background machine-implemented automated processes that all this occurred. Referring to FIG. 3C, assume that the user of FIG. 3B is Sally 121" (shown in upper left of drawing). Because the benign spyware was turned (Interest Monitor=ON) in Sally's local machine, it was providing a CFi upload stream 361 to an assigned domain and topic lookup service (DLUX) 362 executing in the cloud. Sally's uploaded CFi data stream 361 included the URL of first web article 317' of FIG. 3B and the dominant words 320c' of document 320'. From this, and optionally in combination with Sally's domain specific profile 506a" and/or Sally's personhood profile 505a", the in-cloud DLUX 362 automatically determined that Sally's current topic of interest is most probably a topic C which is covered by a system topic node identified as 450' and represented by a topic node data object stored in system storage (to be described shortly below). The DLUX 362 points to this node 450' by way of pointer 363. The pointer 363 might reference the node's globally unique, node ID tag 450a' and/or the node's current position (e.g., polar coordinates) 450pc in a predefined topic space. A more detailed description of domain and topic nodes (see FIG. 4B) and DLUX services (see FIG. 4A) will follow shortly.

For now it is sufficient to understand that, just as Sally's on-screen activities caused a first DLUX 362 associated with Sally 121" to point 363 to topic node 450'; there are other users of the system (bottom left corner of FIG. 3C) whose respective CFi data uploads 371 cause their assigned DLUX services 372 to also point 373 to the same topic node 450'. The CFi data uploads, 361 and 371, of all the users linked to that node 450' are collected and ranked. Some URL's or other CFi data may be scored as much better than Sally's current CFi data 361. Those higher scored URL's or other CFi-supplied resource identifiers may then be automatically fed back to Sally 121" (e.g., from unit 369 of FIG. 3C) as recommendations 355 of FIG. 3B. Additional details will be provided after FIGS. 4A and 4B are described. It is to be understood, incidentally, that chat invitations (e.g., 315c' of FIG. 3B) and recommendations (e.g., 352/355 of FIG. 3B) for on-topic content resources are not interdependent on each other. Sally's client machine (e.g., whose screen area 300' is shown in FIG. 3B) could have displayed a radarscope like flow of recommendation bars, 351, 352, 353, etc. (with the middle one enlarged) and no chat invitation bubbles like 315c' and 315d' or vise versa. If both are displayed, Sally can elect to accept a chat invitation (e.g., C3b) without accepting a resource recommendation (e.g., Link_33) or vise versa. Or she can elect to accept both.

Referring back to FIG. 3B, so far it has been implied that content-describing CFi upload data is generated in response to what the user is currently looking at (and/or otherwise actually perceiving). However, it is within the contemplation of the disclosure to automatically generate CFi upload data based on certain types of content that the user is currently NOT looking at (and/or otherwise perceiving) where that content is of such a nature that it may be taken as being impliedly currently displayed on the user's screen (even though it, e.g., roller 358 and frame 359, is/are not being displayed) and as being impliedly currently focused upon by the user (even though it, e.g., roller 358, frame 359, is not being currently focused upon). More specifically, the user may have one or more pressing, to-do files such as a planning calendar file (example shown at 359) or a must-meet-and-confer list (example shown at 359) or similar other such data stored in his client machine (e.g., in his portable PDA) and/or in another means accessible to the match-making and invitations-generating system (MM-IGS). These pressing, to-do files may set forth places and times of already scheduled meetings, events, conferences and the like which the user is committed to attending or has a possibility of attending and/or to-be-scheduled meetings which the user has a pressing need to schedule and make. More specifically, the optional or pressing to-do planning data may indicate the times and/or places of various events and/or identifications of persons that need to be met with, as well as some information that hints at or explicitly defines one or more topics to be dominant at the meeting, conference or other event. For example, item 359 of FIG. 3B represents a not-being-displayed personal calendar of the owner of client machine (having display 300') where the personal calendar 359 is stored in the client machine (300') and/or elsewhere (e.g., in a secured in-cloud account settings file of the user) and is accessible to CFi data producing software (e.g., 205*a* of FIG. 2A) for the purpose of producing corresponding CFi data at, or before, the planned time of the event for uploading to the MM-IGS in a manner mimicking a hypothetical situation of the user being then focused upon the calendared or other pressing information that relates to an occurring or possibly soon to occur event. In one embodiment, the user is provided with line item veto capability whereby the user can hide from the CFi data producing software any desired one or more of the planned events or other pressing matters and thereby block the software from producing CFi data for that event or other pressing matter. In other words, the non-displayed calendar data of "this week" item 359 is uploaded only with approval from the user. In one embodiment, prior to CFi upload, the user's client machine flashes a warning that the calendared or other pressing matter information is about to be uploaded and gives the user an opportunity to block the upload.

In terms of a more specific example, let it be assumed that the user's not-currently-displayed calendar 359 shows that on Monday of this week, the user plans to be at (or has a good probability of being at) the Moscone Convention Center in San Francisco for a 9:00 AM event concerning topic A. When the time period for the event approaches (say at around 8:00 AM on that Monday), his client machine begins to automatically generate CFi upload data indicating increasing focus by the user upon topic A and the event at Moscone Center, and perhaps also with the CFi uploaded data providing some keywords or other subtopic hints extracted form a "Details" section of the calendared event record (e.g., a database record). Other CFi data generated by the user's machine, such a GPS current location, may verify that the user is indeed near the location of the Moscone Convention Center as the time for the event (e.g., 9:00 AM) approaches. Similar CFi data will be automatically generated from, or on behalf of the client machines of other system users who are also planning to be at the same event and/or at the same venue. As a result, chat room invitations may be automatically sent out to those of the event attendees who have sameness or substantial similarity of implied topic(s) of focus and/or chat co-compatibility. In one variation, the uploaded CFi data of the user of the illustrated machine (300' of FIG. 3B) indicates that this first user is concurrently focused upon topic C (of displayed window 357). In that case, the more strongly suggested chat invitations may be to rooms where the other invited users are also currently focused upon topics A and C and the Moscone event venue (and optionally where they have personality co-compatibility for chatting online or in person).

The portable client machine (e.g., 3G-cellphone, PDA, etc.) of many a user will include a GPS (Global Positioning Satellite) or other automated self-locating subsystem. And as mentioned elsewhere herein, detailed location information about the client machine's current location can be at least periodically uploaded to the match-making and invitations-generating system (MM-IGS) alone or in combination with other CFi data. Thus the MM-IGS can (if given permission by the user to do so) keep track of the current locations of all online system users who have their BlackBerry™ or other PDA turned on with the GPS or other automated self-locating subsystem active. Additionally, in the pressing matters files of many a system user there can be a contacts set of database records that identify one or more persons whom the user wants to personally meet with regarding a pressing matter, for example one involving topic A. The not-currently-displayed contacts roller 358 shown in phantom in FIG. 3B has a contact named "Sam" identified as someone the machine's user wishes to soon meet with personally to discuss topic A, and perhaps more so, to personally discuss certain details of topic A which are identified or hinted at in a "Details re Sam & topic A" section of the record shown as part of roller file 358 and shown as currently most pressing up against (but often not being displayed) on display 300'.

In one example, it just so happens that Sam is at the Moscone Convention Center at the same time that machine user Sally (121") is at that venue and opportunistically they both have a same open time slot to meet in person and discuss topic A. However, the Convention Center is so big and so crowded that neither spots the other. The MM-IGS service though, also knows they are both there at the same time from the GPS or other self-locating information provided in their uploaded CFi data and it also knows that the in-person meeting re topic A is a pressing current focus matter on both their minds because each has allowed their automatically generated CFi upload data to include high priority pressing contact items (e.g., that of roller 358) even though the user is currently not looking at that content. In response to its automated detection that Sam and Sally are in short-travel time proximity of each other and at least one, if not both users, urgently want to set up the in-person meeting regarding topic A, the MM-IGS automatically generates a meeting proposal (similarly to the way that chat room invitations are generated) and sends the meeting proposal to both with an invitation to a private chat room where they can iron out details of the meeting (e.g., exactly where and when). Thus it is seen that automatically uploaded CFi data can be useful for producing not only online meetings in chat rooms and the like (by way of invitations), but also for producing in-person meetings even if the system users do not at the moment have it in their mind that they can meet at the time. Of course, in one embodiment, current user mood is factored into such automated proposal of opportunistic meetings. One of the users may have indicated directly or inferentially that they are currently not in a good mood, and if so, the system may include knowledge-base rules that define when the opportunistic meetings should not be proposed due to a bad mood by at least one user and/or when the opportunistic meeting should be proposed (due to extreme urgency) despite the bad mood of one of the users. Also, although not shown in item 358 of FIG. 3B, it is within the contemplation of the disclosure to include priority indicators in the pressing contact records of files like hidden 358 and to have the system automated arbitrate among competing items based on priority. (For example, Sally's pressing contacts roller stores another desired in-person meeting with Sharon and Sharon is also at the convention center, but Sam's priority is higher. So the system first automatically proposes the higher priority meeting, and if that doesn't come to fruition, the system may then automatically propose the next highest priority meeting if it is opportunistically possible given the current locations and/or moods of the various parties.)

Sometimes users who are at a meeting, show, etc., will turn off or put away their cellphone, PDA or other CFi uploading device and forget to turn it on or pull it out, perhaps for a number of hours. That means that their last uploaded CFi data will become relatively old and the MM-IGS system may wrongly interpret the event (cessation of CFi uploads) as indicating that they have lost interest in certain topics (due to decay of exhibited interest) when this is not at all the case. Accordingly, in at least one embodiment, one of each user's profiles (typically the CpCCp)

includes a last known state and interests record (not shown) that records the last set of content items and intensity of focus on them that were detected for the given user when the device was turned off (or apparently put away in a purse, jacket pocket, or other darkened enclosure). When the user turns his or her device back on (or pulls it back out into the light as detected by an integrated background light detector), the data in the last known state and interests record is treated as if it had just been uploaded into the cloud. In other words, upon boot up of a user's primary client machine (or pull out back into the light), the system assumes that the user is in the same state as they last were even if the user does not immediately begin looking at content that is on a same or similar topic as that which was last looked at. For example, the user may first look at the most recent news stories even though the user has not lost interest in the on-mind topic that was last on his or her mind when they shut off the machine or put it away.

Referring now to FIG. 4A, shown here is a networked system 400 in accordance with the disclosure wherein a plurality of distributed data centers, 410, 420, etc. are coupled via a network 430 (e.g., the internet) to plural client machines 440. One or more services may be provided within each of the data centers, 410, 420, etc. Work load for servicing clients may be adaptively redistributed among the data centers depending on user activity among the numerous client machines 440 that couple via the network 430 and depending on availability of services resources within the various data centers at different times of the day or night at different geographic locations.

Services provided within the data centers may include the following: an Access (client access) and Accessible-Resources Monitoring Service (AARMS) 411, a User Accounts-management Service (UAS) 412, a Domains/Topics Lookup Service (DLUX) 415, a plurality of Domain-specific Matching-making Services (DsMS) 416, and a Chat Rooms management Service (CRS) 418. The servers (virtual or actual) which provide these services and the corresponding software modules that provide these services may be coupled via a secured data center internal backbone 417 to a variety of center-accessible data stores, including a Global Services Directory Store 431, a User Accounts Data Store 432, a Domain/Topics hierarchy configuration store 435 and a historical Trending data store 437. The services providing modules 411-418 and data stores 431-437 (e.g., hard disk storage banks) couple to an unsecured network (e.g., internet) 430 via a protective firewall 419a and through one or more data routers 419b (collectively shown as 419). A trusted (non-open) high speed dedicated network or virtual private network (VPN) 439 interconnects the backbone 417 of a first of the data centers 410 to that 417' of a next data center 420 and so on so that resources can be shared and reallocated among data centers depending on resource availability and user demands.

Referring first to the Domains/Topics Lookup Service (DLUX) 415, it is to be understood that a large number of topic domains and topics and subtopics may be defined either by system operators or by the services using public (clients 440). The topic domains, topics, subtopics and so forth are represented by topic-representing data objects or node objects stored in system memory (e.g., 435). Chat rooms may be pre-assigned or dynamically re-assigned (migrated) to specific domains and/or topics, subtopics, etc. or newly created to serve such topic areas depending on user population interest in the respective topics. A same chat room may be pointed to by different topic nodes if the chat room is currently providing transactions related to the topics of the plural topic nodes. See briefly the pointers 469 to corresponding chat rooms (CR's) 469a-469N in hierarchy tree 401 of FIG. 4B, where room 469a is pointed to by another topic node in addition to being pointed to by topic node 460. The system operators may establish an initial or seed set of Domains and topics on a hierarchical basis and position them as desired in an initial or seed topic space (see briefly FIG. 6). Examples of seed Domains may include: News, Health, Jobs, Entertainment, Finance, Maps and Travel, Personals, and so forth. An example of a Domain/Topic/Subtopic hierarchy might be: Sports/Football/Quarterbacks, Another example might be: Entertainment/Movies/Stars/Male. Hierarchical definitions of topic, subtopic, subsubtopic, etc. as nested logic trees may extend to whatever length deemed appropriate by system users and/or system administrators. System users with voting rights may vote and come to collective agreements on what unique primary names (e.g., 451 of FIG. 4B) and/or alias names (e.g., 452 of FIG. 4B) are to be given to each numerically identified domain (e.g., see 450a of FIG. 4B) and/or its numerically identified subtopics. System users with voting rights may also vote on where in a prespecified topic space the node should be deemed to be located (e.g., see briefly, polar coordinates storing area 450pc of FIG. 3C). Amount of nonvolatile machine storage dedicated to each node, be it a domain, topic, etc. may be determined though use and on the basis of which domains require the most bandwidth for service support and which can provide satisfactory service to users while requiring less bandwidth. The user population may cause new Domains to be dynamically added to the root (402 of FIG. 4B) of a given data center (or globally) and others to be dropped from that data center (where such dropping is not allowed in some embodiments) depending on the whims of the user base assigned to or using that data center (e.g., 410, 420) or the system in whole. The root at each data center will include a catch-all domain (see D0 of FIG. 6) and each domain subtree will include a catch-all child for absorbing miscellaneous chats if none of the specific domain or topic nodes yet apply. The root catch-all domains may be identified chronologically and geographically, for example as, DataCenter456/root/General_Domain/catch-all_activities_of/today's date.

In one embodiment, each of the distributed data centers 410, 420, etc. in system 400 of FIG. 4A has a limited initial Domain hierarchy defined in its respective Domain configuration store 435, 435', etc. by correspondingly stored digital data objects that represent nodes of the hierarchy and provide an indication of how they are logically interconnected one to the next. Each domain specified in this initial hierarchy may have a pre-assigned, whole number navigation meta-tag identifier (e.g., 405, 407 in FIG. 4B) which might correspond to hierarchy navigation meta-tag codes 216f of the CFi data structure of FIG. 2A. Topics and subtopics under each main domain name may be designated by decimation (thus separating domain.topic.subtopic with decimal points) and/or use of slash separators (e.g., domain/topic/subtopic/etc.). In this way, the topic hints provided in pulled current focus indicators (CFi's) may be quickly matched numerically to nodes defined in the Domains configuration stores 435, 435' of the various data centers. Not all data centers need to have identical domains and/or topics defined in their respective Domains configuration stores 435, 435'. (However, in at least one embodiment exact mirroring of domain and topic definitions from one data center to the next is required and is provided for by a crawling background service that synchronizes all data centers. In an alternate embodiment, only a predefined subset of the domains and topics hierarchy tree—for example, a predefined angle sweep in FIG. 6—needs to be replicated across all data centers. Redundancy allows for reconstruction of data in a failed storage device of a given data center if such should happen.) As an example of a case where full replication is not provided, consider a relatively esoteric topic may be serviced at only two data centers because there are only a handful of users throughout the world who are currently discussing it. These people already know the two places (data centers) where the esoteric one node is redundantly located and know how to navigate to each of them. Essentially no one else needs to know. On the other hand, domains and/or topics that are very popular with the general public (e.g., world cup soccer) may be replicated at every data center around the world or at least throughout specific countries. Each pre-designated domain identification number and optional topic number may also have a preconfigured collection of reusable chat rooms (459, 479) reserved for it and always available for absorbing incoming users who accept invitations for that domain and topic. Depending on whether a premium service has been subscribed to or a general free-for-all service, respective client computers (e.g., 440A, 440B, 440C, etc.) can access all or a non-premium portion of the Domains configuration store 435 to look up what domains and topics are currently available at a nearby or remote data center and they can even browse through public ones of the chat rooms covered by accessed hierarchy nodes (e.g., 450, 460 of FIG. 4B). These looked up domain and topic hierarchy structures may be displayed to local users by their respective client machines (e.g., 440A, 440B, etc.) for use in creating the user's DsCCp profiles (see column 183 of FIG. 1C). In one embodiment, all users or subsets thereof (e.g., premium subscription users) are enabled to also see on their displays the hierarchy tree (or authorized parts of it) projected onto a polar topic space such as that of FIG. 6. In one embodiment, beyond each topic node pointing to, or being otherwise logically linked to on-topic online chat rooms (e.g., via linking structures 459, 469, 479, 489, etc.), one or more of the topic nodes each point to (e.g., via pointer structure 459X), or otherwise logically link to on-topic other resources such as on-topic online videos, on-topic nonchat web sites (e.g., on-topic blogs or blog comments), on-topic reading lists and to other on-topic content providing mechanisms (e.g., TV shows, books, movies, etc.). The nonchat other resources that are pointed to (e.g., by pointer structure 459X) may include proposals for online or in person meetings by two or more of system users where the proposed meeting is defined as covering at least the current topic of the given topic node. In one embodiment, participants inside chat rooms pointed to by the given topic node (e.g., node 460) can vote on what non-chatroom content the given node will point to (e.g., which online video streams, which news or editorial items, etc.). In order to avoid illustrative clutter in FIG. 4B, these links from the node to the non-chatroom on-topic content are not shown elsewhere except for 459X of node 450. However, they are understood to be similar to 459, 469, 479, 489 etc., except that they point to non-chatroom on-topic content.

In one embodiment, system servers scan the catch-all Domain and catch-all topic bins (not specifically shown) in the data centers (410, 420, etc.) and when the servers detect that there is sufficient chat activity related to a set of CFi identifiers (sufficient topic clustering) where the set of CFi identifiers are not already assigned their own Domain and/or Topic identification numbers, the system servers automatically create such new specific domains, topics, etc. and assign unused navigation meta-tag numbers and/or topic space coordinates to them and publish the results to the relevant users via the domains configuration stores 435 in the respective data centers and/or via email advisement messages. The user community will be allowed to collaboratively name Domains and/or topics and assign them to branch and sub-branch (child node) locations in the tree-like Domain hierarchy. In one embodiment, only users subscribed a sufficiently high premium level of service will be allowed to participate in domain/topic naming and node placement within the hierarchy. In an alternate embodiment, participation in domain naming and placement activities will be electable by the user. Some users won't want to be bothered. Others may take pride in being involved in process. Any set of CFi hint values seen often enough to warrant automatic creation of their own Domains will probably be popular enough to have some percentage of the user community interested in the naming and categorization process.

Aside from optional user participation in domain/topic node naming and categorizing (node placement in the hierarchy tree and/or node positioning in topic space), system administrators may: review and revise Domain names and/or their categorizations; and specify that a dynamically created Domain should be included in the nonpremium list of published Domain names which every user can explicitly specify in his or her DsCCp profiles. As catch-all chat rooms are created and users in them gravitate or cluster their interchanges toward specific topics, the chat rooms may be automatically re-associated with a specific Domain ID and/or topic ID based on matching CFi values of new users who are invited into and join those catch-all rooms.

Aside from traditional domain names such as News, Sports, Weather, Traffic, etc., it is within the contemplation of the disclosure to have special activity domain names. A first example is a domain node named: "What is recommended as an activity IF My Current Location is:". Under this there will be topic nodes including those bearing the names of major geographical areas or population centers such as, for example, "New York City", "London", "Paris", "California", etc. Under each of these (or over each of these) there will be sub-topic (or super-topic nodes) including those bearing the identities of different time ranges, such as for example: "And IF My Current Time is Weekday Morning", "And IF My Current Time is Weekend Lunch", And IF My Current Time is National Holiday", etc. Under each of these (or over each of these) there will be sub-topic (or super-topic nodes) including those bearing the identities of different situational conditions such as for example: "And IF My Surrounding Weather Condition is Very Hot", "And IF My Surrounding Weather Condition is Raining", etc. Under each of these will be subsidiary activity nodes bearing the identities of different activities such as for example: "Restaurants to Eat at", "Shows to see", "Movies to see", "Museums to visit", "Sight Seeing Tours to take", "Nature Hikes to take", etc. Since in one embodiment, each users portable client machine (e.g., cell phone) is periodically uploading the user's GPS location to the match-making system and the time of day, the system can automatically make activity recommendations given that the system also has a copy of the user's current personhood profile (CpCCp) and the latter provides demographic information about the user as well as various likes and dislikes (e.g., favorites insert 154-7a of FIG. 1B). The match-making system can then automatically generate invitations to chat room discussions among demographic peers as to the recommended activities at that locale given the time of day, week, month, year and current situational conditions. Additionally, as nonchat recommendations, the system can automatically generate pointers to recommended restaurants to eat at, nature hikes to take, etc., all based on information uploaded form the user as part of his routine CFi uploads. As a consequence, the system appears to function as an automatically invoked, automated tour guide.

As yet another example special activity domain names, it is within the contemplation of the disclosure to have a domain node named: "What is recommended as an inter-organization activity IF an Organization I Currently Belong to is:". Under this there will be topic nodes including those bearing the names of major corporations, college fraternities, honor societies, political parties, etc. Under each of these (or over each of these) there will be sub-topic (or super-topic nodes) including those bearing the identities of different time ranges, such as for example: "And IF My Current Time is Weekday Morning", "And IF My Current Time is Weekend Lunch", And IF My Current Time is National Holiday", etc. Under each of these (or over each of these) there will be sub-topic (or super-topic nodes) including those bearing the identities of different situational conditions such as for example: "And IF My Surrounding Weather Condition is Very Hot", "And IF My Surrounding Weather Condition is Raining", etc. Under each of these will be subsidiary activity nodes bearing the identities of different inter-organization activities such as for example: "Meetings to Attend", "Open Collaboration Projects to Join" and so forth. Since in one embodiment, each user's CpCCp includes a listing of organizations he or she currently belongs to and since the user's portable client machine (e.g., cell phone) is periodically uploading the user's GPS location to the match-making system and the time of day, the system can automatically make activity recommendations given that the system also has a copy of the user's current personhood profile (CpCCp) and the latter provides demographic information about the user as well as various likes and dislikes (e.g., favorites insert 154-7a of FIG. 1B). The match-making system can then automatically generate invitations to chat room discussions among demographic peers as to the recommended organization-sponsored activities at that locale given the time of day, week, month, year and current situational conditions. Additionally, as nonchat recommendations, the system can automatically generate pointers to recommended restaurants to eat at where fellow organization members are likely to be, golf course to golf at where fellow organization members are likely to be, etc., all based on information uploaded from the user as part of his routine CFi uploads. As a consequence, the system appears to function as an automatically invoked, automated organizational activity coordinator who shepherds the user to appropriate organization sponsored activities as a function of the user's current situation. These are just examples and yet further special activity domain nodes may be provided as functions for example of how the user is currently feeling (ready for exercise with peer mates, ready to go dancing, hiking, etc.). In other words, online real time chat room meetings are just some of many possible activities that users of the system may automatically receive invitations to and/or recommendations for and/or proposals for based on the CFi data uploads that the user's current client machine(s) are automatically uploading to the match-making system even when the user is not conscious of such uploads taking place (although of course, the user's permission for the benign spyware to be active is obtained and/or repeatedly reaffirmed in some way or another so as to respect the user's privacy rights).

As yet another example special activity domain names, it is within the contemplation of the disclosure to have a hybrid domain node named for example: "What is recommended as an inter-organization activity AND for my current location where the organization/-location pair is as follows: (e.g., Society of Internal Medicine Physicians and Nebraska)". One of the activities might be to discuss a current observation of new symptoms among patients (e.g., salmonella poisoning) in a given geographic region. It is within the contemplation of the disclosure to limit invitation into certain chat rooms only to individuals who are licensed in a particular art (e.g., medicine, law) and/or are credentialed in a specified specialty (e.g., infectious diseases) and/or are practicing in a specified geographic region (e.g., Nebraska). This type of nodal categorization allows specialist to spot unusual developments germane to their location and their specialty. In one embodiment, the users may explicitly specify that they want invitations limited to this type of nodal categorization or their CpCCp and/or DsCCp may specify a preference for this type of nodal categorization.

In one embodiment, certain domain nodes are expected to be more permanent fixtures of the hierarchy tree than others, and as such, these more persistent domain nodes are assigned smaller coordinate angles in polar topic space than domain nodes that are expected to be less persistent and more volatile in nature (e.g., fad domains that come and go). Among the certain domain nodes are expected to be more permanent fixtures are: (1) Those dealing with personal health issues, including those having chat rooms dedicated to specific health maintenance topics and/or disease treatment and/or management issues. Topics under the Health domain node may include those where each chat room is always staffed by or periodically visited by a credentialed health care provider (e.g., a licensed doctor or nurse). Further among the certain domain nodes that are expected to be more permanent fixtures are: (2) Those dealing with children, including those having chat rooms dedicated to specific educational needs of children and/or specific behavioral control issues associated with caring for and raising children. Topics under the Children domain node may include those where each chat room is always or staffed by or periodically visited by a credentialed educator or child psychology expert. Further among the certain domain nodes that are expected to be more permanent fixtures are: (3) Those dealing with jobs and career choices. Topics under the Jobs/Career domain node may include those where each chat room is always or staffed by or periodically visited by a credentialed career advisor. Further among the certain domain nodes that are expected to be more permanent fixtures are: (4) Those dealing with domestic pets (e.g., care and training of dogs, cats, etc.) wherein topics under the Pets domain node may include those where each chat room is always or staffed by or periodically visited by a credentialed animal care expert; (5) Those dealing with vacationing and traveling wherein topics under the Travel domain node may include those where each chat room is always or staffed by or periodically visited by a credentialed travel and vacationing consultant; (6) Those dealing with business issues (e.g., investment recommendations, company management etc.) wherein topics under the Business domain node may include those where each chat room is always or staffed by or periodically visited by a credentialed business consultant; (7) Those dealing with information research issues (e.g., best search strategies) wherein topics under the Research domain node may include those where each chat room is always or staffed by or periodically visited by a credentialed research consultant; and (8) Those dealing with current events in general and having current event discussion rooms dedicated to specific newspaper publications. Further among the certain domain nodes that are expected to be more permanent fixtures are: (9) Those dealing with product and shopping advice (e.g., what is/are best computers, cars, etc. to buy in given price range and/or what is/are best stores, vendors, dealerships to use for obtaining desired products and/or services); and (10) Those dealing with sports (e.g., and having topic nodes dedicated to discussing favorite teams, favorite players, favorite games etc.)

Figure 4D:
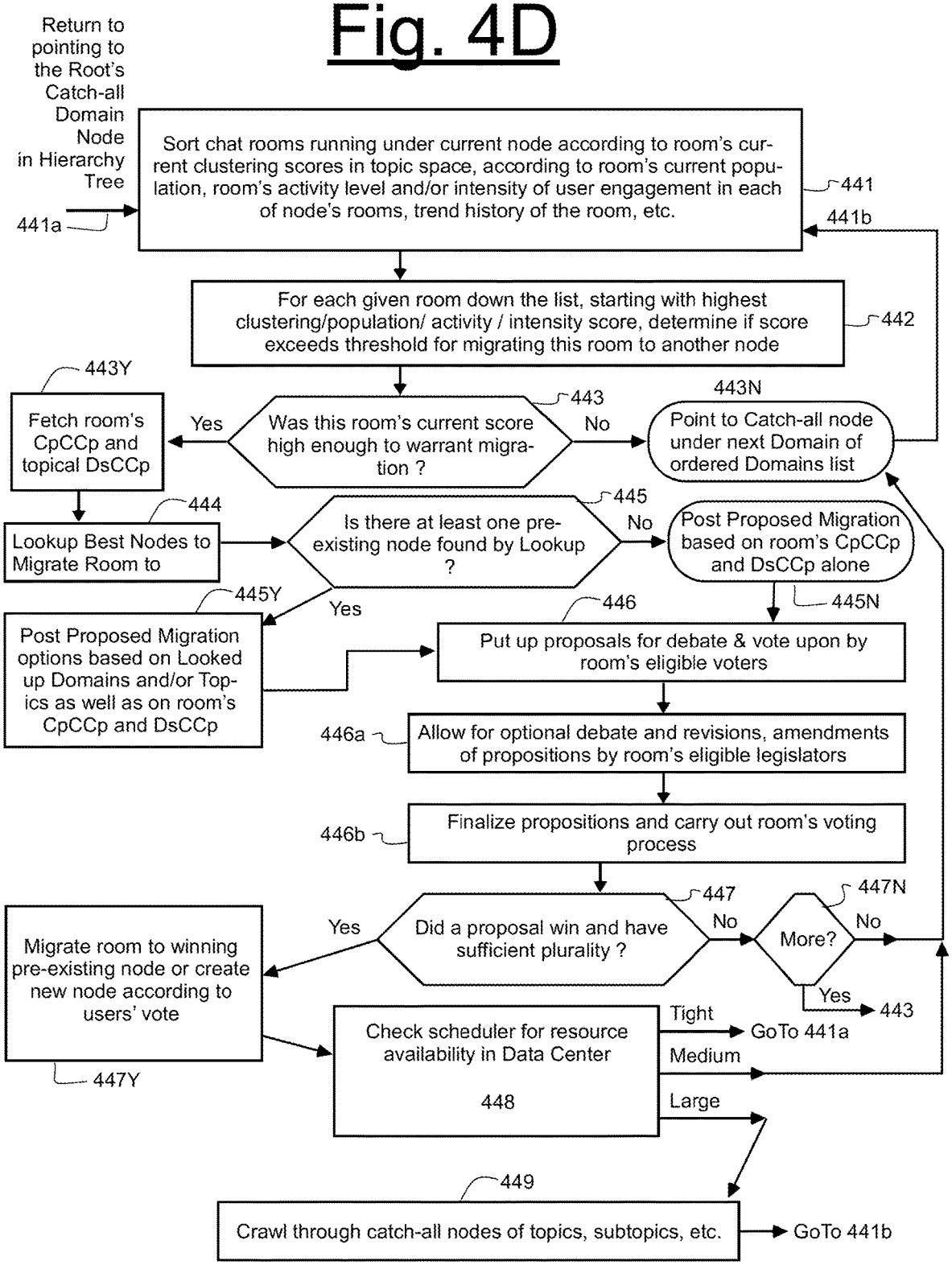
FIG. 4D is a flow chart of a chat room re-categorizing process usable in the system of FIG. 4B.

As mentioned above, chat rooms operating under the root catch-all node or under the catch-all node of a domain typically have a specific topic assigned to them. However, over time, participants in the catch-all room may begin to cluster around a specific topic. FIG. 4D flow charts one machine-implemented process for automatically converting catch-all nodes within a hierarchy tree into named and categorized nodes. It is to be understood that each domain node (e.g., 450, 470 of FIG. 4B) of one embodiment can have one or more "catch-all" child nodes with no specific topic name (e.g., 461) beyond that of its parent node and/or no specific topic specification (e.g., 463) beyond that of its parent node. A "catch-all" child node will however have a unique node ID tag (e.g., 450a, 460a, etc.) in one embodiment, where the node ID tag allows it to be traced as it migrates form catch-all status to another status. It is to be also understood that there will be a "catch-all" domain node (not shown in 4B, see instead D0 of FIG. 6) under the tree's root with no specific domain name (e.g., 451) and/or no specific domain specification (e.g., 453) other than "catch-all" or "none" or something of that nature. The "catch-all" domain node will also have a respective unique node ID tag. Small groups of chat partners who have no specific node to be matched to, and yet are co-compatible with one another and/or are focused upon same or similar content, may be huddled (clustered) into one of the no-name chat rooms either under a no-name, "catch-all" node or even under a named node. (A catch-all node can have a unique identification number even though it has no specific name or expressed mission statement.) As the population of a "catch-all" room evolves, and perhaps grows and acquires unique room characteristics, this growth and/or increased activity by its users may indicate a need for moving the node or bifurcating it to position the moved/split room under a preexisting node or to even create a new node and position it there so as to thereby produce a corresponding, named and specifically placed non catch-all room placed under the target node (could be a new domain) within the system hierarchy tree. The method of FIG. 4D seeks out such "catch-all" rooms for the purpose of automatically evolving the structure of the system hierarchy tree to match evolving needs of the user population. When step 441 is entered via entry path 441a, the process points to the root's catch-all domain node and sorts the chat rooms (similar to 479) running under that node according to current room population, current room activity level and/or current intensity of user engagement with that room. In one embodiment sorting of chat rooms running under a catch-all also scores the amount of topic space clustering (both recent clustering and over-time trended clustering) that takes place in that room. The concept of topic space clustering has already been described above with reference to FIG. 6. To recap, recently uploaded CFi hints of Sam, Sally and Larry (users 611, 621, 651) are processed by a DLUX service and the DLUX outputs are averaged or otherwise combined to provide a mapping of each user's apparent points of most likely interests on top of the topic space (600). Then closeness of mapped topic (e.g., distance 625) is automatically determined as between users. This determination of closeness (625) between users can indicate that some users are more closely clustered to one another and to a specific point in topic space than they are to other users or to the point locations (cross hairs in FIG. 6) of nearby nodes. When a predetermined proportion of users within a given catch-all room are determined to be closely clustered to one another in topic space (e.g. 600) for one or both of recent CFi values and long terms CFi values, the room receives a high clustering score. If users within a given catch-all room are determined to not be closely clustered to one another in topic space (e.g. 600), the room receives a relatively lower clustering score. The top of the sorted list (whose sort can be based on topic clustering and/or other sort keys) then identifies a room with greatest recent or longer term focus on a specific topic, greatest population, significant room activity and/or significant user intensity and thus one that may warrant being migrated sooner rather than later to a more specific node rather than being kept under the auspices of a catch-all node.

An example of how this might come to be, may be helpful. Suppose a new and previously unknown celebrity pops into the public consciousness. Let's call him, Harry the Hairdresser (fictitious name here). He became famous overnight because a politician mentioned him and/or because he won a popular talent show (e.g., American Idol™) or for whatever reason. Suddenly everyone is talking about Harry the Hairdresser, about how well he sings or dances, about a new hair style he just introduced, about how he affects an ongoing political debate, etc. Yesterday, there were no nodes in the system hierarchy tree regarding the topic of Harry the Hairdresser. Today, the catch-all domain node is swamped with new chat rooms, all talking about Harry the Hairdresser. It behooves the system to move at least the more populated and more active ones of these rooms whose topic of discussion clusters around Harry the Hairdresser to specific domains and/or topic or subtopic nodes or to create new nodes (with node ID tags) for these rooms so as to better serve the growing numbers of users logging in to talk about Harry the Hairdresser. While the overnight sensationalism of Harry the Hairdresser may be one example, there could be other catch-all discussions about esoteric topics where the popularity of the topic slowly grows, first perhaps at a creepingly increasing slow rate but then approaching an exponential rate. This too should be automatically identified and dealt with before it becomes a bigger problem (e.g., in that it swamps the catch-all domain node and services that focus on serving that node).

Just as Harry the Hairdresser (fictitious name) may explode into notoriety overnight, he may also disappear into obscurity just a as rapidly or ebb away slowly over time. At some point after his rise and peak, the system may become filled with unused nodes (no active chat rooms for a long time under those nodes) or redundant lightly populated nodes (some chat rooms, but hardly used and having substantially similar attributes) dedicated to the Harry the Hairdresser topic. In order to avoid waste of system resources (e.g., storage, etc.) on topics that are no longer as popular as they once may have been, the system may include background garbage collecting or compressing service modules that crawl through the data centers at off hours, locate long unused nodes (or unused chat rooms under those nodes) and delete them and/or locate lightly populated nodes or chat rooms (e.g., those whose usage in terms of number of participants, intensity of participation, etc. are below system defined thresholds) and try to merge the same with other topic-interrelated nodes and/or rooms that are also lightly populated. In one embodiment, a history is kept of each node at least by its unique node ID tag (see 450a of FIG. 4B) so that it can be determined when or where the node was first created, how it grew and migrated about the hierarchy tree and also when and/or where its popularity began to decline, as well as when the node was deleted if such happens. In one embodiment, advertisers or other such entities may subscribe to a trend reporting service that automatically informs them of when certain topics reach peaks of popularity and then begin to decline. The information is obtained from the system background garbage collecting or compressing service modules (not shown) as well as node creating and/or migrating service modules of the system. This information may allow such entities to time their market activities to rises, peaks and declines of various topics of interest among system users.

Step 442 looks at the not-yet migrated room (e.g., catch-all room) with the highest score on the list due to summed and optionally weighted scoring factors such as recent or long term topic clustering within the room, number of participants in the room, level of user activity in the room, intensity of user engagement with the room and trending history of growth for these or other factors. Step 443 tests for whether the score is above a predetermined threshold such that migration is warranted. The higher scoring rooms in the sorted list that was formed by step 441 may warrant migration ahead of lower scoring rooms. A point of diminishing returns may be reached where the system determines it is not worthwhile to move the next room on the sorted list to another place on the hierarchy tree (or to another location in the topic space of FIG. 6) due to the room's lower level of topic clustering, the room's current small population, low activity rate and/or lack of intense user engagement in the room's uncategorized topic. If a room's population, activity, etc., dwindles down towards one or another of predetermined minimums, a separate automated scavenger process may delete the room from the catch all domain (close it down due to lack of interest) or merge it with another still-small catch-all room having similar room characteristics (similar long term topic clustering and/or similar room CpCCp or room DsCCp averages). If the result of test 443 is a No, then control is passed to step 443N. Here, because all of the sufficiently large catch-all rooms under the root's catch-all domain (D0 of FIG. 6) have been exhausted by steps 442 and 443 (at least for this current go around), step 443N terminates the "For each" loop of step 442 and it causes the process to point to the catch-all node of a next one of presorted domains (e.g., 450, 470 of FIG. 4B; or D1, D2, etc. of FIG. 6) listed under root. The domains may be presorted according to user populations and/or topic clustering with the most populated and/or most tightly clustered one appearing first. Path 441b causes the algorithm to be repeated for the catch-all node(s) in the next non-catch-all domain. When all or the larger of the non-catch-all domains have been exhausted, the process will revert back to entry path 441a and begin all over again with the catch-all domain (D0) and the biggest and most tightly topic clustered catch-all chat rooms currently running under that root domain.

If the result of test 443 is a Yes, then control is passed to step 443Y. In one embodiment, the room is marked as "warrants migration" and a separate migration handling thread picks up the task while the "For each" loop of step 442 process the next room on its sorted list. In step 443Y, the process of attempting to migrate the given room to another place in the hierarchy tree or to create a new domain and/or new non-catch-all topic nodes for it is begun. Because the room has a fairly large user population, the room will have inherited its own averaged CpCCp and/or averaged DsCCp from the profiles of its individual users. In step 444, the room's averaged profile(s) is/are submitted to a Lookup service (e.g., a DLUX module) so that the DLUX can automatically generate a proposed location in topic space (e.g., 600) based on those averaged profiles). Alternatively or additionally, the trended topic clustering within the room is used to automatically generate one or more proposals of where the room should be migrated to next. The trended topic clustering data may show a location in topic space where the room has historically concentrated and a location in topic space where the room's recent activity is trending towards. If the room's averaged topic clustering data and/or averaged CpCCp and/or averaged DsCCp closely correlate with one or more pre-existing and non-catch-all nodes already in the system hierarchy tree, then the Lookup service(s) will find those nodes in step 444 and sort them according to which found node is probably the best match for the room's inhabitants. These found nodes will constitute automatically generated destination proposals which the room's inhabitants can vote on. In one embodiment, users within a relatively large catch-all room are automatically clustered (see FIG. 5A) into smaller groups of more closely co-compatible users based on personality co-compatibility and/or other forms of co-compatibility (e.g., narrowness of topic, topic proficiency preferences, etc.). For the one embodiment, these small groups of personality-wise, closely clustered users (not to be confused with topic clustering) are automatically offered the option of cleaving out of the large catch-all into their own, topic-specific and/or personality clustered online room. If a prespecified portion of the clustered mini-group of personality co-compatible users agree, then lookup step 444 bifurcates itself to serve the agreeing mini group as well as separately serving the non-agreeing others in the to-be-migrated catch-all room. The migration possibilities offered for voting upon to the agreeing mini group may be based on mini group statistics rather than on statistics (e.g., trended topic clustering data) of the whole room.

Step 445 tests to see if the automated look up process looking for destination nodes to propose was successful. If No, because there is no pre-existing node in the system hierarchy tree that already closely matches with the room's topic, control passes to step 445N and a new domain and/or new topic name plus its specification (different from those pre-existing in the system hierarchy tree) are automatically proposed based on data found in the room's profile(s) and/or the more dominant terms found in the room's recent transcript. For example, if the room profiles are very wide in scope and everyone in the room is talking about "HH" (where the system searches back to learn that HH is shorthand for Harry the Hairdresser, and the pre-existing nodes in the system hierarchy tree do not include ones directed to HH; then the automatically generated proposal may be one for creating a new domain named "Harry the Hairdresser". Later, rooms under this new domain will break off into separate topic and sub-topic nodes as groups break off to discuss different aspects of the HH phenomenon and the tree structure further evolves.

On the other hand, if the look up in step 444 produced one or more finds, then step 445 passes control to step 445Y (Yes) and the found nodes are posted as proposed and to-be-voted-on locations to migrate the current room to, with the highest scored find being listed first. In one embodiment, the proposal that is generated by step 445N (No) is appended to the bottom of the list produced by step 445Y so that users of the to-be-migrated room have the 445(N) result as another option to vote on.

In step 446, the automatically generated migration proposals of steps 445Y and/or 445N are submitted to the room's eligible voters or legislators to vote on and optionally debate over before casting final votes. In one embodiment, step 446*a* allows eligible ones of the room's users to debate, propose amendments, propose new migration targets, etc. The eligible users may be a predetermined subset of the room's user community or all of the then active members. The room may have preexisting quorum requirements. (If the quorum requirement is not met within a predetermined time, the thread jumps to step 447N.) after a predetermined debating time (if any) elapses, control passes to step 446*b* where the migration proposals are finalized and put out for vote according to the room's predefined voting procedure (e.g., majority wins, revote on the top three, etc.). In one embodiment, the to-be voted on destination locations are displayed to eligible-to-vote users in a topic space format such as the polar coordinates one of FIG. 6.

Test step 447 determines whether any proposal won and if so whether with a sufficient number of votes to justify migration. If No, next step 447N determines if there are any further room's on the list generated by step 442, and if Yes, it passes control to step 443 for processing the next room on the sorted list. If No, control is passed to step 443N (described above).

If test step 447 results in a Yes, control passes to step 447Y wherein the current room is migrated to a new node in accordance with the winning proposal. If the proposal was to simply move the room to a pre-existing non-catch-all node in the hierarchy tree, then this is done and information regarding the move is broadcast at least to the data center DLUX modules and also recorded in the data center GSDS (e.g., 431 of FIG. 4A). Later the move information is spread to other data centers when bandwidth permits. Part of a migration vote and move may include voting on and changing the name of the room and/or its specifications. If the winning proposal was to create a new domain node and then attach the current room to that new domain node (e.g., the "Harry the Hairdresser" domain) then this is done where the vote results dictate (to the extent allowed by system policies) the name of the new domain node (see 451, 452 of FIG. 4B) and the specification of the new domain node (see 453 of FIG. 4B). The room profiles may provide data for automatically filling in the common URL's list (454), common keywords list (455*a*), common meta-tags list (455*b*) of the new domain node. Alternatively or additionally, the room's voters who voted to create the new domain node may have an explicit say in how the common lists (e.g., 454, 455*a*, 455*b*) are filled in.

After the given catch-all chat room has been migrated to a newly-created domain or to a newly-created node or to a pre-existing node by step 447Y, control over the room migrating system resources is passed to step 448. Here, a system resources scheduler determines how much bandwidth is available for continuing to perform room migration operations. If resources are currently in short supply (tight), then the scheduler of step 448 may decide to restrict the background rooms migrator to moving catch-all rooms only out of the catch-all domain of the system's hierarchy tree to some other domain and/or a topic node immediately under the domain node but not to a more refined position in the hierarchy tree. Refinement can take place at a later time when more resources are available. In that case control is next transferred to entry point 441*a*. Step 441 is repeated with the node pointer pointing at the root node.

On the other hand, if bandwidth constraints are mild (medium), the system resources scheduler of step 448 may decide to instead next pass control to step 443N. Under this pathway, one or more catch-all rooms of a pre-existing named domain node will be processed. On the other hand, if bandwidth constraints are substantially nonexistent (large, wide open), the system resources scheduler of step 448 may decide to instead next pass control to step 449. Under this pathway, the node pointer crawls through deeper, lower level nodes of the hierarchy tree below the level of the root's catch-all domain or the catch-all rooms of the highest level named domains. Once the pointer of step 449 is set to point to a lower level node (assigned on round robin or other fair distribution basis), control is passed to entry path 441*b* and from there into step 441. It is to be noted here that, in one embodiment, catch-all rooms come in different flavors. A catch-all room is one where the room's predominant domain and/or topic are not yet resolved and the room's participants are jumping around many topics without yet having settled their focus on one room-defining topic. However, just because the room's basic topic has not yet been defined, that does not mean that participants in the room necessarily are focused upon entirely different content items. They could be focused upon same or similar content items (e.g., a same URL) and yet be associating different topics in their minds to the same or similar content. By contrast, there can be other catch-all rooms where the participants are not focused upon any content at all or are focused upon substantially dissimilar items of content (e.g., unrelated URL's) and these participants have gotten together in a chat room simply because they like to talk to each other about nothing in particular. More specifically, the match-making system has clustered them into a no-common-focus room simply because their personality co-compatibilities are very strong (e.g., scored above a system predefined threshold). At some later point in time, users in any of these different kinds of chat rooms can vote to define a predominant domain and/or topic for their room and to migrate the room to another node in the data center's hierarchy tree or they can abandon the room and leave it to the system garbage collection services to automatically dissolve the room (and perhaps a temporary node under which it was sponsored). So to summarize, catch-all rooms may be ones whose users are focused upon a same item of content (e.g., same URL) or focused upon substantially similar items of content (e.g., different news reporting sites but directed to same news story) or not focused upon any interrelated content at all. The system may automatically identify these different kinds of catch-all rooms and maintain respective different vote and migration managing rules for managing votes and migration proposals made in the respective the different kinds of catch-all rooms.

Even after a catch-all chat room has been initially named and placed at a non-catch-all node, it's position in the hierarchy tree and/or its characteristics may not remain static and the same. Rooms have a tendency to evolve. As mentioned, users may enter and leave at various time points and by doing so change the averaged attributes of the room, particularly if it is a lightly populated room. While users are participating in a given chat room and voting, the system may automatically put up for a vote by the chat room participants, the Domain and topic names which the users think best describes the current chat. If a sufficiently large vote is received (in accordance with system defined rules for vote taking in that room), the system will reassign the room to the new Domain and topic, for example by a machine-implemented automated process such as that of step 443Y to step 447Y of FIG. 4D. Additionally votes from users in a chat room may be used to create room-validated Domain proficiency level values for the DsCCp's of users in the room who ask for their DsCCp's to be voted on by other room members. Domain and topic proficiencies may be further established by nontransparent displeasure votes cast by users (explicitly or implicitly) against other user in the chat room. For example if a voting user repeatedly expresses that they don't want to chat with certain other people because those other people have low proficiency for this Domain and/or topic or that their personality is displeasing, then that information about relative levels of proficiency can be used to increment up or down the proficiency scores in the DsCCp's of the voting users and the voted against users and thus normalize the proficiency scores given to the DsCCp proficiency scores and/or preferences of users in a given domain and topic room. Similarly votes regarding personality co-compatibility will be used to establish reputations in corresponding CpCC profiles. In one embodiment, the trending behavior store 437 of each data center keeps track of behavioral trends exhibited by users assigned to that data center. If a particular user normally does not cast negative votes and then one day it is observed she is casting negative votes against everyone else, the UAS 412 may automatically determine that the given user is having an unusually bad or off day and may then delete or discount votes cast that day by that given user.

The categorization location within a data center hierarchy tree (e.g., 401 of FIG. 4B) of a particular Domain/topic/subtopic node relative to other Domains/topics nodes with similar common CFi match values (e.g., 464, 465*a*, 465*b*, etc.) may be used to automatically create "related Domain/topic nodes" lists (e.g., distant relatives, see 468 of FIG. 4B) that can then be automatically published as in-box invitations (316*c* of FIG. 3A) in current chat windows displayed on respective client machines 440. Thus, if a given user is chatting in a first such room (e.g., 316*b*) and sees the list (316*c*) of related Domain/topics scroll by, the user may elect to migrate to one or more of the other chat rooms (316*c*) because the user feels the corresponding Domain/topics specified for those one or more other rooms are more suitable to the user's current interest. In one embodiment, the system may automatically keep track of how many users elect to accept this switch over option and to switch from a first given room (316*b*) to a second alternate room (in scrolling list 316*c*). For example if a large percentage of users who initially accept an invitation to enter a first chat room sponsored under the DomainA/TopicB node quickly accept switch over to a co-related second room sponsored under the DomainC/TopicD node (where A, B, C, D are different identifiers here), then it may be automatically determined from such in-mass switchovers by users that that the CFi hint values and/or knowledge-base rules used to initially match the switching over users to, and invite them into the DomainA/TopicB room should instead be used to automatically match them to the more preferred DomainC/TopicD node. The system adaptively alters its match service heuristics accordingly. For example, the system uses expert system pattern discovery services running in the background to discover what discernable pattern of attributes classifies certain users as preferring the room under the DomainC/TopicD node as opposed to the initially entered room under the DomainA/TopicB node. Thus the system can progressively improve its match making abilities based on user migration behavior.

In one embodiment, users who are displeased with having been invited into the DomainA/TopicB room of the above example and who do not see an alternate acceptable room being automatically published as an in-box invitation (316*c* of FIG. 3A) in current chat window are given a none-of-the-above vote option. By picking this option, they indicate to the system that they fervently do want to now chat about their focused upon current content, that none of the system-suggested domains and/or topics match what is currently in their minds, and therefore that the system should spawn a new domain and/or topic for association with the given content they are focusing upon. In response, the system automatically clusters the plural users (where their number has to be above a system predefined threshold) who picked the none-of-the-above option into a new catch-all room (of the kind that does have users focused upon common content) and the system initiates a vote process where the room users can propose new specifications for the room's domain and/or topic and vote upon the same. If predefined system vote requirements are met, the system automatically creates a new topic node (or even a new domain node, if enough people want such) corresponding to the desires of the winning voters in the none-of-the-above option room and migrates the room (and its participants of course) to the newly created node.

Referring to the specifics of FIG. 4B, one possible hierarchical organizing system 401 (as defined by stored data in a corresponding data center) is shown to include a global domains root 402 for its respective data center number, N. Each data center 410, 420, etc. will have its own root. Each root will having uniquely identified (e.g., numerically marked) branches 405, 407, etc. leading to respective domain level nodes 450, 470, etc. In one embodiment, the unique branch identifiers) of branches 405, 407, etc. correspond directly to or map through a data center lookup table (LUT, not shown) to the navigation type meta-tags that are usable in online content (e.g., as 317*a* of FIG. 3A) for determining topics of interest. Thus a corresponding meta-tag code provided in a user's uploaded CFi data (e.g., 118*a* of FIG. 1A) can be used by the matching service 150*c* of a given data center to hint at or directly address a corresponding node in the data center's domains configuration store 435 when performing a topic match.

Topic nodes and node-to-node interconnect branches in the hierarchical organizing system 401 of FIG. 4B may be represented by appropriate digital data objects stored in the data center hierarchy configuration store (e.g., 435 of FIG. 4A). Each topic node representing data object such as 450, at minimum is a data structure that is addressable by one or more system computers for data read and write operations and the object provides logical links (e.g., direct or indirect pointers) to on-topic information resources where at least one topic that these on-topic resources cover is a topic associated with the given topic node. The on-topic resources may comprise on-topic real time chat rooms (e.g., pointed to by pointers 459 of node 450) and/or on-topic reference materials (e.g., pointed to by pointers 459X) where the latter reference materials may be the ones recommended as further research materials or meeting proposals by a matrix like the research materials recommendation matrix 355 of FIG. 3B for example. Node-to-node interconnections between parent and child topic nodes may be provided by pointer data (e.g., 457) embedded in the topic node representing data object and/or in separate data objects that define parent-child relations between nodes.

The on-topic information resources (e.g., those pointed to by pointers 459, 459X of node 450) of each given topic node (e.g., 450) are not necessarily fixedly bound to the given topic node and are not necessarily dedicated to the topic node on a one-for-one basis. A chat room may migrate from one topic node to another as the topic currently discussed in the room changes. A chat room (e.g., 469*a* of node 460) may have more than one topic node pointing to it at the same time, for example because two topics are being simultaneously discussed in the room. (See for example, pointer 499 to room 469*a* which pointer comes from another node beyond node 460.) Migration of a chat room from one node to the next may occur as a Tarzan™-like swinging from one tree vine to the next with room first logically linking to a new next node before releasing linkage to an older but now less on-topic node (in so far as the room is concerned). Just as chat rooms are not necessarily unique to the topic being discussed in them (in other words, there can be multiple rooms per topic) and rooms can migrate about the hierarchy tree and/or in topic space, the same is roughly true of topic nodes. No one topic node necessarily has a monopoly on a corresponding topic because the respective topics of nodes can drift and two or more nodes may drift from spaced apart positions towards a same spot in topic space. The topic of a node is primarily governed by the topic being focused upon in the majority, mean or median of the node's chat rooms (or other alike real time forums). So if the mainstream discussions in the node's rooms drift toward a deviated topic without the mainstream rooms themselves migrating away, then the node as a whole should migrate to a new spot in topic space and optionally to a new spot in the system hierarchy tree. Stated otherwise, a given topic node (e.g., 460) is not necessarily fixedly bound to a specific position in the hierarchy tree 401 and may migrate to a new position in the hierarchy tree (e.g., under a different parent node and/or over different children) and/or may fuse with one or more other drifting nodes and/or may split apart into two diverging nodes, where such changes in hierarchy tree position may be voted for by eligible voters in the system or such changes in hierarchy tree relationships may be made by system administrators and/or such changes in hierarchy tree position may be performed automatically as an automated trending analysis service realizes that the node's cumulative attributes (as determined by modules 380, 390 of FIG. 3C; described below) has drifted significantly out of correlation with cumulative attributes of its parent node and more into line with those of a different, next-to-be parent node.

When a given topic node migrates to a new position in its hierarchy tree, or fuses with another node, or bifurcates into two spaced apart nodes, the on-topic information resources to which that moved node or node part currently links may be viewed as inherently moving with that node to the new position in the hierarchy tree (and/or to the new position in topic space). In one embodiment, all current participants in each room that moved because its node moved are briefly informed that their room has shuttled or warped to a new position in tree space or in topic space. After the node move and/or node bifurcation, some or all of the chat rooms or other resources logically linked to that moved node or node part may migrate away on their own or decay away from the moved node. When the latter happens, in one embodiment, all current participants in each room that moved are briefly informed that their room has shuttled or warped to a new position in tree space or in topic space. Thus from the point of view of users inside a room, there is no apparent difference between their room shuttling to a different node or the node itself migrating to a new place. By way of analogy, each chat room may be viewed as a kind of space ship that orbits its current node planet (or moon) where the space ship can shuttle off on its own to a new position in tree space or topic space or the planet (or moon) about which it orbits can change location. In one embodiment, when rooms are displayed as graphic on-screen icons, they are displayed as space ships orbiting a topic node planet (or moon) so as to give users a graphical sense of where they are in topic space, where nearby space ships are, where nearby planets or moons are, and so forth. (In this rooms-as-space-ships metaphoric world, the central star in the current solar system represents the catch-all domain of a given topic space and space ships can warp over to other solar systems to thereby place themselves in alternate topic spaces.) It is to be observed that just as space ships are not permanent fixtures of the planet they orbit, pointed-to on-topic information resources such as chat rooms (459) and on-topic reference materials (459X) are generally not part of the hierarchy tree node to which they current link. Rather the logical linkage is a temporary gravitational kind and the pointed-to on-topic information resources may be simultaneously pointed-to by multiple nodes and/or may drift in topic space (or tree space) so as to be seen as being under the gravitational influence of different nodes at different times. While knowledge of where in topic space (or tree space) one's current chat room is, may not seem to be of importance to all room users, it may be so to those who wish to take advantage of non-auto-pilot browsing through nearby space and to see and explore manually on their own what is happening inside a nearby other spaceship (a.k.a. a nearby other room; if let in upon requesting) or what is happening in nearby orbits of the current planetary node, and so forth.

Because the on-topic information resources (e.g., chat rooms, like 469*a*-469N of node 460) are logically linked to, by way of the topic nodes (e.g., 460) of the hierarchy tree, the topic nodes may be viewed not only as orbit-supporting planets but also as airport terminals (or more accurately, spaceport terminals) or as pass-through portals through which users of the system pass (or gravitationally touch upon) when the users are on their way to accessing the on-topic information resources (e.g., inside the chat rooms). The topic nodes may also be viewed as clustering centers around which plural users gravitationally cluster as they access the on-topic information resources that are currently of interest to them and happen to be orbiting around that specific node. In actuality, users themselves do not, of course, pass-through such portals or cluster around them. Rather the resource accessing processes (e.g., topic lookup computer programs) that provide the respective users with access to the on-topic information resources (e.g., to the chat rooms; or offer invitations to the rooms) interact with the topic node data objects (directly or indirectly) in such a way that the interaction can be analogized to having some users passing through, temporarily orbiting around, or clustering around the nodes. One of the interactions that warrant such analogy can be that of bringing personal baggage to the corresponding spaceport (to the specific topic node object). When this happens, spaceport authorities (actually modules servicing the node, such as 380, 390 discussed below) can insist on taking a sampling of the relatively current CFi data that was brought along or used by the user to get the user to that topic node because it was determined (e.g., because a DLUX, e.g., 362 of FIG. 3C determined) that the user is more probably than not, focused upon the topic of that topic node. The sampled CFi data can include a URL of a web page that the user was strongly focusing upon just before he or she was brought to that topic node. If enough passing through one of the users who touch upon the node have CFi data with the same URL, the system automatically correlates that commonly referenced URL (commonly referenced now) to the current topic of the given topic node. Such a URL can become one of so-called common URL hints (454 in FIG. 4B) of the topic node, as will be detailed below. If certain passing through users with strong credentials and/or reputations (e.g., validated or licensed) in the topic of the given topic node come with special, uncommon URL hints embedded in their CFi data (uncommon to the lay public, but common to the credentialed experts), the system automatically correlates those special URL's as being expert level hints pointing to the current topic of the given topic node. This is just an illustrative sampling of what can be done with the various pieces of data that passing through users bring with them as they pass through the portal-like topic node. Besides uploaded CFi data, passing through users can bring with them to the node whose topic is of current interest, their respective current CpCC profiles and/or current DsCC profiles; where the latter contain data that can be automatically correlated to the current topic of the given topic node. Besides uploaded CFi data and the carry-along baggage of CpCCp and DsCCp current profiles, passing through users may provide votes about the current topic and/or hierarchy placement of the topic node or suggestions for the topic node. For example, a highly credentialed expert in the current topic of the topic node may, when passing through; provide a suggestion that a subtle change be made to the specification (452, to be discussed) of what the current topic of the node is. This passed along suggestion can be automatically brought up for a vote by other voters eligible to vote on the fate of the topic node. (Where that fate incidentally, is not necessarily the same as the fate of a given chat room currently running under that topic node. The fate of each chat room can also be brought up for vote by eligible voters of the room, where the fate may include migration to a different topic node).

Aside from having a hierarchical position in the hierarchy tree 401, one or more of the topic nodes (but not necessarily all) can have data-defined positions in a prespecified topic space 600 such as, for example, sub-topic node ST1.45 (FIG. 6) being positioned within a topic shadow cone 601 (which cone is determined by sweep angle defining parameters of the node) of domain node D1 in FIG. 6. Positions in topic space of the given topic nodes can change based on user activity or votes. Positions in topic space may change even though a given node remains hierarchically anchored to a same parent node while the child's topic space position shifts. This can happen for example if the parent node changes position in the topic space or the child node changes angular position in the topic space. As with hierarchy position, topic space position can be changed in response to votes of users participating in chat rooms of the given node. Topic space position can represent inter-node relations other than those represented merely by parent-child hierarchy relations in the hierarchy tree. For example, topic nodes that are within a specified arc swing of each other and/or within a specified radial distance from each other in a given topic space may be deemed to have special relations such as closely inter-related topics. If one topic node in the outer reaches of topic space (far way from solar system center D0 in FIG. 6) is under-populated by chat room occupants and there is another topic node closer to the center of topic space and also lightly populated, where the two topic nodes are roughly along a same radial line or within a same shadow cone of acute angle (e.g., cone 602, whose vertex is at the origin), the system may automatically move the nearly empty chat rooms of the outer node to the inner node and then merge co-compatible ones of the rooms that now attach to the inner node. This is an example of how topic space may be used. In one embodiment, topic space coordinates (e.g., polar coordinates) of a given topic node (e.g., node 450' of FIG. 3C) are stored as part of the topic node object (e.g., in region 450pc of FIG. 3C).

Still referring to FIG. 4B and more specifically to the first root-to-node connecting branch 405 of FIG. 4B, it is noted that this exemplary branch is uniquely identified by the global domain tag number: "001" (which number is encoded in the data object or object portion representing branch 405). As a result, the first topic node 450 at the end of this first branch 405 may be navigated to from the root node 401 by specifying connecting branch 405 having global domain tag number: "001". The first exemplary node 450 is assigned a dynamically changeable primary topic or domain name 451 either by users or by the system administrator. Examples of primary domain names may include: News, Entertainment, Health, and so forth. Some users may prefer an alternate or alias name and the illustrated system allows for such alternative naming of domain or topic nodes by means of alias name entries like that of memory area 452. The name given to a domain may not fully explain its corresponding mission and/or what topic topics are to be included or not under the shadow of that domain. Accordingly, in one embodiment a covered-topic(s) specification record 453 (e.g., a database record or field therein) is logically attached to the domain node object 450 to better define its mission statement and/or what topic or topics are intended to fall under that dynamically re-namable domain node 450. In one embodiment, users in chat rooms currently attached to the node may vote on what constitutes an acceptable specification 453 for the given domain node or the system administrator may fix such a node specification 453. In one embodiment, essentially all attributes of each domain or topic node including for example, topic name (451), topic specification (452), node parent name, node location in topic space (see 450c of FIG. 3C), node URL or other hints, etc., are stored as keyword searchable fields in a relational database so machine-implemented searches can be made for example, for all topic nodes currently having a topic space radius of R1 (a supplied radius value) and having a topic node name including the word "soccer" and having a topic node specification including the word "judge" or "referee". This of course merely being an example. Although not shown in FIG. 4B, each topic node (e.g., 450, 460, etc.) may additionally have routine directory attributes stored for it such as, but not limited to: date and time of node creation, date and time of last modification, date and time of last access (by a system administrator), access permission, amount of data storage space consumed for specifying the node, number of hits per minute by DLUX services referencing the node, and so on. Accordingly, database searches may query for all nodes newly created in a certain time range and having a hits rate exceeding a specified threshold number.

When uploaded CFi's are received from different client machines and the domain/topic lookup process (DLUX) determines that these CFi's hint at a given topic node such as 450, the system looks for those of the corresponding CFi's that include URLs as their topic hints. Statistical analysis of incoming CFi's may indicate that some URL hints (or other content address identifiers) are currently more popular or common than others for pointing to a given domain node (e.g., 450). Other analysis of incoming CFi's may indicate that credentialed experts in the current topic of the given topic node favor a particular subset of URL's when apparently having the topic of the given topic node currently on their minds. In one embodiment, these more commonly seen URL hints are stored in logically attached, URL hints record 454. The expert-preferred URL's may be similarly copied into another hints record (not shown) like 454. These more commonly seen URL hints (or other address hints) and/or the expert preferred URL hints (or other address hints) may be automatically copied into template DsCCp records and/or into user's DsCCp rules set (see 195 of FIG. 1C) so that the same information can be communicated to resource users when they review their own DsCCp's and thus they can learn about which URL's are most commonly used by lay people and/or credentialed experts for a given topic of interest. In one embodiment, the domain lookup service (DLUX, discussed below) consults with the common URL hints record 454 (and optionally with the experts' pick URL hints record) of each domain or topic node as well as with the user's DsCCp to determine whether there is a probable match between the topic of current interest on the user's mind and the corresponding topic node 450. If yes, a corresponding match request may be generated for handling by a domain or topic specific match service (DsMS) to match the user with a personality or otherwise co-compatible chat room. A similar scheme may apply to commonly used keywords found within the CFi's of lay users and/or topic experts as indicated by attached keywords record 455*a*. A similar scheme may apply to commonly used meta-tags (other than special hierarchy navigation tags) within the CFi's of lay users and/or topic experts as indicated by attached meta-tags record 455*b*. Ellipses 456 indicate that yet further hinting mechanisms may be similarly attached to the corresponding domain node 450. If the domain lookup service automatically determines that there is a sufficiently strong match of interest for just that domain node 450 and none of its children, the domain lookup service (DLUX 415 of FIG. 4A) will forward the found user-to-domain association to a corresponding domain match service (e.g., 416 of FIG. 4A). Once the DsMS 416 finds or creates a co-compatible chat room (see room 469*a* of node 460), the DsMS will generate an invitation to one of the chat rooms pointed to directly or indirectly by the node's room pointers 459. In one embodiment, each domain and/or topic node has just one primary rooms pointer like 459 which points to a database record (e.g., to an expandable linked list) containing pointers to corresponding chat rooms that are currently associated with the topic of the node 450. The pointed to chat rooms may be hosted in the local data center or in a remote data center. Chat rooms are not permanently married to the topic nodes which point to those chat rooms. As mentioned above, the main topic or topics of discussion within a given room may change over time and as a result, the chat room may become de-linked from a first topic node (e.g., 450) and re-linked to one or more new topic nodes (e.g., 460, 480). Also, the topic name and/or topic specification of a given topic node may change from time to time; in which case, some rooms may elect to migrate away from that node and others may elect to migrate toward that node. Additionally, it is to be understood that although a given node such as 450 may point directly or indirectly to a large number of chat rooms that are taken to be substantially on-topic relative to the current topic of the given topic node, not all of these rooms will necessarily meet the co-compatibility preferences of the then-being-serviced user which is why the DLUX service 415 hands off the job of filtering for rooms that are not only on-topic but also have chat co-compatibility with the then-being-serviced user to one of the DsMS services 416. Accordingly, the CpCCp and/or DsCCp's of the then-being-serviced user will be consulted to narrow down the list of chat rooms to which the user will be invited (if at all; if the measured co-compatibility score is high enough). Finally if the filtered down list of co-compatible rooms is too long (exceeds a predefined target value), a randomly selected subset of the list may be used to generate invitations that are actually sent to the then being serviced user via the Cciv's (e.g., 118*c* of FIG. 1A). In one embodiment, data is stored to indicate that respective chat rooms have their own personality and/or topic proficiency profiles (CpCCp's and DsCCp's) as inherited from an averaging of the room's current participants and/or as voted on by the current participants. The room's profiles may be used to develop distancing vectors (see 562 of FIG. 5A) between the room and potential new users. These distancing vectors may operate to automatically keep out from the room newcomers who are objectionable to the room's current occupiers.

While examples given herein have mostly focused on users who are to meet online, it is also within the contemplation of the disclosure to have users meet in person with the aid of the match-making system. Consider a first user who happens to be at a large business convention; say MacWorld™ in San Francisco where hundreds of Apple Macintosh™ devotees meet annually. Let's say that professionally, this first user is an expert in Java scripting algorithms as used on the Macintosh™. However, at the current moment he is not interested in talking more about Macintosh™ Java scripting. He is all talked out about that topic. His uploaded CFi's of the last two hours show that he is currently interested in talking about vacationing in the Bahamas; and more specifically, which hotels there are best. Unbeknownst to the first user, there is a second user also attending the MacWorld™ convention. The fact that both users are concurrently at MacWorld™ is indicated by their recently uploaded CFi data, both showing GPS determined positionings in the Moscone Convention Center in San Francisco. The second user's recently uploaded CFi's of the last few hours show that he too is current interested in the topic of good hotels in the Bahamas. In one embodiment, the system invites the first and second users to a chat room whose current topics of interest are the MacWorld™ convention and hotels in the Bahamas; with emphasis (more weighting) being placed on the latter. In one embodiment, the system also automatically mentions in the invitation that the other user happens to be physically at the MacWorld™ convention and appears to be co-compatible chat wise (and more particularly for in person chats) with the invited user. The two users may then negotiate online to meet in person at the MacWorld™ convention; not for the purpose of talking about Macintosh™ Java scripting, but instead to talk about best vacation hotels in the Bahamas. With their joint agreement, the system may then automatically flash the photograph of the other user, his CV or resume to the portable client machine of each user and use uploaded GPS data (from their cell phones) to indicate how far apart they are and in what direction. In this way, two relative strangers at a large business convention may be brought together to chat about a topic of current interest, even one having little to do with the business convention. If they form a strong friendship bond over the first topic (e.g., Bahamas), they may later move on to other topics of mutual interest. This was an example of how currently uploaded GPS positions in combination with hints about topic of current interest can be used to automatically bring together people who might not have otherwise gotten together despite having many topics of current interest in common.

With regard to invitations (e.g., the Cciv's 118*c* of FIG. 1A), it is to be understood from the above that each Current Chat Invitation (Cciv) may provide information serving as a recommendation for a particular chat room or for another user-to-user real time exchange or for a non real-time interchange (e.g., blog) that a user might want to join based on inferences made by the match-making services in the cloud regarding likelihood of sameness or similarity in current topic of focus, likelihood of personal co-compatibility with other chatters in the room or with the room in general and/or likelihood of desired levels of proficiency by the user and/or by other chatters in the room with respect to one or more topics. In other words, although much of the above disclosure has focused on indexing real time chat rooms under topic nodes of a system hierarchy tree, it is within the contemplation of the disclosure to index non-real time online destinations or in-person meeting proposals under topic nodes of a system hierarchy tree and to automatically infer one or more topics of current interest of a client user based on recent content that was focused upon by that user and to then automatically suggest to the user (e.g., by providing a hyperlink to the suggested online destination, where such suggestion is a broadened form of invitation) that the user may want to link to the suggested online destination (e.g., an online blog, and online tweet stream, online proposal for an in-person meeting, etc.) In one embodiment, both real time chat rooms and non-real-time or off-line exchanges such as blogs, list-serves, etc., are stored under nodes of a system hierarchy tree and the tree's configuration (e.g., hierarchical organization of nodes) is controlled by votes cast from the chat rooms. Thus a living hierarchy tree is formed that can change its configuration in substantially real time in response to current votes of online chat room users and the topic nodes of the tree can point not only to chat rooms that are currently on-topic, but also to non-real-time on-topic exchanges such as blogs or meeting proposals and even to static content providing web pages associated with the node topic. In one embodiment, vote-eligible participants of chat rooms running under a given topic node are empowered to recommend or de-recommend and vote on non-real-time on-topic exchanges and/or on-topic static content providing web pages that the tree node will point to. The on-topic pointers to non-chatroom content may point or otherwise logically link to a variety of non-chatroom content including, but not limited to: on-topic videos (e.g., recent YouTube™ clips), on-topic books, on-topic movies, on-topic TV shows or online shows, on-topic shopping lists or lists of vendors that service the public with items related to the node topic and so on. When one or more chat rooms depart from the node (due to migration to at least topic or loss of participants), the characteristics of the node automatically change (e.g., at prescribed checkpoint times). These automated changes can include changes to the non-chatroom content pointed to by the node.

The recommendation information provided by each Cciv may include: (a) Summary data about the chat room or about non-chatroom material that can help the user decide whether to join the chat room at this time and/or open the associated non-chatroom material (e.g., the summary can provide the current name of the topic node, the name of the chat room, a description of the room topic, a summary about moderator or lead contributors, etc.); and (b) The data needed to enter that chat room (i.e. the identity of the CRS resource hosting that room, identity of the hierarchy location of the to-be-joined chat room (i.e., domain/topic/subtopic/etc.)), (c) An indication of whether it is a new room being now created, etc. and if so number of other users expected to join. The cloud may provide this or various other forms of recommending data as may be indicated to be desired by the user population. Automated means for adapting to the informational desires of the user population may be incorporated in the cloud as well as means for delivering the desired information for determining whether or not to join a chat room or other user-to-user real time exchange or to open the associated non-chatroom material (e.g., non real-time interchange such as blog, tweet, list serve, etc.).

When a DsMS takes on new chat rooms as being covered by, for example a new hierarchy node added under the hierarchy tree region managed by the DsMS, the DsMS performs an inventory collection run regarding its newly acquired node and underlying rooms by querying the responsible CRS's (418). This inventory collection run may include querying the CRS's handling the new rooms and obtaining from the CRS's answers to questions such as: (a) Current Status of the chat room, i.e., open and running or empty and not running; (b) List of open chat rooms under the management of the given CRS; (c) Counts of participating members in each of the running (active) chat rooms; (d) Details regarding the members in each chat room; and (e) Average number of transactions per second or other time unit for each of the active chat rooms under the management of the given CRS. The DsMS can use this collected information to manage and redistribute its workload as necessary. For example, if a newly acquired group of chat rooms is very busy and corresponding co-compatibility scoring and sorting for members of the newly acquired group of chat rooms will probably overload the DsMS, the DsMS can contact its supervising DLUX or AARMS and request reassignment of part of the chat rooms covered by the given DsMS to another DsMS. An example of when a DsMS may be forced to take on a newly acquired group of chat rooms is when those chat rooms are initially designated as catch-all rooms but then the system recategorizes them as belonging under a pre-existing or new topic node managed by the given DsMS.

Each domain node in the hierarchy, such as node 450 may have one or more child nodes logically attached thereto as indicated by the immediate child pointers shown at 457. This is mostly conceptual. In one embodiment, there is just one immediate child pointer at 457 pointing to an expandable linked list of pointers which then point to the child nodes. In this way, the number of child nodes can be more easily expanded or contracted as appropriate for current system conditions. In the same or another embodiment, each child node has a pointer (not shown) pointing back to its immediate parent node. This allows each parent node to have a highly variable number of immediate children.

Each of the child pointers (e.g., 457*a*) in FIG. 4B is uniquely identified (e.g., numerically marked) such as by the illustrated "0.01" identifier and it points to corresponding child node 460. If a pulled in navigation type meta-tag (navMeta-Tag) within a user's CFi reads as "001.01" then the domain lookup service (415) may use this parameter to automatically determine that the CFi is hinting at navigating to domain node "001" (node 450) and from there to corresponding child node ".01" (node 460). Each child node such as 460 may have a similar data structure as that of its domain node 450 including having a topic primary name stored in record area 461, an alias name stored in record area 462, a topic definition stored in record area 463, a further logically attached memory region 464 which stores the most commonly used URLs for referencing that topic 001.01, a further memory region 465*a* which stores the most commonly used keywords for referencing that topic 001.01, a further memory region 465*b* which stores the most commonly used meta-tags (other than special hierarchy navigation tags) for referencing that topic 001.01, and pointers 467 to immediate subtopic children of the given topic node 460. In one embodiment, additional pointers 468 may be provided to point to distant relatives of the given topic 460. For example other domains or topics that are somehow cross related with the given topic node 460. Similarly, each domain node (e.g., 450, 470) may include pointers to distant relatives of that node such as indicated at 458, 478.

As seen in FIG. 4B, the second domain branch 407 (navigation wise meta-tagged as "002") and its respective node 470 have similar data structures, like primary name 471, etc. logically attached to them and further topic data structures such as node 480, etc. attached thereto and so on. A complex and logically interlinked hierarchical tree 401 may therefore be built up in each data center (410, 420) out of these basic structures. While the illustrated logical links of FIG. 4B are shown as one way links, it is within the contemplation of the disclosure to use indirect pointers to expandable linked lists or database tables or to use reverse-directional links which point back from children to parents or grandparent nodes as well.

When a match-making service invites a user into given first chat room, the invitation accepting user may discover that the room is not quite to his or her liking. The reasons can be many and varied. For example, the topic of interest in the system suggested room is not exactly what the invited user had in mind. Another possibility is that the personalities of the other users in the room are not quite to the invited user's liking. In one embodiment, an invited or accepting user can invoke a "browse the hierarchy tree" function from his local machine. In response, the match-making system sends back a display of folders and subfolders representing the nodes of the tree with the contents in the folders representing that node's chat rooms. (In one embodiment, some premium nodes may be hidden from nonpremium users.) The displayed hierarchy indicates where the current invitation points to and provides the user with the ability to manually browse (navigate among) the displayed nodes, either horizontally within a given parent folder or vertically up to a higher level parent folder or deeper down into a direct child folder. Additionally the user may navigate (with or without the aid of user-specified filtering constraints e.g., show me only rooms that have an average age above 35 years old) along the indirect connection paths offered by the distant relative pointers (e.g., 458 of FIG. 4B) in search of better matching chat rooms. In other words, after the automated match-making system guessed almost correctly regarding what the user had in mind and/or regarding the kind of co-compatible other users the first user wants to converse in real time with, the first user can tweak the results by manually navigating in the hierarchy tree horizontally and/or up or down along its branches in search of a more suitable chat room that is logically associated to the automatically suggested chat room (to the one the system invited the first user to). Of course, not all nodes will necessarily have active chat rooms. If a node does not have an active chat room, the user may ask the system to invite others to join the user in a chat room under that node. After a user picks a new node or room better to his liking, asks to be invited into the active chat room, and does get invited into it (not always guaranteed because some rooms have restrictions), the system records the event in a trending history file associated with the user; and later when bandwidth permits, automatically invokes a knowledge-base patterns discovery service for discerning how that user's knowledge-base rules sets should be tweaked (if at all) in view of the user's browse-and-request-invite activities. The browse-and-request-invite option may be provided in combination with the above described "none of the above" option where multiple users reject automated match-making suggestions made by the system. Aside from displaying the nodes as parts of the hierarchy tree, the system may display to an authorized user, the nodes as distributed in a topic space such as that of FIG. 6 and may allow the user to navigate through the topic space.

Referring momentarily back to FIG. 4A, before the DLUX 415 and DsMS services 416 of a given data center (410, 420, etc.) process a client machine's CFi's as described above, the client machine (e.g., 440a) should establish a client/primary-server relationship with one of the data centers. This is done in cooperation with one of the Access and Accessible-Resources Monitoring Services (AARMS) 411, 411' in one of the data centers. In one embodiment, each client machine (440a, 440b, etc.) is pre-assigned a specific first data center as its primary home center and a geographically distant second data center as its backup home center. The client machine tries to first establish communication with its primary home center (e.g., 410), but if that does not succeed for whatever reason (power outage, etc.), after a predefined number of retries, the client machine will instead try to establish communication with its backup home center (e.g., 420). Irrespective of which home center (there could be a tertiary one, etc.) establishes the initial link, the home center may nonetheless refer the client machine out to a remote data center because resources in the home center are currently near an overwhelmed state. Determining whether this is the case is the job of the home Access and Accessible-Resources Monitoring Service (AARMS) 411 which operates in conjunction with its local Services Directory Store 431. As its name implies, the Global Services Directory Store 431 stores loading and availability data about substantially all services (of substantially all data centers) on at least a regional part of the network if not the whole of the network. For example, the GSDS 431 will store information indicating how busy the local DLUX service 415 is, about how busy the remote DLUX service 415' in a nearby data center (e.g., 420) is, about how busy yet another remote DLUX service 415" (not shown) in yet another online data center (not shown) is, and so on. The GSDS 431 will store information indicating how busy the local and remote DsMS services (416, 416', 416", etc.) are. The GSDS 431 will store information indicating how busy the local and remote chat room managing services (CRS 418, 418', 418" etc.) are, where this includes keeping track of how many users are chatting within each local chat room and what percentage of the chat room limits this amounts to. With this information, the AARMS 411 can determine whether resource within the local data center (e.g., 410) will be able to service a given client machine (one that is first logging in or one that is starting to send in CFi's directed to a new domain and/or topic) or whether the client machine will be better served by being handed off to a less loaded data center (e.g., 420). For example, if the local time for a first data center is the middle of a busy business day, then it may be expected to be under a heavy user load (generally speaking). On the other hand, a data center several time zones away where the local time is 2:00 AM may be expected to be under a much lighter user load (generally speaking) because most of its primarily assigned home users are asleep. So users trying to log into a heavily loaded first data center may be handed off by the AARMS (411) of that first center to the AARMS (e.g., 411') of a second data center several time zones away. In this way user load is redistributed among data centers so that no data center will generally become overloaded by too much traffic.

First of course, a just-turned on client machine should generally log-in into one of the data centers. This function is handled by the User Accounts-management Service (UAS) 412. In general The User Account service (UAS) facilitates and performs the tasks needed to create new user accounts, to save changed user profiles (e.g., CpCCp's, DsCCp's, rPEEP's in the local UAS data store 432) and to manage user passwords and other security measures (e.g., face recognition, voice recognition, etc.). Also, the UAS 412 may manage background synchronization of user records across plural data centers so that when a user account record is altered at one data center, the latest changes are automatically copied into other data centers when system bandwidth permits. In one embodiment, a background running updating service crawls through data centers during their light usage hours and updates old user records with newer ones that may have been created or modified in other data centers. The user's account related information is saved in one embodiment to a set of parallel storage devices (i.e. mirrored databases in different data centers) in order to facilitate fast data access during heavy usage traffic loads. Thus if a client machine tries to log into its primary home center but the local AARMS 411 flags that the center is not ready to accept this additional client, the AARMS 411 will automatically redirect the client machine to another data center which the AARMS 411 knows (from data in the local Directory store 431) has a mirror and/or most recently updated copy of the user's account information. The UAS (e.g., 412') in that alternate data center processes the user's log-in activities and then mirror copies the latest account activity into the primary home center (into data store 432) when network bandwidths allow for such data mirroring.

Upon logging in through the UAS (412) of a given data center, the AARMS (411) of that center begins collecting CFi (118a) packets from the logged-in client machine. The local AARMS (411) determines what rate of CFi's is being generated by the added on client machine (and/or what volume of CFi contained data is being generated per unit of time) and whether the added on client machine is a premium service user or a user with lesser service rights. The local AARMS (411) then determines whether non-premium users should be redirected to other data centers or have their rate of CFi's servicings curtailed to accommodate the just added on client machine (e.g., 440a). Of course, this process repeats as further client machines (e.g., 440b, 440c, etc.) log in and send in their CFi's. so the AARMS (411) is constantly monitoring usage loads on the services within its own data center and within sister data centers to determine how resources should be allocated and reallocated as traffic conditions change.

Just because a given client machine has been accepted by a local AARMS (e.g., 411) for servicing of that client machine's CFi's (and Cvi's), that does not mean that the work load from the client machine will be handed off to the local DLUX (domain lookup service) 415. Each local AARMS has it within its discretion to channel parts of its traffic to remote DLUX's (e.g., 415') rather than to the local one. The local and/or remote DLUX's have it within their discretion to channel parts of their respective traffic flows to DsMS's (e.g., 416') that are remote to them. Accordingly, when a given client machine is accepted for servicing by the AARMS of a first data center, that does not mean that the DLUX (domain lookup service) in the same data center will necessarily provide the domain lookup functions for all or part of the CFi's originated from the given client machine. It also does not mean that one or more of the DsMS (match services) in the same data center will necessarily provide the corresponding chat room co-compatibility matching services. A given client machine that links for servicing by a first AARMS (e.g., 411) may find itself getting invited into chat rooms being managed by the CRS (418') of a different data center. This will be particularly true if there are no co-compatible chat rooms in the data center of the first AARMS.

The CRS's (e.g., 418, 418') in each of the data centers provide typical chat room support features found in conventional servers that host chat rooms, such as facilitating real time discussions among groups or individuals and flagging problems out to system administrators. Additionally, the CRS's of the match-making system facilitate user-to-room activities such as allowing users in the room to make recommendations and/or vote on the chat room name, the system-supported description of the room, the position in the domain hierarchy where the controlling node for this chat room will be disposed (node categorization), the cross linked related rooms to which this room will point, the cross linked related nodes to which the node of this room will point, and other such mutually agreed to and shared information concerning characteristics of the given room. In one embodiment, each CRS also receives and processes explicit or implicit votes regarding content within the rooms under its control, such as votes cast in the form of Cvi's. The CRS may control cleaving of the room into plural rooms so as to separate warring factions and/or such as to merge lightly populated and co-compatible rooms so as to attain a predefined critical mass of participants in one room for purpose of keeping the discussions going. Each CRS (e.g., 418) may maintain interoperative interfaces with the other services (e.g., 411-416) in its own data center or even in other data centers for the purpose of support client operations and carrying out workload balancing.

In one embodiment, chat content messages and other chat-related feature messages are passed through the CRS hosting the chat room when moving between the chat room and the clients in that chat room. The CRS can then control discourse between users, by for example, banning offensive language or reporting suspicious activities to proper authorities. The CRS can also thereby detect changes in the primary topics being discussed within the room. As chat room conditions change, the CRS sends notifications to the DsMS that currently owns the chat room. These notifications may include information about: (a) Users entering or leaving the chat room; (b) Names or descriptions assigned to the chat room by its current participants; (c) Changes in the average (or median, etc.) CpCCp and/or DsCCp attributes of the chat room (which may indicate that the character of the room is changing because a new user population is moving in and an earlier is departing); and other such chat room specific information. If the character of a given room changes sufficiently, the supervising DsMS may responsively send a request to the supervising AARMS requesting a recategorizing of the room such that it is perhaps moved automatically or by user-approving vote to a different node in the domains hierarchy and/or pointers for interrelated rooms or nodes are changed to reflect the newly acquired character of the given room.

Incidentally, in one embodiment, users are allowed to present themselves in various chat rooms (per their choosing and if allowed by predefined room policies) under fictitious user names and/or as anonymous and yet their acquired ratings of topic proficiency, user credibility, etc., may be retained. The fictitious user name and/or anonymous feature may be vital for the safety and/or privacy concerns of certain users. For example, one user may be a diamond wholesaler who just received a new shipment of high quality diamonds. He of course does not want to advertise to the whole world his real name or the location of his store. Nonetheless he may want to publicize the event to a trusted user community, where later; trusted members of the community privately contact him for more information about his actual name and store location. Accordingly, in a system where fictitious user names are permitted and yet the system needs to keep trending data on the various users, a secured lookup table is maintained so that system service modules (but nobody else, except perhaps authorized system administrators) can lookup the user's real identity and attribute corresponding trending data to his or her account.

Referring back to FIG. 3C, now that many of the larger picture aspects of the system have been described, it is worthwhile to revisit details of the illustrated embodiment 301. Each topic node (e.g., 450') operates sort of as a nectar source for attracting to it, busy bee users who are swarming about (in a virtual sense) and trying to locate and touch certain system nodes (again in a virtual sense) in the hopes of finding match-worthy chat rooms (e.g., 459a) attached to the touched nodes and/or in hopes of finding match-worthy other informational resources (e.g., pointed to by 459X') that are probably on-topic with regard to the topics the respective busy bee users current have on their minds. When the interested busy bee users (or more accurately their lookup mechanisms) touch on a given topic node (where reference to bees is a rough analogy here), they bring with them to the node, certain pollen-like data in the form of the recent CFi data uploads (361, 371) they supplied to their respective DLUX's (362, 372) so as to cause the respective DLUX's to point (363, 373) to the given topic node (450'). This brought along pollen-like data can then be used for cross-fertilization purposes. More specifically, the recent CFi data uploads (361a) of a given first user are fed into one input of a difference engine 365 assigned to that first user (Sally 121") while the collected, recent CFi data uploads (371a) of other users (e.g., 111", 131", 141") who have also recently touched upon that same topic node 450' are fed into a second input of the difference engine 365. (The termed, touched, as used in this paragraph is understood to mean that the DLUX's 372 of the respective other users scored the "touched" node 450' relatively highly (above a predefined threshold) irrespective of whether invitations were sent to those other users and irrespective of whether those other users, e.g., 111", 131", 141", accepted the invitations.) The difference engine 365 automatically filters out the CFi data that is the same as what the first user (Sally 121") recently brought to the node and forwards the not-same remainder data to ranking engine 367. In one embodiment, the ranking engine 367 first parses the remainder data according to type (e.g., URL versus HTML heading versus meta-tag, etc.) and/or according to the credentials and/or reputation of the user who brought that data (which credential, reputation parameters can be found in the CpCCp file of the respective user). The ranking engine 367 then ranks or weights the remainder data according to one or more appropriate ranking algorithms. For example, a first ranking algorithm may call for ranking recently received URL's (found in the CFi data of the remainder data) according to popularity, with the most often used URL's being awarded the highest scores. A second ranking algorithm may call for ranking recently received URL's according to a function which combines (e.g., multiplies) user credential ratings in the topic of the given node (450') with each instance where the URL is included in that user's CFi data so as to generate rankings that are weighted by user credential ratings, with the picks by the most well credentialed users getting the greatest weight. A third ranking algorithm may call for ranking recently received URL's according to a trending function which gives greater weight to URL's that have seen a recent upsurge in use with regard to the topic of the given topic node 450'. Similar algorithms can of course be applied to other types of CFi data such as recently used search keywords (216d in FIG. 2A, 330b in FIG. 3A), recently used meta-tags (216f in FIG. 2A, 317a in 3A), recently used dominant words or phrases (320c in FIG. 3A) and so on.

In one embodiment, one or more of the ranking algorithms perform their respective ranking computations only after a newest group of N users (N being a relatively large number such as 100 or more if the node is heavily used) have touched the node with relevant new CFi data. Before the Nth new user touch is detected, the collected CFi data of other touching users are simply stored for future use. The ranking is then done by first filtering the collected data to identify relevant data trends (e.g., major new shift of per-room or per-node common URL's or other topic clustering data) based upon what was stored in the trending data store. The value of N can be varied based on the workload of the system and/or the historical usage load of the given domain or node so that N=1 if the system is under a light load (or the node is not heavily used) and N=(some large number) if the system is under a very heavy load and/or the domain or topic node is a heavily used one. Storing the ranked results only every Nth time can allow for offering of new recommendations to other users to be done faster because fewer real-time calculations will be needed by the ranking engines. In one embodiment, an appropriate sorting algorithm for sorting among the ranked items is chosen for each user based on the user's profiles. After such user-appropriate ranking and sorting, the list of ranked an sorted results is culled by subtracting out any duplicate results that match data supplied by this user so they are not given recommendations of web sites they have just come from. Such an every-Nth-touching technique could automatically provided for culling away of aged or stale older recommendations so that users receive fresh and often newer recommendations each time they accept a further research recommendation, where the recommendation(s) are supplied by the ranking algorithms.

The ranked output(s) of the ranking engine 367 are then fed to a sorting engine 368 which uses a user appropriate sorting algorithm (appropriate for first user 121") for picking out the best of the ranked remainder data to feedback as recommendations (e.g., 355 of FIG. 3B) to the first user. One appropriate sorting algorithm may be to simply pick the highest scored of the commonly popular URL's. another might be to pick the highest scored of the credentialed URL's. In one embodiment, a data reformatting module 369 reformats the data produced by sorting engine 368 into a format appropriate for the first user (e.g., into a matrix format such as 355 of FIG. 3B) and then downloads (369a) the formatted results to the client machine of the first user (121").

The above described generation of ranked recommendations for the first user (121") is repeated for others of the users (e.g., 111", 131", 141", etc.) whose benign spyware resulted in a touching onto node 450'. It is understood that respective instances of engines 365, 367 and 368 are operatively provided for the respective other users. As a result, an accumulation of best ranked recommendations are generated for the community of users who are recently touching upon node 450'. Module 375 automatically collects the best ranked (e.g., highest scored and most often repeated) recommendations produced for the users clustering around node 450', deletes duplicates among these (after scoring them for popularity) and saves them into accumulated recommendation files (not shown) pointed to by pointers 459X' of node 450'. Module 375 also keeps track of aging and popularity or recommendations and periodically culls the accumulated recommendation files (not shown) to remove highly aged and not so popular recommendations. As a result, the accumulated recommendation files contain the freshest and most recently highly ranked recommendations for the topic of the given topic node 450'. It is to be recalled that the topic of the given topic node 450' can dynamically change over time, the chat rooms (e.g., 459N) attached to node 450' can dynamically change over time, the users actively occupying those rooms can dynamically change over time, and so on. Thus it is valuable to keep the retained recommendations as fresh as possible so that users can find new recommendations they had not seen before when their associated match-making processes re-touch on node 450'. In one embodiment, highly rated ones of aged and to-be-culled recommendations are stored in a permanent collection of old but good recommendations and node 450' provides a logical link (not shown) to those oldies but goodies. Eligible premium or other users of the system are empowered to reference the permanent collection of oldies but goodies and pull out old recommendations that might be of interest to them.

Another module 380 in embodiment 301 also receives and collects the recent CFi data uploads (371a, 361a) of all users (e.g., 121", 111", 131", 141", etc.) who have recently touched upon topic node 450'. Same uploaded CFi data such as same URL's are counted so as to determine popularity of each hinting item relative to the touched node 450'. Some of the accumulated hint data (371a, 361a) is given additional weight based on topic credentials of the user who brought the data to node 450'. After counting and weighting, duplicate hint items are deleted and the remainder are stored into appropriate hint storing slots 454', 455a', 455b', etc. (456') of the node. Among the data items stored in the hint storing slots 454', etc., overly aged and low weighted items are decayed away over time by action of the hint slots stocking module 380. Accordingly, the hint storing slots 454', etc., remain filled with the freshest and most up to date hints used by the majority of users (or by the most topic credentialed users) in getting to the node 450' by action of their respective DLUX instances (363, 372). When a new user has his CFi data uploaded for purpose of finding a matching topic node, the new user's DLUX instance can compare the new user's CFi data against the hint storing slots 454', etc. of node 450' and other alike structured nodes so as to produce matching scores and thereby determine which topic nodes have topics that are most likely to currently be on the new user's mind.

There is more. Since every user whose node seeking software (or other automated node-seeking process) comes to touch on node 450' (and/or touches on another such node) brings his or her current personhood profile (CpCCp) with him or her, and since that personhood profile contains demographic information about and/or credentials information of (e.g., column 154 of FIG. 1B) the visiting user, additional modules (e.g., 390) of the system can automatically collect demographic and credential statistics about the kinds of users who most often visit what topic node and when and/or under what other surrounding conditions. Marketing and advertising professionals can use the collected statistics to detect trends in the interests of lay and professional user populations in different topics at different times and/or under different other conditions (e.g., holidays, unusual weather conditions, unusual news event conditions etc.) and use the same for real time adaptive tailoring of their marketing and advertising activities. Also since users whose automated node-seekers (e.g., software) touch on node 450' and/or other nodes also bring along the knowledge-base rules sets of the respective users (in the user profiles), further modules (not shown) of the system can automatically collect statistics about the kinds of knowledge-base rules that seem to work best in getting users to the topics they currently have in mind (this being based on also finding correlations between user acceptance of invitations and/or of recommendations and the rules that brought them to the given node). These are just a few examples of the kinds of useful statistical analysis techniques that may be used to take advantage of the fact that each individual user self-servingly wants to have his or her node-seeker touch on the topic nodes whose topics are of current interest to that user so that the user can potentially receive an invitation to an on-topic chat room or receive an on-topic recommendation or an in-person meeting proposal. The self-serving activities of many users bring useful cross-fertilization data to the node in a manner roughly similar to how bees bring pollen to nectar supplying flowers. The disclosed system gathers on-topic information by having users come to its nodes rather than the system having to crawl out over a vast internet looking for on-topic information.

In one embodiment, each heavily used topic node (e.g., 450', or even selected not-heavily used nodes) has one or more adaptively reprogrammable statistics gathering modules (e.g., 390) associated with it and operatively coupled to the node for collecting statistical information (e.g., demographic information) about the users and/or about their brought-along data (e.g., 371a, 505d", 506d") where the automated node seekers of those users brought them to that topic node (figuratively speaking) like bees drawn to the honey. Each statistics gathering module (e.g., 390) operatively couples (e.g., via bidirectional link 391) to one or more analysis controlling and analysis processing servers (e.g., 395). A controlling one of the servers (e.g., 395) sends data gathering instruction signals to the statistics gathering module (e.g., 390) telling it what data to gather and optionally how to initially process that gathered data (e.g., by weighting gathered data with coefficients and/or by averaging data over specified running windows, etc.) Each analysis controlling and/or analysis processing server (e.g., 395) can receive gathered data from plural nodes and/or can control the data gathering activities at each of the plural nodes. Bidirectional link 392 represents the data gathering and gather instructing linkage to the statistics gathering module (like 390) of another node. By collecting appropriate statistical data from selected topic nodes and processing the collected data as may be deemed appropriate for the analysis being conducted, the one or more analysis controlling and/or analysis processing server (e.g., 395) can automatically produce demographic and/or other trending reports indicating how system users are behaving in fairly recent times (especially with regard to joining real time chat rooms covering certain current event topics). The analysis controlling and/or analysis processing server (e.g., 395) can then automatically forward the reports to requesting ones of marketing and/or advertising organizations and thereby enable those organizations to adaptively adjust their behaviors in response to what is happening over a relatively current time period at one or more nodes of the hierarchy tree (e.g., 401 of FIG. 4B).

While actions of modules 380 and 390 have been described with respect to node-wide CFi data flows and node-wide analyses of the profiles of users whose topic lookup mechanisms substantially touch upon the node, for example when hunting for on-topic chat rooms to preferentially invite each of the users to, it is also within the contemplation of the disclosure to perform a parallel analysis of the same kind on a per-chat-room basis as opposed to on a node-wide basis. In other words, the per-chat-room parallel versions (not separately shown) of module 380 automatically each determine the most often included URL's in the recent CFi data flows of users of each respective chat room running under the node (e.g. 450') and store these in the parallel per-chat-room versions (not separately shown) of storage area 454'. Similarly, the per-chat-room parallel versions (not separately shown) of module 380 also automatically each determine the most often included keyword hints in the recent CFi data flows of users of each respective chat room running under the node (e.g. 450') and store these in the parallel per-chat-room versions (not separately shown) of storage area 455*a*'. The same applies for the parallel per-chat-room versions of storage area 455*b*' and of the other such areas 456'. Moreover, parallel per-chat-room versions (not separately shown) of module 390 collect per-chat-room demographic and/or statistics regarding the users whose topic lookup mechanisms substantially touch upon the node and thereafter invite them into (or consider in a significant way to invite them into—but don't due to higher scoring rooms—) the respective chat rooms running under the node (e.g. 450').

With such information and statistics being collected on a per-chat-room basis, it becomes possible to automatically map the respective chat rooms running under the given node (e.g. 450') relative to the node's mean and/or median of its chat rooms. Some rooms will have per-chat-room attributes (e.g., most often included URL's, most often included keywords, etc.) that correlate fairly closely to the node-wide mean or median of same attributes of the given node (e.g. 450'). Other rooms will have per-chat-room attributes that correlate more poorly relative to the node-wide mean or median of same attributes of the given node. In one embodiment, attribute correlation scores are automatically generated by analysis servers (similar to 395) and the chat rooms that are most deviant, correlation-wise or otherwise, relative to the node's corresponding mean or median attributes are automatically identified as candidates for automated migration to alternate nodes, where the respective alternate nodes have corresponding mean or median attributes that are more in line with the respective migration candidates' attributes. In one embodiment, the determination to automatically migrate a chat room to a new node is also made on the basis of how clustered the users of the room are in topic space to one another and/or how active the users are or how well populated the room is and what the turnover rate is between users departing the room and new users entering the room. A prioritization arbiter decides which rooms to migrate first on this basis. Accordingly, if resource availability is tight, the more tightly clustered and highly populated ones of deviant rooms will be migrated first and perhaps less focused and less active rooms, even if they are more deviant may be migrated later or not at all. As mentioned elsewhere herein, room users may alternatively vote on migrating of their room to a new location in the hierarchy tree and/or in topic space. In one embodiment, the more deviant of rooms are migrated automatically without use of user votes while less deviant rooms that are currently populated with a predefined quorum of vote eligible users may require the migration to be approved by the vote eligible users before being migrated.

Referring now to the Global Services Directory Data Store (GSDS) 431 associated with each data center (410, 420, etc.) shown in FIG. 4A, this GSDS functions as a central repository, whose data is available to all AARMS's in the network, and it stores information about all available services at least in its own local data center (e.g., 410) and in a predefined set of sister data centers to which the local AARMS can offload work to. The local and remote Activity Monitor Services (AARMS) can use this data when making decisions regarding work load distribution. In one embodiment, the GSDS stored data includes a database table having the following columns:

Column_1: Service Type—(Rows are: User Account service, Activity Monitoring service, Domain Lookup service, Matching service, Chat Room Management service, and there could be more or specialized variations of these services);

Column_2: Current Network Access path—(URL or IP Address used to access the respective service type from the client machines—this information is downloaded to and stored by the respective client machines, 440*a*, 440*b*, etc. when they establish contact with a given data center);

Column_3: Default Home Region—(Defines the geographic area(s) best served by the respective service, based on population demographics and the physical locations of the servers that can provide the respective services);

Column_4: Minimum workload threshold—(If a respective service's current workload (e.g., clients served per second) is less than this predetermined number, it becomes a candidate for being shut down to save power and to have its current workload consolidated into another server of the same type that currently has workload slack sufficient to absorb the to-be-consolidated workload);

Column_5: Maximum workload threshold—(If a respective service's current workload is greater than this predefined number, then the respective service becomes a candidate for having its work split and having one or more of the split apart portions distributed to other services (e.g., remote services) of the same type); and Column_6: (AMS Assignment—the Activity Monitor Service (AARMS) that is the current owner (supervising Parent) of this service).

As indicated above, for other than the AARMS service; each in-data center service (e.g., 412-418, but there could be more) will have a supervising Parent AARMS watching over its workload. The supervising Parent AARMS need not be a local AARMS. Additionally, although the respective supervising Parent AARMS are/is primarily responsible for assigning jobs to the respective in-data center services, other AARMS (e.g., remote ones) can also assign jobs to the respective in-data center services after getting approval from the respective supervising Parent AARMS. During start up of a data center, the local AARMS (Access and Accessible-Resources Monitoring Services, e.g. 411) will each fetch from its local GSDS (e.g., 431) a list of the services under its assignment (for which the AARMS acts as the supervising Parent) and current settings of those assigned services. GSDS assignment data is continuously mirrored from one data center (e.g., 410) to the next (e.g., 420) so that data centers at least of a given geographic region if not globally across the network are aware of which AARMS is the primary supervisor for which on-line service. GSDS assignment data (in 431) is updated when: (a) one or more new services are added to the corresponding data center; (b) characteristics of an existing services are changed (an example of this may be when workload threshold settings are upgraded because getting the physical or virtual server hosting the respective service is upgraded); (c) one or more on-line services go off line (for maintenance or other reasons) and (d) primary responsibilities for one or more services are transferred from one AARMS to another.

As already indicated via FIG. 4B, the Domain Configuration Data Store (DCDS, 435) in each data center stores data representing a hierarchy of domains and topics and associated attributes of each domain, topic, subtopic, etc. The associated attributes may include: (a) the domain or topic node's primary name; (b) the specific location in the domain hierarchy to which the node is assigned; (c) a set of CFi hint or clue values that may be used during topic lookups for correlating the given domain/topic node with probable interest by the CFi's user; (d) a list of current chat rooms in use or available for use by users correlated with the domain or topic of the corresponding domain or topic node; and (e) counts of the number of users per chat room using the room and the maximum and/or minimum number of users allowed for the respective room and/or activity rate of the chat room (e.g., transactions per hour or per day—where this might be a criteria for a user to want to join or not the room based on the speed of activity by other users). The hierarchy representing data in the DCDS 435 of a given data center may be mirrored to multiple physical storage locations within the same data center and also into backup storage units in other data centers. Mirroring of such data can help distribute the read load of the main DCDS 435 in the data center and thus improve the speed with which client machines can read that data from over the network 430.

Referring to the Trending Data Store (TDS) 437 of FIG. 4A, this storage is used for maintaining histories of user activities and detecting trends of behavior (and/or instance of abnormal behavior) by individual users (across the entire system) as well as by user populations on a per data center basis and/or on a per domain and/or topic basis. Stored trend data is accessed by one or more system trend data analysis services (not shown, can be shared by plural data centers) which uses the data to make system alteration determinations such as: (a) determining when new domain and/or topic nodes should be created or obsolete ones should be deleted from the DCDS (435) of a given data center based on user population activity at that data center; (b) determining when the common CFi hint parameters (e.g., 454, 455, 456) associated with a respective domain and/or topic node should be modified to conform to changed behavior by user populations; (c) determining when and what adjustments should be made to CpCCp's and/or DsCCp's of specific users based on historical analysis of their Cvi's so that the CpCCp's and/or DsCCp's reflect the actual preferences of these users based on how they actually behave rather than just on how they respond to surveys about their stated preferences; (d) determining which popular domain and/or topic nodes should be featured as user-recommended domains or topics on one or more system provided, Most Popular Topics web pages (not shown) thereby providing users in given geographic locations and/or users having certain general preferences with real time changing advisements as to what chat room topics are currently most popular for like situated other users, where these "live" popularity sites provides living examples of such on-topic chat rooms and provide hyperlinks to such popular chat topics thus giving visiting users the ability to easily join corresponding on-topic chats by single clicking on the hyperlinks. The system trend data analysis services can further use the trending data to (e) determine when and how a specific user's preference profiles should be adjusted based upon trends in their browsing and/or chatting history. For example, the system may determine from trending data that the given user prefers chatting with argumentative people when discussing soccer even though the user specified in his CpCCp or DsCCp that he prefers to chat with agreeable people regarding the topic of which regional team is the best soccer team. In one embodiment, the system trend data analysis service does this by automatically comparing the overall temperament of other users in each soccer related chat room the given user has recently visited and chatted on to the actual degree of involvement by the given user in those contentious rooms and/or to the lengths of time spent by the given user in those apparently contentious rooms. In other words, even though the given user states in his self-filled preference survey that he likes noncontentious rooms for this given topic, his actual behavior indicates that he prefers the exact opposite. In one embodiment, the user's preference for contentious versus noncontentious rooms or vise versa are detected by automatically logging the user's biometric data (e.g., increased heart rate, breathing rate etc.) at his local computer, uploading these to the associated Trending Data Store (e.g., TDS 437) and then causing the system trend data analysis service (not shown) to infer the same as being temperament measurements and then to correlate these temperament-representing measurements to the different topic nodes through which the user enters into the various chat rooms. The system trend data analysis service periodically reviews stated preferences versus temperament-indicated preferences and adjusts CpCCp's and/or DsCCp's to reflect actual preferences as opposed to self-described preferences. It is to be noted that although descriptions herein of the other in-data center services do not mention the Trending Data Store (e.g., TDS 437), in one embodiment, each of those other services routinely submits behavioral trend related data to the user-associated TDS in order to log the activities for later analysis.

Referring to the disposition of the plural data centers (e.g., 410, 420, etc.) of FIG. 4A, it is to be noted that the hosting of the various chat supporting services (e.g., 411-418) on plural servers that are distributed among physically separate datacenters provides benefits such as: (a) the match-making services can remain available to client machines in different geographical locations even if a local home datacenter goes off line. The client machines are programmed to try and connect to the AARMS and/or UAS of alternate data centers (e.g., secondary home) if connection to the primary home center fails for a predetermined number of consecutive retries. Outages at specific data centers may cause certain pre-existing chat rooms to be temporarily unavailable. However, system users will still continue to be invited to join alternate chat rooms (for the same topic and having similar co-compatibility attributes) hosted by alternate data centers, and thus outage at one data center would not result in a complete service outage. By using plural regionalized data centers (e.g., one for every so many square miles or for a predetermined number of users) another benefit is (b) that each data center can have its resources custom tailored to provide optimal performance for its particular geographic region. For example, an island (i.e. Taiwan) may have a high speed internet infrastructure within the island, but a slower connection to the rest of the world. Placing a data center with high speed connectivity directly on this island would provide optimized performance for its residents. The number of datacenters within a geographic region, and the configuration of the servers within the data centers, can vary based on historically observed load requirements and trends. The combination of services running on servers (virtual or real) distributed in a cooperative group of datacenters may be referred to as an in-cloud cooperative group.

An in-cloud cooperative group may grow and evolve as the number of users and/or their geographic displacements increase. During periods when usage is expected to be light (e.g., during initial alpha testing or in a region where adoption rates are low), a single physical server within a single data center may suffice to host all of the services for that budding data center. However, as more users in a region discover the advantages of automated invitations to chat rooms that have been pre-screened for topic and personal co-compatibility, the concomitant increased usage expectations will warrant placing multiple physical servers within the single and still nascent datacenter. Each of these physical servers may host one or more of the in-data center services. However as usage increases yet further and a single data center can no longer provide sufficient the robustness and reliability of service to a population users with growing demands, it will become desirable to share work loads among services running in multiple datacenters where the data centers (e.g., 410, 420, etc.) are configured to communicate with each other via a private network 439. More specifically, as mentioned above, it may become advantages to merge services dedicated to esoteric topics and small user populations into relatively slower and smaller servers while splitting services dedicated to highly popular topics and having very large and growing user populations among a plurality of higher speed and larger servers. Thus cost of services is allocated based on the desires of the user population.

Referring again to the AARMS units (411, 411') in each of the data centers of FIG. 4A, there can be multiple ones in each data center. They can operate as virtual instances and/or as physical units. Only one AARMS instance per center was initially assumed in order to simplify the introductory discussion. Each AARMS (Access and Accessible-Resources Monitoring Service) maintains a pool of its own servers (acts as the supervising parent of those servers) where the AARMS owned servers provide corresponding non-AARMS services such as 412-418. Each AARMS also acts as primary home access point for an assigned set of client machines. (The client machines initially try to connect to that AARMS when logging-in into the system.) The number and speed of resources in each AARMS controlled pool is adjusted by system administrators on a periodic basis to ensure that no server or service has too much of a workload (due to too many client machines and/or too many power users in the corresponding user population) and that no match-making cluster has so few clients that it cannot offer a sufficient number of co-compatible chat opportunities to its client respective user population.

When an AARMS instance (e.g., 411) starts up, it accesses its pre-assigned service directory (e.g., 431) to get a list of the resources it is primarily responsible for and also a list of resources at its disposal for off-loading excess work to. While running, the AARMS will keep track of how each of the service resources it owns is being utilized (e.g., what slack in bandwidth is available). Each time a client machine (e.g., 440b) initially tries to connect to its home data center via public network 430, the client machine first tries to connect with its pre-assigned home AARMS. If this fails, the client machine tries an alternate AARMS and works down a list provided for example on a dedicated web page or as on-network list (dedicated for providing a list of alternate AARMS). The AARMS which picks up connection with a signing-in client machine first interacts with a corresponding UAS 412 (that holds a copy of that user's records) to assure that the user password and/or other security measures are properly met for valid sign-in. Once valid sign-in is established, the primary contact AARMS pulls the user's primary CpCCp from the UADS 432 (one that holds a copy of that user's records) and examines the pulled CpCCp in order to determine which other datacenter and other AARMS (with associated DLUX 415) if not the current AARMS, is best suited for servicing the user's general preferences (e.g., favorite topics as listed in area 154-7a of FIG. 1B for example) given the user assumed current mood. Choice of best suited other AARMS may be based upon the current work loads of the primary contact AARMS, on the openings or slack bandwidth available in chat rooms in the current data center which the signing user is likely to want to enter given the user's CpCCp preferences, on the alternate datacenter's geographic location and/or speed of access, or other such factors. Depending on how workloads of service resources within the contacted datacenter change, the client may be sent by the current AARMS to another AARMS either in the same data center or in another data center. For example, if a given AARMS reaches either its minimum or maximum workload thresholds, it will look for other AARMS instances to transfer some or all if its clients to. In one embodiment, an AARMS's workload (e.g., 411') is determined primarily by the sum of the workloads of all the DLUX (e.g., 412'), DsMS (e.g., 415'), and CRS services (e.g., 418') assigned to that AARMS. In the same or an alternate embodiment, reaching of the AARMS's maximum workload threshold may be defined by the reaching of a respective maximum workload threshold of anyone of the DLUX, DsMS and CRS services assigned to that AARMS or by the reaching of a summed maximum workload threshold of a prespecified subset of the services the given AARMS directly supervises.

An overloaded AARMS may automatically request, or an under-loaded AARMS may automatically respond to a request from another AARMS (either in the same data center or in a remote data center), to transfer service assignments between AARMS's. This control process will allow the AARMS's to automatically reallocate services as workloads dynamically change throughout the day. An example of this may be where there is one AARMS per geographic region with each AARMS having a set of default services hosted for that area. There may also be a set of non-default services that are not assigned to each geographic region but are instead maintained only in certain data centers due to lack of popularity. Supervision over any one or more of the default services or nondefault services may get transferred between different AARMS instances as the workloads of each AARMS in each geographic region changes. Services assigned to one geographic region during that region's peak hours of for example the afternoon and evening may not be needed during the slow hours of that region, for example in the early morning. Accordingly, underloaded service providers (e.g., AARMS, UAS, DLUX, DsMS, CRS units) in a currently slow region can be lent out by the data center of that slow region to relieve the burdens on a heavily loaded data center operating in a different time zone. Thus, the distributed data center model with individually distributable service providing resources can dynamically shift workloads to accommodate dynamically changing demands of the regional user population.

One of the primary tasks of an AARMS, when servicing a given client machine (e.g., 440a) is to receive and parse data from CFi's (e.g., 118*a*) and from Cvi's (e.g., 118*b*) transmitted form the client machine (e.g., 115 of FIG. 1A), to regroup the parsed data if needed, and to offload the tasks implied by the respective data groups obtained from the CFi's and Cvi's to respective DLUX services (for topic look up) and CRS services (for chat room management and recording of trend data into the TDS 437). Accordingly, an AARMS will do the majority of its work in response to receipt of CFi's and Cvi's from respective client machines. This will begin to occur after the client machine has signed-in (logged in) into the system or after the client machine has been redirected to the current AARMS instance from a different instance of an AARMS. Although log-in and redirection may be a frequent occurrence, it will generally be much less of a frequent occurrence than the primary task of the AARMS, namely, the processing of received CFi's and Cvi's. In an alternate embodiment, Cvi upload data may bypass the AARMS and go directly to the CRS so that the CRS collects votes for voted-upon items. Also, in a same or alternate embodiment, parsing and grouping of CFi data items may be handled by the DLUX services rather than by the AARMS. In such a case, the AARMS merely manages balancing of workflow and the assigned DLUX instance takes on the burden of actually processing the CFi data stream inflow from a respective user or plural users.

The following is an exemplary walk showing a case where a client machine fails to connect to its default primary home AARMS. (Identity of the primary home AARMS and secondary home AARMS and of a web page or other on-network list where further alternated contact AARMS's can be found are stored in one embodiment, in the client machine as part of installation of software package 105.) When the exemplary client machine fails to operatively link with the first AARMS, the next AARMS it contacts then redirects the client to a third AARMS which finally accepts the request and begins to route CFi's received from that client machine to an assigned DLUX service under the third AARMS's supervision:

Step 1. As client software (105) starts in a client machine, it provides user authentication credentials to the primary home AARMS with the expectation that the primary home AARMS (say 411) will pull the user's records from the home UADS 432 and interact with the local UAS 412 to validate the sign-in, after which the primary home AARMS 411 should assign one of its DLUX services (only one, 415, shown in FIG. 4A) to processing CFi's routed from the first AARMS to that assigned DLUX. However, the first AARMS may determine that it itself is overwhelmed (at maximum summed threshold) or that it has no DLUX with slack bandwidth to assign this new coming client machine to. So the first AARMS signals back that it is not available or the first AARMS does not respond and the client machine runs a timeout counter that indicates to the client that the first AARMS probably will not respond.

Option 1a. The first AARMS may not respond because it is in an "offline" status.

Option 1b. Upon the client machine receiving the not-available signal or the timeout counter of the client running out, the client tries to connect to a next AARMS resource in its stored list or web accessed list of known AARMS resources.

Step 2. The second contacted AARMS responds affirmatively to the client machine that contact has been made and the second AARMS (e.g., 411') accesses the user's account data either from a locally accessible data store (UADS 432' in center 420), or if the user's records are not there, via the backbone and private network links 417'-439-417 from remote store 432 in another data center (e.g., 410). The fetched user's account data is used to:

Substep 2a. Validate the client's login credentials.

Substep 2b. Obtain the client's current CpCCp (e.g., 105*h*.1 of FIG. 1B) and optional DsCCp's (e.g., 106*h*.1 of FIG. 1C).

Step 3. The second AARMS then accesses its service directory data store (431') to determine if, given the client's preferences as indicated in the fetched CpCCp and DsCCp's, whether the client should be redirected to a different AARMS instance that is better suited to handle this particular client. If so, the second AARMS transmits a signal to the client indicating that the client is being redirected and providing the URL or IP address or other link to the third AARMS which the client is now being bounced to. One reason why a different, third AARMS might be more appropriate is because this user's CpCCp and/or DsCCp's indicate the user has highly esoteric needs for which chat rooms that are accessible to the third AARMS might be needed. Such a bounce over may happen if for example:

Option 3a. The third AARMS is geographically closer to the client machine and/or the third AARMS can offer a higher turn-around speed to the client machine (e.g., a roaming cell phone with computing capabilities) and the third AARMS has sufficient load capacity to take on the service needs of the user and/or his currently utilized client machine.

Option 3b. The second AARMS is near its workload capacity and there are other AARMS instances available with spare capacity and with the ability to meet the client's bandwidth requirements (e.g., high ones if the client is a premium service user or lower ones if not subscribed to a premium service).

Step 4. In response, the client machine makes contact with the specified third AARMS (which AARMS will generally accept the contact request because it has been pre-instructed to by the second AARMS, in other words, the second AARMS already made a reservation for this client machine in one of the available time sharing slots of the third AARMS). The third AARMS (not shown) will now access its local UADS (like 432') to thereby locally gather the user's account information (and if not there, will fetch the data from another UADS) and then the third AARMS will access its local GSDS (like 431') in order to determine which of its supervised DLUX's is best to route this client's CFi's to:

Option 4a. If only one DLUX is active, the third AMS will route all clients to this single DLUX.

Option 4b. If multiple DLUX's are active and available, the third AARMS will selectively assign the client to a DLUX in a manner that spreads the load among its plural DLUX's as evenly as currently possible.

Step 5. The third AARMS will begin forwarding the CFi's from the signed-in client machine to the selected DLUX instance. In an alternate embodiment, the third AARMS signals to the client which DLUX resource to use and the client machine then responsively begins to forward its CFi's (e.g., 118*a* of FIG. 1A) directly to that DLUX resource thereby bypassing the third AARMS. In yet another alternate embodiment, the third AARMS signals to the selected DLUX resource, the address of the signed-in client machine and the selected DLUX resource then begins to pull CFi's from the client machine via the public network 430 (where those CFi's can be encrypted when passing over the public network 430). In yet another alternate embodiment, the third AARMS parses CFi's pulled by the AARMS from that client machine to determine at least a more probable domain associated with each CFi or group of CFi's and the AARMS then routes the parsed and optionally grouped together CFi's to different DLUX resources that are each specialized with performing topic lookup under that specific domain. An example of where grouped CFi's might be differently processed for topic lookup under different domains might be where the domains have different cultural biases or idiomatic contexts and a phrase such as, "there is more than one way to skin a cat" may have entirely different meanings in a domain involving designing computer-implemented processes as opposed to surviving in the wilderness. After the DLUX instance determines a probable specific topic for the client's recent CFi's, it flags the AARMS with information indicating the topic node and the AARMS then activates a node specialized match service (416') to find or create a co-compatible chat room for that user and that identified topic node.

Step 6. If during all this processing, the third AARMS discovers that it needs to rebalance its loads because a threshold is being approached or has been passed, the third AARMS may elect to redirect selected clients to yet different AARMS instances, especially if the clients are non-premium service ones. When this happens, the process restarts at Step 3 except for a differently numbered, Nth AARMS in this case.

As workloads at specific data centers increase due to increasing numbers of signing-in clients, an automated data center managing service (not shown) may responsively decide to fire up more physical servers where those servers had been kept idle in order to conserve data center energy utilization. As the new servers power up, they will instantiate new AARMS instances. As each instance of an AARMS starts, in one embodiment, it sequences through the following steps:

AMS Step 1. The starting up AARMS instance gets the list of services resources it owns (its supervised child services) from the service directory data store. The assignments in the service directory data store (GSDS) are initially set when new services are added to the data center. Current assignments in the GSDS (431) are updated when services get reassigned during load balancing operations.

AMS Step 2. The starting up AARMS instance initializes each of its child service resources, by sending initialization instructions and getting status reports back, for example in the following order:

AMS SubStep 2a. All online and available CRS Resources (418);

AMS SubStep 2b. All DsMS Resources (416). Part of this process may include:

AMS SubStep 2b(i). Assigning specific CRS resources for each the DsMS's to use.

AMS SubStep 2b(ii). Optionally, assigning specific domain and/or topic nodes listed in the DCDS (435) that the respective DsMS's should be responsible for and thus specialize in making co-compatibility matches for.

AMS SubStep 2b(iii). Optionally, creating default chat room(s) (e.g., empty or populated with an automated moderator) for the assigned domain and/or topic nodes in accordance with the hierarchy definitions provided in the DCDS (see FIG. 4B). The starting up AARMS instance may do this by sending "create chat room" instructions to each of the respective CRS instances together with a pointer to the assigned hierarchy node or nodes and by receiving a confirmation status regarding successful instantiation of the desired number of initial chat rooms for each of the assigned domains and/or topic nodes.

AMS Step 2c. The starting up AARMS instance initializes all of its owned DLUX Resources (415). Part of this initialization process may include indicating which DsMS resource the DLUX instance should route its match-making requests to after having performed a lookup and identified a probable domain and/or topic for a corresponding one or more processed CFi's. In one embodiment, the initialization process also includes indicating which DsMS resource the DLUX instance should route its match-making requests to if the lookup failed and the CFi(s) is/are instead deemed to be dealing with a default catch-all domain and/or catch-all topic and where the client is thus to be invited to a corresponding catch-all chat room that contains or is to contain personality-wise co-compatible other users. Of course, many variations on which unit asserts control and delegates tasks to the other are possible. In one embodiment each DLUX is made responsible for determining the target number of topic node matches it will look for and the time out of when to stop looking. Thus in such an embodiment, the DLUX, and not the AARMS, is the controlling factor which determines how many invitations if any at all, each user will receive. In an alternate embodiment, the supervising AARMS may have override abilities, such as stopping a DLUX before it reaches its target goal of number of topic nodes found and instructing the DLUX to begin a new lookup, perhaps for a premium subscription client. After a DLUX finds whatever number of matching topic nodes and scores them, either the supervising AARMS, or the DLUX, may forward the scored results to a DsMS instance and initiate the DsMS match making process for that topic node (where the DsMS match making process scores possible chat rooms based on co-compatibility and returns scored links to chat rooms that appear to be most co-compatible with the given user).

AMS Step 2d. The starting up AARMS instance initializes all of its owned UAS resources (432, only one shown). At this point, the starting up AARMS instance can begin to accept client linkage requests and to start servicing those requests. In one embodiment, the availability of the now started up AARMS instance is published into the GSDS (431) of at least the local data center and more typically into the GSDS (e.g., 431') of sister data centers so that overloaded other AARMS can bounce their excess workload to the now started up AARMS instance. In one embodiment, availability of the now started up AARMS instance is also automatically published into the list of alternate AARMS which client machines can try to connect to when linking to the match-making system.

AMS Step 3. Some aspects of the AARMS initialization process that may be common to all child services are:

AMS Step 3a. Informing each child service how it can connect with and contact with the supervising parent AARMS in order to establish asynchronous two way communications via a local backbone (e.g., 417) or over multiple backbones and private networks (e.g., 439). The asynchronous two way communications may be packet based serial ones in accordance with industry established protocols for the same or they may be proprietary ones.

AMS Step 3b. Requesting current status from each child service.

AMS Step 3c. Updating the local GSDS (431) to indicate current assignments made by the AARMS for its supervised child services and mirroring the assignment information to other GSDS's (e.g., 431') in other locations.

The DLUX services take on the job of looking through the user's CpCCp and DsCCp's and trying match these with the help of hints in the CFi's to the more probable domain and/or topic nodes to which the DLUX service may be assigned (it could be to all domains). Since the DLUX services have continuous work of sustainably performing lookups for inflowing CFi's it is desirable to prevent each from becoming overwhelmed. Typically an AARMS will simultaneously start all of the DLUX resources it has available so that it can distribute its client jobs to them in a manner that balances the load and assures that all client machines will get relatively rapid response to their CFi submissions. In one embodiment, if the active client population for a given AARMS is more than its current pool of DLUX resources can handle, the AARMS will take the steps listed below.

DLUX overload Step 1. When a parent AARMS detects (through periodic checking of workload levels such as examining backups of requests in buffers or getting pressure push back packets) that one of its child DLUX resources is trending towards reaching its maximum workload threshold or has reached it, the AARMS will start looking for alternate available DLUX resources to reassign some of the workload to:

DLUX overload Step 1a. First the AARMS will begin by checking its own pool of services to see if there is an unused DLUX resource that can be brought online but has not yet been activated, if not;

DLUX overload Step 1b. The AARMS will start making requests for transfer of unused or lightly loaded DLUX resources from other AARMS instances in the same or in remote data centers, where a lightly loaded other DLUX resource will first have to divest itself of current jobs or it will have to partition itself to create a supervisable subpartition controlled by the requesting AARMS (or by another AARMS) before indicating availability to the requesting AARMS.

DLUX overload Step 2. If an available DLUX full resource or subpartition is found, then:

DLUX overload Step 2a. The requesting AARMS will start to redirect new clients to the new DLUX resource either directly or by redirecting the clients to the alternate AARMS which controls the found and available DLUX full resource or subpartition.

DLUX overload Step 2b. The requesting AARMS may also or alternatively instruct the heavily loaded DLUX resources to bounce back some of its current client jobs to the AARMS, at which point the AARMS will forward these to less loaded ones of its directly supervised DLUX resources.

DLUX overload Step 3. If an available DLUX resource is not found, the AARMS having the heavily loaded DLUX will determine if there are other AARMS instances locally or remotely that can take over the excess work and possibly increasing load. If so:

DLUX overload Step 3a. The overloaded AARMS will begin redirecting all new clients to the alternate AARMS, additionally:

DLUX overload Step 3b. The taking over new AARMS may instruct the heavily loaded DLUX to bounce back some part of its still not serviced and current clients over to the alternate AARMS. this can help to clear the backlog in the input buffers (not shown) of the heavily loaded DLUX.

DLUX overload Step 4. If the overloaded AARMS cannot rebalance its DLUX work loads by the above methods, the local DLUX resources and/or the overloaded AARMS will start to implement load throttling techniques wherein they simply drop some of the client sourced job requests (arising out of uploaded CFi's). In one embodiment, load throttling instructions or backpressure flags are downloaded to the clients as part of their next Cciv posts. The client machine may optionally flag an indication to its user apologizing that the chat room invitations service is currently in a throttled down mode. In the same or another embodiment, load reduction may be implemented by the cloud downloading new CFi filtering requirements to one or more of the client machines so as to thereby reduce the amount of uploaded CFi data. For example, a new CFi filtering requirement might indicate to the instructed client machine to temporarily increase your threshold for sufficient biometric intensity for recording the biometric event in the CFi buffer by 10%. In response, where the minimal increase of user heart rate was 5% to warrant recording, now for a predefined amount of time it will be raised to 5.5%. Thus the amount of uploaded CFi data will tend to decrease. The new CFi filtering requirement instructions provide the cloud with a method of fine tuning the rate at which CFi data is uploaded to it and of placing the filtering workload in the laps of the client machines.

After a DLUX resource finds a probable match between received CFi's and a given domain and/or topic node, it falls to one of the DsMS resources to find the appropriate chat room under that looked-up domain and/or topic node that is co-compatible with the corresponding user. The matchmaking services (DsMS's 416, 416') can work most efficiently when they can provide chat room matches for the pool of clients assigned to them via the local AARMS without having to do global searches across all possible chat rooms. In order for the co-compatible aspect to work effectively, each DsMS should receive jobs from a sufficiently large population of different clients so as to be able to provide good chat opportunities to co-compatible clients. If the population of different clients is too small, the DsMS may not be able to make a match that fully or partially satisfies the co-compatibility preferences of two or more members of the serviced population. On the other hand, if the to-be-serviced client population is too large, the DsMS may not have the bandwidth to make matches in a timely manner. One of the ways to control the size and diversity of the client population that is to-be-serviced by a given DsMS (e.g., 416') is by changing the number of domains and/or the number or identities of the topics covered by that DsMS.

In one embodiment, in order to provide an optimal load for each of the DsMS resources, specific domains (and/or specific topics under those specific domains) are assigned to the respective DsMS resources by the supervising AARMS and the assigned specific domains/topics are marked as being serviceable either only locally or globally. What is meant here by "locally" is that chat room matching services are provided only for the local AARMS that owns the local DLUX and the local DsMS and the DLUX was servicing the CFi's of a user for which this data center is a default home center or a default secondary home (backup home). This assures that home town users will not be deprived of minimal bandwidth when a surge of out-of-town CFi servicing requests comes streaming in, due for example outage at a nearby data center. What is meant here (in this paragraph) by "globally" is that chat room matching services are provided for out-of-data center requesters also. DsMS load control may include the following steps:

DsMS load control Step 1. When a parent AARMS sees one of its child DsMS resources reaching its maximum workload threshold, it will look for alternate available DsMS resources to take on some of the workload:

DsMS load control Step 1a. The looking AARMS begins by checking its own pool of DsMS resources to see if there is an unused (e.g., off line) MS resource that can now be brought on line to the share or split the workload.

DsMS load control Step 1b. The looking AARMS next checks its pool of DsMS resources to see if there are any underutilized DsMS resources that can take on some of the overload by taking on responsibility for some of the nodes now handled by the overloaded DsMS.

DsMS load control Step 1c. The looking AARMS next issues requests via the backbone 417 and/or private network 439 for transfer of a Matching Service resource from another AARMS (local or remote) to supervision under the looking AARMS.

DsMS load control Step 1d. If it gets supervision over a less loaded DsMS, the looking AARMS will begin determining how to reassign one or more of the domains and/or topics currently being handled by the overloaded local DsMS resource to one or more of the more lightly loaded other DsMS resources belonging to other AARMS.

DsMS load control Step 2. If an available lightly loaded Matching Service resource has been found DsMS load control Step 2a. The AARMS looking to relieve one of its own DsMS's will automatically determine how assignment of the specific domains and/or topics of the overloaded DsMS should be split up between the fully loaded and the available DsMS other resources. This determination may be made by:

DsMS load control Step 2a(i). Checking to see if a specific global domain node has enough client traffic to warrant being split into both a global servicing node and a local only servicing node.

DsMS load control Step 2a(ii). Determining which one or more of the lightly used domain and/or topic nodes on the heavily loaded DsMS resource can be transferred to the more lightly loaded DsMS resource so as not to overload the latter.

DsMS load control Step 2b. If the responsibility for a globally serviced domain node is transferred to a matching service in an alternate AARMS (in another data center), the originating AARMS will inform all other AARMS resources of this change via changes to the GSDS 431 and mirroring of the same to other GSDS's (e.g., 431'). Then each AARMS will inform all its DLUX resources of this change.

DsMS load control Step 3. If a given AARMS cannot balance its DsMS loads, the local DsMS and/or DLUX resources will start to implement load throttling techniques described above for the Matching Service Client overload conditions. Portions of the load throttling instructions may be sent to clients as part of their next Cciv posts.

In one embodiment, aside from making matches between chat rooms and CFi's of individual users, DsMS instances with spare capacity can use their spare bandwidth to make co-compatibility matches between one user and the next (background clustering) even if the users are not currently on line. This may be done by crawling through the CpCCp's of users to find cases of extreme personality-based co-compatibility and/or crawling through the DsCCp's of users to find cases of extreme topic-based co-compatibility. These results may be stored in the respective user's account data store records (e.g., 432). In one embodiment, the system may periodically recommend a pen-pal relation or the like to users who have not previously conversed, this being based on a crawl found extreme co-compatibility involving personality-based co-compatibility and/or topic-based co-compatibility.

Referring to FIG. 4C, in one embodiment, when a client servicing AARMS (e.g., 411) assigns to a supervised DLUX (e.g., 415) the job of finding the more likely domains and/or topics associated with a received one or more of the client's CFi's, the DLUX determines how good of a job it needs to do. In other words, in one embodiment, the DLUX determines what number N' of potential domains will be competitively scored and/or how deep down the hierarchy tree below the domain node level the search will proceed. Assignment of the domain lookup task is through entry path 421a. As indicated in step 421, the extent of the job may depend on the level of service the user is subscribed to (e.g., normal, premium, super-premium). The DLUX will set for itself corresponding target numbers for the number of chat opportunities to locate for this round of to-be-processed CFi's and target parameters for closeness of match as to topic and/or user-to-chat room co-compatibility. High premium service clients will of course be given larger target values (unless the users indicate to the contrary for the time being or system bandwidth availability is tight for the moment). The larger target values will mean that more chat opportunities (more invitations per unit time) are offered to the more premium members, better matching for co-compatibility with other chat room partners and better matching of their CFi clues to specific topics are offered to the more premium members, and so on. Lower service clients will receive poorer results such as a fewer number of corresponding invitations per predefined unit of time and/or poorer matching of topic sameness or user co-compatibility such that the chat rooms they are invited into may not be exactly on topic, although close enough and such that the chat room buddies they find populating those rooms may not be exactly in accordance with the user's CpCCp and/or DsCCp preferences, but nonetheless close enough to be of value to the being-serviced user. As mentioned above, in one embodiment, users can navigate through the hierarchy searching on their own for a better matching node or room and/or users can pick the "none of the above" option.

In some instances, a user may have already received more than a targeted number of good invitations in a recent previous round of lookup and matching. In this case, depending on resource availability, step 422 may downgrade the target numbers for this round if local bandwidth availability is currently tight and the user got a sufficient number of good invitations just recently to satisfy the owed quality of service to that user. On the other hand, if current bandwidth availability is relatively wide and the user was short changed in the previous round, the target numbers may be upgraded to thereby attempt to satisfy the owed quality of service to the given user. In some instances, the given DLUX or its whole data center is being overwhelmed with too much work and it needs to throttle down its allocated services for all users. In such a case, the target number may be reduced for all users, perhaps less so for premium service users than for lower priority users.

Referring still to steps 421 and 422, in one embodiment, the initial or adjusted chat opportunity target count goal and matching score minimum thresholds are determined based on:

Presence or absence of redirection instructions from AARMS-initiated load balancing operations and the severity of such pending load balancing requests;

The number of chat opportunities offered to the same client fairly recently (e.g., in the past 10 minutes); and The number of chat rooms the client is currently participating in and the degree of participation. In other words, if the user of the client machine is busy writing in contributions to a first chat room, it is unlikely that he or she will have time to notice new incoming chat invitations and join in those as well. Thus for a user who is already heavily engaged with a first set of one or more ongoing chat operations—this status being reported to the cloud by the user's client machine—the cloud can respond by temporarily shutting off or substantially throttling down the number of chat room invitations being currently sent to that user, in which case the target number may intentionally be forced down to 0 even though normally it would be a higher value. As a result of the temporarily forced zero count, step 423 passes control to exit step 423x and DLUX resources are not consumed for servicing the user who is already busily engaged with one or more chat rooms.

In one embodiment, the following general rule is followed:

The larger the number of recent chat opportunities presented to the client, the lower the target count will be (in order to keep the user from being overwhelmed with too many chat opportunity invitations) and the higher the matching score requirements will be (in order to ensure high quality matches if invitations are at all sent, where here, the matching score requirement is a minimum or threshold score (e.g., co-compatibility score and/or narrowness of topic score) needed for allowing an invitation to be sent out)—In one embodiment, the DLUX provides the DsMS with a target count and a minimum matching score requirement and a timeout limit so that the DsMS will have guidelines to follow on how much effort it should spend on trying to make a match. If the target count has been reached or the sorted scores begin to fall below the minimum threshold or the timeout limit is reached, the DsMS can stop;

The fewer the number of chat opportunities (Cciv's) offered to a user relative to an adjusted target count, the lower the minimum matching score requirements will be made (by readjustment) so as to thereby find and offer at least some chat opportunities to the otherwise short changed client. In other words, in response to failure to find the desired number of high quality matches, if time has not run out in below described step 426a, a loop back to the top of the algorithm will be made where the degree of closeness of topic co-compatibility and/or personality co-compatibility will be automatically scaled back so that at least some invitations are generated even though these invitations are suboptimal relative to what is indicated to be desirable in the user's DsCCp's and/or CpCCp.

At step 423 the process determines if the resulting target values, after adjustment in step 422, are equal to or less than zero. If yes, there are no invitations to be sent back to the client machine and the job terminates at exit step 423x so that the local DLUX resources can be used to service another client. If test 423 results with a No, then in step 423a the current DLUX fetches the user's PEEP, CpCCp and optionally her root DsCCp and optionally her topic specific DsCCp's from the local UADS (e.g., 432). Step 423b is the head of domain identifying loop. If the AARMS and/or the user's client machine have not already done so, the DLUX may use the user's PEEP to parse and group the data found in one or more CFi's so that parsed and grouped data is likely to indicate probable topic of interest on the user's mind and also the degree emotional engagement with the topic. Parsed and grouped hint data is sorted so that the hints with the greater degree of emotional engagement will be processed first by the DLUX. In one embodiment, at least a majority of the CFi data parsing and/or grouping functions are performed in the user's local client machine using a downloaded copy of the situation appropriate PEEP or a situation selected copy of a locally stored LPeep file (if the client machine has sufficient computational resources for doing so, that is, the local machine is not for example a minimal function cell phone or the like). This localized parsing and grouping of the CFi data can improve the chances that the right biometric data will be correctly logically linked to its causative and focused-upon content while at the same time reducing the workload placed on the in-cloud server(s). In some cases, the local client machine can perform all of the needed parsing and grouping of data in a CFi data stream and then the in-cloud AARMS may not be needed for this process at all and can simply pass the already parsed and grouped CFi data stream to a selected DLUX for further processing (for identifying the one or more topic nodes that score highest relative to the topic hints provided by the CFi data stream). For each pulled CFi (or parsed and grouped data obtained from a plurality of CFi's) of the current processing round, the topic hints or clues in the CFi's are correlated against hint-to-domain probability factors provided in the user's profiles (e.g., in the user's CpCCp and/or DsCCp and/or knowledge-base rules sets provided therein) in step 423c. Probability-of-match scores are computed and assigned for each CFi's hint group relative to the likely domains that associate with it. After all recently pulled CFi's are looped through for purpose of identifying the most likely current domain, the formed list of domains is ordered in step 423c so as to list the most likely domain at the top of the list. Scoring may be performed with aid of knowledge-base rules sets as will be detailed below.

At step 424a, the formed list of likely domains is processed and again for each of the recently parsed and grouped hint data sets (from the recently pulled CFi's), a machine-implemented determination is made as to which topics under each of the more likely domains is a more likely topic (or subtopic, etc.). Depending on the targeted degree of topic sameness that was established in steps 421-422, the amount of work done in the topic loop (whose head is step 424b) will vary. For each pulled CFi(s) data group of the current processing round, the topic hints or clues in the CFi's are correlated against the hint-to-topic probability or scoring factors provided in the user's profiles (e.g., DsCCp's including knowledge-base rules set in each such DsCCp) in step 424c. Probability of match scores are computed and assigned for each CFi data group versus its more likely topics (e.g., the top 3 or 5 most likely topics). After all recently pulled CFi data groups are looped through for purpose of identifying the most likely current topics for each, the formed list of topics under the current, likely domain is ordered according to score or probability in step 424c so as to list the most likely topic (or subtopic, etc.) at the top of the list.

At step 425a, the formed list of likely topics is processed from the top by handing off (step 425b) to corresponding local DsMS instances in the data center (e.g., 410) the job of finding a co-compatible one or more chat rooms (or other online forums) that closely correlate to preferences in the user's CpCCp and/or DsCCp for the kind of chat rooms the user prefers to be invited into based for example on personality and/or topic proficiency. Step 426a determines if the earlier established target goals (of steps 421-422) for number of chat opportunities have been met or if a predefined time out has been reached. If yes, control is passed to step 427 where the found matches are scored for co-compatibility with the user's preferences (e.g., as expressed in CpCCp and/or DsCCp) and sorted accordingly with highest scoring ones to be sent to the user's local machine first. Then in step 428, all or a highest scoring subset of the corresponding invitations for the found chat rooms are downloaded to the client machine as pushed Cciv's (e.g., 118c of FIG. 1A). If no, then at step 426b it is determined if the minimum match goals for the given topic have been exhausted. If yes, control is returned to step 425a to investigate for matches under the next most likely topic. If test step 426b returns a no, then the remaining job for that topic is handed off to a remote DsMS in another data center (optionally with cooperation of it's supervising AARMS and/or its assigned DLUX) to see if good matching chat rooms can instead be found in that remote data center. Accordingly, for more esoteric topics where there may not be enough co-compatible chat partners joined in a chat room in the current data center (e.g., 410), the search may expand to more and more remotely located data centers (e.g., 420, etc.) in search of a chat room and/or chat partners that respectively is or who are co-compatible with the preferences of the current user. Each remote DLUX may begin executing from step 423 via path 426*d* where the target values are current ones rather than initial ones established in steps 421-422. Thus, if target values are down to zero, the exit is made via step 423*x*. The remote exit via 423*x* returns to step 426*a* of the client-servicing data center. Once the targeted goals are met (or partially met if they cannot be fully met in the allotted time out), the corresponding invitations are downloaded to the client machine in step 428. The local DLUX is then ready to receive a next task from its supervising AARMS.

One machine-implemented process that may be used for scoring domains (e.g., 423*c*) or topics (e.g., 424*c*) or other potentially matchable nodes (see FIGS. 4B and 1C) proceeds as follows:

Domain Scoring Step 1: It is possible for a user to be looking at content that provides essentially no useful hints as to the domain most probably on the user's mind. For example, in FIG. 3A the user may have an open file window like 320 where the file name and/or the file's location in the local file directory provide no hints as to domain or topic and the data being focused upon in the file is equally nondescript. Yet another example is one where the URL of the web page (e.g., 317) the user is focused upon is a one time nondescript one (e.g., a cgi database serve number with no meaning) and the focused upon data is also nondescript. In such cases, best guesses as to what domains are most probably on the user's mind now can rely on past trending history. What domains have historically been the user's favorites? A list of such domain identifications may be stored in the user's root DsCCp such as in column 183 of FIG. 1C. The data may be organized as a database table (e.g., Table 1 below) that is sortable according to initial scores given to each of the domains based only on historical trends and without accounting for any additional hints (clues) that may justify bumping the score up or down.

Table 1 roughly parallels major row 191 of FIG. 1C while providing some additional insights. As seen in the third column of database Table 1, each of N domains recently and/or routinely accessed by the user (where N is predetermined number such as 5, 10, etc. that can vary based on for example whether the user is a premium subscriber or other, how long the user has used the system, etc.) has an initial score stored therein. Row ID and score need not be correlated. Some domains may share a same initial score. When new users join the system, in one embodiment, they are assigned a stereotyping or template DsCCp where the N entries (e.g., where N starts off with say 5 most probable domains) are pre-formulated for them based on a short questionnaire they fill out. The initial scores may be all the same at the start (say a score of 100, which is an arbitrary number here). Then as the new users begin using the match-making and invitations-generating system (MM-IGS), trending data is collected about the new users. For example, how often on average per day, week or month do they accept invitations to, or otherwise enter into chat rooms belonging to the given domain? For how long has this averaged usage rate been going on; the last few days, last few weeks, last few months, years? How long has it been since they last used the domain? In exemplary Table 1, each filled in row has a pointer (tPointer) in the fourth column pointing to where the corresponding trending history is stored for that user and that identified domain. (Incidentally it need not be a system level domain as shall be explained later. For the moment assume it is a system level domain.) Periodically, trending update service modules in the system automatically crawl through the collected data and the root DsCCp's of users to determine if the initial scores (column 3) for user's favorite domains (as listed in the user's Table 1) need to be updated. For example, say that user Sam has been highly active in the Finance.002 domain for the last 10 years (but not in the recent month) and thus that row had gotten a score of +100. However, in the last 6 months, Sam has been becoming increasingly more active on a daily basis in the Politics_(national) domain (row 1) and accordingly,

TABLE 1

| Row ID | Domain Name/Node ID Tag or Navigation path | Initial Score | Trending History | Most Fav. URL's | Most Fav. Search Words | Most Fav. Meta Tags | Most Fav. Other Hints . . . |
|---|---|---|---|---|---|---|---|
| 1 | Politics (national)/ D104 | 100 | tPointer_1 | 1. News.com, 2. NYTimes-.com, 3. . . . | election, party, . . . | Tag_1a, Tag_1b, . . . | |
| 2 | Finance.002/ D273.87 | 95 | tPointer_2 | 1. WSJ.com, 2. Forbes.com, 3. . . . | economy, interest, rate, prime, . . . | Tag_2a, Tag_2b, . . . | . . . |
| 3 | Sports.007/ D876.54 | 90 | tPointer_3 | Sports.com | soccer, football, game, . . . | Tag_2a, Tag_2b, . . . | . . . |
| 4 | Poker/ D987.65 | 85 | tPointer_4 | PGuru.com | tells, cards, game, . . . | Tag_3a, Tag_3b, . . . | . . . |
| 5 | Travel/ D098.76 | 80 | tPointer_5 | Vacation.com | hotel, maps, tours, . . . | Tag_4a, Tag_4b, . . . | . . . |
| 6 | Language/ D123.45 | 75 | tPointer_6 | UCnLearn.com | French | Tag_6a, Tag_6b, . . . | . . . |
| 7 | Career.008/ D234.56 | 70 | tPointer_7 | Jobs.com | resume | Tag_7a, Tag_7b, . . . | . . . |
| 8 | More . . . | 65 | tPointer_8 | More.com + [ptr2rules.4 more.com] | more | Tag_8a, Tag_8b, . . . | . . . | the trending update service modules has promoted the initial score for row 1 to +100 and had demoted the initial score for row 1 to +95. If Sam had been equally active in both domains, then each may have had an initial score of +100; this indicating that all other things being equal, Sam is just as likely in a current time period to be thinking about the Finance.002 domain as he is about Politics_(national) domain when focusing intently upon nondescript content.

The amount that the trending update service modules increase or decrease each initial score is a function of a system stored initial score adjustment algorithm, where the latter may take into account various trending factors including how active the user has recently been in that domain and how far back in time the user's preference for that domain goes. In one embodiment, the system may hold in storage a plurality of standardized or template adjustment algorithms for adjusting initial domain scores where the respective different algorithms are respectively used at different times of day, week or for other predetermined circumstance. For example, one or more of the conditionally selectable template adjustment algorithms may include a subroutine that accounts for the condition that, just because Sam has in the last 6 months become intensely interested in Politics_(national), that factor does not totally erase the effects of his continued and persistent interest over the previous last 10 years in the Finance.002 domain (row 2). While the trending update service modules may have rapidly elevated the Politics_(national) domain (row 1) from a score close to zero (or even a negative initial score) to one being the highest current score (e.g., +100), the adjustment algorithm(s) did not as rapidly demote the initial score of the Finance.002 domain in view of the inertia of its long history of frequent past usage even though Sam may have been neglecting that domain as of late. After the current political election cycle ends, it is likely that Sam will return to having Finance.002 as his most favorite domain. The algorithm(s) model that likely behavior and adjust initial scores accordingly. The specific adjustment algorithm(s) used for initial score adjustments may vary from system to system, data center to other center, over different time periods and/or from user to user so as to account for short-lived fads in certain topics and the like that may temporarily sweep a system-served region. In one embodiment, premium subscription users may have personal knowledge-base rules sets that control how the trending update service modules increase or decrease their initial scores and the premium users may be allowed to fine tune these update controlling rules.

As may be appreciated from above Table 1, Sam's list of favorite domains is longer than the initial 5 domains his template DsCCp (not shown) listed when he first joined. Since then, the trending update service modules have not only automatically figured out what specific domains are Sam's top N (e.g., N=10, not all shown), but the trending update service modules have automatically adjusted the initial scores for those domains, removed some initial domain names, added some new ones all in view of Sam's recent trending histories for the domains now listed in Table 1, which histories are respectively pointed to by tPointers 1 through N of the fourth column of Table 1. A word is in order here about what the word "domain" means in the context of Sam's Table 1. It should be apparent from FIG. 4B that domain and topic nodes are substantially the same except that domain nodes (e.g., 450, 470) are categorized as being situated directly under the data center root 402 (and radially close to the origin in the polar topic space of FIG. 6) while other topic nodes (e.g., 460, 480) are categorized as being situated under at least one non-root node such as a domain node (and being positioned radially further away from the origin in FIG. 6). It should be apparent from FIG. 4D that through a voting process, a topic node can be promoted into becoming a domain node at a given one data center or at all data centers in the networked system 400 (FIG. 4A). Additionally, system administrators and/or voting users can cause new domain nodes to be added on a data center-by-data center basis or on a system-wide basis as well as demoting certain less popular old domains to a topic status or eliminating them entirely if they had not been accessed for a long time. Accordingly, it may be appreciated that there can be different kinds of "domains" including those that are recognized as being a domain on a system-wide basis and those that are recognized as being a domain only within a given one or more data centers. The term domain serves as a navigational convenience (for example, indicating how close to the origin the topic node is in a given topic space). It's the first node after root that a navigator might point to while navigating toward a desired target node (which could be the domain node) in a given data center. Thus the concept of a personal domain can be appreciated as being a shortcut to a target node that an individual user often refers to with such frequency that for that user, the topic node might as well be a domain node. By way of example, assume that user Sam is an avid believer in Anthropomorphically-induced Global Warming (or AGW as its followers refer to it). Perhaps for other people AGW is categorized as a subtopic under the science fiction category, but for Sam, assume it is an incontrovertible fact that he thinks about every day and for which he sees many subtopics. If this is the case, Table 1, column 2 can list AGW as being a personal domain of Sam's even though other people in Sam's home data center may not see it as qualifying for domain status. The point is that the "domains" listed in Table 1, column 2 and pointed to by associated Domain node ID'ing objects can be system-wide domains, or data center only domains or personal domains of the individual user (e.g., Sam). The Domain node ID'ing object (e.g., a node ID tag such as D273.87 of row 2, column 2—or it could be navigation pathway to the node from root or other starting point) is a system recognizable shortcut that can be used to quickly jump to or navigate to the intended domain or topic node irrespective of where it is in the hierarchy tree of FIG. 4B and without having to resort to a node name to node location lookup table. Accordingly, Finance.002 may be a personal domain of Sam's rather than a system wide domain and in the context of Table 1 that makes no substantial difference. Although not shown, in one embodiment; one or more rows of Table 1 may store coordinates (e.g., polar coordinates) pointing to a specific point, or area or shadow cone in a predefined topic space such as that of FIG. 6. Topic hints in that row may be used to link to whatever topic nodes happen to currently occupy the specific point, area, or shadow cone in the predefined topic space. In other words, some rows of Table 1 may specify a target node without knowing the target node's name or ID and instead by simply pointing to a region in topic space where that node is expected to be found.

Incidentally, it may be appreciated from the above that processing of a lookup assisting, relational database table, like above Table 1, can consume significant system resources. On the other hand, there may be certain circumstances under which resort to the lookup assisting table (e.g., Table 1) is a complete waste of time. For example, a given user (e.g., Sam) may have a respective habit of behavior where, it is 9:30 AM (EST) and it is a day on which the New York Stock Market is open, the only topic he has on his mind is the Finance.002 topic. It would be a waste of system resources and energies to lookup Table 1 and start competitively scoring all the possible domains and/or topics, subtopics, etc., that Sam may be thinking about. Instead, an overriding and earlier executed rule in the given user's DsCCp knowledge-base rules set 195 might read as follows: 0. IF Time_of_Day is in range 9:25 AM (EST) to 10:05 AM (EST) AND Day_of_Week=Market_Open_Day, THEN Ignore Scoring Table 1 and Return Matching Domain Set as Finance.002. Special and earlier executed rules for overriding the entire lookup assisting table (e.g., Table 1) or excluding from consideration certain parts of it (certain rows and/or columns) may use a variety of triggering conditionals including for example, time of day, week, month or year; current surroundings of the user (e.g., work versus home, alone versus accompanied by others); the type of primary client machine being used (e.g., small screen PDA as opposed to wide or multiple screens home desktop computer), and so on. System resources can be significantly conserved by use of such selective override or exclusion rules.

Still referring to Table 1, it may be may be appreciated that the automated trending update service modules have also automatically determined what Sam's top M web page URL's were under each domain and their order of preferential visitation to such URL's by Sam. These table-recorded URL's are the ones that Sam most often referred to during his PEEP-defined normal time-stretches when accepting invitations to the corresponding domains (where M is a system specified number such as 3, 5, etc. and PEEP-defined normal time-stretch can vary from domain-to-domain). Note that the entry in row 8 of column 5 includes not only the name of a URL called More.com (a fictitious alias) but also a pointer (ptr2rules.4_more.com) which points to one or more knowledge-base rules associated with that URL and the domain of its row in Table 1. In fact each URL listed down column 5 of Table 1 can have a respective "pointer to rules for" (ptr2rules.4_) it recorded in Table 1 or otherwise logically linked to that URL's listing in Table 1. The reason for having such pointers will explained shortly.

Still referring to Table 1, it may be may be further appreciated that the automated trending update service modules have also automatically determined for each listed domain what the top Q search keywords were (and their order of preference by Sam as shown in the sixth column) where these table-recorded search keywords are the ones that Sam most often used to during his PEEP-defined normal time-stretches when accepting invitations to the corresponding domain (where Q is a system specified number such as 3, 5, etc.). The trending update service modules have also automatically determined for each listed domain what the top P meta-tags were that were present (and their relative frequencies of presence as shown in the seventh column) where these table-recorded meta-tags that were most frequently present (embedded) ones in the focused upon content that Sam was browsing during his PEEP-defined normal time-stretches when accepting invitations to the corresponding domain (where P is a system specified number such as 3, 5, etc.) Table 1 may of course have more columns that list yet other attributes which are most frequently associated with the respective domains and optionally pointers to knowledge-base rules sets associated with those attributes.

Domain Scoring Optional Step 2: The initial scores listed in column 3 of Table 1 are not necessarily the final scores allocated to the listed domains when performing a domain lookup. They will be final if there is no other useful hinting information available for improving the guess as to what topic the user has in mind. Assuming however, that there is some form of usable hint data in the CFi's recently pulled from Sam's local machine(s), the domain lookup process will use the initial scores merely as a starting point for generating running scores that modulate up or down relative to the initial scores (or don't change) based on additional hinting information provided by CFi's uploaded over stretches of time corresponding to Sam's PEEP-defined normal time-stretches for the respective domains (the time-stretches may different, for example only 2 minutes to look at today's comic strip, but 10 minutes to study today's stock market results). In one embodiment, time for re-scoring is limited to a predefined number (can vary if user is a premium user). In other words, whatever the running scores are when the time limit runs out, those scores are taken as good enough competitive indicators of what is likely on the given user's mind. In such a system, the score changing computations with potential for larger score changes should be run first and those with finer refinements of score run later. In one embodiment, the initial list of N domains provided by Table 1 and under consideration (if not selectively excluded out) by the domain lookup process may increase or decrease as a result of execution of various knowledge-base rules including rules that can exclude from consideration some of the domains listed in the user's Table 1. In other words, although Politics_(national) is listed in Table 1 as having the highest initial probability of being on Sam's mind, certain hints collected from recent CFi's may cause that domain to be excluded from further consideration and when this happens, the system can stop keeping a running score for such an already excluded domain. In forming the running scores for non-excluded domains, the domain lookup process combines the initial scores assigned to Sam's top N domains (if not excluded, and also to scores of additional domains which may be brought into consideration by knowledge-base rules) with score increasing and/or score decreasing factors to thus form current running scores (which scores can dynamically change due to new CFi's being further uploaded into the cloud in, say, the next 30 seconds).

More specifically, suppose for example that Sam visited the WSJ.com web page in the last 2 minutes. His initial score of +95 for the Finance.002 domain may be automatically increased to +105 as a result. But suppose that Sam also visited the NYTimes.com web page in the last 3 minutes. His initial score of +100 for the Politics_(national) domain (row 1) may be automatically increased to +108 as a result. Similarly if any of the table-listed favorite search keywords are found to have been used in the last X minutes (X being variable on a domain by domain basis), then the respective running scores may be automatically increased or decreased for each occurrence by appropriately weighted amounts in response. Similarly if any of the table-listed frequent meta-tags are found to have been present in the last Y minutes in content Sam was intently focusing upon (Y being variable on a domain by domain basis) then the respective scores may be automatically increased or decreased for each occurrence by appropriately weighted amounts in response. The amounts of change of each running score may be a function of a system stored running score adjustment algorithm, where the latter may take into account various trending factors including those operating on a user-by-user basis, on a data center-by-data center basis and/or on the basis of time of day, of week, of month, etc. As such the preliminary running score adjustment algorithm used for such first round adjustments (there may be further re-scoring rounds as discussed below) can vary from system-to-system and there is no specific embodiment discloseable here for better empowering artisans to carry out the same. Note that weighting of score adjustments can take into account the intensity of focus (e.g., emotional engagement) that Sam exhibits in conjunction with each CFi provided data point (e.g., URL, keyword, meta-tag) and thus weights need not be purely linear but can instead be products of an intensity of focus score multiplied by an occurrence-of-hint score and multiplied by a factor representing preference position in an ordered list of table-specified hints. More specifically, because the keyword hint, "soccer" appears first in the list of favorite keywords of row 3 (Sports) and "game" appears third, detection of "soccer" will generally tend to increase the running score for the row 3 domain (Sports) more than detection of "game" as a recent keyword. Moreover, note that the keyword, "game" appears also in row 4 of Table 1 (for Poker). So if the only useful hint data pulled from recent CFi's is the search word, "game", the running scores of the row 3 and row 4 domains would both be increased by roughly the same amount and the relative competitive scoring positions of the two domains, if both are not excluded from consideration, would generally not change.

Domain Scoring Optional Step 3: As mentioned above, there is only so much improvement attainable in guessing at a user's current domain of interest and the user's current topic of interest under that domain by using the 2 dimensional table approach of above Table 1. Firstly, there is a practical limit as to how large the number N can be for the number of most favorite domains tracked for every user by a table such as Table 1. Secondly, no matter how large N is, there can still be an obscure domain that the user (e.g., Sam) currently has on his mind and is not yet listed in his top N domains in Table 1. So if the domain lookup process relied only on scoring the top N domains of Table 1, the system may more often than desirable, invite Sam to an incorrect chat room because the system did not take into account the possibility that Sam is thinking about a domain not yet listed as the top N domains that Sam frequents. Thirdly, the system may waste time, energy and resources in conducting unnecessary scoring activities under various circumstances. Suppose for example, it is determinable that 99% of the time during business days (e.g., Monday to Friday) and between the hours of 9 AM and 5 PM, a given user such as Sam does not think about the domains of above Table 1, rows 3-5 and rows 8-N. In such as case it would be wasteful to compute scores for those domains during the stated time periods. A simple database having only a structure like Table 1 cannot conventionally account for all such possible variations. On the other hand, a knowledge-base rules set such as 195 of FIG. 1C can be structured to provide for a large number of unusual contingencies including limiting the extent to which the contents of Table 1 (or its equivalent) are considered—versus being automatically excluded from consideration—during different time periods and/or when the user (Sam) is located in different surrounding environments (e.g., work versus home). More specifically and by way of example, knowledge-base rules set 195 may include a conditional rule that controls which of the N domains listed in column 183 of FIG. 1C are excluded from scoring under different circumstances. An exemplary control rule may read as follows: IF Time_of_day:=Business_Hours AND Day_of_Week:=Business_Day AND Surroundings:=Workplace, THEN Exclude from System_Domain_Scoring, rows 3-5, 8-N of Table 1 AND Set Final_Score:=0 for rows 3-5,8-N; ELSE IF Day_of_Week:=Weekend AND Week:=Poker_Tournament_Week, THEN Increase_Score of domain row 4 by +50 points; ELSE IF Time_of_day:=>7 PM but <12:01 AM AND Surroundings:=Home THEN Use System_Scoring_Template_9 for first round re-scoring of Domains.

As seen from the above pseudo code, the DsCCp knowledge-base rules set 195 of one embodiment can control how scoring is performed under various conditions including time of day and location from which the user is operating. Additionally it should be mentioned that the initial list of domains or topics considered can be expanded beyond that provided for by Table 1 through use of consideration-expanding rules, such as for example: IF Time_of_day:=After Work AND Surroundings:=Home, THEN ADD to list of nodes to be scored: <begin list>My_Hobby with an initial score of 88 <end list>. This has the effect of dynamically expanding Table 1. Accordingly, entirely different initial domains and corresponding different scoring algorithms may be selectively executed in response to varying conditions so as to more flexibly determine what domain a given user is probably thinking about in view of uploaded CFi data including CFi data that indicates where the user is located and what the time was for respective ones of the collected pieces of topic hint data and emotional state indicating data.

Moreover, if certain combinations of external events take place, the knowledge-base rules set 195 may include one or more conditional rules that cause esoteric domains to be added to the list of domains under consideration and thus being scored competitively against other domains under consideration. For example, set 195 may include the rule: IF Time_of_Year:=International World Soccer Cup Semifinals or Finals THEN Add Sports.100 domain to Domains_scoring_List AND Set Initial_Score of Sports.100 domain to +200 AND Set End_of_Range of Business_Day to 3 PM (rather than usual 5 PM). Accordingly, it is seen that a soccer enthusiast may command the system to accommodate his esoteric preferences on an individualized basis, cut the definition of his routine work day short and add a special domain into the competitive pool when the International World Soccer Cup Semifinal or Final games are taking place. Additionally, as mentioned above, automated trending services may automatically readjust a user's knowledge-base rules set to more accurately reflect his actual behavior as opposed to his declared behavior. For example, although Sam said he would work until 3 PM during soccer season, in fact for the last 3 years he had run home at 2 PM to watch the games. In one embodiment, the trending services would spot that and automatically modify the above soccer cup handling rule to end the business day at 2 PM rather than 3 PM as Sam had said. This way the system will be serving Sam according to his actual behavior rather than his declared behavior.

To summarize part of what is taught by the above, in accordance with one embodiment, the knowledge-base rules set 195 in the user's currently active DsCCp (106h.1) has a first set of one or more rules that control which of a limited number of N' domains will be actively considered and scored (as opposed to being excluded under current circumstances, where the limited number N' can be greater than N as well as less than the N of Table 1, e.g., N=10) and which scoring algorithms will be used for performing such first round or later round re-scorings. These one or more scoring algorithm control rules are executed before any of the actual first round or later round domain re-scoring algorithms are executed. (The later round domain re-scoring algorithms will take into account synergisms of occurrence such as, IF Snapshot_of_content being_focused_upon includes WORD1 Within_5_words_of WORD2, THEN Increase_Score_of (Domain 6) by +70.)

Parsing, grouping, cross-linking and further weighting of CFi-supplied data samples prior to domain lookup: Referring briefly back to FIG. 2A, recall that streams of CFi packets can be uploaded to the match-making and invitations-generating system (MM-IGS) from a variety of CFi generating devices and that each CFi packet or record can contain plural data samples of different kinds (e.g., snapshot of content, biometric data, etc.) rather than just one. More specifically, a given one CFi record may contain biometric data indicating that the user is becoming increasingly agitated about content he or she focused upon about 2 minutes ago. At the same time, the given one CFi record may contain new keyword data about an unrelated search the user performed just 30 seconds ago. To work properly, the system should link the biometric data indicating agitation to content that was identified in a CFi having a time stamp of about 2 minutes earlier than the time stamp of the current CFi. The system should not link the unrelated search terms in the current CFi to the content identified in the older CFi. In order to know how to do so automatically, the system has to learn how this particular user (e.g., Sam) tends to behave. Some of the user's behavioral trending data is provided in the user's PEEP record (see FIG. 1E). For example, the user's PEEP record may include a knowledge-base rule stating to the effect: IF User_State:=Agitated_Type_1 THEN Time_of_Causal Content:=-2 minutes ago. The system can then automatically determine that it needs to logically link the agitation state reported in the current CFI to the focused upon content reported in the CFi received 2 minutes earlier.

However, the user's PEEP record usually does not indicate how he behaves with respect specific domains. In one embodiment, parsing, grouping and weighting of CFi-supplied data samples is a task that is split between the AARMS module that initially receives the CFi streams of user X and the DLUX module(s) to which the AARMS forwards the job for completion. The AARMS will handle the processing of the emotional state portion of the parsing task so that it can then prioritize domain lookup tasks according to how emotionally involved the user appears to be with that certain content. However, some of the parsing and grouping task calls for knowledge about the user's Domain-specific behaviors and this information is generally stored in the user's DsCCp records, where the latter are generally processed by the DLUX service module to which the AARMS hands off completion of the domain determination task (and also the topic lookup task). So in the example given immediately above, the AARMS would know to create a data grouping or cross-referencing link between the content identifier in the CFI that was time stamped 2 minutes earlier and the emotional reaction data supplied in the current CFi. However, the AARMS would not know how to properly parse and group the new keyword data that just came in and happens to be part of an unrelated search because information for parsing of such domain specific data is typically contained in the DsCCp rules 195 rather than in the PEEP rules 199. So the AARMS hands off partially resolved streams of CFi data (partially cross-linked CFi sample point data) to the DLUX module and the latter completes the parsing and grouping task based on the user's current DsCCp record 106*h*.1. Scanning down column 6 of above Table 1 for example, the DLUX can determine what search keywords most probably correlate with what domains. The DLUX can also determine what the more probable domains are that the content from 2 minutes ago belongs to. If the two lists of domains do not overlap, the DLUX can conclude that the keywords of the current CFi are not to be grouped with (cross linked with) the content of the CFi from 2 minutes ago. While this is an all or nothing example, it can be appreciated that for gray zone situations, the DLUX assigns grouping weights or probability of grouping factors to different pieces of incoming sample data. The agitated emotional state of the current CFi and the 2 minute old content of the previous CFi may have a strong cross-grouping factor linking the two data items while the less certain plurality of recent keywords may acquire a weaker cross-grouping factor between itself and the 2 minute old previous content. Since the agitated emotional state reported in the most recent CFi cannot possibly be a delayed outcome of the currently received search terms, the cross-grouping factor between the recent keywords and the agitated emotional state will generally be set to zero. In this way a historical record of events and underlying cross-grouping factors is built up by the DLUX. The cross-grouping factors function as weights that emphasize cross effects between more clearly linked together data samples and deemphasize cross effects between less clearly linked together data samples as they are parsed out from the streams of CFi's uploaded into the cloud 150. One way of thinking about this process is by analogy to a double sided data recording tape where observed data is recorded in chronological sequence on one side of the double sided tape and hypotheses about interrelations between the observed data points are recorded on the other face of the data recording tape.

With parsed and cross-linked sample data points in place, the DLUX is in a position to further weight content-identifying data points as a function of the strongly cross linked topic hints that go with them and as a function of the more strongly cross linked biometric data items that also go with them. More specifically, for each "known" URL or alike content identifier that appears in the fifth column of above Table 1 and for the N' domains that are under consideration and being scored there should be a corresponding cross-correlation rule in area 195 of the DsCCp that increases or decreases the running scores of the N' domains under consideration according to cross-correlation of data items. For example, IF URL:=NYTimes.com AND Cross_link_to emotional data:=Strong, THEN Increase_score_of (Domain of row 1, if not excluded) by +20, Increase_score_of (Domain of row 2, if not excluded) by +5, Decrease_score_of (Domain of row 3, if not excluded) by -10, Decrease_score_of (row 4 (Poker), if not excluded) by -20, etc. In other words, for each CFi data sample or Value uploaded from the user's reporting device(s), first it will be determined what the type is of the data sample (e.g., URL or alike content location identifier, keyword, meta-tag etc.) and also whether the uploaded data point sample is a table-known one already stored in Table 1 (or an equivalent thereof). If yes, then in a pointer layer (not fully shown, see ptr2rules4_) that shadows the contents of Table 1 there will be pointers to corresponding scoring rules. For example, logically linked with the "NYTimes.com" entry in column 5, row 1 of above Table 1 there will be a pointer to one or more scoring rules like the immediately above, IF URL:=NYTimes.com AND . . . rule. The associated rule for the known Table-included sample point will be applied and the N' domain scores under consideration will be adjusted accordingly.

Treatment of Nondescript Common Words: If one or more CFi-supplied sample point data items is not in Table 1 but is instead stored in another table of predefined common nondescript words like "the", "of", etc., a separate rule for handling such common nondescript words will be executed where typically the scoring action is to ignore the nondescript words and not change the scores of the N' domains under consideration in response. Of course, there can be esoteric exceptions to this general rule and such exceptions will be expressed within the rule that handles the listed and generally common nondescript words.

Treatment of routinely opened Known Locations. Typically, when a user first launches his browser (e.g., FireFox™, Internet Explorer™, etc.) the browser may have an initialization script that it automatically executes upon launching where it downloads one or more default start pages (i.e. Yahoo™, MyYahoo™, MSN™, GoogleNews™, iGoogle™, etc.). In such a case, because user activity did not directly and intentionally cause the loading of these routine pages, the URL's and other topic hints found on these pages will generally not be indicative of the user's current topics (or domains) of substantial interest. The knowledge-base rules set 195 of the current DsCCp 106h.1 (e.g., the user's root DsCCp) may accordingly include a special processing rule for web pages that are initially or routinely downloaded shortly after launch of the browser. For example, IF Time_after_browser_launch <2 minutes multiply uploaded sample data points thus far by an importance de-weighting factor of 0.1. In an alternate embodiment, the de-weighting factor assigned to such launch associated data points (e.g., URL, Meta tags and snapshot content) can be a weight of 0. The point here is that some web pages should be automatically ignored so that time and machine resources are not wasted attempting to do domain lookups for them.

Treatment of different types of CFi-supplied data points (Treatment by CFi Value Category): Some CFi-supplied data points can be of greater importance in determining likely domain of interest than others. For example, if the user entered a set of keywords into his or her search engine 5 minutes ago and then spent the last three minutes intently studying content in a URL found by the search engine, that can be taken as highly supportive of the hypothesis that the keywords of 5 minutes ago strongly cross-correlate with the topic of interest currently on the user's mind. A corresponding treatment rule in knowledge-base 195 may read as follows: IF URL_of_strong_interest follows within 7 minutes after keyword search THEN apply importance weighting increasing factor of 1.8 to the keywords. Thus, Search Term Values submitted by the user as part of an explicit search request are taken as highly indicative of what is on the user's mind because these are values that the user has explicitly expressed an interest in. The specific knowledge-base rule(s) used to more heavily weight such user expressed keywords can vary from user-to-user and from one surrounding environment or time to the next.

Treatment of extremely unique file, page or other content addressing information—Some URL addresses are relatively non-informative of what is on the user's mind because they connect to a broad topic portal, say Google.com™. As such, when a CFi provides such a broad topic hint (be it to a widely used internet page or to a file directory that contains files directed at a sundry of random topics or another form of content addressing information whose covered topics are non-unique) there is not much that the domain lookup process can do with this information. On the other hand, some URL addresses or other content addressing information may be extremely unique and thus tightly coupled to one specific or to a fairly limited group of domains or topics. Accordingly, in one embodiment, a list is stored for each user of such corresponding and tightly coupled URL's or other content addressing information and the one or more small number of topics or domains that they tightly couple to when the given user is involved. An importance-increasing factor is then applied to such listed addresses when they show up in the CFi stream and the list of unique URL or other addresses is consulted by the domain lookup process when one of these addresses is present. Such unique addresses may be collected from the user's web browser, his FTP client, pod-catcher, etc. These addresses may be in the form of a URL for a web page, an FTP site address and/or the name of a file being downloaded or in the form of a podcast's URI, or any other type of unique combination of data that points to the content the user is interacting with (viewing, downloading, listening to, etc) where the corresponding set of associated topics or domains is relatively narrow (e.g., 5 or less)

Treatment of extremely informative Meta Tags: As mentioned above, meta-tags are typically hidden codes embedded in web page content (e.g., HTML or XML content) or in podcast content (or in the source page or home page from where the podcast stream or other stream, i.e. RSS was obtained) and these often indicate what the author of the content believed to be significant descriptors of the corresponding content. Some meta-tags can be rather broad in nature and thus not informative enough regarding what is likely on the user's mind (e.g., Sam's) when they connect to content having such meta-tags embedded in it. On the other hand, other meta-tags can be extremely unique and thus tightly coupled to one specific or to a fairly limited group of domains or topics. Accordingly, in one embodiment, a list is stored for each user of such corresponding and tightly coupled meta-tags (the more often seen ones) and the one or more small number of topics or domains that they tightly couple to when the given user is involved. An importance-increasing factor is then applied to such listed meta-tags when they show up in the CFi stream and the list of unique meta-tags is consulted by the domain lookup process when one of these meta-tags is present.

Treatment of potentially informative Web Page heading fields and the like. As known to those skilled in HTML or other web page defining languages (including XML, CSS etc.), certain content may be embraced between <<Hn>> and <</Hn>> tags, where n is a heading level number. Other page defining languages may use stylesheet references where the referenced style sheets may include emphasis commands for style like Title, Big, Bold, etc., and these are often used to indicate important parts of the to-be-displayed web page. In one embodiment, an importance-increasing factor is automatically applied to such content that is emphasized by heading braces or the like where the importance increasing factors may vary as a function of heading level (n) and/or as a function of how many style modifiers are applied to the content.

Treatment of probably uninformative Web Page content formatting codes: As known to those skilled in HTML or other web page defining languages, certain content may be embraced between formatting codes calling for rudimentary bolding or in italicizing of such content. This does not routinely mean the content is important.

As such, in one embodiment, no adjustments are made to the weight of such routinely formatted content.

Adaptive Learning: As users interact with the match-making and invitations-generating system (MM-IGS), automated trend tracking services of the MM-IGS will keep track of the invitations which the users accept and of the CFi data streams and weights attached thereto that led to successfully accepted invitations as well as perhaps to positive interaction with the respective chat room. Positive feedback scores will be generated for successfully accepted invitations and the respective ways in which their CFi data streams were processed by the system. Negative feedback scores will be generated for declined invitations and the respective ways in which their CFi data streams were processed by the system; particularly if the CFi processing had resulted in giving a relatively high match score to the target chat room. (It is more understandable why a user may have declined a lower scored match and thus no negative feedback will be generated for such.) Over time, success and failure patterns will emerge. These feedback patterns can be used to automatically adjust how the stream of CFi values uploaded from the client machines are later processed (e.g., what importance enhancing weights are attached to certain kinds, how CFi data spread over time is grouped together, which re-scoring algorithms are applied, and so forth). Here is an example regarding a user who is interested in soccer:

The CFi stream received from the user's client machine contains the headlined or otherwise emphasized content words: "Football", "Referee", and "Gialloblu" (where the latter is a nickname of an Italian soccer team in Parma). In response the match-making and invitations-generating system (MM-IGS) produces a plurality of chat opportunities which are returned to the user's client machine in the form of several highly-scored invitations. The user accepts a particular one of the offerings. The accepted invitation is to a chat room that not only strongly correlates with "Football", "Referee", and "Gialloblu", but also with additional keywords, "Soccer" and "Parma". (These associated keywords may be stored in region 465*a* for example of the node (e.g., 460 of FIG. 4B) which the accepted chat room (e.g., 469) resides under. The system can then responsively build a more detailed cross-correlation in its database(s) as between the soccer infatuated user (e.g., Sam) and the submitted first three emphasized content words: "Football", "Referee", and "Gialloblu" and the node-stored common keywords, "Soccer" and "Parma". The database entries may appear as follows:

Football submit count=1
Soccer hit count=1
Parma hit count=1
Referee submit count=1
Soccer hit count=1
Parma hit count=1
Gialloblu submit count=1
Soccer hit count=1
Parma hit count=1

Later the same user's client machine submits a CFi stream containing the headlined or otherwise emphasized content words: "Football", "Contract", and "Cagni" (where the latter is a manager of an Italian soccer team in Empoli). Once again, the match-making and invitations-generating system (MM-IGS) produces a plurality of chat opportunities which are returned to the user's client machine in the form of several highly-scored invitations. The user accepts a particular one of the offerings. The accepted invitation is to a chat room that not only strongly correlates with "Football", "Contract", and "Cagni" but also with additional node-supplied keywords, "Soccer" and "Empoli". The system will now update its database entries so they appear as follows:

Football submit count=2
Soccer hit count=2
Empoli hit count=1
Contract submit count=1
Soccer hit count=1
Empoli hit count=1
Cagni submit count=1
Soccer hit count=1
Empoli hit count=1

As can be seen, the correlation for this user between the Football submit count and the Soccer hit count has strengthened (2 for 2). Assume that as this same user continues to interact with MM-IGS, the submit counts for "Football" keep going up and corresponding hit counts for "Soccer" continue to increase in pace. The higher the number of submits is and the closer the Hits/Submits ratio is to one, the greater is the associated correlation between the content word Football and the keyword Soccer for this user. Note: in this section that submit counts are referring to CFi content values submitted by user which also resulted in acceptance by the user of a corresponding chat invitation. CFi values submitted by clients that do not result in invitation acceptance, or even in a sending out of a chat invitation may still be tracked elsewhere as part of the trending data tracking process but they are not relevant to this Hits/Submits correlation feature.

By automatically keeping track of the Hits/Submits numerators and denominators for each user (or premium user), the match-making system will be able to implement the following additional rules:

Low hit count numbers below a predefined threshold are deemed to be irrelevant and thus meaningless. For example the 1/1 association between "Contract" and "Empoli" is weak for this user and therefore it will be ignored.

Hit counts are deemed to become more significant once they pass beyond one or more successive threshold settings. When this happens the correlation between the hit term (e.g., Soccer) and the submitted data point (e.g., Football) will be automatically added to a corresponding strong correlations list maintained for the respective user.

After a sufficiently strong Hits/Submits correlation is added to a correlations list of same strength correlations maintained for the user, each time the Submit word appears in a CFi input stream from the client's machine, the not-submitted but cross-correlated Hit word (e.g., Soccer) will be automatically added to the search terms that the domain lookup process uses. Since the domain lookup process now has a larger list of different match terms, the likelihood is increased that a found chat room will more accurately reflect what the user has in mind. In other words, by tracking Hits/Submits for this user, the system over time learns to map the user's preferred terminology of "Football" for what the broader system node mappings refer to as "Soccer". Thus even if this particular user tends to employ less common words or phrases for the topics he has in mind, the system over time automatically learns about the user's word choice preferences and adapts.

In one embodiment, an importance enhancing weight applied to the added Hit term is a function of its Hits/Submits ratio. For example, if the user has 5 hits on "Soccer"

in response to submitting "Football" 10 times, the added hit term "Soccer" would have its importance weight factored as: ("football weight"*5/10). This type of weighting will ensure that more significant Hit terms are given greater weighting than less well correlated Hit terms.

Note that within this process, the client submitted match word (e.g., "Football") will not be removed from the list of to-be-matched words. In other words, the client submitted data value ("Football") will not be translated into its cross-correlated system-common term (e.g., "Soccer"). Rather, the list of to-be-matched words is being expanded in accordance with the trend-produced cross-correlations. By using this non-translative technique, it is ensured that the original user-submitted hint values continue to get through and generate directly associated chat opportunities. For example if this same user became interested in the American football team, the Dallas Cowboys™ and submitted CFi hint values "Football" and "Cowboys" the to-be-matched words list would be automatically expanded to "Football", "Cowboys" and "Soccer". This submission would likely result in chat opportunities regarding soccer teams associated with the name "Cowboys" but it will also likely produce chat opportunities regarding the Dallas Cowboys™ as well and the user may then pick from this expanded set of results the chat opportunity that best reflects his current topic of interest.

In summary, by expanding the list of to-be-matched terms in this non-translative way and weighting expansion terms according to observed Hits/Submits usage patterns, the system is able to dynamically adapt to each individual user's style of interacting with the system. The user will not have to learn to type "soccer" when they are thinking about English "football". Instead, the system will adaptively learn that this user is often referring to "soccer" when they submit "football".

Different scoring techniques for rating domains and/or topics: Referring to step 424a of FIG. 4C, it should be now apparent that after one or more of the above techniques is used to identify the more likely ones (e.g., the top three) of the possible domains that the user has in mind, for each of the more highly scored domains, starting with the highest, similar techniques may be used to identify the more likely ones (e.g., the top three) of the possible topics under each domain. The techniques used for finding the more likely topics do not have to be exactly the same as those used to identify the more likely domains.

Here is one possible score generation and score assessment technique:

Scoring Technique Step 1: Add or multiply the computed importance enhancing or importance lowering weight for each term in the list of to-be-matched terms (e.g., including "Football" and "Soccer"), process the weighted list against each of the N' domain nodes under consideration and normalize the returned match value by dividing by the number of total terms in the compiled to-be-matched list so that to-be-matched lists with more terms in them do not get an unfair advantage over competing to-be-matched lists which happen to have fewer terms in them. In one embodiment, the returned match value is a function of a sum of match subtotals found for each term alone where the subtotals are multiplied by their respective importance enhancing or importance lowering weights and then added together, thus giving long-winded to-be-matched lists a competitive advantage over shorter lists.

Example: If the compiled list of to-be-matched terms (e.g., including "Football" and "Soccer") contains 10 values, each with an importance weight of 1, out of which 5 of the list's values match 5 out of the total of 15 of the domain node's matchable terms, then the matched to number-in-list ratio is 5 out of 10, or 50%. Another list of to-be-matched terms may have 4 terms and all four terms match a prospective domain node, in which case the matched to number-in-list ratio is 4 out of 4, or 100%. However this need not be the only score comparing factor. The second node may have had a total of 20 domain node matchable terms, in which case the matched to matchable ratio is 4/20 or 20%. On the other hand, for the first node, the matched to matchable ratio was 5/15 or 33%, which is higher. How these different ratios are treated in the final analysis can vary from system to system. In one embodiment, the respective matched to matchable and matched to number-in-list ratios are added to thereby give the first node a score of 50%+33% or 83 (not a percentage) and to give the second node a score of 100%+20% or 120 (not a percentage). In this case the match between the second list and the second node is rated higher than the match between the first list and the first node.

MORE HYPOTHETICAL EXAMPLES

Example 1

A grouped set of CFi-contained content samples consists of 10 data samples (to continue with the rating example immediately above) is submitted to the match-making and invitations-generating system (MM-IGS) because the corresponding user (Sam) just interacted with a popular web portal home page (e.g., MSN.com™ or Yahoo.com™). The 10 data samples include the web page's URL and meta-tags extracted from the web page's HTML source code. Because such portal web pages have been determined by the MM-IGS to be commonly accessed as a user's default home page by large populations of users, the MM-IGS lists the URL's and/or attributes of such portal web pages in a to-be-ignored list stored within the MM-IGS. In one embodiment, the MM-IGS automatically assigns a 0 importance weight to URL's listed in the to-be-ignored list and a 0 importance weight to the CFi-contained content samples that are grouped to such URL's. In general users will not be paying any particular attention to content on their default home page even if they stare at them for a long time, and since 0 importance weights are automatically assigned to the correspondingly uploaded CFi's, no domain lookup or rating resources will be wasted and therefore no attempt at creating chat opportunity matches will occur. Of course, there can be exceptions where specific users do want match-making to occur for their default home pages. These exceptions can be handled by specialized DsCCp knowledge-base rules that, for example, translate a to-be-ignored URL string into a not-to-be-ignored alias which the system recognizes as such.

Example 2

The same user as in above hypothetical Example 1 opens and stares at another web page whose URL is not listed on the to-be-ignored list. Once again this user activity produces a grouped set of CFi-contained content samples consists of 10 data samples including the new URL value. Since the URL is not on the to-be-ignored list, the MM-IGS does not automatically assign zero importance weights to the associated 9 other data samples, they retain their original weights (e.g., a default weighting of 1) or are upgraded or downgraded in importance by appropriate weight adjustment rules (e.g., if content was braced inside heading tags) and the non-zero-weighted CFi-provided data samples are forwarded to the domain lookup process for further processing.

Example 3

After opening the non-portal second web page, this same user initiates a web search about 3 minutes later by entering 3 search terms. The user's PEEP record indicates that such follow up activity within 5 minutes of having opened a non-portal page normally indicates strong topic cross-correlation between the earlier opening of the web non-portal page and the current search keywords. In other words, the earlier grouped set of CFi-contained content samples consisting of 10 data samples including the second URL value are to now be cross-correlated with the 3 new search keywords when performing domain lookup. Because the user explicitly entered the 3 new search keywords (as opposed to other hint data which was obtained by benign spyware without the user's direct participation), the matchmaking system automatically assigns higher weights to the 3 new search keywords and then concatenates them to the earlier weighted 10 data samples. The concatenated combination is them passed to the domain lookup process for further processing. In summary, these examples show how domain lookups are differently handled based on whether reference was made to a common or default home page URL whose associated sample points are scored low because the user is inferred to be not paying actual attention to them even if it seems he is and based on whether the user explicitly participated in generation of some of the content samples, in which case the explicitly generated sample points are given comparatively higher weights than sample points that are automatically gathered by the benign spyware. Note therefore that some types of CFi-provided sample values (e.g., keyword terms entered explicitly by the user as search criteria) may be automatically assigned more of an importance for scoring likely sameness of topic than other types of CFi values (e.g., those that were inferred from the URL and/or content the user is interacting with). In one embodiment, a neural network type of weighting or statistical classifying method is used for adaptively learning through experience with the user (e.g., from getting survey feedback from the user as to how well the system is providing appropriately matching invitations) what weighting factors should be applied to different kinds of CF-provided sample points. In one embodiment, a knowledge-base rules set may be stored for each user containing respective rules for handling that user's CFi-provided sample values, including what importance weight is to be attributed to each type of CFi parameter for the specific user or for general user population which the specific user belongs to.

In one alternate embodiment, certain URL's are predefined in the user's client machine to be blind spots (to-be-ignored URL's) for which matching is to be temporarily turned off without disconnecting from the AARMS service. In an alternative or supplemental version certain URL's are predefined in the user's client machine to be automatically weighted down (damped down) focus areas so that matches are not found and invitations are not sent unless something of unusually high interest appears on such damped down, prespecified web pages. Weighting down can be performed in the client machine before the CFi is sent out or at the cloud end after the CFi is received, or in both places. In other words, although parts of this disclosure may seem to imply that most of the data processing should be conducted in the cloud 150, it is within the contemplation of the disclosure to offload some of the work on the local client machine if that client machine has the bandwidth to handle the work. In one embodiment, the machine-implemented task of performing trending data analysis for respective users is offloaded from the cloud to the client machines of the respective users (software and data is typically downloaded in encrypted form to protect user privacy) when it is determined that the user machine is basically idle. Users who agree to letting their local machines be used for such distributed offloading of the cloud's processing chores may be rewarded with reduced subscription rates and/or special privileges. As already mentioned above, parsing and grouping of CFi data stream items may also be partially or fully handled locally by the user's client machine(s).

After the domain lookup process scores competing domain nodes for topic matching and/or scores competing topic nodes under the higher scoring domains for topic matching and so on; the higher scoring ones of the matched topic nodes (or domain nodes) are assigned with the task of finding the most co-compatible chat rooms under those nodes for the given user. (To be more precise, after the DLUX service identifies the better matching topic nodes, it sends requests to the corresponding DsMS modules in charge of the corresponding matched nodes to find the chat rooms under those nodes that are most co-compatible for the given user.) When it searches for an appropriate chat room, a DsMS may conclude that no currently occupied room qualifies and yet, on the other hand, there are a number of floating users who currently are co-compatible and should be clustered into their own room. In such a case the DsMS automatically requests creation of such a room and sends out invitations to that room for the co-compatible floating users.

Just because a DsMS finds a matching chat room, that does not automatically mean however, that an invitation will be issued for that chat room. The controlling DLUX may send instructions regarding minimum scoring requirements for issuing a corresponding invitation. The minimum matching score requirement(s) passed in from the DLUX to its supervised DsMS resource(s) may be adjusted up or down based on:

The current number of clients already participating in the chat rooms hosted under the specified domain or other node. If the number of clients is low then the minimum score requirement may be reduced in order to increase the likelihood of issuing more invitations. Conversely, if all the rooms are crowded, the minimum score requirement may be automatically increased in order to thereby reduce the likelihood of issuing more invitations unless it is a really good match for the respective user.

The total number of clients that have recently submitted CFi's directed to the specified domain or other node. If the number of such clients is relatively low (e.g., as compared to historical norms) then the minimum score requirement may be reduced in order to increase the likelihood of issuing more invitations and thus pulling in more participants into those chat rooms. Conversely, if the total number of clients that have recently submitted CFi's directed to the specified domain or other node is large (e.g., as compared to historical norms) then it is likely that many will be determined to be good matches. In such a case, the minimum score requirement may be responsively increased on an automatic basis in order to decrease the likelihood of issuing more invitations and thus throttle back on the number of new participants that will be pulled into those chat rooms.

The current workload of the DsMS resources associated with the specified domain or other node. If the load is heavy then the score may be responsively increased on an automatic basis in order to decrease the likelihood of issuing more invitations and thus throttling back on the number of new participants that will be pulled into the chat rooms whose DsMS resources are currently overburdened.

The workload on the CRS resources assigned to this DsMS. If the CRS work load is heavy, meaning that many users are not just watching but also participating in the chat room in a more burdensome way, the minimum score requirement may be responsively increased on an automatic basis in order to decrease the likelihood of issuing more invitations and thus throttle back on the number of new participants that will be pulled into those chat rooms whose CRS resources are overburdened at the moment.

In one embodiment, scores for automatically deciding whether or not to issue an invitation are determined based on:

The degree of matching or correlation between the CFi, CpCCp, and DsCCp attributes of the incoming user versus those of other clients already in the chat room that has been created for the domain or other node specified by the controlling DLUX;

The degree of matching or correlation between the CFi, CpCCp, and DsCCp attributes of the incoming user versus those of other clients who have been already blocked from receiving invitations for specific chat room. In other words, if the incoming user (the one with the now being processed CFi's) better matches with others who are outside the chat room rather than in it, then an automated decision can be made to create a new node with its own chat rooms and to invite the outsiders (the outsiders who closely correlate to one another but not to the insiders) into the chat rooms of that newly created node.

The degree of matching or correlation between the CFi, CpCCp, and DsCCp attributes of the incoming user versus those of other clients who have been already assigned to a preexisting "catch all" node. In other words, if the incoming user (the one with the now being processed CFi's) better matches with others who are inside a catch all room rather than inside the rooms of the currently specified DsMS, then an automated decision can be made to invite the incoming user into the catch all room rather than inside the rooms of the currently specified DsMS. If the participant population of the catch all room grows beyond a predefined threshold, then the system automatically creates a specific node in the hierarchy for that room. Whether a catch all room evolves into being a special interest room depends on the population of users currently using that room and the historical growth trends of that room. In one embodiment, the system cleaves a catch all or general purpose room into two, retaining some participants as general purpose ones and moving others into the special interest room based on historical trends seen for similar rooms in other data centers. In other words, if a new conversation is taking root across a geographical area and spreading geographically like wildfire, the system can automatically detect this as the new conversation takes root in the general purpose rooms (because a special interest topic did not previously exist for that new conversation) and the system can begin to proactively create the corresponding special interest nodes in data centers of other geographic areas even before users there begin to flood the general purpose rooms in those other data centers;

The degree of matching or correlation between only the CFi and CpCCp, but not the DsCCp attributes of the incoming user versus the same profiles of other clients who have recently submitted non-domain specific CFi's and are not yet in any chat room because there is no topic specific chat room that matches for them, in which case the system automatically creates a new general room for these personality co-compatibility new users.

In one embodiment, the invitation issuance scores are determined using a method similar to the one the DLUX's use when rating domains or other nodes for co-compatibility with an incoming CFi. In this method, goodness values for different aspects (i.e. CFi data types and the percentage of matches, or CpCCp/DsCCp attributes) may have different compatibility percentages calculated for them for determining if an invitation should issue. Each percentage is weighted, based on importance level, and then a total rating is derived based on the individual percentages and their associated weights. Note: in a variation on the scoring mentioned above, the invitation scores are automatically relayed to the client machine and displayed to the user as basis for determining whether to join. Note: in a variation on the scoring mentioned above, the invitation scores are automatically cross linked with other chat room invitations having same or similar scores and these are displayed to the user as "related chat opportunities" after the user has joined one of the so-interrelated chat rooms. In this case:

Instead of identifying "related chat opportunities" based only on the domain or topic node of the invitation issuing DsMS and its position in the domain/topic hierarchy, the offered other matches will be based on the closeness of invitation scores. In one embodiment, a first set of chat opportunities that meet the chat opportunity minimum matching score requirement and don't result in exceeding the chat opportunity target count are returned to the client machine as chat room opportunity recommendations. The degree of recommendation may be included in the Cciv's returned to the client.

As indicated in step 425*b* of FIG. 4C, once one or more hierarchy node matches are found for a given client's CFi values (e.g., a domain lookup score greater than 20, for example), the DLUX starts looping through the identified nodes based on how well they scored relative to one another. In one embodiment, for each next high scoring node, the DLUX will:

Per Node step 1: Identify the DsMS resource or resources best suited to find matching chat rooms for this client's CFi values and based on this client's CpCCp and DsCCp's. The chosen DsMS resource may be in the local data center or it may be a remote one in one of the other data centers. When choosing the DsMS, the DLUX controller may: (a) Give priority to DsMS resources assigned to local instances of the matched node (e.g., matched domain) and thus to local chat rooms running under that node; (b) If there are no local DsMS resources available and assigned to the specified node, the DLUX controller (or its supervising AARMS) may look for available remote DsMS resources assigned to the same hierarchy point (e.g., domain/topic/subtopic/etc.) but located in other data centers and thus controlled by other AARMS's; (c) If there are no local or remote DsMS resources available and assigned to the specified node, then the DLUX controller (or its supervising AARMS) may request creation of a local or remote DsMS resource for servicing the not-covered node and thereafter pass the room finding job to that new DsMS instance.

Per Node step 2: After identifying the one or more corresponding DsMS resources, the DLUX controller forwards the client's CFi values to the identified DsMS resources for processing together with the client's CpCCp and DsCCp profiles.

Per Node step 3: Upon sending the task(s) out to the identified DsMS resource(s), the DLUX controller establishes a return thread which will receive the chat opportunity matches if any found by the DsMS resources. Upon receiving the chat opportunity matches (step 426*a*), the DLUX controller keeps count of the total number of chat opportunities found thus far from the DsMS resources contacted thus far and tests to see if the target number has been reached (and/or if target quality numbers have been reached). The DLUX controller also keeps count of the time consumed in looking for matches and/or the number of resources consumed.

Per Node step 4: The DLUX controller stops looking for more matched chat opportunities once the chat opportunity target count has been reached or once a predefined resource consumption limit has been reached in terms of time and/or bandwidth times time. By starting with the highest rated nodes and stopping once the target count is met, the DLUX will usually present the CFi sourcing client with the best quality chat opportunities that could be found given the allotted resources. Of course, other techniques for increasing likelihood of finding good matches may be used and there can be a point where match scores are good enough and do not have to be refined to being more accurate. Moreover the same concept of good enough applies to the room matching tasks of the DsMS's. They do not have to find the best matching (e.g., in terms of personality co-compatibility) room for every user. There is a point where good enough is good enough. More specifically, assume that there are 100 chat rooms under the node picked by the DLUX service. The DsMS assigned to the task of finding the best matching room might try and survey all 100 rooms. However in many cases; especially those where room characteristics of the 100 rooms substantially conforms to a Poisson distribution, the DsMS surveys only the first 37% of the large number (e.g., 100) of potential rooms. The DsMS identifies the highest scoring room among the initially surveyed 37%. Then the DsMS starts scoring through the remaining 63%. However, on the first instance where the DsMS encounters a room whose scores beats the highest score in the initial 37%, the DsMS stops and picks that next higher scoring room as the winner. It does not always have to (if time permits) step through all 100% of the available samples. On average this method generally locates good enough matches. In other words, various statistical functions may be used to increase the chances of locating good enough matches for the client from among a set of matches without necessarily sending back invitations for all found matches. The statistics used for sampling from among all found matches may be a distribution that is adaptively learned for different user populations based on geography, education, etc.

Per Node step 5: During its searching for hierarchy nodes having characteristics matching those sought by a given one or more CFi's, it is possible that the DLUX will not find any hierarchy node correlating well to the CFi values or that DLUX will not find a sufficient number of hierarchy nodes correlating well to the CFi values so as to achieve the chat opportunity target count. When this happens, the DLUX defaults to a catch-all node either under a best guess domain or to a catch-all domain node (not explicitly shown in FIG. 4A) and test whether focus content and current chat compatibility can be found there. Accordingly for such catch-all situations, the DLUX will:

Send the client CFi values to a local DsMS resource hosting a "catch all" node (e.g., catch-all domain) and the catch-all DsMS will make a best guess match for a co-compatible chat room based on personality (CpCCp) and on commonality or similarity of focused-upon content. The DsCCp's cannot be used because there is no topic co-compatibility to match for. The catch-all DsMS will respond with any chat opportunity matches found to have personality based co-compatibility (CpCCp) and optionally sameness or similarity of focused-upon content.

If this still fails to produce the chat opportunity target count, the local DLUX will send the client CFi values to one or more remote DsMS resources belonging to other AARMS instances that are hosting a "catch all" node. The remote DsMS resources may then respond with any chat opportunity matches found.

Referring again to FIG. 4A, accepted chat invitations are managed by CRS resources (e.g., 418) in the data center where the chat room resides. As the number of concurrent chat rooms and chat room participants increases, a Chat Room Service resource (e.g., 418) may struggle to continue to provide what appears to be real time communications for the participating chat room partners. This can be alleviated by the AARMS monitoring Chat Room Service utilization and reassigning resources (e.g., cleaving chat rooms) and splitting up tasks to balance the load. In one embodiment, the following chat room management steps are undertaken:

Chat Room Step 1. Each AARMS monitors the activity levels of the Chat Room Services (CRS) assigned to it. If an AARMS determines that a chat room is becoming overloaded due to too many users and/or to many contributions, it may take the below steps to ease the load on the CRS.

Chat Room Step 2. The AARMS will identify the CRS resources to which its DsMS's have been sending out invitations for and those that have not been directed to by sent out invitations. This done by:

Chat Room Step 2a. Looking for any Chat Room Services the AARMS's supervised pool of CRS's (e.g., 418) which have not been assigned to a corresponding DsMS. If one is found, it will be assigned to the DsMS whose current CRS resources are being overtaxed. The DsMS will then begin sending out invitations for chat rooms in the underloaded new CRS resource(s) rather than for chat rooms in the overloaded CRS resource(s) and overloading trends for the overloaded CRS resource(s) will thus be alleviated.

Chat Room Step 2b. The AARMS also tries to alleviate overloaded CRS resource(s) by looking for one or more DsMS resources that are not currently sending out a full load of invitations and thus probably have underused CRS resources. If such lightly loaded DsMS resources is/are found, the CRS resource(s) of those lightly loaded DsMS's will be reassigned to the heavily loaded DsMS which is in need of additional CRS resources and the heavily loaded DsMS will be instructed to start sending out invitations for chat rooms in the newly added CRS resource.

Chat Room Step 2c. The AARMS also tries to alleviate overloaded CRS resource(s) by looking for one or more DsMS resources that currently have multiple CRS resources each operating beneath its maximum workload thresholds. If this is found, workload form the CRS with the lightest workload will be reassigned to others of the multiple CRS resources and the thus freed CRS resource is then reassigned to the heavily loaded DsMS.

Chat Room Step 2d. The AARMS also tries to alleviate overloaded CRS resource(s) by looking for other AARMS instances that have CRS resources available for transfer to this AARMS and requesting transfer of the free resources to itself.

Chat Room Step 3. If the AARMS that supervises the overloaded CRS resources cannot find additional CRS resources to offload the work to, the DsMS using the heavily loaded CRS will be instructed to decrease the load on its CRS resources (to throttle down) by reducing the target number of offered new chat invitations (see steps 421-422 of FIG. 4C) so that fewer users enter the chat room than there are people leaving chat room and as a result chat room user population begins to shrink.

Referring to the UAS resource 412 of FIG. 4A, the primary focus of the User Account Service will be to support account creation and maintenance of user accounts. Aspects of this may include: (a) Creating a user account that can be used for authentication via login and password credentials; (b) Allowing the user to change passwords; (c) Supporting a "forgot password" feature; (d) Entering and editing user related information, such as age, educational level, location, language, etc.; in other words, change of usern-changeable profile data; (d1) As seen in FIG. 1B, the user's CpCCp may include some of the more general demographics information describing the user and may include topic isolating clues such as favorite current topics, favorite current movies, books, etc. (154-7a) which tend to change from time to time. In one embodiment, the Trending services automatically detect probable changes in the user's profile information and suggest to the user to permit automatic changes being made to the user's profiles. The CpCCp and DsCCp's will also be automatically maintained and periodically updated as part of the user related information stored by the User Account service; (d2) Portions of the user's PEEPs (e.g., 107) may be specific to the local client machine (e.g., 125) while other portions of the expression profile could be stored in the cloud 150 to thereby provide a baseline when the user is logging in from new machines.

Further aspects of the UAS may include: (e) Automated collecting of fees for charges like access to premium features and/or enhancement of profile credentials. Such automated collections may be done via credit card or other online collection means: (a) When the account is being created; (b) When a user-requested upgrade to an existing account is made; and (c) On a recurring basis for a corresponding automatically renewed account subscription. Further aspects of the UAS may include: (f) Validating a user's login credentials (e.g., including for example by using biometric data to validate identity biometrically) and determining the user's subscription level (i.e. free guest, normal, and premium) for each login session.

Access to User Account Data Store data can be made available via the data center backbone and through the communications firewall 419 so that: (a) Client software can interact with the UADS (e.g., 432) in order to support account creation, maintenance, and upgrades through actions taken by the client software (105) running on the user's computer; (b) A web-based application can interact with the UADS (e.g., 432) in order to support online account creation and maintenance—This would let a person create and purchase an account without having physical access to the user's computer, for example, a relative may buy a subscription as a birthday gift for the new user; (c) Besides the UAS, other data center services (e.g., 411, 415-418) may access the UADS (e.g., 432) for the purpose of: (c1) Validating a user's login credentials and determining the user's current subscription level; (c2) Saving changes to a user's CpCCp and/or DsCCp settings. In one embodiment, all access to the UADS (e.g., 432) is via the corresponding UAS 412 in accordance with a service-orientated architecture (SOA). In one embodiment, UADSs data changes are replicated to other data centers on a more or less real-time basis. This way, if as a user's activity is passed from center to center, or a center goes off line, users will have access to all the services to which they are entitled. In an alternate embodiment, the system may implement a Home center signature process which allows one center to query another for a user's credentials. the latter approach might be subject to failure however if a user's home center is off line.

Intermixed with the various interactions between client machines and services provided from the distributed data centers, the system may include further controls for managing communications between the various client machines (e.g., 440) and the cloud 150. These communications managing modules may be connected to the public network 430 and may provide secured or unsecured instructions or recommendations as appropriate. Such instructions or recommendations may be responded to by the client machine upon client start up if the client is not currently turned on and connected to the system. Some of the various types of communication instructions that may be sent are:

(a) Informing a client machine of the identity of an AARMS which the client should access in order to have that AARMS determine which DLUX will be receiving CFi's from that client machine (either directly or through the AARMS). This informational communication may occur when a first AARMS has instructed an overloaded DLUX or one trending towards overload to transfer some of its clients to a different AARMS for purposes of load balancing. In this case the transferred client machines need to be told of the transfer.

(b) Informing a client machine that it needs to reestablish connection with its default AARMS in order to have a new DLUX assigned for that client. This may occur if the client does not have CpCCp or DsCCp file values that match well with a current DLUX assigned for that client and thus the corresponding DsMS resources are having a difficult time finding co-compatible chat rooms for the client. In such a case, the current DLUX or DsMS resources communicate the problem to the communications managing modules via the backbone and the latter then send the "return to your default AARMS" message to the client machine.

(c) Providing rules for generating the next one or more CFi submissions from the client machine to its associated AARMS or to its assigned DLUX. By defining these rules, the associated AARMS and/or assigned DLUX can control the client CFi submission rates and/or submitted CFi content. This may be used to help achieve a balance between server load levels and performance. For example:

(c.1) If the assigned DLUX has lots of bandwidth and is nonetheless finding few well-matching nodes per unit of time for the incoming CFi's, the assigned DLUX may instruct the client to send more CFi's in at shorter intervals so as to increase the richness of matching information and increase the chance of finding good matches.

(c.2) If the assigned DLUX is running within its normal bandwidth range, it can instruct the client to not submit CFi's whose priorities fall below a minimum specified importance rating at least for a prespecified time interval.

This can work to help filter out noise from low priority CFi's and allow the well loaded DLUX to focus its efforts on higher priority CFi's.

(c.3) If the assigned DLUX is heavily loaded, it can further throttle the number of CFi's it is getting from its assigned clients by:

(c.3a) Communicating a maximum number of CFi's to submit per client machine per specified unit of time;

(c.3b) Communicating an extended interval between CFi submissions so as to thereby reduce number of CFi's received per unit of time.

(c.3c) Communicating a set of limited types of CFi's that are to be submitted in an upcoming time period. For example the assigned DLUX or AARMS may instruct one or more of its clients to submit only explicit CFi's (i.e. ones containing user entered search request key words) and to not submit inferred CFi's (i.e. ones based only on biometrics) during an upcoming time period. This may help to throttle down the number of CFi's the AARMS and/or its supervised DLUX's need to process in the specified time period. The AARMS and/or its supervised DLUX's may use these forms of submission throttling to help mitigate DsMS or CRS overloads within a datacenter whose performance is being monitored by the AARMS.

(c.3d) Additionally, if CFI submission throttling is needed, the DLUX or AARMS that receives them, may choose to interspersingly or periodically ignore one or more CFi submissions per unit of time from one or more identified clients. For example, certain nonpremium clients may be identified as stressing the system more than other nonpremium clients and these identified clients may be targeted for occasional interspersed ignoring of their CFi's. In some instances it may be necessary to cut back of CFi recognition even for premium clients. When this occurs, the detected fact that a client (premium or standard service) has not been issued any recent Cciv's may result in giving that client elevated priority the next time its CFi's are processed. See for example step 422 of FIG. 4C.

Example: Hypothetical walkthrough of a transaction between client machine 115 and cloud 150 (FIG. 1A). In this hypothetical walkthrough, it is assumed that user 111 has already logged-in into his user account as hosted by a local data center (e.g., 410) and has been forwarding CFi's to the assigned AARMS and receiving invitations to join corresponding chat rooms from the DsMS resources of the subject area (topic, e.g., 117a) he was last focusing on and was last emotionally engaged with (where emotion is inferred from his detected biometric data). Now user 111 flips to the sports section of his online newspaper 117. Client software 105 in his local machine 115 automatically detects the change of URL and notes that the URL is generally associated (e.g., 90% of the time) with the hierarchy domain named, "Sports" (which domain name was in this example embedded in the downloaded invitation (Cciv)). User 111 starts focusing on a particular story inside this online news page and camera 116 detects the major focus of the user's eyeballs on the corresponding area of the online news page. The focused on area includes an HTML heading containing the word "Soccer". Client software 105 can then automatically correlate the "Sports" domain name with a predefined "Soccer" topic node which it earlier took note of and is already pre-categorized and placed in a topics hierarchy defined by a Domain Configuration Data Store (435) of the AARMS with which client machine 115 is communicating. Client machine 115 pings the AARMS to let it know user 111 is still reading the online newspaper and appears to be interested in a new topic. This is automatically determined because the previous CFi's output from machine 115 were for the topic, International News whereas now the new domain and topic are Sports/Soccer. The client machine alerts the cloud of the probable change of topic which was detected locally.

User 111 launches a web search engine in another area of his screen and types the search terms: "Beckham respects referee" shortly after having focused on the news article about soccer. In response, client machine 115 generates a CFi (215a-215i of FIG. 2A) providing the URL plus the user-typed keywords: "Beckham respects referee" and identifies the CFi data as a type corresponding to box 216b. It also sets the intensity indicator 215h to a relatively high value (e.g., +100) based on the short time delay between when user 111 read the story and typed in the co-related search terms. For this hypothetical example it is assumed that user 111 is not currently participating in any chat rooms, but that he has been offered chat opportunities recently for the previous topic of interest (International News) so the minimum matching threshold for this round is set at a medium value of, say 50.

Also in this hypothetical example, the local matching service resources (e.g., in data center 410) are operating well within their load handling capabilities so that there will not be a need to re-adjust the match threshold for purposes of load management. The CFi having the Sports/Soccer hint and the related URL and the keywords is posted onto client buffer 215 (FIG. 2A). When a time slot for processing new CFi's from machine 211 comes around, the AARMS retrieves (pulls 207b) the posted CFi information from the client machine and forwards it to a supervised DLUX which has been pre-assigned to the Sports/Soccer node. Because the identity of the user is known, for example from field 215a of the CFi, the DLUX (or the AARMS) can immediately fetch that user's CpCCp file, and if the user has them, DsCCp files of the identified user that relate to Sports and/or Soccer.

Since the root domain (Sports) and child topic node (Soccer) are already firmly established, the AARMS will not forward the pulled CFi to a catch-all DLUX that handles ambiguous catch-all CFi's. Instead the job goes to a DLUX that specializes in further categorizing CFi's that are directed to the Sports/Soccer node so as to narrow the choice among invitations to specialized ones under the Sports/Soccer topic node. The Sports/Soccer DLUX locates in the user's fetched CpCCp file and fetched DsCCp files an indication that 75% of the time when this user uses the keyword, "referee", the user is implicitly also interested in the subtopic of "fairness" of different referees. Therefore, the combination of the CFi and the user's preference profiles is used to automatically expand on the probable topic that the user has in his head, for example, [Does famous player] "Beckham" [believe that] "referee" named X [is fair} and therefore deserves "respect"?. The DLUX scores this expanded and more focused topic as having a 60% chance of being correct based on user 111's current mood (inferred mood, i.e., from current surroundings) and the corresponding current CpCCp and DsCCp files. Incidentally, in one embodiment, when CpCCp data conflicts with DsCCp data and topic is firmly established, the more topic specific DsCCp data is automatically taken as overriding the more general (not topic specific) data. For example user 111 may have a CpCCp file that indicates he generally likes peaceful discussions with small groups of middle aged people. However, his Sports/Soccer DsCCp file indicates that when it comes to this topic, user 111 welcomes heated debates with large audiences of young people because user 111 believes that on-field behavior by players and referees is important for teaching young people how to behave correctly in other aspects of life. From this Sports/Soccer DsCCp file, the DLUX (or DsMS) pulls co-compatibility information indicating that user 111 would most welcome an invitation to chat room filled with young soccer fans who believe that players should play rough and cheat whereas user 111 wishes to heatedly argue the counterpoint. Armed with all this information, the DLUX (or DsMS) can look for a matching chat room whose detailed aspects are substantially more refined than what could have been inferred from just the CFi taken alone. Accordingly, there is a good chance that user 111 will be pleasantly surprised when the matchmaking system invites him into a chat room filled with young people who have been reading the same article in the same newspaper and are of a belief that the referee (named X) deserves no respect. Now user 111 has a real time interaction of precisely the kind he has been aching for. The just-read newspaper article is no longer a dead inscription on a gray tombstone; it comes to life as a hot headed mob of youngsters to whom user 111 can argue his position (assuming they too are in a mood for heated debate, which is what their CpCCp's or DsCCp's indicate).

Of course during processing of any latent CFi data stream (e.g., the one above where child topic node of Soccer was established), it is possible that the user; while in the middle of thinking about one topic (e.g., Soccer), suddenly switches topics in his mind (e.g., because the sports site reminded him of something else) and then the subsequent web search may have not have been sports related at all. The user might just as easily gone from reading about sports to thinking about uniforms, his dirty laundry, the price of starch, and doing a Google™ search on a company that makes starch he is considering investing in. In that case the assumption made by DLUX specializing in sports, that the user is continuing under this topic, is not helpful. In one embodiment, alternate possibilities are routinely considered in parallel. One DLUX assumes the old topic is being continued and one or more other DLUX's are tasked with assuming that completely different domains or topics are being considered based on recent CFi input. If the client, or AARMS, explicitly specifies that only a single domain tree or region in topic space should be used then lots of potentially better matches will not be found then if the DLUX's start from an assumption that a totally new domain is possible for recent CFi input.

More generally, given the expanded information that the DLUX derives for a first user (e.g., 111) based on his CFi combined with his CpCCp and/or DsCCp, the DLUX automatically searches for potential chat partners and/or potential chat rooms whose similarly expanded topic definitions correlate well with those of the first user. As each new client enters a given chat room, the CFi values that prompted the match will get added to the set of CFi values more generically associated with the chat room. Thus chat room profiles evolve according to the clients that enter or leave that chat room. Additionally, in one embodiment, chat room contents are automatically monitored to detect what words or phrases are most often repeated. If CFi values associated with the majority population in the room are used repeatedly in the associated CFi's then they can be deemed to be on-topic common words or phrases and recorded as such for the associated room and/or for the associated topic node. In other words, since they are common to the users of that chat room) they are automatically added to the list of CFi values associated with this specific chat room. These actions allow the "personality" of a chat room to build and change over time; as different people enter or leave the room the topic under discussion evolves from one major issue to another. For example, there may be many simultaneous chats occurring under the major domain/topic of Sports/Soccer. However, one might be about the best equipment for amateur players to use while another may be about organizing little league teams. Yet another may have been started based on two people reading the same review of a player's (David Beckham) performance in a recent game and a third about statements David Beckham made off the field about referee fairness. As other people joined this chat it turned into an argument about the incompetence of some referees and whether they nonetheless deserve "respect". This evolved chat room would be categorized under the major domain/topic nodes of Sports/Soccer and furthermore under a more specific node such as Sports/Soccer/referee/fairness. A well operating DLUX would logically connect user 111's CFi of the above example with this latter node rather than the other nodes.

In one embodiment, for each chat room that is being categorized by a domain specializing DLUX unit, the CpCCp and DsCCp values for each of the chat room participants that enters that watched chat room will be: (a) Combined following the same rules that were used when the DLUX combined a single user's CpCCp and DsCCp values to form an expanded topic definition; and (b) Averaged so that there are overall averaged values for the rules-wise combined CpCCp and DsCCp attribute values for the given chat room. For each incoming new user and a potentially matching chat room, the DLUX computes a match score based on the averaged chat room characteristics versus the new user's preferences and expanded topic definition. In one embodiment, a score of 0 indicates a bad match and a score of 100 indicates a great match. In the given hypothetical example the chat room discussing whether referees acted fairly receives a good match score because there were strong keyword matches to the terms: "Beckham", "respect "referee" as well as to the expansion derived keyword, "fairness". The Chat room discussing the best equipment to use did not score as well because there were lacks of matching on the primary keywords.

More generally, a chat room match score is calculated by the responsible DLUX for each of the possible chat rooms under consideration by assigning match value to various aspects of the chat room topic based on the clients' topic preference profile. Thereafter, the assigned DsMS narrows the list of potential chat rooms to which the first user (e.g., 111) might be invited based on personality considerations. Aspects that may be considered include: (a) The number of people already in the chat room; (b) The conversation tone (i.e. peaceful versus heated debate) where the latter may be determined based on participant supplied votes (supplied via their Cvi's 118*b* where the votes are either explicitly stated or inferred from the biometric feedback data). The conversation tone may also be determined based on detection of keywords or phrases within the chat conversations that indicate tone. Each topic and personality co-compatibility aspect will be given a value based on comparing the client's preference to the chat room's state. The values from each of the evaluated aspects are then combined to produce a chat room match score. A score of say, 50 may represent a neutral outcome while a score of 0 may indicate a bad match and a score of 100 may indicate a great match for the user who is potentially to be invited into the given room.

In one embodiment, chat room match scores are calculated as follows: (a) A neutral starting score of say, 50 is (assumed; (b) The DsMS will compare each of the DLUX supplied client's CpCCp or DsCCp preference's (i.e. level of topic proficiency or expertise) to a corresponding average of the chat room's current participants. Favorable comparisons (i.e. the average age of the participants in the chat room matches, or is close to, the age preference stated by the DLUX supplied data) will increase the sequentially adjusted score. Unfavorable comparisons will decrease the score; (c) The calculated match score may also be adjusted up or down based on individuals in the chat room, for example, if the client has indicated that they never want to chat with a specific individual who happens to be inside the chat room then the chat room match score is forced to 0. As another example, if the client has indicated a preference for chatting with a specific second individual who happens to already be inside the chat room, then the chat room match score will be increased. In one embodiment, the final score will be between 0 and 100. In this example the chat room discussing referees scored well because: (a) The DLUX specified client did not indicate a preferred domain expertise level so that aspect of the chat room profile was ignored; (b) The chat room had attracted many other participants of young age in accordance with the first user's desires as expressed in his DsCCp, so there was a positive affect on the computed match score; (c) one specific person whom the first user likes to chat with, was already inside this room resulting in the neutral score being further adjusted in a positive direction.

In some cases, numerous chat rooms may score for a positive match. In that case, the DsMS will evaluate the well matched chat rooms in the order of their scores. The chat rooms with the highest scores will be evaluated first. In this example: (a) The chat room discussing referee fairness is evaluated first, because it scored the highest. It meets the minimum threshold for the match score and so it is added to the list of potential chat opportunities to be handed back to the DLUX or sent back as an invitation directly from the DsMS; (b) If the chat opportunity target count has not yet been met, a next chat room on the list is evaluated; (c) In a case where the chat opportunity target count is not yet reached by evaluating preexisting rooms, the DsMS will look for opportunities to create matching new chat rooms by inviting in other users with similar preferences into the newly created rooms. This may be done by:

New Room Step 1: Find the list of potential chat partner clients that have recently submitted CFi's directed to the same hierarchy regions (e.g., same current domain) where the submitted CFi's are in common with some of the CFi values submitted by the DLUX expanded topic identification of the first user (e.g., 111);

New Room Step 2: For each client in the potential chat partner list, retrieve their profile settings: (a) CpCCp values will always be retrieved; (b) If the DLUX indicated a specific domain, and not the "catch all" domain, then DsCCp values will also be retrieved if any exist for that node;

New Room Step 3: For each client in the potential chat partner list, rules-based combination of CpCCp and DsCCp values will be used as the client's preferences relating to this set of CFi values; for example, when topic specific DsCCp values are found they will override generic CpCCp values.

In this following hypothetical example two potential chat partner clients have been identified. Both were selected because they had submitted the CFi value "referee" in reference to the domain/topic of Sports/Soccer.

New Room Step 4: The DsMS calculates a cross matching score for each potential chat partner client in the list against the first user. For example, a potential chat partner client CFi score will be calculated by comparing the DLUX expanded client's CFi values to the CFi values associated with the potential chat partner client from the list. In one embodiment, this will be done by using the same algorithm used to calculate domain matching scores when comparing the client's CFi's to the domain node's average CFi's. A score of 0 indicates a bad match and a score of 100 indicates an excellent match.

In this hypothetical example, one of the potential chat partner clients (Bob) CFi's consisted of only "soccer" and "referee". This resulted in a fairly high score. On the other hand, the other potential chat partner client (Bill) CFi's consisted of "soccer, Referee" and ten other terms that did not well match the DLUX expanded topic values for the first user (111, e.g. Sam). Although the number of positive hits between the two potential chat partner clients was the same, the ten terms that did not match caused the score for this second potential chat partner to be lower.

In one embodiment, a potential chat partner client profile score is calculated as follows: (a) A starting score of 50 (neutral) is assumed; (b) The DsMS compares each of the chat room preferences (i.e. number of participants, conversation tone, etc.) declared in the CpCCp or DsCCp values for both the first user and the potential chat partner client; (c) The DsMS compares each first user's CpCCp or DsCCp preference file attributes for a chat partner (i.e. age range, level of domain expertise, etc.) to the corresponding demographic settings (i.e. Actual age, declared or verified level of domain expertise, etc.) from the potential chat partner and vise versa; (c) Favorable comparisons (e.g., declared level of expertise matches requested level of expertise) will increase the score. Unfavorable comparisons will decrease the score; (d) The calculated scores may be adjusted up or down based on dislike or like for specific individuals involved, for example, if the one user has indicated he never wants to chat with the other person then the score will be set to 0; (e) On the other hand, if either client has indicated a preference for chatting with the other person then the new chat room match score will be increased. The final score will be between 0 and 100.

In this hypothetical example the potential chat partner, Bob was on the list of individuals the first user (Sam) indicated he never wanted to chat with so their resulting cross compatibility score was 0 for the two. The other potential chat partner client Bill had no CpCCp or DsCCp values in common with the profile values supplied for the first user (Sam) so the score was left at a neutral value of 50. The CFI and profile scores will be combined to create a matching score for each potential chat partner client. In our example potential chat partner clients Bob and Bill each scored poorly in one section so neither of the matching scores was very high. The potential chat partner clients will be evaluated in the order of their scores. The potential chat partner clients with the highest scores will be evaluated first. In this example neither of the potential chat partner clients met the minimum matching score so neither was added to the list of potential chat opportunities to be handed back to the DLUX for forming a new room. Therefore the chat opportunity target count is never reached before the time out clock runs empty.

Users of the match-making system do not have to be passive receivers who merely wait around for new invitations. They can actively change the way the system is organized (e.g., how the domains hierarchy tree of FIG. 4B is organized and/or how topic nodes are mapped onto a given topic space such as the one shown in FIG. 6) by casting votes and making suggestions, including suggestions to merge out-of-system rooms or on-topic resources into the system. (By out-of-system rooms or on-topic resources, what is meant here is that these rooms or on-topic resources are not yet linked to by corresponding on-topic nodes of the system's hierarchy tree. Out-of-system rooms may also be ones for which the system has no rights of control, such as controlling who enters the room, etc.) In one embodiment, a client can try to explicitly subscribe to a given chat room even if not automatically invited to it by sending a message to the Chat Room Service (CRS 418) in control of the room or to the AARMS that supervises that CRS. The uninvited joining into a room request should contain a chat room identifier which is typically posted in the room. Once the CRS accepts the subscribing user, the user will be able to (through his or her client machine): (a) Send messages into that chat room; (b) Receive all messages posted into the chat room by other participating members; (c) Get alerted as other members enter or leave the chat room; and (d) depending on whether only premium users or other specially classified room users or anyone can, get to vote on changing the name, description and other system-stored characterizations of the given room.

In one embodiment, any member of a first in-system chat room can request that a new second chat room be created or that a current room be cleaved or that a third room be merged in with the first room by sending a corresponding request for new room creation, cleaving or merger to the room supervising CRS. (By in-system room, what is meant here is that this room is logically linked to by at least one corresponding on-topic node of the system's hierarchy tree and also that the system has control rights over the room. It is possible to have out-of-system rooms for which the MM-IGS does not have control rights.) Part of this request may include recommending a name and description for the new or altered chat room(s). The user requesting reformation of the first room or creation of the new second chat room can also specify if the modified room is to be a public room or a private room. The supervising AARMS may be asked to get involved in grant of request process because load balancing issues may arise. Upon grant, the DsMS that is the CRS resource's parent will be notified that the new chat room has been created or one or more previous rooms have been modified (e.g., merged). If the new/modified room is a public room, the DsMS may start using that room when looking for chat room opportunity matches. If the new/modified chat room is instead designated as a private room, it can only be entered via invitations authorized by the user who initiated formation of the private room or via invitations authorized by another user who is delegated the task of controlling entry into the private room. An example of an invitation authorization might be for example, invite only outside users who have a PhD degree in advanced biophysics and who also attended an Ivy League school. The DsMS would inherit this authorization criteria into its match-making criteria when performing its match-making tasks.

In one embodiment, users of a given chat room may invite specific outsiders to join that chat room. Such invitations to join the chat room will be initiated by a request sent from the inside client to the Chat Room Service hosting the chat room. The CRS or its supervising DsMS will then pass the invitation directly to the specific outsider as a Cciv record or packet without its DLUX having received a corresponding CFi from that specific outsider. In an alternate embodiment, the CRS receiving the request will determine which AARMS is being used by the outsider client who is being invited to join the given chat room. The CRS will then pass the invitation on through the default AARMS used by the client who is being invited in. If that invited outsider is off line at the moment, the next time that client contacts his default AARMS, the AARMS will respond with the stored and awaiting invitation in the form of a Cciv.

When a newly created or user-modified chat room is a public room it: (a) May temporarily appear in the domain hierarchy tree under a node that is a child of the node pointing to original room from which the requesting user initiated the new room creation or old room(s) modification (e.g., bifurcation or merger); (b) May be used by the DsMS when looking for chat opportunities for users who have not been specifically invited into the new/modified public room; (c) May get included as a "related" chat room recommendation provided at other nodes or in other rooms.

Users within all or a system specified subset of chat rooms may perform collaborative actions. An example of this may be to set or change system stored data representing chat room settings. Some chat room settings can be defined or modified based on recommendations of the chat room users. Here are some examples: (a) A new chat room created from a user's request can have set properties such as being private or public, having a specific room name and description set by the creating user and/or can have a specific node position in the domains hierarchy tree and interrelated nodes or rooms pointing to it or it pointing to them; (b) Preexisting public chat rooms that were not locked down (i.e., not designated as unalterable because they were created to support dynamic creation of new domains and topic node or because they are part of a predefined domains hierarchy tree backbone) may be specially allocated for allowing users to meet there and collaborate on chat room names or descriptions or descriptions for other rooms. In other words, the structure of a large set of branches within the domains hierarchy tree may be debated about and agreed to in these collaboration rooms. The process might occur as follows:

A user submits a suggestion to the CRS.

This suggestion is automatically broadcast to the other users in the chat room who have agreed to weigh in on restructuring suggestions.

One or more of the other users may make alternate or supplemental suggestions.

These additional suggestions are also automatically broadcast to the other users in the chat room.

Each of the plural suggestions is voted on to reach a group consensus. The votes may be submitted in the form of Cvi's cast by users participating within the collaboration room.

As the votes are collected and a collaborative decision is reached, the AARMS, DLUX and DsMS responsible for the chat room will be automatically notified of any changes that might affect future match-making tasks.

Cvi Processing: Like the CFi's, Current Vote Indicators (Cvi's) are records or packets or other data conveying objects that are formulated and generated in one or more of the local client machines at the location where the user is interacting with one or more open chat rooms (e.g., 316a, 316b of FIG. 3A) and where the user is implicitly or explicitly expressing vote-like opinions regarding content presented in the open chat rooms (and/or in other online exchange forums). In one embodiment, implicit voting is automatically inferred from collected biometric data of the user where that collected biometric data is deemed to strongly correlate with the content presented in the open chat rooms or the like. In one embodiment, each Cvi indicates at least one of: (a) what portion of the inn-chat-room content is being voted on, (b) a emotion or reaction type (e.g., inferred from biometric feedback) associated with current or previous inn-chat-room content, and (c) a vote on, or rating of current or previous inn-chat-room content. Additionally, in one embodiment, each Cvi may further indicate (d) a degree or intensity of an emotion or reaction type concurrently reported in the Cvi. In some cases, the vote on, or rating of the identified inn-chat-room content may be in the form of a simple "yes" or "no"; or simple "positive (+)" or "negative (−)"; while in other cases the rating may be a value within a predefined range (i.e. on a scale of 1 to 10). For example, a 0-100 scale might be used to rate another user's level of knowledge about and/or proficiency in a topic being discussed in the chat room. As mentioned, Emotion types may be accompanied with a rating scale value of their own.

Implicitly or explicitly produced votes (as conveyed by the Cvi's) can be used to smooth interaction and/or collaborating with other users in various chat rooms. As mentioned above, if a majority or super majority of participants in a given chat room implicitly or explicitly express persistent negative votes on the inn-chat behavior of one user (e.g., because that user is behaving like a troll), the chat room supervising service (CRS) may responsively bifurcate the room and thus separate the unwanted user from the others Also as mentioned above, voting may be used to migrate a room to being situated under a new or different node in the hierarchy tree and/or towards renaming the room or its node. Here is an example of steps that would be followed in one embodiment:

A room user proposes a name, or a name change, for the current chat room.

This proposal is automatically presented to all or a preselected subset of the other chat room participants.

Each authorized participant is enabled to cast an explicit or implicit vote (via a Cvi) regarding the proposal.

The votes are automatically counted over a predetermined time limit and the proposal is approved or denied according to room specific voting rules. Rules relating to approving the proposal may require one of the following:

A simple majority of the votes submitted or of all the participants in the chat room where that number may have to exceed a predefined quorum.

A specified percentage (i.e. 60%) of all submitted votes or of all the participants in the chat room.

The voting will end and the results will be displayed after:

Enough of the chat room participants have submitted votes to determine the outcome, or A predefined voting time limit has elapsed.

Implicitly or explicitly produced votes (as conveyed by the Cvi's) can also be used to adaptively adjust a given user's CpCCp and/or DsCCp values and/or knowledge-base rules. Examples of this include:

Reducing a first user's verified proficiency level within a given topic, if the user receives negative feedback from other chat room users having verified higher proficiency levels in that same topic (in other words, subordinates are graded by validated ones of their superiors in the same topic).

Setting or altering a first user's preference or dislike for certain other people or chat rooms if the first user shows a history of consistently voting contrastingly for or against such other people or chat rooms.

Using the above techniques, a user can participate in a domain specific chat room without having a personalized DsCCp (e.g., he or she as a new comer has only a template DsCCp). As the user interacts with chat rooms in the domain, the user's reputation values and/or credential values in the corresponding DsCCp can be developed automatically based on implicitly or explicit votes cast by others in the room.

Implicitly or explicitly produced votes (as conveyed by the Cvi's) can be used to adjust profiles in real time. They also may be stored for later evaluation by trending analysis services. For example it may be noted that a user who is usually fairly balanced in their voting has voted extremely negatively over an usually large percentage of the time during one evening. From that it may be automatically inferred that this person is simply in a bad mood or ill on that one unusual occasion therefore those negative votes will not be counted or they will be weighed less than what how they are normally weighed (based on the user's reputation, credentials, proficiency level, etc.).

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a further example, it is understood that the configuring of client computer machines and cloud servers in accordance with the disclosure constitutes transformation of instructable machines (and instructing articles therein) and cannot be deemed as a purely abstract exercise. Signals processed by such client computer machines and/or cloud servers are physical things and not abstract concepts. At least in some instances, processed signals represent physical things such biochemical and/or biomechanical and/or biometrically measured states of physical bodies (e.g., users) as detected and/or measured by biometric sensors. At least in some instances, processed signals represent physical things such the location of focus on a physical display of a user's eyes. It is further to be understood that the configuring of client computer machines and/or cloud servers in accordance with the disclosure can include use of local and/or remote software installation computers or computer programs to carry out physical installation of physical signals representing the software and/or to carry out activation of various functional parts of the described software modules. A computer-readable medium or another form of a software product transfer means or machine-instructing means (including but not limited to, a hard disk, a compact disk, a flash memory stick, a downloading of manufactured instructing signals over a network) may be used for instructing an instructable machine (client machine and/or in-cloud servers) to carry out their respective activities, where the activities can include selective activation of different functions including premium service and non-premium service in accordance with the disclosure. As such, it is within the scope of the disclosure to have an instructable machine carry out, and/to provide a software product adapted for causing an instructable machine to carry out the machine-implemented methods described herein.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein. Descriptions above regarding related technologies are not admissions that the technologies or possible relations between them were appreciated by artisans of ordinary skill in the areas of endeavor to which the present disclosure most closely pertains.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. § 120 and/or 35 U.S.C. § 251.

What is claimed is:

1. A machine-implemented method of dynamically associating with corresponding content, one or more persons for whom the corresponding content is likely to be in the present, or would likely be in the future of interest at a corresponding time and/or a corresponding place based on a corresponding one or more of determined current or recent situations and/or identified profiles and/or votes and/or declarations and/or planning files and/or history files and/or trending files of the associated one or more persons, where said determined current or recent situations and/or identified profiles and/or votes and/or declarations and/or planning files and/or history files and/or trending files correspond to information automatically repeatedly obtained from or about the associated persons, the method comprising:
  (a) causing an automated and automatically repeated obtaining of respective situational data from respective sensors and/or other situation indicators that are operatively proximate to or associated with respective ones of users of an automated machine system,
    wherein the respective proximate sensors and/or other situation indicators that are operatively proximate to or associated with the respective ones of the users respectively provide at least one of:
      (a1) data indicative of a current or recent one or more surroundings and/or of a current or recent one or more locations and/or of a current or recent one or more temporal positions and/or one or more availabilities and/or of a current or recent one or more changes of surrounding, and/or changes of location of the respective user;
      (a2) data indicative of a current or recent mood or of a current or recent one or more changes of mood of the respective user;
      (a3) data indicative of a current or recent one or more biometric attributes of, and/or of a current or recent one or more changes of biometric attributes of the respective user;
      (a4) data indicative of a current or recent one or more machine usage activities and/or one or more machine usage states of the respective user;
      (a5) data indicative of a current or recent mental state of, and/or of one or more current or recent changes of a mental state of the first user;
      (a6) data indicative of a current or recent one or more body language gestures made by the respective user;
      (a7) data indicative of a current or recent one or more body postures and/or biomechanical states of, and/or of a current or recent one or more changes of body posture and/or biomechanical state of the respective user;
      (a8) data indicative of a current or recent one or more biochemical states of, and/or of a current or recent one or more changes of biochemical state of the respective user;
      (a9) data indicative of a current or recent one or more physiological states of the respective user;
      (a10) data indicative of a current or recent one or more frames or states of mind of, and/or of a current or recent one or more changes of frame or state of mind of the respective user;
      (a11) data indicative of a current or recent one or more emotional states of, and/or of a current or recent one or more changes of emotional state of the respective user;
      (a12) data providing hints or clues for identifying specific cognition nodes relevant to a current or recent state of mind of the respective user;
      (a13) data indicative of a current or recent involvement of the respective user with corresponding content;
      (a14) data indicative of a current or recent vote cast implicitly or explicitly by the respective user; and
      (a15) data indicative of a current or recent declaration made by the respective user;
  (b) causing an automated and automatically repeated using of one or more of respective currently active profiles and/or current or recent votes and/or current or recent declarations and/or planning files and/or history files and/or trending files of the respective users, the currently active profiles being respectively selected subsets of respective plural profiles assigned for each of the respective users, where the used one or more respective currently active profiles and/or current or recent votes and/or current or recent declarations and/or planning files and/or history files and/or trending files of the respective users respectively provide at least one of:
    (b1) data indicative of current or recent demographic attributes of the respective user;
    (b2) data indicative of current or recent reputation attributes of the respective user;
    (b3) data indicative of current or recent credential attributes of the respective user;

(b4) data indicative of current or recent preference and/or dislike attributes of the respective user;

(b5) data indicative of current or recent favorites of the respective user;

(b6) data indicative of current or recent topic trends of the respective user;

(b7) data indicative of current or recent keyword histories of the respective user;

(b8) data indicative of current or recent URL histories of the respective user;

(b9) data indicative of current or recent machine usage histories of the respective user;

(b10) data indicative of current or recent physical locations-visited histories of the respective user;

(b11) data indicative of current or recent virtual forums-visited histories of the respective user;

(b12) data indicative of current or recent topics touched-on histories of the respective user;

(b13) data indicative of current or recent personal expression attributes of the respective user;

(b14) data indicative of current calendared events of the respective user;

(b15) data indicative of current to-do tasks and/or priorities thereof for the respective user;

(b16) data indicative of current persons-to-contact tasks of the respective user;

(b17) data indicative of currently open or closed availability time slots of the respective user;

(b18) data indicative of currently or recently cast votes of the respective user showing engagement with corresponding content; and (b19) data indicative of currently or recently made declarations by the respective user regarding the respective user's emotional and/or physiological state; and (c) causing an automated and automatically repeated determining of which, if any, of one or more items of dynamically associable and corresponding content are likely or would likely be of interest or not of interest to the respective users at corresponding times and/or places based on the caused automated and automatically repeated obtaining of the respective situational data and based on the caused automated and automatically repeated using of the one or more of the respective currently active profiles and/or current or recent votes and/or current or recent declarations and/or planning files and/or history files and/or trending files of the respective users;

wherein the machine system provides an organized mapping of plural topics that are represented by an organized mapping of topic nodes stored and maintained by the machine system and the mapped topic nodes are mapped to correspond to respective topics in respective coarse and more finely resolved manners within at least one of a respective hierarchical tree of topic nodes and a respective topic space populated by topic nodes; and wherein the automated and automatically repeated determining of which, if any, of one or more items of dynamically associable and corresponding content are likely in the present or would likely be in the future of interest or not of interest to the respective users at corresponding times and/or places is also based on an automatically repeated using of the organized mapping of plural topics.

2. The method of claim 1 wherein:

the respective users of the machine system include ones who might be subsequently identified as the automatically associated one or more persons for whom the corresponding information and/or the other offerings are likely to, or would likely be of current interest at corresponding times and/or corresponding places, and said causing of the automated and automatically repeated determining of which, if any, of one or more items of the corresponding content are likely or would likely be of interest or not of interest, is further based on:

causing an up to date maintaining in computer readable storage of the organized mapping of plural topics so as to provide a plurality of first data objects each representing an up to date respective topic node in a hierarchical tree of logically interconnected topic nodes; and causing an up to date maintaining, as an integrated part of each of plural given ones of the first data objects, of one or more logical links to respective data resources so as to thereby provide up-to-date on-topic data corresponding to a given topic associated with the topic node of the given first data object.

3. The method of claim 2 wherein the up to date maintained data resources include one or more identified telecommunications-mediated information exchange forums including online real time chat rooms having recent exchanges directed to the topic of the topic node or expected to soon have exchanges directed to the topic of the topic node, where the recentness of the recent exchanges are defined by pre-specified time durations and formation and availability of the soon to-be expected exchange are defined by pre-specified preferences for exchange property attributes of potential invitees.

4. The method of claim 2 wherein the up to date maintained data resources include an online web page that provides content corresponding to the topic of a corresponding given one of the first data objects.

5. The method of claim 2 wherein the one or more items of the corresponding content that are automatically repeatedly determined as being likely or would likely be of interest include a machine generated online proposal for a physical meeting between two or more of the respective ones of the users of the automated machine system where the proposed meeting is defined as covering the topic of a corresponding given one of the first data objects.

6. The method of claim 2 wherein said caused up to date maintaining of the one or more logical links to respective data resources includes for each of at least some of the given first data objects, causing automatically repeated pruning from the linked-to data resources, of links to those resources that no longer provide on-topic data corresponding to the given topic associated with the topic node of the given first data object.

7. The method of claim 2 wherein said caused up to date maintaining of the one or more logical links to respective data resources includes for each of at least some of the given first data objects, causing automatically repeated adding to the linked-to data resources, of links to additional data resources that provide on-topic data corresponding to the given topic associated with the topic node of the given first data object.

8. The method of claim 2 wherein said caused up to date maintaining of the first data objects includes a causing of a maintaining of an up to date stored first topic name for each of at least some of the given first data objects.

9. The method of claim 8 wherein said caused up to date maintaining of the first data objects includes a causing of a maintaining of an up to date stored and alternately-usable second topic name for each of at least some of the given first data objects.

10. The method of claim 2 wherein said caused up to date maintaining of the first data objects includes a causing of a maintaining of up to date and respectively stored and user-modifiable specifications of one or more topics respectively covered by each of at least some of the given first data objects.

11. The method of claim 2 wherein said caused up to date maintaining of the first data objects includes a causing of a maintaining of up to date and respectively stored and system modifiable logical links between parent node representing ones and corresponding respective child node representing ones of the given first data objects.

12. The method of claim 2 wherein said caused up to date maintaining of the first data objects includes a causing of a maintaining of up to date and respectively stored and system modifiable logical links between parent node representing ones and corresponding respective distant progeny node representing ones of the given first data objects.

13. The method of claim 2 wherein said caused up to date maintaining of the first data objects includes a causing of a maintaining of up to date and respectively stored and hierarchy tree wise unique ones of node ID tags for substantially all of the first data objects so that created topic nodes can be tracked as unique objects even if they migrate to new positions in the hierarchy tree different from their positions at time of creation.

14. The method of claim 2 wherein said caused up to date maintaining of the first data objects includes a causing of a maintaining of up to date and respectively stored and topic space wise unique ones of positioning coordinates in the nodes populated topic space for substantially all of the first data objects.

15. The method of claim 2 wherein said caused up to date maintaining of the one or more logical links to respective data resources includes for each of at least some of the given first data objects, causing vote-based pruning from the linked-to data resources, of links to those resources that according to votes no longer provide on-topic data corresponding to the given topic associated with the topic node of the given first data object.

16. The method of claim 2 wherein said caused up to date maintaining of the one or more logical links to respective data resources includes for each of at least some of the given first data objects, causing vote-based adding to the linked-to data resources, of links to additional data resources that according to votes provide on-topic data corresponding to the given topic associated with the topic node of the given first data object.

17. The method of claim 1 wherein the automated using of one or more of the respective planning files of the respective users occurs and includes using said data (b14) indicative of current calendared events of the respective user and said used data (b14) is automatically obtained from buried content of a machine accessed by the respective user, where the buried content is not being perceived by the respective user and includes a scheduling calendar of the respective user.

18. The method of claim 1 wherein the automated using of one or more of the respective planning files of the respective users occurs and includes using said data (b16) indicative of current persons-to-contact tasks of the respective user and said used data (b16) is automatically obtained from buried content of a machine accessed by the respective user, where the buried content is not being perceived by the respective user and includes a pressing contacts list of the respective user.

19. The method of claim 1 and further comprising:
causing a first network-connected and content-presenting digital machine of a respective first user among said identified one or more of the respective users of the machine system to automatically present to the first user a stream of automatically repeatedly updated invitations respectively offering to the first user an ability for the first user to immediately join with one or more other persons into a telecommunications-mediated information exchange forum where actual joiners there-into or invited potential joiners into the corresponding forum are predetermined by the machine system to likely have in common with one another at least one of:
(1) same presented content which is predetermined by the machine system to have been likely recently a center of focus for the actual or potential joiners during a predetermined first time period;
(2) a common topic of concurrent focus predetermined by the machine system to likely be a center of focus for the actual or potential joiners during a predetermined second time period; and
(3) co-compatibility determined by the machine system to likely be present during a predetermined third time period and as between the actual or potential joiners, the determined co-compatibility indicating likely co-compatibility between the actual or potential joiners for beneficially communicating with each other by way of the corresponding forum during the third time period,
the method further comprising:
causing an automatically repeated sending by the machine system of a streamed series of invitation representing physical signals to the respective first content presenting digital machine of the first user where the sent invitation representing physical signals are not infinitesimally transient ones and are structured to cause the first content presenting digital machine to present at least some of the represented invitations as a stream of repeatedly more up to date invitations that the first user can selectively accept and where the represented invitations enable the first user to, immediately upon acceptance, join into one or more corresponding telecommunications-mediated information exchange forums each having as true at least one of said attributes as between the actual or potential joiners, namely:
(1) commonality of same presented content being likely focused upon within the first time period;
(2) commonality of likely topic being likely a center of focus within the second time period; and
(3) co-compatibility for communicating with one another by way of the corresponding forum and during the third time period.

20. The method of claim 19 wherein:
even when said attribute (1) is not true, in other words, two or more users of the machine system are not focusing on same content but rather on different and dissimilar contents, said automatic sending to them of a streamed series of invitation representing physical signals, including one representing an invitation to a same forum, can still occur as a result of at least one of said attributes (2) and (3) being true.

21. The method of claim 19 wherein:
for a case where only said attribute (1) is true, namely, commonality of same content being focused upon, the commonly focused upon content is not obtained by all actually joined or invited potential joiners from a same source that itself directs the actual or potential joiners to the corresponding forum.

22. The method of claim 19 wherein:
at least one of the represented invitations invites the first user to join into a corresponding telecommunications-mediated information exchange forum having as true both of said attribute (1) of commonality of same content being likely focused upon within the first time period and attribute (2) of commonality of likely topic focused upon within the second time period.

23. The method of claim 19 wherein:
at least one of the represented invitations invites the first user to join into a corresponding telecommunications-mediated information exchange forum having as true both said attribute (2) of commonality of likely topic of interest and said attribute (3) of co-compatibility for communicating with members of the forum, the co-compatibility being determined based on a currently active profile of the first user.

24. The method of claim 19 wherein:
at least one of the represented invitations invites the first user to join into a corresponding telecommunications-mediated information exchange forum having as true all of said attributes (1)-(3), namely, commonality of content focused upon, commonality of likely topic of interest and co-compatibility for beneficially communicating.

25. The method of claim 19 wherein:
at least the first user and one other actually joined or invited potential joiner into the corresponding forum are topically contemporaneous strangers with respect to one another in that the first user does not know that the one other actual or invited potential joiner is a person who during the predetermined second time period has a substantially same topic of focus or interest in mind as does the first user during the predetermined second time period.

26. The method of claim 19 wherein:
at least the first and second attributes are true, and
each of the first and second predetermined time periods is not more than one week before the corresponding invitation is presented to the first user.

27. The method of claim 26 wherein:
each of the first and second predetermined time periods is at least one of:
not more than three hours before the corresponding invitation is presented to the first user; and
at time period determined in accordance with a currently active profile of the first user as to what constitutes recentness for a current context of the first user.

28. The method of claim 26 wherein:
each of the first and second predetermined time periods is not more than 10 minutes before the corresponding invitation is presented to the first user.

29. The method of claim 1,
wherein said causing of an automated and automatically repeated obtaining of respective situational data from respective sensors and/or other situation indicators that are proximate to or associated with respective ones of users of the automated machine system includes a caused automated and automatically repeated determining of at least one of:
odors the respective user is subjected to;
background sounds the respective user is subjected to;
background lightings the respective user is subjected to;
eye focusing activities of the respective user;
changes in pupil dilation state of the respective user;
cursor focusing activities of the respective user;
head movement activities of the respective user;
body language activities of the respective user;
eyeglass-frame associated activities of the respective user;
time spent by the respective user in apparently listening to audio content; and
user input device usages of the respective user which user input device usages may include one or more of:
keyboarding input focusing activities of the respective user;
mouse actuations or mouse movements of the respective user;
display scrolling actions caused by the respective user through use of a user input device;
temporary highlighting of displayed content as caused by the respective user through use of a user input device;
temporary zooming into or zooming back from displayed content as caused by the respective user through use of a user input device;
copying of presented content as caused by the respective user through use of a user input device;
time spent operating a user input device to thereby view more than one screen-full of presented content;
rates of input device usage by the respective user including those indicative of hand agitation rates;
eye blinking activities of the respective user;
heart rate of the respective user;
breathing rate of the respective user;
depth of breathing of the respective user;
fidgeting by the respective user;
facial grimaces of the respective user;
galvanic skin response of the respective user;
hand gesturing by the respective user;
blood pressure of the respective user;
blushing or paleness of the respective user;
skin temperature of the respective user;
muscle tensing by the respective user; and
imagery in an infra-red (IR) range of the respective user.

30. The method of claim 1 wherein the automatically repeatedly obtained respective situational data is repeatedly received as transmitted data from one or more transmitters which are remote from receivers receiving the obtained situational data and at least one of the repeatedly received and thereby obtained respective situational data from a corresponding at least one of the respective sensors and/or other situation indicators includes at least one of:
a time stamp indicating when the particular situation, as indicated by the at least one repeatedly received and respective situational data, was deemed to have taken place;
a location stamp indicating where the particular situation, as indicated by the at least one repeatedly received and respective situational data, was deemed to have taken place;
a machine identification stamp indicating an identification of a particular machine or sensor used for producing the at least one repeatedly received and respective situational data;
a machine setting stamp indicating a positional orientation and/or other setting of the particular machine or sensor used for producing the at least one repeatedly received and respective situational data;

a user identification stamp indicating an identification of the respective user for whom the at least one repeatedly received and respective situational data applies; and a usage of a machine input mechanism stamp providing repeatedly received and respective indication of user usage of one or more machine input mechanisms including, but not limited to, keyboard usage, mouse usage, touchpad usage, microphone usage, a usage that changes displayed content, a usage that causes copying a specific piece of content, a usage that involves listening to audio content and a search engine input usage.

31. The method of claim 30 wherein:
the location stamp is obtained on the basis of at least one of: a GPS signal and a non-GPS location determining means.

32. The method of claim 31 wherein:
the location stamp is obtained on the basis of the non-GPS location determining means and the non-GPS location determining means includes at least one of: a nearby RFID tag, one or more nearby pieces of equipment whose locations are predetermined; pre-identified surrounding locations based on visual and/or sound data that is indicative of being at least in one of the following situations: at home, in the office, on the road, alone, and in a crowd.

33. The method of claim 30 wherein:
at least one of the repeatedly received and thereby obtained respective situational data from a corresponding at least one of the respective sensors and/or other situation indicators simultaneously includes at least two of the recited stamps.

34. The method of claim 30 wherein:
at least one of the repeatedly received and thereby obtained respective situational data from a corresponding at least one of the respective sensors and/or other situation indicators simultaneously includes at least three of the recited stamps.

35. The method of claim 30 wherein:
said transmitted data originates from at least two different particular machines and/or from at least two different sensors and the machine identification stamp is included with the transmitted data to thereby indicate the identification of the particular machine and/or sensor used for producing the respective situational data provided by the transmitted data.

36. The method of claim 1 wherein the automatically repeatedly obtained respective situational data is repeatedly received as transmitted data from one or more transmitters which are remote from receivers receiving the obtained situational data and the automated and automatically repeated obtaining of the respective situational data from respective sensors and/or other situation indicators that are proximate to or associated with respective ones of users of the automated machine system comprises: automatically repeatedly detecting and recording local machine usage activities of the respective user as applied to machine systems in the user's locale, including:
attention focusing activities of the respective user which include at least one of:
eye focusing activities of the respective user;
eye movements of the respective user;
changes in pupil dilation state of the respective user;
head movement activities of the respective user;
activities of the respective user sensed by a device worn by the respective user; and eyeglass-frame associated activities of the respective user.

37. The method of claim 36 wherein:
the automated detecting and recording of local machine usage activities of the respective user further includes:
automatically detecting and recording indications of intensity or rapidity of emotional involvement concurrently associated with the local machine usage activities of the respective user.

38. The method of claim 37 wherein the automatically detected and recorded indications of intensity or rapidity of emotional involvement include at least one of:
eye blinking activities of the respective user;
heart rate of the respective user;
breathing rate of the respective user;
depth of breathing of the respective user;
fidgeting by the respective user;
facial grimaces of the respective user;
galvanic skin response of the respective user;
hand gesturing by the respective user;
blood pressure of the respective user;
blushing or paleness of the respective user;
skin temperature of the respective user;
muscle tensing by the respective user;
imagery in an infra-red (IR) range of the respective user; and
one or more biometric attributes of the respective user in the group consisting of: biometric attributes based on EEG signals obtained from the respective user, biometric attributes based on EKG signals obtained from the respective user, biometric attributes based on ultrasound reflection signals obtained from the respective user, and biometric attributes based on biometric signals obtained from sensors worn by the respective user.

39. The method of claim 36 wherein:
the automatically repeatedly detected and recorded attention focusing activities of the respective user include said body language activities of the respective user; and
the method further comprises automatically using a currently active expression interpreting profile of the respective user to automatically attribute a likely emotional state and/or implicit voting state of the respective user to at least one of the detected and recorded user activities.

40. The method of claim 1 wherein the automatically and repeatedly obtained and respective situational data from respective sensors and/or other situation indicators that are proximate to or associated with respective ones of users of the automated machine system include indications of one or more biometric states or mental states of the respective user, where the indicated states include or are based on at least one of:
(a) a staring by the respective user beyond a pre-specified time upon displayed content and/or the time length of such staring;
(b) increased or decreased heart rate;
(c) increased or decreased breathing rate;
(d) increased or decreased depth of breathing;
(e) increased fidgeting;
(f) unusual skin blushing or paleness;
(g) up-tilted head and diverted eyes while listening to audio;
(h) grimaces, eyebrow lifts, or other facial expressions;
(i) rate of $CO_2$ exhalation;
(j) galvanic skin response;
(k) posture-related weight bearing distribution;
(l) rate of words read per unit of time;

(m) changes in eye dilation state;
(n) verbal expressing of profanities or the like;
(o) rate of invitation acceptances by the respective user;
(p) reaction time of the respective user after being subjected to emotion evoking test content;
(q) eyelid blink rate and/or degree to which eyes are kept open;
(s) distance between head of the first user and content presenting device;
(t) in person social isolation or immersion of the respective user;
(u) increased agitation;
(v) engaging in flaming activities where the respective user is projecting impolite content to other users in a forum, even if not actually transmitting such flaming content to the others;
(w) unusually high casting of negative votes by the respective user;
(x) output of an electromagnetic brain probing device;
(y) body language cues provided by the respective user;
(z) emotion or reaction type associated with current or previous content to which the respective user is exposed;
(aa) blushing or paleness of the respective user;
(bb) skin temperature of the respective user;
(cc) muscle tensing by the respective user; and
(dd) imagery in an infra-red (IR) range of the respective user.

41. The method of claim 40 wherein the indicated biometric states of the respective user are processed by automated apparatus in accordance with predetermined biometric data processing rules stored in a memory and logically linked to the respective user.

42. The method of claim 40 and further comprising:
automatically repeatedly determining one or more of the indicated mental states of the respective user on basis of a Personal Emotion Expression Profile (PEEP) stored in a memory and logically linked to the respective user as being a currently active profile of the respective user.

43. The method of claim 42 wherein:
the currently active PEEP of the respective user that is used as the basis for determining one or more of the indicated mental states of the respective user is a function of automatically repeatedly determined surroundings of the respective user.

44. The method of claim 1 and further comprising:
(d) causing an automated data-access suppressor to automatically and selectively suppress an obtaining of respective situational data directed to pre-specified content or occurring during pre-specified times.

45. The method of claim 44 wherein the pre-specified times is a controlling factor causing automatic suppression of said obtaining of respective situational data and the pre-specified times include times when a local global interest monitoring warning notification indicates interest monitoring is globally off.

46. The method of claim 44 wherein the pre-specified content is a controlling factor causing automatic suppression of said obtaining of respective situational data and the pre-specified content is pre-specified as that containing confidential material.

47. The method of claim 1 and further comprising:
causing use of an encryption unit that encrypts at least some of the automatically repeatedly obtained respective situational data before that at least some of the situational data is transmitted over a network.

48. The method of claim 1 and further comprising:
causing an automated upload suppressor to automatically suppress an automated uploading of the respective user's situational data to a server or cloud in cases where the respective user's situational data lacks a priori permission from the respective user of the respective situational data for such uploading and where that respective situational data is designated as originating from a pre-specified confidential source.

49. The method of claim 1 wherein:
the automated machine system used by the respective ones of users maintains in a memory thereof, said organized mapping of plural topics and the automatically repeated using of the organized mapping of plural topics includes automatically repeatedly updating and re-organizing mappings of the topic nodes within said respective hierarchical tree and/or respective topic space such that the topic nodes respectively represent communally-agreed-to definitions corresponding to the respective topics of the respective topic nodes and wherein the organized mapping is a dynamically changeable mapping of said topic nodes, where node organizing aspects of the mapping can be re-organized to correspond with changing sentiments of a plurality of users of the machine system; and
the machine system is configured to automatically repeatedly re-organize its node-represented communally-agreed-to definitions based on received and processed vote-indicating signals obtained from one or more of the users of the machine system.

50. The method of claim 1 wherein the automated and automatically repeated obtaining of respective situational data comprises:
using one or more user monitoring subsystems that are configured to automatically repeatedly monitor at least one of machine usage activities of, states of, and/or surroundings of the respective user of the machine system and to automatically repeatedly record and only temporarily keep for potential transmission, a plurality of report records providing data corresponding to the monitored activities, states, and/or surroundings of the respective user, wherein the automatically repeated monitorings are carried out transparently by the one or more user monitoring subsystems without need for diverting focused attention of the respective user to aiding the monitorings;
wherein said monitored activities, states, and/or surroundings of the respective user whose recorded report records are used for determining recent activities, states and/or surroundings consist of those that occurred no more than at least one of:
3 hours prior to said automated determining, which determining is based on the corresponding data provided by the temporarily kept records and which determines which, if any, of one or more informational, and/or other offerings are likely or would likely be of interest or not of interest at corresponding times, and/or places; and
a determined time duration prior to said automated determining of which, if any, of one or more informational, and/or other offerings are likely or would likely be of interest or not of interest at corresponding times, places, the determined time duration being determined based on a currently active profile characterizing the respective user.

51. The method of claim 50 wherein the automated and automatically repeatedly monitored activities and/or states of the respective user include likely recent focusings of attention of the respective user and include focusings of attention on differently sourced items of content that respectively originated from different sources of content.

52. The method of claim 50,
wherein at least some of the automatically repeatedly recorded report records include data derived from an emotional state detector, the detector comprising at least one of:
a body language detector configured to detect a body language state of the respective user; and
a biometric state detector configured to detect a biometric state of the respective user;
wherein the emotional state detector is configured to automatically repeatedly determine a recent at least one of the body language state and the biometric state of the respective user transparently without need for diverted centering of attention by the respective user directed to aiding the automatically repeated determining of the recent at least one of the body language state and the biometric state of the respective user;
wherein the caused automated and automatically repeated determining of which, if any, of one or more items of dynamically associable and corresponding content are likely or would likely be of interest or not of interest to the respective users at corresponding times and/or places is based at least on a respective and currently active, emotions expressing profile of each respective user; and
wherein the caused automated and automatically repeated determining of which, if any, of one or more items of dynamically associable and corresponding content are likely or would likely be of interest or not of interest to the respective users at corresponding times and/or places is based on the automatically repeated determinations by the body language detector of recent ones of body language states or determinations by the biometric state detector of recent ones of the biometric states of the respective user in combination with interpretations of those body language states or biometric states in accordance with the respective and currently active, emotions expressing profile of the respective user.

53. The method of claim 52,
wherein at least a portion of the biometric state detector is incorporated in a wearable article that is wearable by the respective user.

54. The method of claim 53,
wherein the wearable article includes a watch that is wearable by the respective user.

55. The method of claim 52,
wherein at least a portion of the biometric state detector is incorporated in a user-to-computer system interface device that is usable by the respective user.

56. The method of claim 52,
wherein at least a portion of the biometric state detector is incorporated in a camera trainable on a skin portion of the respective user for detecting changes in biometric state based on changes of imagery obtained in different optical wavelength bands of the skin portion of the respective user.

57. The method of claim 52,
wherein the body language detector includes a camera trainable on at least a head portion of the respective user for detecting body language related attributes from images provided by the camera of at least the head portion of the respective user.

58. The method of claim 52,
wherein the body language detector includes an instrumented article of furniture configured to support the body of the respective user and further configured to detect changes of weight bearing and/or posture of the respective user.

59. The method of claim 52,
wherein at least one of the biometric state detector and the emotional state detector includes a respective noncontact sensor that respectively detects a corresponding biometric state or emotional state of the respective user without making direct contact with the respective user.

60. The method of claim 50 wherein at least one of the user monitoring subsystems is configured to automatically sort the stored recent ones of the report records according to at least one of biometrically or explicitly detected level of user interest or user engagement with the corresponding content that the respective report records report on.

61. The machine system of claim 60 wherein the sorting of the stored recent report records performed by the user monitoring subsystem is keyed at least on biometrically detected level of interest as indicated in the respectively stored recent report records.

62. The machine system of claim 60 wherein the at least one user monitoring subsystem is configured to respond to an externally supplied pull-request signal that includes filtering criteria for selectively identifying those of the stored recent report records that are to be next used for said automated determining of which, if any, of one or more informational and/or other offerings are likely or would likely be of interest or not of interest at corresponding times and/or places.

63. The method of claim 1 and further comprising automatically repeating the automated determining of which, if any, of one or more items of dynamically associable and corresponding content are likely or would likely be of interest or not of interest at corresponding times and/or places such that the automatically repeated automated determinings with respect to which, if any, of one or more items are likely or would likely be of interest or not of interest to respective users, are progressively more up to date ones due to progressive refinement of referencing among the mapped topic nodes from respective and relatively coarse ones to more finely resolved ones based on continued gathering of the automatically repeatedly obtained and respective situational data from the respective sensors and/or the other situation indicators that are operatively proximate to or associated with the respective users.

64. The method of claim 1 and further comprising:
(d) causing a maintaining and an automatically repeated updating within a memory of the machine system of a plurality of stored and dynamically updated user profiles for each of the respective users of the machine system, at least one of the automatically repeatedly updated profiles being a currently active profile activated on a basis of at least one of a current mood and current surroundings of a respective one of the users of the machine system,
wherein the current mood and/or the current surroundings basis of the respective one user is determined based on automatic repeated obtaining of at least one of Current Focus indicator signals (CFi's) associated with the respective one user, of Current Vote indicator signals (CVi's) associated with the respective one user, of current GPS signals associated with the respective one user, and of current nearby RFID tag information associated with the respective one user and/or of current nearby RFID tag information associated with another user who is proximate to the respective one user, and/or wherein the current mood of the respective one user is determined based on an explicit mood reporting signal provided by the respective one user.

65. The method of claim 64 and further comprising:
automatically determining connection co-compatibilities between two or more of the users of the machine system based on their respective and currently active user profiles.

66. The method of claim 64 and further comprising:
automatically recommending activities to the respective one user based on at least one of the respective one user's currently-active personhood profile and the respective one user's recently, automatically repeatedly obtained Current Focus indicator signals (CFi's).

67. The method of claim 64 and further wherein at least one of the current mood and faced-toward portion of surroundings of the respective one user is automatically repeatedly determined based on signals obtained from an instrumented eye glass type of frame or other headwear worn by the respective one user.

68. The method of claim 64 and further wherein at least one of the current mood and current surroundings of the respective one user is automatically repeatedly determined based on signals wirelessly obtained from one or more instrumented devices worn by the respective one user and/or from an instrumented posture supporting device used by the respective one user for defining a current posture of the user.

69. The method of claim 1 wherein the causing of an automated determining includes:
causing an automatically repeated determining of one or more members of a joinder worthiness attributes group of a first user among said respective ones of users of the automated machine system, the members of the joinder worthiness attributes group being comprised of at least two joinder worthiness attributes including: recent user emotional states, recent user moods, recent user behavioral states, recent user attention focusing states, user demographics, recent user-surrounding objects, recent other persons surrounding the user, recent user context cues other than user-surrounding objects and user-surrounding other persons, plus optionally other recent joinder worthiness attributes of a respective first user of the machine system; and
causing an automatically repeated determining of a same one or more members of the joinder worthiness attributes group of a respective second user among said respective ones of users of the machine system; and
wherein the determined same one or more members of the joinder worthiness attributes group are usable for indicating how likely or not each of the respective first and second users are to want to receive at a substantially same time, respective and automatically generated invitations to join one with the other.

70. The method of claim 69 wherein:
the at least two joinder worthiness attributes include at least two of:
(a1) current positive mood of the respective user to join with another user belonging to a predefined age range;
(a2) current negative mood of the respective user to join with another user belonging to a predefined age range;
(a3) current neutral mood of the respective user to join with another user belonging to a predefined age range;
(b1) current positive mood of the respective user to join with another user of a predefined gender;
(b2) current negative mood of the respective user to join with another user of a predefined gender;
(b3) current neutral mood of the respective user to join with another user of a predefined gender;
(c1) current positive mood of the respective user to join with another user located in a predefined geographic area and/or time zone;
(c2) current negative mood of the respective user to join with another user located in a predefined geographic area and/or time zone;
(d1) current positive mood of the respective user to join with another user fitting into a predefined socioeconomic class;
(d2) current negative mood of the respective user to join with another user fitting in a predefined socioeconomic class;
(e1) current positive mood of the respective user to join with another user belonging to a predefined religion and/or culture;
(e2) current negative mood of the respective user to join with another user belonging to a predefined religion and/or culture;
(f1) current positive mood of the respective user to join with another user belonging to a predefined political organization;
(f2) current negative mood of the respective user to join with another user belonging to a predefined political organization;
(g1) current positive mood of the respective user to join with another user currently having a predefined one or more topics as currently favorite topics or currently most disliked topics;
(g2) current negative mood of the respective user to join with another user currently having a predefined one or more topics as currently favorite topics or currently most disliked topics;
(h1) current positive mood of the respective user to join with another user currently having a predefined one or more books as currently favorite books or currently most disliked books;
(h2) current negative mood of the respective user to join with another user currently having a predefined one or more books as currently favorite books or currently most disliked books;
(i1) current positive mood of the respective user to join with another user currently having a predefined one or more movies as currently favorite movies or currently most disliked movies;
(i2) current negative mood of the respective user to join with another user currently having a predefined one or more movies as currently favorite movies or currently most disliked movies;
(j1) current positive mood of the respective user to join with another user currently having a predefined one or more games as currently favorite games or currently most disliked games;
(j2) current negative mood of the respective user to join with another user currently having a predefined one or more games as currently favorite games or currently most disliked games;
(k1) current positive mood of the respective user to join with another user currently having a predefined one or more URL's (universal resource locators) as currently favorite URL's or currently most disliked URL's;

(k2) current negative mood of the respective user to join with another user currently having a predefined one or more URL's as currently favorite URL's or currently most disliked URL's;

(L1) current positive mood of the respective user to join with another user currently having a general reputation for liking to argue or opposingly having a general reputation for liking to be agreeable;

(L2) current negative mood of the respective user to join with another user currently having a general reputation for liking to argue or opposingly having a general reputation for liking to be agreeable;

(L3) current positive or negative mood of the respective user to be invited to observe and/or participate in forum having specified average or otherwise forum-wide characterizing attributes relating to general reputations of other users of that forum and/or relating to general credentials of other users of that forum and/or relating to general demographics of other users of that forum;

(m1) current positive mood of the respective user to join with another user currently having a general reputation for having fact-based view points or opposingly having a general reputation for not having fact-based view points;

(m2) current negative mood of the respective user to join with another user currently having a general reputation for having fact-based view points or opposingly having a general reputation for not having fact-based view points;

(n1) current positive mood of the respective user to join with another user currently having validated credentials in a predefined one or more topic areas or work experience areas;

(n2) current negative mood of the respective user to join with another user currently having validated credentials in a predefined one or more topic areas or work experience areas;

(O1) current positive mood of the respective user to join with one or more other users in a forum where the forum has, or is projected to have a predefined set of forum statistics;

(O2) current negative mood of the respective user to join with one or more other users in a forum where the forum has, or is projected to have a predefined set of forum statistics;

(O3) current neutral mood of the respective user to join with one or more other users in a forum where the forum has, or is projected to have a predefined set of forum statistics;

(p1) current emotional state of the respective user being at least one of happy, disappointed, upset, engaged, bored, groggy, sleepy, caffeinated and in a bad mood due to background stresses;

(p2) current emotional state of the respective user being at least one of heightened excitement, a determined level of anxiety, a determined level of jumpiness, a determined level of interest, a determined level of upset, a determined level of concern, a state of deep interest, a state of high degree of dissatisfaction, a determined degree of attentive focus, a state of sleepiness, a stressed state, a relaxed state, a state of agitation, a state of fear, a state of doubt, state of joy, a state in which one or more pre-specified parts of the respective user's brain are raised to a more active level where the pre-specified brain parts may include at least one of the amygdala, orbitofrontal cortex, and dorsal striatum, a state of willingness to engage with other users, a mood to engage with other users who are agreeable with the respective user's point of view and a mood to engage with other users who adhere to points of view different from that of the respective user and desire to debate over the differing points of view;

(p3) current emotional state of the respective user being cranky;

(p4) current emotional state of the respective user being in an unusual mood for a given period of time;

(p5) current emotional state of the respective user being anxious;

(p6) current emotional state of the respective user being excited;

(q1) a current disposition to join into an online forum where the forum has or will have at least one of:
    (q1a) a predetermined forum population range;
    (q1b) a predetermined forum average age of participants;
    (q1c) a predetermined forum gender mix ratio;
    (q1d) a predetermined forum socioeconomic average;
    (q1e) a predetermined forum mean location of participants;
    (q1f) participants having same emotional reactions with respect to a reference item of content;
    (q1g) a commonality among forum participants with respect to at least one of: favorite books, favorite movies, favorite topics, favorite games, favorite URL's; and
    (q1h) an exclusion from the forum of participants having a predetermined undesired age range, a predetermined undesired gender, a predetermined undesired socioeconomic class, a predetermined undesired reputation, a predetermined undesired credential or lack of such credential or a credential that will unbalance a predetermined mix of the credential desired for the forum, a predetermined disposition toward arguing, a predetermined disposition toward ignoring facts, a predetermined disposition toward being too agreeable; and (q2) a current disposition to join in on an in person meeting with other co-compatible users.

71. The method of claim 70 wherein:
current mood and/or emotional state of the respective user is determined based on recent body language and/or biometric states of the respective user; and
said automatically repeated and unobtrusive determining of two or more of the joinder worthiness attributes of the respective user includes automatically repeatedly analyzing automatically repeatedly monitored ones of body language expressions of the respective user and/or biometric states of the respective user.

72. The method of claim 71 wherein:
the automatically repeated analyzing of monitored ones of body language expressions and/or biometric states of the respective user includes use of a currently active Personal Emotion Expression Profile (PEEP) record of the respective user, where the used and currently active PEEP record provides correlative mappings between at least one of:
recent body language expressions of the respective user and emotional states or focus/content-engagement states of the respective user; and
recent biometric states of the respective user and emotional states or focus/content-engagement states of the respective user.

73. The method of claim 72 wherein:
the automatically repeatedly monitored recent biometric states of the respective user include at least one of:
an increase or decrease of blood flow to a monitored body part of the respective user;
a pulse rate of the respective user;
a galvanometric skin resistance of the respective user;
a skin temperature of the respective user;
flexure of monitored muscles of the respective user;
rate of acceleration of hand gestures of the respective user;
respiration rate of the respective user and/or depth of exhalations of the respective user;
blood pressure of the respective user;
distribution of weight by the respective user on monitored weight bearing surfaces that bear the respective user;
at least one of an EKG and EEG of the respective user;
a grip force by which the respective user grips a device having embedded grip monitoring features;
stress tones in the respective user's voice; and
brain activity indicating signals obtained by a brain probing device.

74. The method of claim 72 and further comprising:
selecting the currently active Personal Emotion Expression Profile (PEEP) record of the respective user on the basis of at least one of:
a recently determined mood of the respective user;
recently determined surroundings of the respective user;
recently determined biometric states of the respective user; and
currently active knowledge base rules (KBR's) associated with the respective user.

75. The method of claim 74 wherein the selection basis includes the currently active knowledge base rules (KBR's) and those KBR's specify at least one of:
a next PEEP record to be instead activated for the respective user if KBR-specified conditions are met;
changes in determined emotional state of the respective user based on changes of heart beat rate and/or other collected biometric data;
changes in determined emotional state of the respective user based on changes in the user's posture;
changes in determined attention focusing score of the respective user based on changes in a reading rate of the respective user over a recent predetermined duration of time;
changes in a CFi's merging time stretch based on changes in the user's recent biometric data;
changes in determined emotional state of the respective user based on detected recent verbal utterances by the respective user; and
changes in at least one of detected background noises, odors and/or lighting cues.

76. The method of claim 71 wherein:
the automatically repeatedly monitored body language expressions of the respective user include at least one of:
facial expressions made by the respective user;
upper body posturings expressed by the respective user;
eye lid blinks made by or blink rates of the respective user;
changes of eye pupil states of the respective user;
eye movements;
length of staring at a particular location;
rapidity and/or depth of breathing by the respective user;
sighing actions of the respective user;
shoulder shrugging actions of the respective user;
stretches of physical inactivity of the respective user;
head shakes by the respective user;
a sitting posture of the respective user; and
how often and/or to what extent the respective user shakes or bobs the user's head and whether such shaking or bobbing is in rhythm to background music.

77. The method of claim 69
wherein the automatically repeated determining of two or more members of the joinder worthiness group includes determining user behaviors;
wherein the automatically repeated determinings of the respective one or more behavioral and optionally other joinder worthiness attributes of the respective first and second users is an unobtrusive determining process which does not divert the respective user's attention toward aiding the determining process;
wherein the automatically repeatedly determined one or more behavioral or other joinder worthiness attributes of each of the respective first and second users includes at least one of:
using a currently active personhood profile (CpCCp) of the respective user;
using a currently active planning calendar of the respective user;
using a currently active must-meet-and-confer list of the respective user;
using one or more currently pressing, to-do files of the respective user where the to-do files define at least one of places and times of already scheduled meetings, events or conferences which the respective user is committed to attending;
using a currently active contacts list of the respective user;
using historical trending behaviors of the respective user as stored in a trending behaviors store of the machine system;
using the respective user's developed reputation within a given domain as based on respective user's past behaviors in that domain and as adjudged by other users of the machine system;
using the respective user's historical migration behaviors within a machine system maintained topic space;
using the respective user's historical migration behaviors in stepping through different kinds of online forums as a trending predictor; and
using the respective user's historical habits of behavior.

78. The method of claim 77 wherein:
the currently active personhood profile (CpCCp) is used and includes:
a currently active set of knowledge base rules (KBR's) and those KBR's specify at least one of:
a next personhood profile to be instead activated for the respective user if KBR-specified conditions are met;
a change in a determined co-compatibility score based on attributes of a potential forum to which the respective user might be invited; and
a change in a determined co-compatibility score based on time and/or location of the respective user.

79. The method of claim 77 wherein:
the currently active personhood profile (CpCCp) of the respective user is used and includes:
a list of desirable other users;
a list of undesirable other users
a list of desirable forum properties;
a list of undesirable forum properties;
a list of desirable reputations of other users;
a list of undesirable reputations of other users;
a list of desirable credentials of other users;

a list of undesirable credentials of other users;
a list of desirable favorite things of other users; and
a list of undesirable favorite things of other users.

80. The method of claim 69 wherein:
the respective and automatically repeated determinings of the same one or more members of the joinder worthiness attributes group of the respective first and second users are unobtrusive determining processes which respectively do not divert each of the respective user's attention toward aiding the respective determining processes.

81. The method of claim 1 wherein the causing of an automated and automatically repeated determining of which, if any, of one or more items of dynamically associable and corresponding content are likely or would likely be of interest or not to the respective users at corresponding times and/or places includes:
causing an automatically repeated determining of one or more members of a content recommendation worthiness attributes group of a respective user, the group being comprised of at least two recommendation worthiness attributes including: recent user emotional states of the respective user, recent user moods of the respective user, recent user behavioral states of the respective user, recent user attention focusing states of the respective user, user demographics of the respective user, recent user-surrounding objects of the respective user, recent other persons surrounding the respective user, recent user context cues other than user-surrounding objects of the respective user, user-surrounding other persons proximate to the respective user, and other recent content recommendation worthiness attributes of the respective user of the machine system; and
wherein the caused determining of the one or more content recommendation worthiness attributes of the group belonging to the respective user is used as a basis for determining how likely or not the respective user is to want to receive an automatically generated recommendation of content for the respective user to investigate the recommended content.

82. The method of claim 81 wherein:
the respective and automatically repeated determinings of the content recommendation worthiness attributes of the respective user are unobtrusive determining processes which respectively do not divert the respective user's attention toward aiding the respective determining processes regarding the content recommendation worthiness attributes.

83. The method of claim 1 and further comprising:
causing an automatic identifying of clusterings and/or of trends toward clustering or declustering of users and/or of cognition-representing nodes and/or of information exchanging forums in one or more attribute-differentiated spatial spaces or hierarchically ordered spaces, the method using the automated machine system where said causing of the automatic identifying of clusterings and/or of trends toward clustering or declustering of users and/or of cognition-representing nodes and/or of information exchanging forums includes:
causing an automatically repeated determining of one or more spatially-differentiating attributes and/or hierarchical-placement-differentiating attributes of plural users of the machine system and/or of cognition-representing nodes defined by the machine system and/or of information exchanging forums tracked by the machine system, the spatially-differentiating attributes being ones that enable differentiation of the users and/or of the cognition-representing nodes and/or of the information exchanging forums within a respective spatial space and the hierarchical-placement-differentiating attributes being ones that enable differentiation within a respective hierarchically ordered space with regard to how relatively close or farther apart or trending toward convergence or diverting away from one another or how otherwise correlated within the respective space are the plural users relative to one another and/or are the plural cognition-representing nodes relative to one another and/or are the plural information exchanging forums relative to one another;
wherein the automatically repeated determinings of the spatially-differentiating attributes and/or of the hierarchical-placement-differentiating attributes as related to the plural users are unobtrusive determining processes which respectively do not divert the respective users' attentions toward aiding the respective determining processes for said attributes;
wherein the attributes related to the plural users include at least one of user demographic attributes of the respective users, user reputation attributes of the respective users, user credential attributes of the respective users, user attention focusing attributes of the respective users, user emotional and/or biometric state attributes of the respective users, user body language attributes of the respective users, recent user-surrounding objects of the respective users, recent other persons surrounding the respective users, recent user context cues other than user-surrounding objects of the respective users and user-surrounding other persons proximate to the respective users;
wherein the attributes related to the plural information exchanging forums include at least one of forum population demographic attributes of the respective forums, forum population reputation attributes of the respective forums, forum population credential attributes of the respective forums, forum relative strength of attachment to corresponding ones of the cognition-representing nodes of the respective forums, forum discourse types (e.g., debate versus harmony) of the respective forums;
wherein the attributes related to the plural cognition-representing nodes include at least one of: indicators of closeness by the respective nodes to other ones of the plural cognition-representing nodes, indicators of number and/or types of information exchanging forums attached to the respective cognition-representing nodes, indicators of number and/or types of users associated with and/or currently touching the respective cognition-representing nodes.

84. The method of claim 83 wherein:
the attribute-differentiated spatial spaces include at least one of:
a topic space; and
a co-compatibility scoring space.

85. The method of claim 83 wherein:
the attribute-differentiated hierarchically ordered spaces include a hierarchically ordered topic tree.

86. The method of claim 83 wherein:
the automatically repeated determinings of the spatially-differentiating attributes and/or of the hierarchical-placement-differentiating attributes as related to respective ones of the plural users include determinings of recent attributes of the respective users, where recency of such recent attributes of respective users includes at least one of:

having been true no more than 3 hours prior to said determination of the respective user attribute; and having been true no more than a determined time duration prior to said determination of the user attribute, the determined time duration being determined based on a currently active profile characterizing the respective user.

87. The method of claim 83 wherein:

the automatically repeated determinings of the spatially-differentiating attributes and/or of the hierarchical-placement-differentiating attributes as related to the plural information exchanging forums include determinings of recent attributes of the respective forums, where recency of such recent attributes of respective forums occur at predetermined forum attribute checkpoint times.

88. The method of claim 83 wherein:

the automatically repeated determinings of the spatially-differentiating attributes and/or of the hierarchical-placement-differentiating attributes as related to the plural cognition-representing nodes include determinings of recent attributes of the respective cognition-representing nodes, where recency of such recent attributes of respective cognition-representing nodes occur at predetermined node attribute checkpoint times.

89. The method of claim 1 wherein:

the caused automated and automatically repeated obtaining of respective situational data includes that from a respective one or more proximate sensors where the obtained situational data from at least one of the sensors includes respective time stamp data indicating time of acquisition of the situational data by the at least one of the respective proximate sensors and the at least one of the respective proximate sensors provides:

data identifying current or recent content to which the respective user gave focused attention.

90. The method of claim 89 wherein:

the current or recent giving of focused attention is that which occurred:

within a time period automatically determined in accordance with a currently automatically deemed as active profile of the respective user where the deemed as active profile defines what constitutes recentness based on a respectively determined current situation of the respective user.

91. The method of claim 89 wherein:

the identified current or recent content to which the respective user gave focused attention includes graphic imagery.

92. The method of claim 89 wherein the identified current or recent content to which the respective user gave focused attention includes graphic imagery, said method further comprising:

(d) causing an automatically repeated determining of which, if any, of plural topics within at least one of the respective hierarchical tree of topic nodes and the respective topic space are more likely than not to be associated by the respective user with the graphic imagery which the respective user gave focused attention to;

wherein:

the graphic imagery is electronically provided imagery and the electronic provision of the graphic imagery includes provision of one or more meta-tags;

the graphic imagery is electronically provided imagery and the electronic provision of the graphic imagery includes provision of one or more subject-matter categorizing tags; and said automatically repeated determining of which, if any, of plural topics are more likely than not to be associated includes using one or more of the provided meta-tags and/or subject-matter categorizing tags.

93. The method of claim 1 wherein:

(b) a respective at least one used one of said respective currently active profiles and/or current or recent declarations of the respective users respectively provides for each of the respective users:

(b4a) corresponding data indicative of current or recent preference attributes and/or dislike attributes of the respective user, where the corresponding indicative data is used for the causing of the automated and automatically repeated determining of step (c) where the corresponding indicative data includes at least one of:

an indication of a preference or dislike for a profile-indicated social relation between the respective user and an optionally to be automatically identified and connected-to other of said one or more persons as indicated in an automatically deemed as currently active profile of the respective user;

an indication of a preference or dislike for a profile-indicated age range of an optionally to be automatically identified and connected-to other or others of said one or more persons as indicated in an automatically deemed as currently active profile of the respective user;

an indication of a preference or dislike for a profile-indicated gender of an optionally to be automatically identified and connected-to other or others of said one or more persons as indicated in an automatically deemed as currently active profile of the respective user;

an indication of a preference or dislike for a profile-indicated socioeconomic class of an optionally to be automatically identified and connected-to other or others of said one or more persons as indicated in an automatically deemed as currently active profile of the respective user;

an indication of a preference or dislike for a profile-indicated location or geographic distance of an optionally to be automatically identified and connected-to other or others of said one or more persons as indicated in an automatically deemed as currently active profile of the respective user;

an indication of a preference or dislike for a profile-indicated profession of an optionally to be automatically identified and connected-to other or others of said one or more persons as indicated in an automatically deemed as currently active profile of the respective user;

an indication of a preference or dislike for a profile-indicated religion and/or culture of an optionally to be automatically identified and connected-to other or others of said one or more persons as indicated in an automatically deemed as currently active profile of the respective user;

an indication of a preference or dislike for a profile-indicated political affiliation and/or other group affiliation of an optionally to be automatically identified and connected-to other or others of said one or more persons as indicated in an automatically deemed as currently active profile of the respective user;

an indication of a preference or dislike for a profile-indicated type of forum within which the respective user might interact with one or more of the optionally to be automatically identified and connected-to others of said one or more persons as indicated in an automatically deemed as currently active profile of the respective user;

an indication of a preference or dislike for a profile-indicated one or more of topics, books, movies, URL's, and/or games being favorites of the optionally to be automatically identified and connected-to others of said one or more persons and/or being dominant attributes of a corresponding forum within which the respective user might interact with one or more of the to be automatically identified others of said one or more persons as indicated in an automatically deemed as currently active profile of the respective user;

an indication of a preference or dislike for a profile-indicated and rules-controlled one or more of situational dispositions currently associated with the respective user and/or with one or more of the optionally to be automatically identified and connected-to others of said one or more persons as indicated in an automatically deemed as currently active profile of the respective user; and an indication of a preference or dislike for a profile-indicated one or more of typical in-forum behavioral attributes currently associated with the respective user and/or with one or more of the optionally to be automatically identified and connected-to others of said one or more persons as indicated in an automatically deemed as currently active profile of the respective user.

94. The method of claim 93 wherein:
at least one of said data indicated current or recent preference attributes and/or dislike attributes of the respective user is a graduated one having three or more levels or degrees of the corresponding attribute.

95. The method of claim 93 wherein:
at least one of the used data indicative of current or recent preference attributes and/or dislike attributes of the respective user comes from a profile of the respective user that is automatically deemed to be a currently active profile of the respective user on the basis of automatically determined current surroundings of the respective user.

96. The method of claim 95 wherein:
the automatically determined current surroundings (a1) of the respective user are used as a basis for said automated and automatically repeated determining of which, if any, of the one or more items of dynamically associable and corresponding content are likely or would likely be of interest or not of interest to the respective user at corresponding times and/or places and the used automatically determined current surroundings include at least one of:
an indication that the respective user is at home;
an indication that the respective user is at work;
an indication that the current surroundings of the respective user are other than those of the user being at home or at work;
an indication that the current surroundings of the respective user are those where the respective user is not alone;
an indication that the current surroundings of the respective user are those where the respective user is using a desktop computer;
an indication that the current surroundings of the respective user are those where the respective user is using a mobile data processing device; computer;
an indication that the respective user is within a specific major geographical area or population center;
an indication that the respective user is subject to certain weather conditions; and
an indication that the respective user is near to where an event sponsored by a specific organization is being held or is to be soon held.

97. The method of claim 93 wherein:
at least one of the used data indicative of current or recent preference attributes and/or dislike attributes of the respective user comes from a profile of the respective user that is automatically deemed to be a currently active profile of the respective user on the basis of one or more automatically determined temporal dispositions of the respective user.

98. The method of claim 97 wherein:
the one or more automatically determined temporal dispositions of the respective user that are used as a basis for deeming the profile to be a currently active profile include at least one of:
an indication that the respective user is in a worktime temporal disposition;
an indication that the respective user is in outside of worktime temporal disposition;
an indication that the respective user is in a vacationing temporal disposition;
an indication that the respective user is in a holiday temporal disposition, the holiday being a general public one;
an indication that the respective user is in a holiday temporal disposition, the holiday being a cultural one;
an indication that the respective user is in a celebratory temporal disposition, the celebration being for a personal reason;
an indication that the respective user is in a specific meal time temporal disposition;
an indication that the respective user is in a specific month of the year temporal disposition; and
an indication that the respective user has been subject to a predetermined passage of time since a last determined disposition of the respective user.

99. The method of claim 1 and further comprising:
(d) causing an automated pushing of one or more informational offerings onto the respective users based on the caused automated and automatically repeated obtaining of the respective situational data and the caused automated and automatically repeated using of the organized mapping of plural topics as well as one or more of the respective currently active profiles and/or current or recent votes and/or current or recent declarations and/or planning files and/or history files and/or trending files of the respective users.

100. The method of claim 99 wherein:
the caused automated pushing is a function for each of the respective users of respective subscription levels of the respective users.

101. The method of claim 1 wherein:
the caused automated and automatically repeated determining of which, if any, of one or more items of dynamically associable and corresponding content are likely or would likely be of interest or not of interest to the respective users is based on the automatically repeated using of the organized mapping of plural topics and is a function for each of the respective users of respective subscription levels of the respective users.

102. The method of claim 1 wherein:
the caused automated and automatically repeated determining of which, if any, of one or more items of dynamically associable and corresponding content are likely or would likely be of interest or not of interest to the respective users is based on the automatically repeated using of the organized mapping of plural topics and is a function of at least one of normally-hidden from view codes embedded in content which the respective user is automatically determined to have been recently or currently focusing-upon where the at least one of the normally-hidden from-view codes includes at least one of:
a markup code,
a meta-tag,
a subject-matter categorizing tag,
a podcast embedded code,
a topic-hinting code,
a hierarchy navigation code,
a search-engine assisting code,
an attention-getting code,
a popularity engine tag,
a subject-matter categorizing code,
a hidden comment code, and
a content formatting code.

103. The method of claim 1 wherein said step (a) of causing an automated and automatically repeated obtaining of respective situational data includes automatically repeatedly obtaining situational data based on said respective sensors and/or other situation indicators that are operatively proximate to respective ones of the users of the automated machine system, where the respective proximate sensors and/or other situation indicators include at least those that provide data indicative of respective current surroundings and/or of respective current locations of the respective users.

104. The method of claim 1 wherein said step (a) of causing an automated and automatically repeated obtaining of respective situational data includes automatically repeatedly obtaining situational data based on said respective sensors and/or other situation indicators that are operatively proximate to respective ones of the users of the automated machine system, where the respective proximate sensors and/or other situation indicators include at least those that provide data indicative of respective recent changes of current surroundings and/or of respective recent changes of current locations of the respective users.

105. The method of claim 1 wherein said step (a) of causing an automated and automatically repeated obtaining of respective situational data includes automatically repeatedly obtaining situational data based on said respective sensors and/or other situation indicators that are operatively proximate to respective ones of the users of the automated machine system, where the respective proximate sensors and/or other situation indicators include at least those that provide data indicative of respective current or recent one or more machine usage activities and/or one or more machine usage states of the respective users.

106. The method of claim 1 wherein said step (b) includes causing an automated and automatically repeated using of one or more of the respective profiles of the respective users, where the used one or more of respective profiles are at the time of using respectively deemed as currently active profiles of the respective users and respectively provide at least:
(b1) data indicative of currently active demographic attributes of the respective users.

107. The method of claim 1 wherein said step (b) includes causing an automated and automatically repeated using of one or more of the respective profiles of the respective users, where the used one or more of respective profiles are at the time of using respectively deemed as currently active profiles of the respective users and respectively provide at least:
(b3) data indicative of current or recent credential attributes of the respective users.

108. The method of claim 1 wherein said step (b) includes causing an automated and automatically repeated using of one or more of the respective profiles of the respective users, where the used one or more of respective profiles are at the time of using respectively deemed as currently active profiles of the respective users and respectively provide at least:
(b4) data indicative of current or recent preference attributes and/or dislike attributes of the respective users.

109. The method of claim 1 wherein said step (b) includes causing an automated and automatically repeated using of one or more of the respective profiles of the respective users, where the used one or more of respective profiles respectively are at the time of using respectively deemed as currently active profiles of the respective users and provide at least:
(b5) data indicative of current or recent favorites of the respective users or of other users with whom the respective users would prefer to connect, said favorites being general favorites as among at least one of topics, domains, books, movies, URL's/web pages, games, TV shows, music, foods, the general favorites being distinguishable from currently focused upon counterparts in that the general favorites need not relate to content currently focused upon by the respective users or said other users.

110. The method of claim 1 wherein said step (b) includes causing an automated and automatically repeated using of one or more of the respective profiles of the respective users, where the used one or more of respective profiles are at the time of using respectively deemed as currently active profiles of the respective users and respectively provide at least:
(b6) data indicative of current or recent topic trends of the respective users, the topic trends being derived from current or recent touchings by the respective users on topic nodes within the respective hierarchical tree of topic nodes or the respective topic space.

111. The method of claim 1 wherein said step (b) includes causing an automated and automatically repeated using of one or more of the respective profiles of the respective users, where the used one or more of respective profiles are at the time of using respectively deemed as currently active profiles of the respective users and respectively provide at least:
(b7) data indicative of current or recent keyword histories of the respective users.

112. The method of claim 1 wherein said step (b) includes causing an automated and automatically repeated using of one or more of the respective profiles of the respective users, where the used one or more of respective profiles are at the time of using respectively deemed as currently active profiles of the respective users and respectively provide at least:

(b8) data indicative of current or recent URL histories of the respective users.

113. The method of claim 1 wherein said step (b) includes causing an automated and automatically repeated using of one or more of the respective profiles of the respective users, where the used one or more of respective profiles are at the time of using respectively deemed as currently active profiles of the respective users and respectively provide at least:
(b9) data indicative of current or recent machine usage histories of the respective users.

114. The method of claim 1 wherein said step (b) includes causing an automated and automatically repeated using of one or more of the respective profiles of the respective users, where the used one or more of respective profiles are at the time of using respectively deemed as currently active profiles of the respective users and respectively provide at least:
(b10) data indicative of current or recent physical locations-visited histories of the respective users.

115. The method of claim 1 wherein said step (b) includes causing an automated and automatically repeated using of one or more of the respective profiles of the respective users, where the used one or more of respective profiles are at the time of using respectively deemed as currently active profiles of the respective users and respectively provide at least:
(b11) data indicative of current or recent virtual forums-visited histories of the respective users.

116. The method of claim 1 wherein said step (b) includes causing an automated and automatically repeated using of one or more of the respective profiles of the respective users, where the used one or more of respective profiles are at the time of using respectively deemed as currently active profiles of the respective users and respectively provide at least:
(b12) data indicative of current or recent topic nodes touched-on histories of the respective users.

117. The method of claim 1 wherein at least a portion of the automatically repeatedly determined one or more items of dynamically associable and corresponding content is presented to the associated one or more persons on a pushed basis.

118. The method of claim 117 and further comprising:
(d) providing for an automated collecting of explicit votes from the associated one or more persons respecting the at least a portion of the automatically repeatedly determined one or more items of dynamically associable and corresponding content if the at least a portion of the corresponding content is presented to the associated one or more persons.

119. The method of claim 117 and further comprising:
(d) causing an automated collecting of implicit votes from the associated one or more persons respecting the at least a portion of the automatically repeatedly determined one or more items of dynamically associable and corresponding content if the at least a portion of the corresponding content is presented to the associated one or more persons.

120. The method of claim 1 and further comprising:
(d) presenting to the associated one or more persons on a pulled basis at least a portion of the automatically repeatedly determined one or more items of dynamically associable and corresponding content in response to the associated one or more persons accepting an invitation or suggestion automatically generated by the machine system to link to the at least a portion of the corresponding content.

121. The method of claim 120 and further comprising:
(e) providing for an automated collecting of explicit votes from the associated one or more persons respecting the at least a portion of the automatically repeatedly determined one or more items of dynamically associable and corresponding content if the at least a portion of the corresponding content is presented to the associated one or more persons.

122. The method of claim 120 and further comprising:
(e) causing an automated collecting of implicit votes from the associated one or more persons respecting the at least a portion of the automatically repeatedly determined one or more items of dynamically associable and corresponding content if the at least a portion of the corresponding content is presented to the associated one or more persons.

123. The method of claim 1 and further comprising:
(d) providing for an automated collecting of explicit votes from the associated one or more persons respecting content presented to the associated one or more persons.

124. The method of claim 123 wherein the collected explicit votes include at least one of:
a positive vote respecting the presented content;
a negative vote respecting the presented content;
a vote having an indication of a current change of vote with respect to the presented content;
a vote having an indication of an intensity of vote with respect to the presented content;
a vote respecting a reputation of another of the associated one or more persons;
a vote respecting a credential of another of the associated one or more persons;
a vote respecting a domain or topic proficiency of another of the associated one or more persons;
a vote indicating disagreement with another of the associated one or more persons;
a vote indicating displeasure with another of the associated one or more persons;
a vote indicating pleasure with respect to another of the associated one or more persons;
a vote indicating pleasure or displeasure with respect to a contribution provided by another of the associated one or more persons;
a vote indicating preference for a smaller information exchange forum;
a vote indicating an objection to another user's behavior;
a vote indicating that another user is overly argumentative;
a vote with respect to a pending proposal within an information exchange forum; and
a vote indicating a number within a predefined range of numbers.

125. The method of claim 1 and further comprising:
(d) providing for an automated collecting of explicit declarations from the associated one or more persons respecting at least a portion of the automatically repeatedly determined one or more items of dynamically associable and corresponding content when that content is presented to the associated one or more persons wherein the collected explicit declarations include an indication of at least one of:
a current emotional state of the person;
a current physiological state of the person;
a current mood of the person;
a current change of mood of the person;
a current topic of focus of the person; and
a current surrounding of the person while the content is being presented.

126. The method of claim 1 wherein said data providing hints or clues for identifying specific cognition nodes relevant to a current or recent state of mind of the respective user is provided and includes at least one of:
- (a12a) data indicative of a communications channel from which currently or recently focused upon content was obtained;
- (a12b) data indicative of a storage location from which currently or recently focused upon content was obtained;
- (a12c) data indicative of a unique content providing resource from which currently or recently focused upon content was obtained;
- (a12d) data indicative of a pointer pointing to a unique source from which currently or recently focused upon content was obtained;
- (a12e) data indicative of a specific frame within a content providing resource, where the specific frame contains content currently or recently focused upon by the respective user;
- (a12f) a snapshot of specific content currently or recently focused upon by the respective user;
- (a12g) data indicative of a level of intensity of focus given by the respective user to specific content currently or recently focused upon by the respective user;
- (a12h) data indicative of a specific online forum associated with content currently or recently focused upon by the respective user;
- (a12i) markup language data following a markup language field start indicator;
- (a12j) markup language data preceding a markup language field end indicator;
- (a12k) ancillary digital data accompanying analog content currently or recently focused upon by the respective user;
- (a12L) content that currently or recently has been highlighted and/or copied by the respective user;
- (a12m) data indicative of a plurality of online forums that the respective user has recently been involved with;
- (a12n) data indicative of durations of involvement with a plurality of online forums that the respective user has recently been involved with;
- (a12o) data indicative of how many times the respective user has recently focused on a same piece of content;
- (a12p) hints or clues extracted from a currently active profile of the respective user for narrowing in on specific cognition nodes;
- (a12q) profile data of the respective user representing weighted pointers to different ones of specific cognition nodes;
- (a12r) data representing variable scores given to different ones of candidate cognition nodes based on knowledge base rules provided in one or more currently active profiles of the respective user;
- (a12s) data representing subject-matter categorizing tags for associated content currently or recently focused upon by the respective user;
- (a12t) data obtained from subject-matter categorizing databases of respective entities providing subject-matter categorizing tags for associated content currently or recently focused upon by the respective user; and
- (a12u) data obtained from one or more pressing, to-do files of the respective user and hinting at or explicitly defining one or more topics to be covered by a corresponding to-do activity.

127. The method of claim 126 wherein currently or recently focused upon content excludes content that was focused on by the respective user for less than a profile specified minimal focus persistence time.

128. The method of claim 126 wherein said automated and automatically repeated obtaining of respective situational data includes the situational data providing hints or clues for identifying specific cognition nodes and the hints or clues obtained for identifying the specific cognition nodes extend over a profile specified stretch of time.

129. The method of claim 1 wherein the caused automated and automatically repeated determining of which, if any, of one or more items of dynamically associable and corresponding content are likely or would likely be of interest or not of interest to the respective users at corresponding times and/or places is based on one or more currently active knowledge base rules (KBR's) of the respective user and at least one of the currently active KBR's specifies at least one of:
- (c1) weight to be attributed to one or more cognition likelihood hints based on the one or more cognition likelihood hints being part of a rule-satisfying sequence and/or combination of such hints;
- (c2) weight to be attributed to one or more automatically accessed content resources of the respective user;
- (c3) identification of two or more cognition likelihood hints that are to be automatically considered in combination;
- (c4) identification of one or more cognition domains that are to be included or excluded when determining candidate cognition nodes that are to be scored for likelihood of corresponding with currently or recently received cognition likelihood hints;
- (c5) weight to be attributed to one or more cognition likelihood hints based on temporal disposition of the respective user;
- (c6) weight to be attributed to one or more cognition likelihood hints based on combination of temporal and spatial dispositions of the respective user;
- (c7) weight to be attributed to one or more profile entries of the respective user;
- (c8) weight to be attributed to one or more candidate resource suggestions or recommendations that are potentially to be provided to the respective user;
- (c9) duration over which a resource suggestion or recommendation is to be provided to the respective user;
- (c10) co-compatibility criteria for one or more candidate forum suggestions or recommendations that are potentially to be provided to the respective user; and
- (c11) which items of content are to be considered as substantially similar to one another even though they are different.

130. The method of claim 1 wherein:
the used elements of part (a) include at least the (a15) data indicative of a current or recent declaration made by the respective user and at least the (a1) data indicative of a current or recent one or more surroundings of the respective user; and
the used elements of part (b) include at least the (b19) data indicative of currently or recently made declarations by the respective user regarding the respective user's emotional state and at least the (b1) data indicative of current or recent demographic attributes of the respective user.

131. The method of claim 1 wherein:
the used elements of part (a) include at least the (a14) data indicative of a current or recent vote cast implicitly or explicitly by the respective user and at least the (a1)

data indicative of a current or recent one or more surroundings of the respective user; and the used elements of part (b) include at least the (b18) data indicative of currently or recently cast votes of the respective user and at least the (b1) data indicative of current or recent demographic attributes of the respective user.

132. The method of claim 1 wherein:

the used elements of part (a) include at least the (a11) data indicative of a current or recent one or more emotional states of the respective user and at least the (a1) data indicative of a current or recent one or more surroundings of the respective user; and the used elements of part (b) include at least the (b3) data indicative of current or recent credential attributes of the respective user and at least the (b6) data indicative of current or recent topic trends of the respective user.

133. The method of claim 1 wherein:

the used elements of part (a) include at least the (a3) data indicative of a current or recent one or more changes of biometric attributes of the respective user and at least the (a1) data indicative of a current or recent one or more changes of surrounding of the respective user; and the used elements of part (b) include at least the (b13) data indicative of current or recent personal expression attributes of the respective user and at least the (b12) data indicative of current or recent topics touched-on histories of the respective user.

134. The method of claim 1 wherein:

the used elements of part (a) do not include use of the planning files and/or history files and/or trending files of the respective users;

the used elements of part (b) do not include use of the planning files and/or history files and/or trending files of the respective users; and the used elements of part (c) do not include use of the planning files and/or history files and/or trending files of the respective users.

135. The method of claim 1 and further comprising:

using at least one of current or recently cast explicit votes of the respective user and current or recently made explicit declarations of the respective user to adaptively improve automated inferencing carried out by the machine system for determining the respective user's likely current state.

136. A machine-implemented method of automatically identifying one or more informational resources that respectively are currently likely to be of interest or not of interest, or would in the future likely be of interest or not of interest to a respective one or more users of an automated machine system, each at a respective time and/or a respective place of the respective user based on a corresponding one or more of determined situations and/or identified profiles and/or votes and/or declarations and/or planning files and/or history files and/or trending files of the respective users, which determined situations and/or identified profiles and/or votes and/or declarations and/or planning files and/or history files and/or trending files correspond to information automatically repeatedly obtained from or about the respective users, the method comprising:

(a) causing an automated and automatically repeated obtaining of respective situational data from respective sensors and/or other situation indicators that are operatively proximate to or associated with respective ones of the users of the automated machine system, wherein utilized ones of the respective proximate sensors and/or other situation indicators that are operatively proximate to or associated with the respective ones of the users respectively provide at least one of:

(a1) data indicative of a current or recent one or more surroundings of and/or indicative of a current or recent one or more locations of and/or of a current or recent one or more temporal dispositions of and/or one or more availabilities of and/or of a current or recent one or more changes of surrounding of, and/or current or recent changes of location of the respective user;

(a2) data indicative of a current or recent mood of or of a current or recent one or more changes of mood of the respective user;

(a3) data indicative of a current or recent one or more biometric attributes of, and/or of a current or recent one or more changes of biometric attributes of the respective user;

(a4) data indicative of a current or recent one or more machine usage activities of and/or one or more machine usage states of the respective user;

(a5) data indicative of a current or recent mental state of, and/or of one or more current or recent changes of a mental state of the first user;

(a7) data indicative of a current or recent one or more body postures and/or biomechanical states of, and/or of a current or recent one or more changes of body posture and/or biomechanical state of the respective user;

(a8) data indicative of a current or recent one or more biochemical states of, and/or of a current or recent one or more changes of biochemical state of the respective user;

(a9) data indicative of a current or recent one or more physiological states of the respective user;

(a10) data indicative of a current or recent one or more frames or states of mind of, and/or of a current or recent one or more changes of frame or state of mind of the respective user;

(a11) data indicative of a current or recent one or more emotional states of, and/or of a current or recent one or more changes of emotional state of the respective user; and (a12) data indicative of a current or recent or expected in future one or more dislikes or negative votings of the respective users;

(b) causing an automated and automatically repeated using of one or more of respective and currently active profiles and/or current or recent votes and/or current or recent declarations and/or current planning files and/or current or recent history files and/or current or recent trending files of the respective users, where the used one or more of respective and currently active profiles and/or current or recent votes and/or current or recent declarations and/or current planning files and/or current or recent history files and/or current or recent trending files of the respective users respectively provide at least one of:

(b1) data indicative of current or recent demographic attributes of the respective user;

(b2) data indicative of current or recent reputation attributes of the respective user;

(b3) data indicative of current or recent credential attributes of the respective user;

(b4) data indicative of current or recent preference attributes and/or dislike attributes of the respective user;

(b5) data indicative of current or recent favorites attributes of the respective user;

(b6) data indicative of current or recent topic trends of the respective user;

(b7) data indicative of current or recent keyword histories of the respective user;

(b8) data indicative of current or recent URL histories of the respective user;

(b9) data indicative of current or recent machine usage histories of the respective user;

(b10) data indicative of current or recent physical locations-visited histories of the respective user;

(b11) data indicative of current or recent virtual forums-visited histories of the respective user;

(b12) data indicative of current or recent topics touched-on histories of the respective user;

(b13) data indicative of current or recent personal expression attributes of the respective user;

(b14) data indicative of current calendared events of the respective user;

(b15) data indicative of current to-do tasks and/or priorities thereof for the respective user;

(b16) data indicative of current persons-to-contact tasks of the respective user; and (b17) data indicative of currently open or closed availability time slots of the respective user; and (c) causing an automated and automatically repeated identifying of which, if any, of one or more of informational resources are currently likely be of interest or not of interest or would likely be of interest or not of interest to the respective users at corresponding times and/or places based on the caused automated and automatically repeated obtaining of the respective situational data and based on the caused automated and automatically repeated using of at least one of the one or more of the respective and currently active profiles and further based on the caused automated and automatically repeated using of one or more of the current or recent votes and/or current or recent declarations and/or current planning files and/or current or recent history files and/or current or recent trending files of the respective users, where the used one or more of respective and currently active profiles of the respective users includes at least one currently active one of:

(c1) a personal emotion expression profile (PEEP) of the respective user;

(c2) a personhood defining profile of the respective user; and (c3) a domain specific preferences profile of the respective user;

wherein a time duration deemed to be recent rather than current is at least one of:

not more than 3 hours before hand;

not more than 10 minutes before hand; and a latest time duration determined by a currently active profile of the user as being a recent one.

137. The method of claim 136 wherein:

the respective users of the machine system are ones who can be subsequently identified as automatically identified persons for whom the corresponding one or more of the identified informational resources are at the subsequent time currently likely to be of current interest.

138. The method of claim 136 wherein:

the one or more of informational resources that can be automatically identified to be currently likely of interest or would likely be of interest to the respective users include at least one of:

popular and for-topic URL's and/or other resource access identifiers;

expert-favored and for-topic URL's and/or other resource access identifiers;

popular and for-topic keywords;

expert-favored and for-topic keywords;

popular and for-topic meta-tags;

popular and for-topic subject-matter categorizing tags; and expert-favored and for-topic meta-tags;

where the identifying of the likely to be of interest informational resources is based on automatically and repeatedly obtained, for-node and ranked hinting information, where said for-node and ranked hinting information is that associated with automatically repeatedly obtained ones of current and/or recent focus indicators of respective users that are currently or were recently logically linked by the machine system to a corresponding node among a plurality of nodes maintained by the machine system as part of a stored and organized mapping of cognition-representing nodes, where the mapped nodes are hierarchically mapped to correspond to respective cognition-representations of respective coarse and more finely resolved natures; and where said for-node and ranked hinting information is pre-ranked in accordance with at least one of the following ranking criteria:

more popular among lay users;

more preferred by credentialed experts; and more preferred by users having relatively high reputation scores at least for the node that the corresponding hinting information is for.

139. The method of claim 138 wherein:

the for-node and ranked hinting information is sorted in accordance with ranking scores given in respective categories of hinting information.

140. The method of claim 139 and further comprising:

causing pre-sorted ones of ranked and additionally sorted hinting information items to be presented to one or more of the respective users.

141. The method of claim 138 and further comprising:

causing one or more of the ranked hinting information items to be presented to one or more of the respective users.

142. The method of claim 136 wherein:

the automated and automatically repeated identifying of which, if any, of one or more of informational resources are currently likely of interest or not of interest or would likely be of interest or not to one or more of the respective users at corresponding times and/or places includes at least one of:

(c1) automatically determining, based on a hierarchy of special activity topic nodes, a recommended special activity based on the caused automated and automatically repeated obtaining of the respective situational data and the caused automated and automatically repeated using of the one or more of the respective profiles and/or votes and/or declarations and/or planning files and/or history files and/or trending files of the one or more respective users; and (c2) using priority data obtained from a currently deemed as active planning file of the respective user.

143. The method of claim 142 wherein:
the recommended special activity is included within at least one of a hierarchal subset of special activity topic nodes that includes a node with a form of:
(c1a) What is recommended as an activity IF My (the respective user's) Location is a current or specified location;
(c1b) What is recommended as an activity IF My (the respective user's)
Surrounding Weather Condition is a current or specified weather condition;
(c1c) What is recommended as an activity IF My (the respective user's) Time-based Context is a current or specified time-based context;
(c1d) What is recommended as an activity IF an Organization I (the respective user) Currently Belong to is a profile-determined or otherwise specified organization;
(c1e) What is recommended as a sports and/or other non-virtual activity IF My (the respective user's) situational disposition is a profile-determined or otherwise specified disposition; and
(c1f) What is recommended as an activity IF an Organization I (the respective user) Currently Belong to is a profile-determined or otherwise specified organization AND My (the respective user's) Location is a current or specified location.

144. The method of claim 136 and further comprising: causing an automated hiding from one or more of the respective users of corresponding informational resources that are identified based on said caused automated obtaining of the respective situational data and/or based on said caused automated using of the one or more of the respective profiles and/or votes and/or declarations and/or planning files and/or history files and/or trending files of the respective users, to be likely currently or recently disliked by the one or more of the respective users and/or to be likely currently or recently of least interest to the one or more of the respective users.

145. The method of claim 136 wherein corresponding content from an identified informational resource is presented on a pushed basis to the associated one or more persons based on the automatically repeatedly identifying of which, if any, of the one or more informational resources are currently likely or would likely be of interest or not to the associated one or more persons.

146. The method of claim 145 and further comprising:
(d) providing for automated collecting of explicit votes from the associated one or more persons respecting the content from the identified one or more informational resources when the corresponding content is presented to the associated one or more persons.

147. The method of claim 145 and further comprising:
(d) causing an automated collecting of implicit votes from the associated one or more persons respecting the corresponding content from the identified one or more informational resources when the corresponding content is presented to the associated one or more persons.

148. The method of claim 136 wherein corresponding content from the identified one or more informational resources is presented to the associated one or more persons on a pulled basis in response to the associated one or more persons accepting an invitation or suggestion to link to the corresponding content.

149. The method of claim 148 and further comprising:
(d) providing for automated collecting of explicit votes from the associated one or more persons respecting the content from the identified one or more informational resources if the corresponding content is presented to the associated one or more persons.

150. The method of claim 148 and further comprising:
(d) causing an automated collecting of implicit votes from the associated one or more persons respecting the corresponding content from the identified one or more informational resources if the corresponding content is presented to the associated one or more persons.

151. The method of claim 136 and further comprising:
(d) providing for an automated collecting of explicit votes from the associated one or more persons respecting content presented to the associated one or more persons.

152. The method of claim 151 wherein the collected explicit votes include at least one of:
a positive vote respecting the presented content;
a negative vote respecting the presented content;
a vote having an indication of a current change of vote with respect to the presented content;
a vote having an indication of an intensity of vote with respect to the presented content;
a vote respecting a reputation of another of the associated one or more persons;
a vote respecting a credential of another of the associated one or more persons;
a vote respecting a domain or topic proficiency of another of the associated one or more persons;
a vote indicating disagreement with another of the associated one or more persons;
a vote indicating displeasure with another of the associated one or more persons;
a vote indicating pleasure with respect to another of the associated one or more persons;
a vote indicating pleasure or displeasure with respect to a contribution provided by another of the associated one or more persons;
a vote indicating preference for a smaller information exchange forum;
a vote indicating an objection to another user's behavior;
a vote indicating that another user is overly argumentative;
a vote with respect to a pending proposal within an information exchange forum; and
a vote indicating a number within a predefined range of numbers.

153. The method of claim 136 and further comprising:
(d) providing for an automated collecting of explicit declarations from the associated one or more persons respecting content presented to the associated one or more persons wherein the collected explicit declarations include an indication of at least one of:
a current emotional state of the person;
a current physiological state of the person;
a current mood of the person;
a current change of mood of the person;
a current topic of focus of the person; and
a current surrounding of the person while the content is being presented.

154. The method of claim 136 wherein said step (a) of causing an automated and automatically repeated obtaining of respective situational data is based on obtaining data from respective sensors and/or other situation indicators that are proximate to respective ones of the users of the automated machine system, wherein the respective proximate sensors and/or other situation indicators that are proximate to the respective ones of the users respectively provide at least:

(a1a) data indicative of respective current surroundings and/or of respective current locations of the respective users.

155. The method of claim 136 wherein said step (a) of causing an automated and automatically repeated obtaining of respective situational data is based on obtaining data from respective sensors and/or other situation indicators that are proximate to respective ones of the users of the automated machine system, wherein the respective proximate sensors and/or other situation indicators that are proximate to the respective ones of the users respectively provide at least:

(a1b) data indicative of respective recent changes of current surroundings and/or of respective recent changes of current locations of the respective users.

156. The method of claim 136 wherein said step (a) of causing an automated and automatically repeated obtaining of respective situational data is based on obtaining data from respective sensors and/or other situation indicators that are proximate to respective ones of the users of the automated machine system, wherein the respective proximate sensors and/or other situation indicators that are proximate to the respective ones of the users respectively provide at least:

(a4) data indicative of a current or recent one or more machine usage activities and/or one or more machine usage states of the respective users.

157. The method of claim 136 wherein said step (a) of causing an automated and automatically repeated obtaining of respective situational data is based on obtaining data from respective sensors and/or other situation indicators that are proximate to respective ones of the users of the automated machine system, wherein the respective proximate sensors and/or other situation indicators that are proximate to the respective ones of the users respectively provide at least:

(a12a) data indicative of a current or recent one or more dislikes or negative votings of the respective users.

158. The method of claim 136 wherein said step (b) of causing an automated and automatically repeated using includes causing an automated using of one or more of the respective profiles of the respective users, where the used one or more of respective profiles are at the time of using respectively deemed as currently active profiles of the respective users and respectively provide at least:

(b1) data indicative of current demographic attributes of the respective users.

159. The method of claim 136 wherein said step (b) of causing an automated and automatically repeated using includes causing an automated using of one or more of the respective profiles of the respective users, where the used one or more of respective profiles are at the time of using respectively deemed as currently active profiles of the respective users and respectively provide at least:

(b4) data indicative of current or recent preference attributes and/or dislike attributes of the respective users.

160. The method of claim 136 wherein said step (b) of causing an automated and automatically repeated using includes causing an automated using of one or more of the respective profiles of the respective users, where the used one or more of respective profiles are at the time of using respectively deemed as currently active profiles of the respective users and respectively provide at least:

(b5) data indicative of current or recent favorites of the respective users, said favorites being general favorites as among at least one of topics, domains, books, movies, URL's/web pages, games, TV shows, music, foods, the general favorites being distinguishable from currently focused upon counterparts in that the general favorites need not relate to content currently focused upon by the respective users.

161. The method of claim 136 wherein said step (b) of causing an automated and automatically repeated using includes causing an automated using of one or more of the respective profiles of the respective users, where the used one or more of respective profiles are at the time of using respectively deemed as currently active profiles of the respective users and respectively provide at least:

(b6) data indicative of current or recent topic trends of the respective users.

162. The method of claim 136 wherein said step (b) of causing an automated and automatically repeated using includes causing an automated using of one or more of the respective profiles of the respective users, where the used one or more of respective profiles are at the time of using respectively deemed as currently active profiles of the respective users and respectively provide at least:

(b7) data indicative of current or recent keyword histories of the respective users.

163. The method of claim 136 wherein said step (b) of causing an automated and automatically repeated using includes causing an automated using of one or more of the respective profiles of the respective users, where the used one or more of respective profiles are at the time of using respectively deemed as currently active profiles of the respective users and respectively provide at least:

(b8) data indicative of current or recent URL histories of the respective users.

164. The method of claim 136 wherein said step (b) of causing an automated and automatically repeated using includes causing an automated using of one or more of the respective profiles of the respective users, where the used one or more of respective profiles are at the time of using respectively deemed as currently active profiles of the respective users and respectively provide at least:

(b9) data indicative of current or recent machine usage histories of the respective users.

165. The method of claim 136 wherein said step (b) of causing an automated and automatically repeated using includes causing an automated using of one or more of the respective profiles of the respective users, where the used one or more of respective profiles are at the time of using respectively deemed as currently active profiles of the respective users and respectively provide at least:

(b10) data indicative of current or recent physical locations-visited histories of the respective users.

166. The method of claim 136 wherein said step (b) of causing an automated and automatically repeated using includes causing an automated using of one or more of the respective profiles of the respective users, where the used one or more of respective profiles are at the time of using respectively deemed as currently active profiles of the respective users and respectively provide at least:

(b11) data indicative of current or recent virtual forums-visited histories of the respective users.

167. The method of claim 136 wherein said step (b) of causing an automated and automatically repeated using includes causing an automated using of one or more of the respective profiles of the respective users, where the used one or more of respective profiles are at the time of using respectively deemed as currently active profiles of the respective users and respectively provide at least:

(b12) data indicative of current or recent topics touched-on histories of the respective users.

168. The method of claim 136 wherein the identified one or more informational resources include at least one of:
   summary data about an information exchange forum;
   summary data about material other than an information exchange forum;
   a current name of a corresponding topic node;
   a name of an information exchange forum;
   a summary description of a topic of an information exchange forum; and
   a summary about a moderator or lead contributors of an information exchange forum.

169. The method of claim 136 wherein the identified one or more informational resources include data needed by the respective one or more users for them to enter a corresponding information exchange forum.

170. The method of claim 136 wherein the identified one or more informational resources include an indication of whether a corresponding information exchange forum is a new forum currently being created and if so a number of other users expected to join.

171. The method of claim 136 wherein the identified one or more informational resources that respectively are currently likely to, or would in the future likely be of interest to a respective one or more users are presented in an ordered sequence based on at least one of:
   how close within a topic nodes mapping space, information in each of the identified one or more informational resources is to a current topic of focus of the user as also resolved within the topic nodes mapping space;
   how old is the identification of the identified one or more informational resources relative to time of presentation; and
   how quickly relative to time of presentation, acceptance is needed to an invitation or suggestion related to the identified one or more informational resources.

172. The method of claim 136 wherein the identified one or more informational resources that respectively are currently likely to, or would in the future likely be of interest to a respective one or more users include information exchange forums whose identifications by said automated and automatically repeated identifying step are scored based on at least one of:
   demographics of others of the one or more users who are participating in or are to be invited to participate in the respective information exchange forums;
   reputations of others of the one or more users who are participating in or are to be invited to participate in the respective information exchange forums;
   credentials of others of the one or more users who are participating in or are to be invited to participate in the respective information exchange forums;
   favorites of others of the one or more users who are participating in or are to be invited to participate in the respective information exchange forums;
   names of others of the one or more users who are participating in or are to be invited to participate in the respective information exchange forums; and
   forum properties of the respective information exchange forums.

173. The method of claim 172 wherein the scoring based on names includes at least one of:
   scoring positively if names of others of the one or more users are listed in a desired names list of the user to whom the identification of the respective information exchange forum is to be provided;
   scoring negatively if names of others of the one or more users are listed in an undesired names list of the user to whom the identification of the respective information exchange forum is to be provided; and
   scoring according to rules of a knowledge base associated with the user to whom the identification of the respective information exchange forum is to be provided.

174. The method of claim 172 wherein the scoring based on names of others of the one or more users is a function of at least one of:
   the user's current mood;
   the user's current surroundings;
   the user's current topic of focus;
   the user's current chronological placement in a calendar; and
   the user's current surroundings.

175. The method of claim 172 wherein the scoring based on a respective one or more of demographics, reputations, credentials, favorites and forum properties is a function of at least one of the user's current mood;
   the user's current surroundings;
   the user's current topic of focus;
   the user's current chronological placement in a calendar;
   the user's current surroundings.

176. The method of claim 172 wherein the scoring based on demographics includes scoring based on at least one of:
   desired ages of other users in an identified information exchange forum;
   undesired ages of other users in an identified information exchange forum;
   desired gender of other users in an identified information exchange forum;
   undesired gender of other users in an identified information exchange forum;
   desired mix of ages and/or genders in an identified information exchange forum;
   desired socioeconomic class of other users in an identified information exchange forum;
   undesired socioeconomic class of other users in an identified information exchange forum;
   desired educational levels of other users in an identified information exchange forum;
   undesired educational levels class of other users in an identified information exchange forum;
   desired religions of other users in an identified information exchange forum;
   undesired religions of other users in an identified information exchange forum;
   desired cultures of other users in an identified information exchange forum and/or desired stereotypical idiosyncrasies of those cultures;
   undesired cultures of other users in an identified information exchange forum and/or undesired stereotypical idiosyncrasies of those cultures;
   desired geographic locations of other users in an identified information exchange forum;
   undesired geographic locations of other users in an identified information exchange forum;
   desired time zones of other users in an identified information exchange forum;
   undesired time zones of other users in an identified information exchange forum;
   desired language preferences of other users in an identified information exchange forum;
   undesired language preferences of other users in an identified information exchange forum;
   desired political affiliations of other users in an identified information exchange forum;

undesired political affiliations of other users in an identified information exchange forum;
desired favorite topics of other users in an identified information exchange forum;
undesired favorite topics of other users in an identified information exchange forum;
desired favorite cognitive domains of other users in an identified information exchange forum;
undesired favorite cognitive domains of other users in an identified information exchange forum;
desired favorite books of other users in an identified information exchange forum;
undesired favorite books of other users in an identified information exchange forum;
desired favorite movies of other users in an identified information exchange forum;
undesired favorite movies of other users in an identified information exchange forum;
desired favorite games of other users in an identified information exchange forum;
undesired favorite games of other users in an identified information exchange forum;
desired favorite URL's of other users in an identified information exchange forum;
undesired favorite URL's of other users in an identified information exchange forum;
desired most-visited URL's of other users in an identified information exchange forum;
undesired most-visited URL's of other users in an identified information exchange forum;
desired favorite web pages of other users in an identified information exchange forum;
undesired favorite web pages of other users in an identified information exchange forum;
desired favorite TV shows of other users in an identified information exchange forum;
undesired favorite TV shows of other users in an identified information exchange forum;
desired favorite music of other users in an identified information exchange forum;
undesired favorite music of other users in an identified information exchange forum;
desired favorite foods of other users in an identified information exchange forum;
undesired favorite foods of other users in an identified information exchange forum; and
demographics based scoring rules in a currently active set of knowledge base rules of the user.

177. The method of claim 172 wherein the scoring based on user histories includes scoring based on at least one of:
history of recently visited web pages;
history of recent search activities;
history of recent activities within information exchange forums;
history of metadata within recently focused on content;
history of topic nodes recently touched on;
history of cognitive domains recently focused on;
history of recently collected Current Focus identifying records (CFi's);
historical trends for topic nodes recently touched on and/or cognitive domains recently focused on;
history of recent edits made to presented content;
history of user requests for entry into respective information exchange forums; and
history of user voting tendencies.

178. The method of claim 172 wherein the scoring based on reputations includes scoring based on at least one of:
proficiency in topic votes given to respective users by other users;
argumentative tendencies as determined by votes given to respective users by other users;
fact-based view point tendencies as determined by votes given to respective users by other users; and
tendency for troll like behavior as determined by votes given to respective users by other users.

179. The method of claim 136 wherein the identified one or more informational resources that respectively are currently likely to, or would in the future likely be of interest to a respective one or more users include targeted advertisements whose identifications are scored based on at least one of:
recently collected Current Focus identifying records (CFi's) of respective users;
history of recent user voting activities of respective users;
determined content of current focus of respective users;
determined current topics of focus of respective users;
determined current moods of respective users;
determined reputations of respective users;
recently collected positive and/or negative votes for contributions of respective users;
invitation acceptance, rejection and/or ignoring activities of respective users; and
trending information respecting growing and/or shrinking popularities of respective information exchange forums and/or topic nodes.

180. The method of claim 136 wherein at least one of the identifications of the one or more informational resources that are automatically repeatedly and respectively identified as being currently likely to, or would in the future likely be of interest to a respective one or more users are presented to the respective users in the form of at least one of:
an invitation, recommendation or suggestion that includes a title related to a determined current emotional state of the user;
an invitation, recommendation or suggestion that includes a name of a corresponding domain and/or topic;
an invitation, recommendation or suggestion that is color coded and/or textured in accordance with a corresponding domain or topic;
an invitation, recommendation or suggestion that is color coded and/or textured and/or shaped in accordance with a determined urgency of the invitation, recommendation or suggestion;
an invitation, recommendation or suggestion that is operable to identify content currently presented to the respective user and constituting part of a basis on which the invitation, recommendation or suggestion has been generated;
an invitation, recommendation or suggestion that provides one or more items of information present in a corresponding invitation/recommendation record, said one or more items including: utilized keywords, utilized meta-tags, utilized subject-matter categorizing tags, domain/topic node names, node descriptions, a name of a corresponding information exchange forum, a description assigned by members of the corresponding information exchange forum to that forum, associated interest domain and topic coefficients, user co-compatibility coefficients, and current forum participants mix.

181. A machine-implemented method of automatically reducing or preventing informational clutter in an information presenting area controlled by corresponding code executing within a machine system, the machine-implemented method comprising:

(a) causing an automatically repeated automatic determining of a current or recent situational disposition of a user of the machine system;
(b) based on a most recent one or more of the automatically repeated automatic determinings of user situational disposition, causing an automatic determining of currently active dislikes or undesirabilities of the user;
(c) causing a generating of respective ranking scores for respective ones of informational items that are candidates for presentation within the controlled information presenting area, the caused generating of the respective ranking scores including a reducing of rankings of those of the candidates which correlate with the automatically determined currently active dislikes or undesirabilities of the user;
(d) causing at least one of:
  (d1) causing a limited presentation in the controlled information presenting area of only those of the candidates which are the highest N scoring candidates among all scored candidates, N being a predetermined integer greater than zero, and
  (d2) causing an exclusion from the controlled information presenting area of those of the candidates which correlate with the automatically determined currently active dislikes or undesirabilities of the user; and
  causing the limited presentation in the controlled information presenting area to be based on currently active likes of the user as well as currently active dislikes or undesirabilities;
  wherein a time duration deemed to be recent is at least one of:
  not more than 3 hours before hand;
  not more than 10 minutes before hand;
  a latest time duration determined by an active profile of the user as being a recent one.

182. The method of claim 181 wherein:
said causing of the automatic determining of currently active dislikes or undesirabilities of the user is based on at least one of: an automatically repeated determining of a current mood of the user; an automatically repeated determining of current surroundings of the user; an automatically repeated identifying of currently active knowledge base rules applicable to the user.

183. The method of claim 181 and further comprising:
causing a turning off of the presentation of the candidates in automatically determined circumstances where such presentation of the candidates are automatically determined to constitute a probable annoyance to the user.

184. A machine-implemented method of automatically signaling with regard to personal dispositions and/or interpersonal exchange dispositions that are ongoing or are likely to soon be entered into for at least first and second users of a machine system where the automatic signaling is based on automatically repeated mapping of such personal dispositions and/or interpersonal exchange dispositions relative to one or more cognitive-disposition defining spaces, each of which spaces indicates at least one of a respective hierarchical organizational relationship and distancing relationship between probable cognitive dispositions of the at least first and second users taken individually or as taken relative to one or more information exchange groups, the method comprising:
(a) causing a maintaining in a memory of the machine system, of a first representation of, and an automatically repeated updating of a respective first cognitive-dispositions defining space having respective first nodes that are logically linked one to another at least hierarchically or spatially;
(b) causing a maintaining in a memory of the machine system, of a second representation of, and an automatically repeated updating of a respective second cognitive-dispositions defining space having respective second nodes that are logically interrelated one to another at least by represented logical distances between the second nodes within the second cognitive-states defining space;
(c) causing an automatically repeated automatic and respective ascribing to at least the first and second users of the machine system and by the machine system of at least one of respective likely positions and ascribed user-to-user linking distances within at least one of the first cognitive-dispositions defining space and the second cognitive-dispositions defining space based on repeatedly automatically collected physical disposition data currently or recently collected from respective sensors respectively proximate to the at least first and second users; and
(d) causing a signaling to automated equipment of at least one user of the machine system of a linkage to an information providing resource that is likely to be beneficial to that at least one user and is likely to be available to the at least one user, the signaling of the linkage being based on said ascribing to at least the first and second users of the at least one of respective likely positions and user-to-user linking distances;
wherein said respective and caused maintainings of the first and second cognitive-dispositions defining space respectively each includes:
automatically repeatedly updating the hierarchical or spatial organizings or represented logical distancings of the respective nodes in the respective space based on more recently acquired data corresponding to respective ones of the respective nodes, the more recently acquired data being more recent than previous data previously used to define the hierarchical or spatial organizations or represented logical distancings of the respective nodes in the respective space.

185. The method of claim 184 wherein the more recently acquired data includes at least one of:
current focus indicator signals (CFi's) recently received from respective devices associated with respective ones of the two or more users of a machine system;
explicit or implicit voting signals (CVi's) recently received from respective devices associated with respective ones of the two or more users of a machine system;
node-specific group statistics derived from recent CFi upload streams of users who touch on respective nodes of at least one of the spaces; and
node-specific group demographic statistics derived from recent active profiles of users who touch on respective nodes of at least one of the spaces.

186. The method of claim 185 wherein the automatically maintained and updated hierarchical or spatial organizations or represented logical distancings of the respective nodes in the respective spaces represent at least one of:
a child parent relationship as between hierarchically organized nodes;
a closer or farther apart relationship between spatially organized nodes;

a closer or farther apart relationship between a position ascribed to a given user and a position ascribed to a corresponding node within a respective space;

a closer or farther apart relationship between a position ascribed to a given group of users and a position ascribed to a corresponding node within a respective space; and a closer or farther apart relationship between a position ascribed to a given user and a position ascribed to a given group of other users within a respective space.

187. The method of claim 184 wherein at least one of the maintained cognitive-disposition defining spaces is a hybrid space that simultaneously maps at least two of hierarchical organizings of, or spatial organizings of, or represented logical distancings as between the nodes of the respective space and/or as between users virtually touching on the nodes of the respective space.

188. The method of claim 184 wherein at least one of the maintained cognitive-disposition defining spaces maps logical distancings as between the nodes of the respective space and/or as between users virtually touching on the nodes of the respective space based on at least one of:
 individual or group demographics;
 individual or group reputations;
 individual or group credentials;
 individual or group favorites; and
 knowledge base scoring rules.

189. A machine-implemented method of automatically changing user profiles and using the changed profiles for automatically determining what information to show and not show to a user of an automated machine system, the method comprising:
 (a) causing a repeated automatic determining of a current or recent situational disposition of a respective user of the machine system;
 (b) based on a more recent one or more of the repeated automatic determinings of situational disposition of the respective user, causing an automatic determining of at least a first profile as being a currently active profile of the respective user, the determined first profile being a member of a respective set of one or more other and currently inactive respective profiles which can alternatively be determined to be the currently active profile of the respective set and for the respective user, the at least first profile that is determined to be the currently active profile of its respective set providing at least one of information about current preferences and dislikes of the respective user and knowledge base rules including those about current preferences and dislikes of the respective user; and
 (c) using the information and/or knowledge base rules of the at least first profile that is determined to be the currently active profile of its respective set and for the respective user as a basis for automatically repeatedly determining what information to show and not show to the respective user;
 wherein said using of the at least first currently active profile of the respective user uses at least one of:
 a currently active personhood profile of the respective user;
 a currently active domain specific profile of the respective user; and
 a currently active personal expressions profile of the respective user; and
 wherein the used at least first currently active profile of the respective user includes the currently active personhood profile of the respective user and said used currently active personhood profile specifies at least one of:
 currently effective demographic attributes of the respective user;
 currently effective reputation attributes of the respective user;
 currently effective credentials of the respective user;
 currently effective knowledge base scoring rules and/or status switching rules for the respective user;
 currently effective positive and/or negative interaction co-compatibilities of the respective user;
 currently effective positive and/or negative forum preferences of the respective user; and
 currently effective favorites and/or dislikes of the respective user.

190. The method of claim 189 wherein the used at least first currently active profile of the respective user includes a currently active domain specific profile of the respective user and said used currently active domain specific profile specifies at least one of:
 a currently effective order of likelihood of different domains within a cognitive-disposition defining space that the respective user is likely to be currently focusing-upon;
 a currently effective order of likelihood of different sub-domains within a given domain of a cognitive-disposition defining space that the respective user is likely to be currently focusing-upon;
 a recent set of search keywords used by the user in conjunction with one or more of different domains and sub-domains within a cognitive-disposition defining space that is maintained within the automated machine system;
 a recent set of meta-tags referenced by the user in conjunction with one or more of different domains and sub-domains within a cognitive-disposition defining space that is maintained within the automated machine system;
 a recent set of subject-matter categorizing tags referenced by the user in conjunction with one or more of different domains and sub-domains within a cognitive-disposition defining space that is maintained within the automated machine system;
 currently effective positive and/or negative forum preferences of the respective user where the forum preferences are for forums directed to domains or sub-domains specified within the used currently active domain specific profile; and
 currently effective knowledge base scoring rules and/or status switching rules for the respective user where the knowledge base scoring rules and/or status switching rules are based on universal resource identifiers, meta-tags, subject-matter categorizing tags and/or search keywords specified within the used currently active domain specific profile.

191. The method of claim 189 wherein the used at least first currently active profile of the respective user includes a currently active personal expressions profile of the respective user and said used currently active personal expressions profile specifies at least one of:
 a currently effective order of likelihood of different biometric classes that are currently likely to indicate an emotional and/or other biometrically-related disposition of the respective user;
 for a respective one or more of the different biometric classes, a currently effective set and/or order of effectiveness of biometric attributes that are associated with the respective biometric class so as to be effectively indicative of an emotional and/or other biometrically-related disposition of the respective user;

for a respective one or more of the different biometric classes and/or for a respective one or more of the associated biometric attributes, a currently effective latency time indicative of a normal time stretch between when the respective user internally undergoes a change of mood, of emotion or of another disposition and when the change is expressed by the respectively associated biometric class and/or biometric attribute;

for a respective one or more of the different biometric classes and/or for a respective one or more of the associated biometric attributes, a currently effectively correlated mental state of the respective user that correlates with the way the respective biometric class or biometric attribute is being expressed by the respective user;

for a respective one or more of the different biometric classes and/or for a respective one or more of the associated biometric attributes, a currently effectively correlated keyword that correlates with the way the respective biometric class or biometric attribute is being expressed by the respective user;

a set of one or more knowledge base rules (KBR's) for automatically determining correlations between externally measurable or detectable expressions of the respective user and currently effective mental states and/or biometric states of the respective user and/or for automatically determining that a switch is to be carried out to using another personal expressions profile as the currently active one of the respective user.

192. The method of claim 191 wherein the knowledge base rules (KBR's) of a currently active personal expressions profile of the respective user are used and are responsive to at least one of:

change of surroundings of the respective user;
change of data processing resources available to the respective user;
change of social setting of the respective user;
change of temporal disposition of the respective user;
change of heart rate of the respective user;
change of posture of the respective user;
change of reading rate of the respective user;
change of eye dilation of the respective user;
change of note making status of the respective user;
change of respiration rate of the respective user;
change of inhalation depth of the respective user;
change of blood pressure of the respective user;
change of oxygen saturation level of the respective user;
change of eye sweep rate of the respective user;
change of rate of invitation acceptances of the respective user;
time span of focused activity by the respective user;
auditory expressions and/or visual gestures of the respective user; and
automatically determined topic of interest of the respective user or type of topic and/or general domain to which currently focused upon content of the respective user is automatically determined to belong.

193. The method of claim 191 wherein the knowledge base rules (KBR's) of a currently active personal expressions profile of the respective user are used and additionally indicate how to currently parse and group current focus indicator signals of the respective user.

194. A machine-implemented, context indicating method for indicating a probable one or more current contexts of a user of a machine system, the method comprising:

(a) automatically repeatedly collecting a plurality of temporally and spatially related sensory signals that report on at least one of: current and/or change of surroundings of the user; current and/or change of temporal disposition of the user; current and/or change of data processing resources available to the user; current and/or change of social setting of the user; current and/or changing biometric states of the user; current and/or change of facial expressions and/or gestures of the user; current and/or change of postures of the user; current and/or change of content being currently focused-upon by the user; current and/or change of sound levels to which the user is exposed;

(b) in response to current or recent ones of the automatically repeatedly collected plurality of sensory signals, automatically repeatedly determining at least one of: one or more current and likely emotional and/or other current and likely mental states of the user; a current one or more topics that the user is likely focusing-upon, the determined topics being represented by machine system maintained nodes organized as at least one of a hierarchical topics tree and a cognitions representing space whose spatial mapping includes a topics dimension; currently active one or more co-compatibility attributes of the user indicating current likes or dislikes for interaction between the user and other users of the machine system based on corresponding co-compatibility attributes of the other users; and (c) transmitting over a network, data indicative of at least one of: the determined as current, one or more likely emotional and/or one or more likely other mental states of the user; the determined as current, one or more likely topics of focus of the user; and the determined as current, one or more co-compatibility attributes of the user, the transmitted indicative data being operative to indicate a probable one or more current contexts of the user;

wherein a time duration deemed to be recent rather than current is at least one of:
not more than 10 minutes before hand; and
a latest time duration determined by a currently active profile of the user as being a recent one.

195. The method of claim 194 wherein:
the network over which said data is transmitted includes one or more domain lookup servers each operatively coupled to a respective domains configuration storage where the respective domains configuration storage stores data representative of a respective set of domain and sub-domain nodes organized hierarchically and/or spatially within a cognitions representing space and/or as interrelated by logical distancings between the nodes and the respective domain lookup servers are each configured to receive and send data signals to other components within the network.

196. The method of claim 195 wherein:
at least two of the domain lookup servers are respectively situated in geographically spaced apart locations and the respective domains configuration storages of the geographically spaced apart domain lookup servers store data for respectively different representations of how the respective set of domain and sub-domain nodes are organized based on their respective geographic locations.

197. The method of claim 195 wherein:
at least one of the domains configuration storage is organized to include at least two of:
a catch-all domain,
a domain or sub-domain providing recommendation data for the question of: What is recommended as an activity IF My Current Location is X, where X designates a geographic location;
a sub-domain providing recommendation data for the qualifier of: And IF My Current Temporal Situation is Y, where Y designates a temporal situation indicative of at least one of morning versus other parts of a day, lunch time versus other meal times of a day, weekend versus other parts of a week, holiday versus non-holiday parts of the year;
a sub-domain providing recommendation data for the qualifier of: And IF My Surrounding Weather Condition is W, where W designates a surrounding weather condition;
a domain or sub-domain providing recommendation data for at least one activity in the group consisting of: places to eat at; entertainment activities to enjoy; sightseeing activities to enjoy; exercise activities to enjoy;
a domain or sub-domain providing recommendation data for at least one activity in the group consisting of: inter-organizational activities or projects to participate in; and physical group activities to participate in.

198. The method of claim 195 wherein:
the network over which said data is transmitted includes one or more domain matching servers each operatively coupled to a respective users profile storage where the respective users profile storage stores data representative of a respective set of currently active and activateable profiles of respective users of the machine system and the respective domain matching server is configured to receive and send data signals to other components within network.

199. The method of claim 194 wherein (b1) said current one or more topics that the user is likely focusing-upon are automatically repeatedly determined.

200. The method of claim 194 wherein (b1) said currently active one or more co-compatibility attributes of the user are automatically repeatedly determined.

201. The method of claim 194 wherein (a1) sensory signals that report on at least current and/or changing biometric states of the user are automatically repeatedly collected.

202. The method of claim 194 wherein (a1) sensory signals that report on at least current and/or change of content being currently focused-upon by the user are automatically repeatedly collected.

203. The method of claim 194 wherein (c1) data indicative of at least the determined as current, one or more likely topics of focus of the user are transmitted.

204. The method of claim 203 wherein (c2) data indicative of at least the determined as current, one or more co-compatibility attributes of the user are transmitted.

205. The method of claim 203 wherein the time duration deemed to be recent rather than current is the latest time duration determined by a currently active profile of the user.

206. An automated method comprising:
dynamically associating one or more users with content based on machine system maintained domains where the maintained domains include:
mappings of different topic nodes maintained by respective communities of users and the maintained domains additionally include at least one of:
A) mappings of different social relations of users;
B) mappings of different situation-based states of users; and
C) mappings of different cognition nodes other than topic nodes, which cognition nodes are maintained by respective communities of users;
wherein the maintained domains are automatically repeatedly updated by the machine system; and
wherein the maintained domains are structured to allow for computation of in-domain closeness respectively as between different topic nodes mapped within a topic nodes organizing domain and to allow for computation of in-domain closeness respectively as between at least one pair of: (A) different users as mapped within a social co-compatibility domain; (B) different user states based on current situations of the respective users; and (C) different other cognition nodes mapped within a respective nodes organizing domain for the other cognition nodes;
wherein:
the content is presented to the associated one or more persons on a pushed basis and on basis of an in-domain computation of closeness between each associated user to whom the content is to be optionally pushed and an in-domain mapped location of an identification of the content or of a group of other users to whom the content is to be optionally pushed or of a user pre-linked to that content.

207. The method of claim 206 and further comprising:
providing for an automated collecting of explicit votes from the associated one or more persons respecting the corresponding content when the corresponding content is presented to the associated one or more persons.

208. The method of claim 206 and further comprising:
causing an automated collecting of implicit votes from the associated one or more persons respecting the corresponding content when the corresponding content is presented to the associated one or more persons.

209. The method of claim 206 wherein the corresponding content is presented to the associated one or more persons on a pulled basis in response to the associated one or more persons accepting an invitation or suggestion to link to the corresponding content.

210. The method of claim 209 and further comprising:
(d) providing for an automated collecting of explicit votes from the associated one or more persons respecting the corresponding content when the corresponding content is presented to the associated one or more persons.

211. The method of claim 209 and further comprising:
(d) causing an automated collecting of implicit votes from the associated one or more persons respecting the corresponding content when the corresponding content is presented to the associated one or more persons.

212. A credibility weighted method that automatically links one or more first users of an automated machine system to one or more other users of the machine system and/or to one or more informational resources maintained by the machine system and linked with one or more other users of the machine system, where the linked to other users and/or the informational resources linked with the one or more other users are automatically repeatedly identified as being currently likely of interest or not of interest or in the future likely to be of focal interest or not of interest to a respective one or more of the first users, each at a respective time and/or a respective place of the respective first user based on a corresponding one or more of automatically repeatedly determined situations of the respective first user and based on automatically repeatedly identified as currently active profiles of the respective first user, the method comprising:
- (a) causing an automated and automatically repeated obtaining of respective situational data from respective sensors and/or other situation indicators that are operatively proximate to or associated with respective ones of the first users of the automated machine system and further causing an automated and automatically repeated using of the obtained situational data and/or the other situation indicators to determine current or recent situations of the respective first users;
- (b) causing an automated and automatically repeated using of one or more of respective and deemed as currently active profiles of the respective first users, the currently active profiles being respectively selected subsets of respective plural profiles assigned for each of the respective first users, where selection of the currently active profiles is based on the determined current or recent situations of the respective first users and where the used one or more respective and currently active profiles of each respective first user provide at least one of:
  - (b1) data indicative of current or recent reputation attributes of the respective first user; and
  - (b2) data indicative of current or recent credential attributes of the respective first user, the credential attributes demonstrating credentialed competence relating to one or more areas of knowledge;
  - (b3) data indicative of preferences and/or dislikes of the respective first user regarding current or recent reputation attributes of the other users and/or reputation attributes of the informational resources maintained by the machine system, where the informational resources having such reputation attributes are linked to one or more of the other users;
  - (b4) data indicative of preferences and/or dislikes of the respective first user regarding current or recent credential attributes of the other users and/or credential attributes of the informational resources maintained by the machine system, where the informational resources having such credential attributes are linked to one or more of the other users;
  - (b5) data indicative of preferences and/or dislikes of the respective first user regarding current or recent on-topic proficiency attributes of the other users; and
  - (b6) data indicative of current or recent on-topic proficiency attributes of the respective first user; and
- (c) causing an automated and automatically repeated determining of which, if any, of one or more of the other users of the machine system and/or one or more of the informational resources linked with the one or more other users and maintained by the machine system are currently likely to be of interest or not of interest or would likely be of interest or not of interest to the respective first users at corresponding times and/or places based on the caused automated and automatically repeated determining of current or recent respective situations of the respective first users and based on the caused automated and automatically repeated using of at least the one or more of the respective and currently active profiles of the respective first users;
  wherein said automatically repeated determining of current and/or future interest and disinterest makes use of at least one of the indicative data of at least one of above profile items (b1), (b2), (b3), (b4), (b5) and (b6) for ranking likelihoods that one or more of the other users of the machine system and/or one or more of the informational resources linked with the one or more other users and maintained by the machine system are currently likely to be of interest or not of interest or would likely be of interest or not of interest to the respective first users at corresponding times and/or places.

213. The method of claim 212 wherein:
the indicative data of at least profile item (b4) is used for ranking said likelihoods that one or more of the other users of the machine system and/or one or more of the informational resources linked with the one or more other users and maintained by the machine system are currently likely to be of interest or not of interest or would likely be of interest or not of interest to the respective first users at corresponding times and/or places;
said current or recent credential attributes of respective ones of the other users are not respectively individually controllable by the respective ones of the other users; and
said current or recent credential attributes of the informational resources linked with the one or more other users and maintained by the machine system are determined based on machine system determined credentials of users who are determined to be linking to those informational resources in association with concurrent focus on a corresponding, machine system recognized cognition node.

214. The method of claim 213 wherein:
the credential attributes are segregated into on-topic credential attributes and the credential attributes used for said ranking include the on-topic credential attributes corresponding to a topic of a cognition node being currently focused on by the respective ones of the first users.

215. The method of claim 212 wherein:
the indicative data of at least profile item (b3) is used for ranking said likelihoods;
said current or recent reputation attributes of respective ones of the other users are not respectively individually controllable by the respective ones of the other users; and
said current or recent reputation attributes of the informational resources linked with the one or more other users and maintained by the machine system are determined based on machine system determined reputations of users who are determined to be linking to those informational resources in association with concurrent focus on a corresponding, machine system recognized cognition node.

216. The method of claim 212 wherein:
the indicative data of at least profile item (b5) is used for ranking said likelihoods;
said current or recent on-topic proficiency attributes of respective ones of the other users are not respectively individually controllable by the respective ones of the other users.

217. The method of claim 212 wherein:
the indicative data of at least profile item (b1) is used for ranking said likelihoods; and
said current or recent credential attributes of the respective first user are not respectively controllable by the respective first user.

218. The method of claim 212 wherein:
the current or recent credential attributes of the informational resources linked with the one or more other users and maintained by the machine system are determined based on whether forums maintained by the machine system and linking to those informational resources are governed by or routinely visited by respective users having current or recent credential attributes and/or current or recent reputation attributes meeting or exceeding predetermined respective thresholds.

219. The method of claim 212 wherein:
the current or recent credential attributes of the respective users include respective credential attributes validated by respective institutions that issue the respective credential attributes.

220. A content worthwhileness scoring method that automatically scores shareable content according to how worthwhile it may be for respective users of a machine system to give attention to the shareable content, the method comprising:
(a) automatically repeatedly determining one or more demographic attributes of respective, information contributing users of the machine system whose respective visitations to a respective cognition representing node maintained by the machine system and/or to a respective information exchange forum maintained by the machine system brings contributable data to the respectively visited node and/or forum as part of informational content automatically brought with the visitation due to node and forum maintaining operations of the machine system; and
(b) automatically associating with a given item of contributable data, the determined demographic attributes of the respective, one or more information contributing users whose visitations automatically brought the respective item of contributable data to the respectively visited node and/or forum;
wherein the contributable data is derived from uploaded Current Focus indicating (CFi) packages of the respective, information contributing users; and
wherein the contributable data derived from the CFi packages includes at least one of: a
URL that is a current item of focus for the respective information contributing user, a keyword that is a current item of focus for the respective information contributing user, focused on content currently focused on by the respective information contributing user, a focused on subject-matter categorizing tag currently focused on by the respective information contributing user and a meta-tag buried within currently focused upon content of the respective information contributing user.

221. The method of claim 220 wherein the demographic attributes of the respective, information contributing users include one or more credentials attributes of the respective, information contributing users.

222. The method of claim 220 wherein the demographic attributes of the respective, information contributing users include one or more reputation attributes of the respective, information contributing users.

223. The method of claim 220 wherein the demographic attributes of the respective, information contributing users include one or more topic proficiency attributes of the respective, information contributing users.

224. The method of claim 220 and further comprising:
(c) automatically associating with a given item of contributable data, automatically determined reactions by users who focus on the given item of contributable data.

225. A machine-implemented method of dynamically associating with corresponding content, one or more persons for whom the corresponding content is likely to be in the present, or would likely be in the future of interest at a corresponding time and/or a corresponding place based on a corresponding one or more of determined current or recent situations and/or identified profiles and/or votes and/or declarations and/or planning files and/or history files and/or trending files of the associated one or more persons, where said determined current or recent situations and/or identified profiles and/or votes and/or declarations and/or planning files and/or history files and/or trending files correspond to information automatically repeatedly obtained from or about the associated persons, the method comprising:
(a) causing an automated and automatically repeated obtaining of respective situational data from respective sensors and/or other situation indicators that are operatively proximate to or associated with respective ones of users of an automated machine system,
wherein the respective proximate sensors and/or other situation indicators that are operatively proximate to or associated with the respective ones of the users respectively provide at least one of:
(a1) data indicative of a current or recent one or more surroundings and/or of a current or recent one or more locations and/or of a current or recent one or more temporal positions and/or one or more availabilities and/or of a current or recent one or more changes of surrounding, and/or changes of location of the respective user;
(a2) data indicative of a current or recent mood or of a current or recent one or more changes of mood of the respective user;
(a3) data indicative of a current or recent one or more biometric attributes of, and/or of a current or recent one or more changes of biometric attributes of the respective user;
(a4) data indicative of a current or recent one or more machine usage activities and/or one or more machine usage states of the respective user;
(a5) data indicative of a current or recent mental state of, and/or of one or more current or recent changes of a mental state of the first user;
(a6) data indicative of a current or recent one or more body language gestures made by the respective user;
(a7) data indicative of a current or recent one or more body postures and/or biomechanical states of, and/or of a current or recent one or more changes of body posture and/or biomechanical state of the respective user;
(a8) data indicative of a current or recent one or more biochemical states of, and/or of a current or recent one or more changes of biochemical state of the respective user;
(a9) data indicative of a current or recent one or more physiological states of the respective user;
(a10) data indicative of a current or recent one or more frames or states of mind of, and/or of a current or recent one or more changes of frame or state of mind of the respective user;

(a11) data indicative of a current or recent one or more emotional states of, and/or of a current or recent one or more changes of emotional state of the respective user;
(a12) data providing hints or clues for identifying specific cognition nodes relevant to a current or recent state of mind of the respective user;
(a13) data indicative of a current or recent involvement of the respective user with corresponding content;
(a14) data indicative of a current or recent vote cast implicitly or explicitly by the respective user; and
(a15) data indicative of a current or recent declaration made by the respective user;
(b) causing an automated and automatically repeated using of one or more of respective currently active profiles and/or current or recent votes and/or current or recent declarations and/or planning files and/or history files and/or trending files of the respective users, the currently active profiles being respectively selected subsets of respective plural profiles assigned for each of the respective users, where the used one or more respective currently active profiles and/or current or recent votes and/or current or recent declarations and/or planning files and/or history files and/or trending files of the respective users respectively provide at least one of:
(b1) data indicative of current or recent demographic attributes of the respective user;
(b2) data indicative of current or recent reputation attributes of the respective user;
(b3) data indicative of current or recent credential attributes of the respective user;
(b4) data indicative of current or recent preference and/or dislike attributes of the respective user;
(b5) data indicative of current or recent favorites of the respective user;
(b6) data indicative of current or recent topic trends of the respective user;
(b7) data indicative of current or recent keyword histories of the respective user;
(b8) data indicative of current or recent URL histories of the respective user;
(b9) data indicative of current or recent machine usage histories of the respective user;
(b10) data indicative of current or recent physical locations-visited histories of the respective user;
(b11) data indicative of current or recent virtual forums-visited histories of the respective user;
(b12) data indicative of current or recent topics touched-on histories of the respective user;
(b13) data indicative of current or recent personal expression attributes of the respective user;
(b14) data indicative of current calendared events of the respective user;
(b15) data indicative of current to-do tasks and/or priorities thereof for the respective user;
(b16) data indicative of current persons-to-contact tasks of the respective user;
(b17) data indicative of currently open or closed availability time slots of the respective user;
(b18) data indicative of currently or recently cast votes of the respective user showing engagement with corresponding content; and
(b19) data indicative of currently or recently made declarations by the respective user regarding the respective user's emotional and/or physiological state; and (c) causing an automated and automatically repeated determining of which, if any, of one or more items of dynamically associable and corresponding content are likely or would likely be of interest or not of interest to the respective users at corresponding times and/or places based on the caused automated and automatically repeated obtaining of the respective situational data and based on the caused automated and automatically repeated using of the one or more of the respective currently active profiles and/or current or recent votes and/or current or recent declarations and/or planning files and/or history files and/or trending files of the respective users;
wherein the current or recent situation-indicating data of the respective user is that which was generated within a time period automatically determined in accordance with a currently automatically deemed as active profile of the respective user, the deemed as active profile contributing to a current definition as to what constitutes recentness for a context of the respective user.

226. A machine-implemented method of dynamically associating with corresponding content, one or more persons for whom the corresponding content is likely to be in the present of interest based on a corresponding one or more of determined current or recent situations and/or identified profiles and/or declarations and/or history files and/or trending files of the associated one or more persons, where said determined current or recent situations and/or identified profiles and/or declarations correspond to information automatically repeatedly obtained from or about the associated persons, the method comprising:
(a) causing an automated and automatically repeated obtaining by an automated machine system of respective situational data from respective sensors and/or other situation indicators that are operatively proximate to or associated with respective ones of users of the automated machine system, wherein the respective proximate sensors and/or other situation indicators that are operatively proximate to or associated with the respective ones of the users respectively provide for respective ones of the users at least one of:
(a1) data indicative of a current or recent one or more surroundings and/or of a current or recent one or more locations and/or of a current or recent one or more temporal positions and/or of a current or recent one or more changes of surrounding, and/or changes of location of the respective user;
(a3) data indicative of a current or recent one or more biometric attributes of, and/or of a current or recent one or more changes of biometric attributes of the respective user;
(a7) data indicative of a current or recent one or more biomechanical states of, and/or of a current or recent one or more changes of biomechanical state of the respective user;
(a8) data indicative of a current or recent one or more biochemical states of, and/or of a current or recent one or more changes of biochemical state of the respective user;
(a10) data indicative of a current or recent one or more frames or states of mind of, and/or of a current or recent one or more changes of frame or state of mind of the respective user;

(a11) data indicative of a current or recent one or more emotional states of, and/or of a current or recent one or more changes of emotional state of the respective user;

(a12) data providing hints or clues for identifying specific cognition nodes in a cognitions nodes populated space represented by data stored by the machine system relevant to a current or recent state of mind of the respective user;

(a13) data indicative of a current or recent involvement of the respective user with corresponding content;

(a14) data indicative of a current or recent vote cast implicitly or explicitly by the respective user; and (a15) data indicative of a current or recent declaration made by the respective user;

(b) causing an automated and automatically repeated using of one or more of respective currently active profiles and/or current or recent votes and/or current or recent declarations and/or current or recent trending files of the respective users, the currently active profiles being respectively selected subsets of respective plural profiles assigned for each of the respective users, the trending files indicating node touching trends of the respective user within the cognitions nodes populated space, where the used one or more respective currently active profiles and/or current or recent votes and/or current or recent declarations and/or current or recent trending files of the respective users respectively provide at least one of:

(b1) data indicative of current or recent demographic attributes of the respective user;

(b2) data indicative of current or recent reputation attributes of the respective user;

(b3) data indicative of current or recent credential attributes of the respective user, the credential attributes demonstrating credentialed competence relating to one or more of the cognition nodes in the cognitions nodes populated space;

(b4) data indicative of current or recent preference attributes and/or dislike attributes of the respective user;

(b5) data indicative of current or recent favorites of the respective user or of other users with whom the respective users would prefer to connect, said favorites being general favorites as among at least one of topics, domains, books, movies, URL's/web pages, games, TV shows, music, foods, the general favorites being distinguishable from currently focused upon counterparts in that the general favorites need not relate to content currently focused upon by the respective users or said other users;

(b6) data indicative of current or recent node touching trends of the respective user, the node touching trends being derived from current or recent touchings by the respective user on cognition nodes within a respective hierarchical tree of cognition nodes or within a respective space populated by the cognition nodes;

(b7) data indicative of current or recent keyword histories of the respective user;

(b8) data indicative of current or recent URL histories of the respective user;

(b10) data indicative of current or recent physical locations-visited histories of the respective user;

(b11) data indicative of current or recent virtual forums-visited histories of the respective user;

(b13) data indicative of current or recent personal expression attributes of the respective user;

(b18) data indicative of currently or recently cast votes of the respective user; and (b19) data indicative of currently or recently made declarations by the respective user regarding the respective user's emotional and/or physiological state; and (c) causing an automated and automatically repeated determining of which, if any, of one or more items of dynamically associable and corresponding content are likely in the present to be of interest or not of interest to the respective users based on the caused automated and automatically repeated obtaining of the respective situational data and based on the caused automated and automatically repeated using of the one or more of the respective currently active profiles and/or current or recent votes and/or current or recent declarations and/or history files and/or current or recent trending files of the respective users;

wherein occurrences said herein to be recent are those that occur not more than 3 hours before occurrences said herein to be current or occurrences said herein to be recent are those that occur not more than a profile-determined time stretch before occurrences said herein to be current, the profile-determined time stretch being defined by a currently active profile of the respective user.

227. The method of claim 226 and further comprising:

(d) causing a maintaining or updating within a memory of the machine system of a stored arrangement of updateable data objects, at least a plurality of which are community-updateable data objects that each respectively represents a cognition node having associated therewith, updateable cognition data resources that can be updated by way of automated collection and filtering of potentially new data that might, if determined to be sufficiently worthy, replace or supplement one or more of the updateable cognition data resources;

wherein the arrangement of the cognition nodes is at least one of a hierarchical arrangement, a spatial arrangement and one maintained in a database;

wherein the updateable cognition data resources associated with each of the at least plurality of the community-updateable data objects includes at least one of a primary name assigned to the respective cognition node and a primary specification assigned to the respective cognition node; and wherein users of the machine system can cause through at least one of explicit and implicit voting or their respective data contributions to the machine system, at least one of the following actions for respective ones of the community-updateable data objects:

(d1) converting a non-dedicated node into one dedicated to a respective and primary-wise community named and/or primary-wise community specified cognition node;

(d2) creating a dedicated node which is dedicated to a respective primary-wise community named and/or primary-wise community specified cognition;

(d3) migrating at least one of the cognition nodes and attached child nodes thereof to a different location hierarchically and/or spatially within the at least one of the hierarchical arrangement and the spatial arrangement of said community-updateable data objects;

(d4) fusing at least two of the cognition nodes together so as to thereby define a fused node inheriting the associated data resources of the fused nodes;
(d5) splitting at least one of the cognition nodes so as to thereby define a plurality of nodes each initially inheriting at least some of the associated data resources of the split node;
(d6) changing placement of a respective node hierarchically and/or spatially within a respective hierarchical and/or spatial arrangement of said community-updateable data objects;
(d7) changing an associated primary name of at least one of the cognition nodes;
(d8) adding to or changing an associated primary specification of at least one of the cognition nodes; and
(d9) adding to or changing other cognition data resources associated with at least one of the cognition nodes.

228. The method of claim 227 wherein:
the updateable cognition data resources associated with the respective ones of the community-updateable data objects include ones that have been explicitly or implicitly voted on or ranked by or provided by at least two users of the machine system.

229. The method of claim 227 wherein at least one of the hierarchical and/or spatial arrangements of the cognition nodes is additionally a dynamically reorganizable one where the dynamically organized and reorganized arrangement of at least a plurality of the cognition nodes has been explicitly or implicitly voted on by at least two users of the machine system and wherein at least three of the cognition nodes respectively and hierarchically represent at a given time point and in the recited order, a first grandparent node, a first parent node and a first child node; and further wherein the users of the machine system can cause through at least one of explicit and implicit voting, at least one of the following additional actions:
adding a second child node, different from the first child node as being an additional child of the first parent node;
changing the spatial but not hierarchical arrangements of the first and second child nodes; and
changing both of the spatial and hierarchical positionings of a selected node.

230. The method of claim 227 wherein at least a first and a second of respective pluralities of the updateable cognition data resources respectively associated with a corresponding first and a corresponding second of the community-updateable data objects are each organized as a sorted or ranked or at least collected collection of same type cognition data resources and wherein
the method comprises:
enabling users of the machine system to cause through at least one of explicit and implicit voting or ranking or usage-type touching on respective cognition nodes, at least one of the following actions to occur:
providing a relative ranking of recently collected cognition data resources of a same type collected for the respective cognition node, where the ranking is based on at least one basis among the ranking bases group of: (a) recently most popular usage of that same type of cognition data resource; (b) usage by node-touching users having higher credentials than those of other node-touching users for that same type of cognition data resource; (c) usage by node-touching users having higher reputations than those of other node-touching users for that same type of cognition data resource; and (d) recent showing of a relatively higher upsurge in trend of increased usage than the increasing usage trends of others of the same type of cognition data resource collected for the respective cognition node;
providing a sorted list of pre-ranked ones of cognition data resources of a same type where the sorting basis is selected from among a plurality of sorting bases including, most popular of used cognition data resources, most heavily credentialed of used cognition data resources, and sophistication level of information provided by the used cognition data resources;
providing a collection of aged but nonetheless highly ranked ones of cognition data resources of respective types; and
providing respective statistical reports about the personhood data of users who have touched on the respective cognition nodes.

231. The method of claim 230 wherein respective types of cognition data resources that are respectively replaced or supplemented by way of said automated collection and filtering of potentially new data for the respective cognition nodes include at least two of:
universal resource locators (URL's) of the respective cognition node;
keywords of the respective cognition node;
meta-tags of the respective cognition node;
other hints or clues of the respective cognition node besides said URL's, keywords and meta-tags;
pointers to immediate child nodes of the respective cognition node;
pointers to distant relative nodes of the respective cognition node;
pointers to associated forums of the respective cognition node;
pointers to associated other data resources of the respective cognition node;
a pointer to an associated parent node of the respective cognition node;
personhood statistics about the users who have touch on the respective cognition node, the personhood statistics including demographic statistics; and
spatial coordinates within a respective spatial space assigned to the respective cognition node.

232. The method of claim 231 wherein the other hints or clues include subject-matter categorizing tags.

233. The method of claim 230 and further comprising:
causing one or more of the ranked cognition data resources or identities thereof to be presented to one or more of the respective users.

234. The method of claim 233 and further comprising:
causing pre-sorted ones of ranked and additionally sorted cognition data resources or identities thereof to be presented to one or more of the respective users.

235. The method of claim 227 wherein the stored arrangement of updateable data objects further includes co-compatibility state objects of respective online users of the machine system, the co-compatibility state objects being respectively indicative of current personhood states of the respective online users and distances between them in a multidimensional co-compatibility space.

236. The method of claim 235 wherein the current personhood states of the respective online users include at least two selected from the group consisting of:
user age, user gender, user socioeconomic class, user religion, user culture (and implicitly associated stereotypical idiosyncrasies of that culture), user geographic location, user time zone, user language preferences, user political affiliations, user's favorite topics, user's favorite books, user's favorite movies, user's favorite games, user's favorite URLs, user's currently desired forum buddies personhood criteria, user's currently desired forum properties, user's current reputations and user's current credentials.

237. The method of claim 227 wherein the arrangement of the cognition nodes include at least a first grandparent node, a corresponding first parent node and a corresponding first child node each of which is a topic representing node respectively representing according to said recited order, a comparatively broad topic, a comparatively narrower topic (subtopic) falling under the comparatively broad topic, and a comparatively even-narrower topic (sub-subtopic) falling under the comparatively narrower topic.

238. The method of claim 237 wherein said replacing or supplementing of the updateable cognition data resources includes an adding to or a changing of at least one of:
  a URL hint associated with a respective topic node;
  a keyword hint associated with the respective topic node;
  a metadata hint associated with the respective topic node;
  a pointer to a child node associated with the respective topic node;
  a pointer to a forum associated with the respective topic node; and
  a pointer to a non-forum resource associated with the respective topic node.

239. The method of claim 238 wherein at least one forum is an online and topic-related chat room.

240. The method of claim 227 wherein said replacing or supplementing of the updateable cognition data resources includes a changing of at least one of:
  a URL hint associated with the respective node;
  a keyword hint associated with the respective node;
  a metadata hint associated with the respective node;
  a pointer to a child node associated with the respective node;
  a pointer to a forum associated with the respective node; and
  a pointer to a non-forum resource associated with the respective node.

241. The method of claim 240 wherein at least one forum is caused to have more than one of the cognition nodes pointing to that at least one forum.

242. The method of claim 241 wherein the at least one forum is an online chat room.

243. The method of claim 240 and further comprising:
  causing at least one of the primary names, primary specifications, URL hints, keyword hints and metadata hints of the respective cognition nodes to be stored in a searchable database so that cognition nodes having commonality with respect to the database stored primary names, primary specifications, URL hints, keyword hints and metadata hints of the respective cognition nodes can be co-located with use of the database.

244. The method of claim 240 and further comprising:
  causing at least one of respective node creation dates and times, node modification dates and times, node last access dates and times, and node access hits per unit time to be stored in a searchable database so that cognition nodes having commonality with respect to these database stored attributes of the respective cognition nodes can be co-located with use of the database.

245. The method of claim 227 wherein said replacing or supplementing of the updateable cognition data resources includes an adding to or changing of one or more alias names associated with the respective node.

246. The method of claim 227 wherein at least one of the cognition nodes is a co-compatibility preference representing node respectively representing at least one of demographic attributes, reputation attributes, credential attributes, and personality attributes or preferences according to which plural users of the machine system are likely to prefer joinder with one another in an information exchange session irrespective of there being an associated topic.

247. The method of claim 246 and further comprising:
  causing an automated determination of co-compatibility distancing within a co-compatibility space containing said co-compatibility preference representing node, the co-compatibility distancing being between two or more of plural users of the machine system.

248. The method of claim 247 wherein the co-compatibility space is a multidimensional space having plural axes each defining co-compatibility based on a different one of plural co-compatibility determining attributes.

249. The method of claim 226 wherein occurrences said herein to be recent are those that occur not more than 60 minutes before occurrences said herein to be current or occurrences said herein to be recent are those that occur not more than a profile-determined time stretch before occurrences said herein to be current, the profile-determined time stretch being defined by a currently active profile of the respective user.

250. The method of claim 226 wherein the respective proximate sensors and/or other situation indicators that are operatively proximate to or associated with the respective ones of the users respectively provide for respective ones of the users two or more members of the list consisting of:
  (a1') data indicative of current or recent one or more changes of surrounding, and/or changes of location of the respective user;
  (a3') data indicative of a current or recent one or more changes of biometric attributes of the respective user;
  (a7') data indicative of a current or recent one or more changes of biomechanical state of the respective user; and
  (a15') data indicative of a current or recent declaration made by the respective user.

251. The method of claim 226 wherein the respective proximate sensors and/or other situation indicators that are operatively proximate to or associated with the respective ones of the users respectively provide for respective ones of the users two or more members of the list consisting of:
  (a1') data indicative of a current or recent one or more temporal positions of the respective user, the temporal positions including at least one of indications of whether the respective user is in a temporal work disposition or not, whether the respective user is in a temporal holiday disposition or not, whether the respective user is in a temporal feeding disposition or not, and whether the respective user is in a temporal relaxation disposition or not;
  (a1") data indicative of a current or recent one or more surroundings user, the indicated surroundings including at least one of indications of what kind of weather conditions surround the respective user; what eateries surround the respective user; what entertainment venues surround the respective user, and what organization-sponsored activities surround the respective user;
  (a3') data indicative of a current or recent one or more biometric attributes of, and/or of a current or recent one or more changes of biometric attributes of the respective user, indicated biometric attributes or for which changes are indicated including at least one of pulse rate of the respective user; galvanometric skin resistance of the respective user; skin temperature of the respective user; flexure of a muscle of the respective user; rate of acceleration of hand gestures of the respective user; respiration rate of the respective user, depth of exhalations of the respective user; blood pressure of the respective user; distribution of weight by the respective user on weight bearing surfaces that bear the respective user; an EKG of the respective user, an EEG of the respective user; a grip force by which the respective user grips a device having embedded grip monitoring features; stress tones in the respective user's voice; and brain activity indicating signals obtained from the respective user by a brain probing device; and (a8') data indicative of a current or recent one or more biochemical states of, and/or of a current or recent one or more changes of biochemical state of the respective user.

252. The method of claim 226 wherein the automated and automatically repeated using of one or more of respective currently active profiles of the respective user include using of two or more members of the list consisting of:

(b13') data indicative of current or recent personal expression attributes of the respective user;

(b1') data indicative of current or recent demographic attributes of the respective user;

(b2') data indicative of current or recent reputation attributes of the respective user; and (b3') data indicative of current or recent credential attributes of the respective user.

253. The method of claim 226 wherein the automated and automatically repeated using of one or more of respective currently active profiles of the respective user and/or using of one or more of respective current or recent trending files of the respective users include using of two or more members of the list consisting of:

(b6') data indicative of current or recent node touching trends of the respective user;

(b7') data indicative of current or recent keyword histories of the respective user;

(b8') data indicative of current or recent URL histories of the respective user; and (b18') data indicative of currently or recently cast votes of the respective user.

254. The method of claim 226 wherein the basis of said step (c) of causing an automated and automatically repeated determining includes using at least one or more of the respective currently active profiles and the current or recent votes of the respective user.

255. The method of claim 226 wherein the basis of said step (c) of causing an automated and automatically repeated determining includes using at least one or more of the current or recent votes and/or current or recent declarations of the respective user.

256. The method of claim 226 and further comprising:

causing a first network-connected and content-presenting digital machine of a respective first user among said identified one or more of the respective users of the machine system to automatically present to the first user a stream of automatically repeatedly updated invitations respectively offering to the first user an ability for the first user to immediately join with one or more other persons into a telecommunications-mediated information exchange forum where actual joiners there-into or invited potential joiners into the corresponding forum are predetermined by the machine system to likely have in common with one another at least one of:

(1) same presented content which is predetermined by the machine system to have been likely recently a center of focus for the actual or potential joiners during a predetermined first time period;

(2) a common topic of concurrent focus predetermined by the machine system to likely be a center of focus for the actual or potential joiners during a predetermined second time period; and (3) co-compatibility determined by the machine system to likely be present during a predetermined third time period and as between the actual or potential joiners, the determined co-compatibility indicating likely co-compatibility between the actual or potential joiners for beneficially communicating with each other by way of the corresponding forum during the third time period, the method further comprising:

causing an automatically repeated sending by the machine system of a streamed series of invitation representing physical signals to the respective first content presenting digital machine of the first user where the sent invitation representing physical signals are not infinitesimally transient ones and are structured to cause the first content presenting digital machine to present at least some of the represented invitations as a stream of repeatedly more up to date invitations that the first user can selectively accept and where the represented invitations enable the first user to, immediately upon acceptance, join into one or more corresponding telecommunications-mediated information exchange forums each having as true at least one of said attributes as between the actual or potential joiners, namely:

(1) commonality of same presented content being likely focused upon within the first time period;

(2) commonality of likely topic being likely a center of focus within the second time period; and (3) co-compatibility for communicating with one another by way of the corresponding forum and during the third time period.

257. The method of claim 226 wherein said causing of an automated and automatically repeated obtaining of respective situational data from respective sensors and/or other situation indicators that are proximate to or associated with respective ones of users of the automated machine system includes a caused automated and automatically repeated determining of at least one of:

eye focusing activities of the respective user;

changes in pupil dilation state of the respective user;

head movement activities of the respective user;

eyeglass-frame associated activities of the respective user;

eye blinking activities of the respective user;

heart rate of the respective user;

breathing rate of the respective user;

depth of breathing of the respective user;

facial grimaces of the respective user;

galvanic skin response of the respective user;

blood pressure of the respective user;

blushing or paleness of the respective user;

skin temperature of the respective user;

muscle tensing by the respective user; and imagery in an infra-red (IR) range of the respective user.

258. The method of claim 226 wherein said causing of an automated and automatically repeated obtaining of respective situational data from respective sensors and/or other situation indicators that are proximate to or associated with respective ones of users of the automated machine system includes a caused automated and automatically repeated determining of at least one of:
  odors the respective user is subjected to;
  background lightings the respective user is subjected to;
  time spent by the respective user in apparently listening to audio content;
  time spent operating a user input device to thereby view more than one screen-full of presented content; and
  rates of input device usage by the respective user including those indicative of hand agitation rates.

259. A machine-implemented method of automatically identifying one or more informational resources that respectively are currently likely to be of interest based on a corresponding one or more of determined situations and/or identified profiles and/or votes of respective users, which determined situations and/or identified profiles and/or votes correspond to information automatically repeatedly obtained from or about the respective users, the method comprising:
  (a) causing an automated and automatically repeated obtaining of respective situational data from respective sensors and/or other situation indicators that are operatively proximate to or associated with respective ones of the users of the automated machine system,
  wherein utilized ones of the respective proximate sensors and/or other situation indicators that are operatively proximate to or associated with the respective ones of the users respectively provide at least one of:
    (a1) data indicative of a current or recent one or more surroundings of and/or indicative of a current or recent one or more locations of and/or of a current or recent one or more temporal dispositions of, and/or a current or recent one or more changes of surrounding of, and/or current or recent changes of location of the respective user;
    (a3) data indicative of a current or recent one or more biometric attributes of, and/or of a current or recent one or more changes of biometric attributes of the respective user;
    (a5) data indicative of a current or recent mental state of, and/or of one or more current or recent changes of a mental state of the respective user;
    (a7) data indicative of a current or recent one or more body postures and/or biomechanical states of, and/or of a current or recent one or more changes of body posture and/or biomechanical state of the respective user;
    (a8) data indicative of a current or recent one or more biochemical states of, and/or of a current or recent one or more changes of biochemical state of the respective user;
    (a9) data indicative of a current or recent one or more physiological states of the respective user;
    (a10) data indicative of a current or recent one or more frames or states of mind of, and/or of a current or recent one or more changes of frame or state of mind of the respective user; and
    (a11) data indicative of a current or recent one or more emotional states of, and/or of a current or recent one or more changes of emotional state of the respective user;
  (b) causing an automated and automatically repeated using of one or more of respective and currently active profiles and/or current or recent votes of the respective users, where the used one or more of respective and currently active profiles and/or current or recent votes of the respective users respectively provide at least one of:
    (b1) data indicative of current or recent demographic attributes of the respective user;
    (b2) data indicative of current or recent reputation attributes of the respective user;
    (b3) data indicative of current or recent credential attributes of the respective user;
    (b4) data indicative of current or recent preference attributes and/or dislike attributes of the respective user;
    (b13) data indicative of current or recent personal expression attributes of the respective user; and
  (c) causing an automated and automatically repeated identifying of which, if any, of one or more of informational resources are currently likely be of interest based on the caused automated and automatically repeated obtaining of the respective situational data and based on the caused automated and automatically repeated using of at least one of the one or more of the respective and currently active profiles, where the used one or more of respective and currently active profiles of the respective users includes at least one currently active one of:
    (c1) a personal emotion expression profile (PEEP) of the respective user;
    (c2) a personhood defining profile of the respective user; and
    (c3) a domain specific preferences profile of the respective user;
  wherein a time duration deemed to be recent rather than current is at least one of:
    not more than 3 hours before hand;
    not more than 10 minutes before hand; and
    a latest time duration determined by a currently active profile of the user as being a recent one.

260. A machine-implemented method of automatically identifying one or more informational resources that respectively are currently likely to be of interest to a respective one or more users of an automated machine system, each at a respective time and/or a respective place of the respective user based on a corresponding one or more of determined situations and/or identified profiles and/or votes and/or declarations and/or planning files and/or history files and/or trending files of the respective users, which determined situations and/or identified profiles and/or votes and/or declarations and/or history files and/or trending files correspond to information automatically repeatedly obtained from or about the respective users, the method comprising:
  (a) causing an automated and automatically repeated obtaining of respective situational data from respective sensors and/or other situation indicators that are operatively proximate to or associated with respective ones of the users of the automated machine system,
  wherein utilized ones of the respective proximate sensors and/or other situation indicators that are operatively proximate to or associated with the respective ones of the users respectively provide at least one of:
    (a1) data indicative of a current or recent one or more surroundings of and/or indicative of a current or recent one or more locations of and/or of a current or recent one or more temporal dispositions of and/or one or more availabilities of and/or of a current or recent one or more changes of surrounding of, and/or current or recent changes of location of the respective user;

(a2) data indicative of a current or recent mood of or of a current or recent one or more changes of mood of the respective user;

(a3) data indicative of a current or recent one or more biometric attributes of, and/or of a current or recent one or more changes of biometric attributes of the respective user;

(a4) data indicative of a current or recent one or more machine usage activities of and/or one or more machine usage states of the respective user;

(a5) data indicative of a current or recent mental state of, and/or of one or more current or recent changes of a mental state of the first user;

(a7) data indicative of a current or recent one or more body postures and/or biomechanical states of, and/or of a current or recent one or more changes of body posture and/or biomechanical state of the respective user;

(a8) data indicative of a current or recent one or more biochemical states of, and/or of a current or recent one or more changes of biochemical state of the respective user;

(a9) data indicative of a current or recent one or more physiological states of the respective user;

(a10) data indicative of a current or recent one or more frames or states of mind of, and/or of a current or recent one or more changes of frame or state of mind of the respective user; and (a11) data indicative of a current or recent one or more emotional states of, and/or of a current or recent one or more changes of emotional state of the respective user;

(b) causing an automated and automatically repeated using of one or more of respective and currently active profiles and/or current or recent votes and/or current or recent declarations and/or current or recent history files and/or current or recent trending files of the respective users, where the used one or more of respective and currently active profiles and/or current or recent votes and/or current or recent declarations and/or current or recent history files and/or current or recent trending files of the respective users respectively provide at least one of:

(b1) data indicative of current or recent demographic attributes of the respective user;

(b2) data indicative of current or recent reputation attributes of the respective user;

(b3) data indicative of current or recent credential attributes of the respective user;

(b4) data indicative of current or recent preference attributes and/or dislike attributes of the respective user;

(b5) data indicative of current or recent favorites attributes of the respective user;

(b6) data indicative of current or recent topic trends of the respective user;

(b7) data indicative of current or recent keyword histories of the respective user;

(b8) data indicative of current or recent URL histories of the respective user;

(b9) data indicative of current or recent machine usage histories of the respective user;

(b10) data indicative of current or recent physical locations-visited histories of the respective user;

(b11) data indicative of current or recent virtual forums-visited histories of the respective user;

(b12) data indicative of current or recent topics touched-on histories of the respective user; and (b13) data indicative of current or recent personal expression attributes of the respective user;

(c) causing an automated and automatically repeated identifying of which, if any, of one or more of informational resources are currently likely be of interest or not of interest to the respective users at corresponding times and/or places based on the caused automated and automatically repeated obtaining of the respective situational data and based on the caused automated and automatically repeated using of at least one of the one or more of the respective and currently active profiles and further based on the caused automated and automatically repeated using of one or more of the current or recent votes and/or current or recent declarations and/or current or recent history files and/or current or recent trending files of the respective users, where the used one or more of respective and currently active profiles of the respective users includes at least one currently active one of:

(c1) a personal emotion expression profile (PEEP) of the respective user;

(c2) a personhood defining profile of the respective user; and (c3) a domain specific preferences profile of the respective user;

wherein a time duration deemed to be recent rather than current is at least one of:

not more than 10 minutes before hand; and a latest time duration determined by a currently active profile of the user as being a recent one.

* * * * *